US010545653B2

(12) United States Patent
Dye et al.

(10) Patent No.: US 10,545,653 B2
(45) Date of Patent: Jan. 28, 2020

(54) DEVICE, METHOD, AND GRAPHICAL USER INTERFACE FOR MEDIA PLAYBACK

(71) Applicant: Apple Inc., Cupertino, CA (US)

(72) Inventors: Alan C. Dye, San Francisco, CA (US); Christopher P. Foss, San Francisco, CA (US); Cyrus Daniel Irani, Los Altos, CA (US); David Chance Graham, Campbell, CA (US); Drew Domm, Oakland, CA (US); Eric Lance Wilson, San Jose, CA (US); Jeffrey L. Robbin, Los Altos, CA (US); Matthew Joseph Cielak, San Francisco, CA (US); Monika Ewa Gromeck, Oakland, CA (US); Ofer Morag, Oakland, CA (US); Prashant J. Desai, San Francisco, CA (US); Stephen Olivier Lemay, Palo Alto, CA (US); Taylor Gerard Carrigan, San Francisco, CA (US); William Martin Bachman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 278 days.

(21) Appl. No.: 15/273,989

(22) Filed: Sep. 23, 2016

(65) Prior Publication Data

US 2017/0357421 A1 Dec. 14, 2017

Related U.S. Application Data

(60) Provisional application No. 62/348,971, filed on Jun. 12, 2016.

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS

2010/0162115 A1* 6/2010 Ringewald ........ G06F 17/30743 715/716
2011/0201388 A1 8/2011 Langlois et al.
(Continued)

OTHER PUBLICATIONS

International Search Report and Written Opinion for PCT/US2017/035371 dated Oct. 23, 2017.
(Continued)

*Primary Examiner* — William C Trapanese
(74) *Attorney, Agent, or Firm* — Fernando & Partners, LLP

(57) ABSTRACT

In accordance with some embodiments, a method includes displaying a representation of a first automatically-generated playlist, the representation of the first automatically-generated playlist including representations of a first set of media items selected for inclusion in the first automatically-generated playlist based on first playlist generation criteria for the first automatically-generated playlist. While displaying the first automatically-generated playlist, detecting user interaction with the representations of the first set of media items, and then detecting that a first update criterion for the first automatically-generated playlist has been met. In response, the method includes updating the first set of media items based on the first playlist generation criteria and the user interaction with the representations of the first set of media items—by adding or removing one or more removed
(Continued)

media items from the first set of media items, and/or maintaining media items in the first set of media items.

42 Claims, 124 Drawing Sheets

(51) Int. Cl.

| | |
|---|---|
| ***G06F 16/215*** | (2019.01) |
| ***G06F 16/48*** | (2019.01) |
| ***G06F 16/438*** | (2019.01) |
| ***G06F 3/0482*** | (2013.01) |
| ***G06F 3/0488*** | (2013.01) |
| ***G11B 27/34*** | (2006.01) |
| ***H04N 21/2385*** | (2011.01) |
| ***H04N 21/433*** | (2011.01) |
| ***H04N 21/482*** | (2011.01) |
| ***H04N 21/81*** | (2011.01) |
| ***G11B 27/031*** | (2006.01) |
| ***G11B 27/10*** | (2006.01) |

(52) U.S. Cl.

CPC ...... *G06F 3/04845* (2013.01); *G06F 3/04883* (2013.01); *G06F 16/215* (2019.01); *G06F 16/4387* (2019.01); *G06F 16/489* (2019.01); *G11B 27/031* (2013.01); *G11B 27/102* (2013.01); *G11B 27/34* (2013.01); *H04N 21/2385* (2013.01); *H04N 21/4333* (2013.01); *H04N 21/4825* (2013.01); *H04N 21/8113* (2013.01)

(56) References Cited

U.S. PATENT DOCUMENTS

| | | | |
|---|---|---|---|
| 2013/0307792 A1 | 11/2013 | Andres et al. | |
| 2014/0040740 A1* | 2/2014 | Asano ................ | G06F 3/04817 715/716 |
| 2014/0108929 A1 | 4/2014 | Garmark et al. | |
| 2015/0015494 A1 | 1/2015 | Delorme et al. | |
| 2016/0054841 A1 | 2/2016 | Yang et al. | |
| 2016/0117147 A1 | 4/2016 | Zambetti et al. | |

OTHER PUBLICATIONS

LG Electronics: “LG-H950 (LG G Flex 2)” User manual, May 27, 2015, 132 pages.

Examination Report Australian Patent Office for AU20172866131 dated Jun. 4, 2019.

* cited by examiner

Figure 7B:
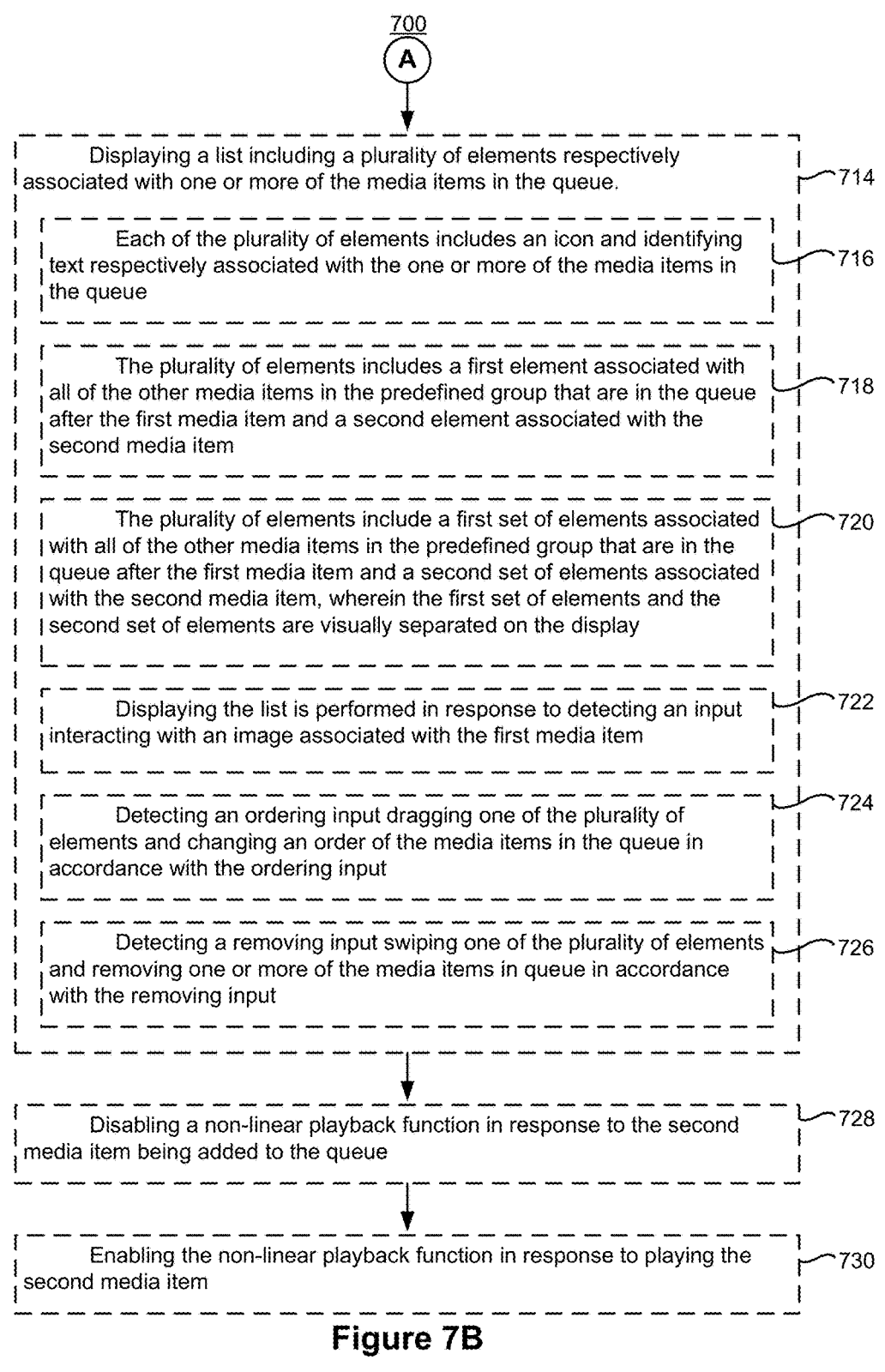

700

A

Displaying a list including a plurality of elements respectively associated with one or more of the media items in the queue. 714

Each of the plurality of elements includes an icon and identifying text respectively associated with the one or more of the media items in the queue 716

The plurality of elements includes a first element associated with all of the other media items in the predefined group that are in the queue after the first media item and a second element associated with the second media item 718

The plurality of elements include a first set of elements associated with all of the other media items in the predefined group that are in the queue after the first media item and a second set of elements associated with the second media item, wherein the first set of elements and the second set of elements are visually separated on the display 720

Displaying the list is performed in response to detecting an input interacting with an image associated with the first media item 722

Detecting an ordering input dragging one of the plurality of elements and changing an order of the media items in the queue in accordance with the ordering input 724

Detecting a removing input swiping one of the plurality of elements and removing one or more of the media items in queue in accordance with the removing input 726

Disabling a non-linear playback function in response to the second media item being added to the queue 728

Enabling the non-linear playback function in response to playing the second media item 730

Figure 9D:
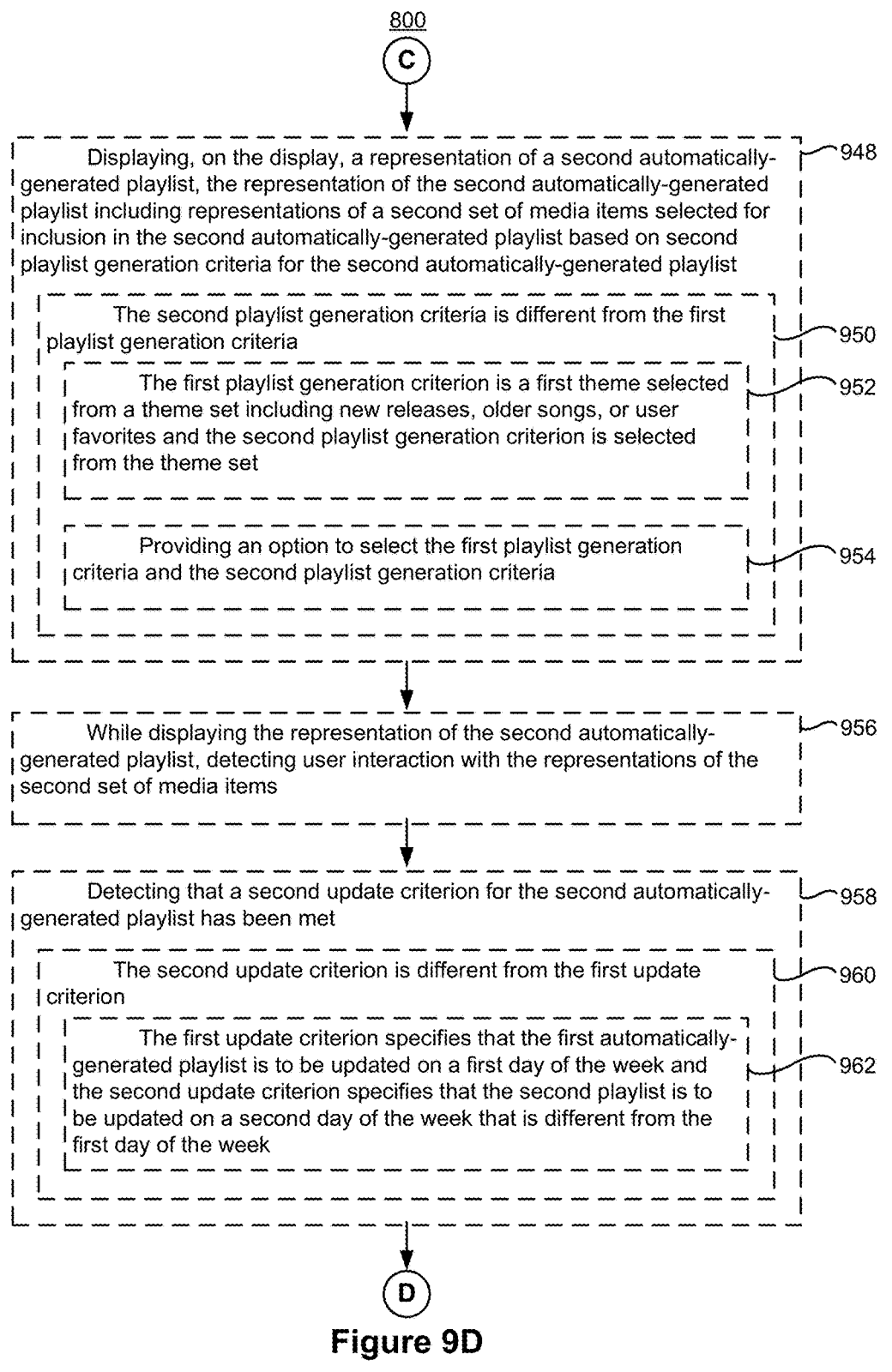

948 Displaying, on the display, a representation of a second automatically-generated playlist, the representation of the second automatically-generated playlist including representations of a second set of media items selected for inclusion in the second automatically-generated playlist based on second playlist generation criteria for the second automatically-generated playlist 950 The second playlist generation criteria is different from the first playlist generation criteria 952 The first playlist generation criterion is a first theme selected from a theme set including new releases, older songs, or user favorites and the second playlist generation criterion is selected from the theme set 954 Providing an option to select the first playlist generation criteria and the second playlist generation criteria 956 While displaying the representation of the second automatically-generated playlist, detecting user interaction with the representations of the second set of media items 958 Detecting that a second update criterion for the second automatically-generated playlist has been met 960 The second update criterion is different from the first update criterion 962 The first update criterion specifies that the first automatically-generated playlist is to be updated on a first day of the week and the second update criterion specifies that the second playlist is to be updated on a second day of the week that is different from the first day of the week

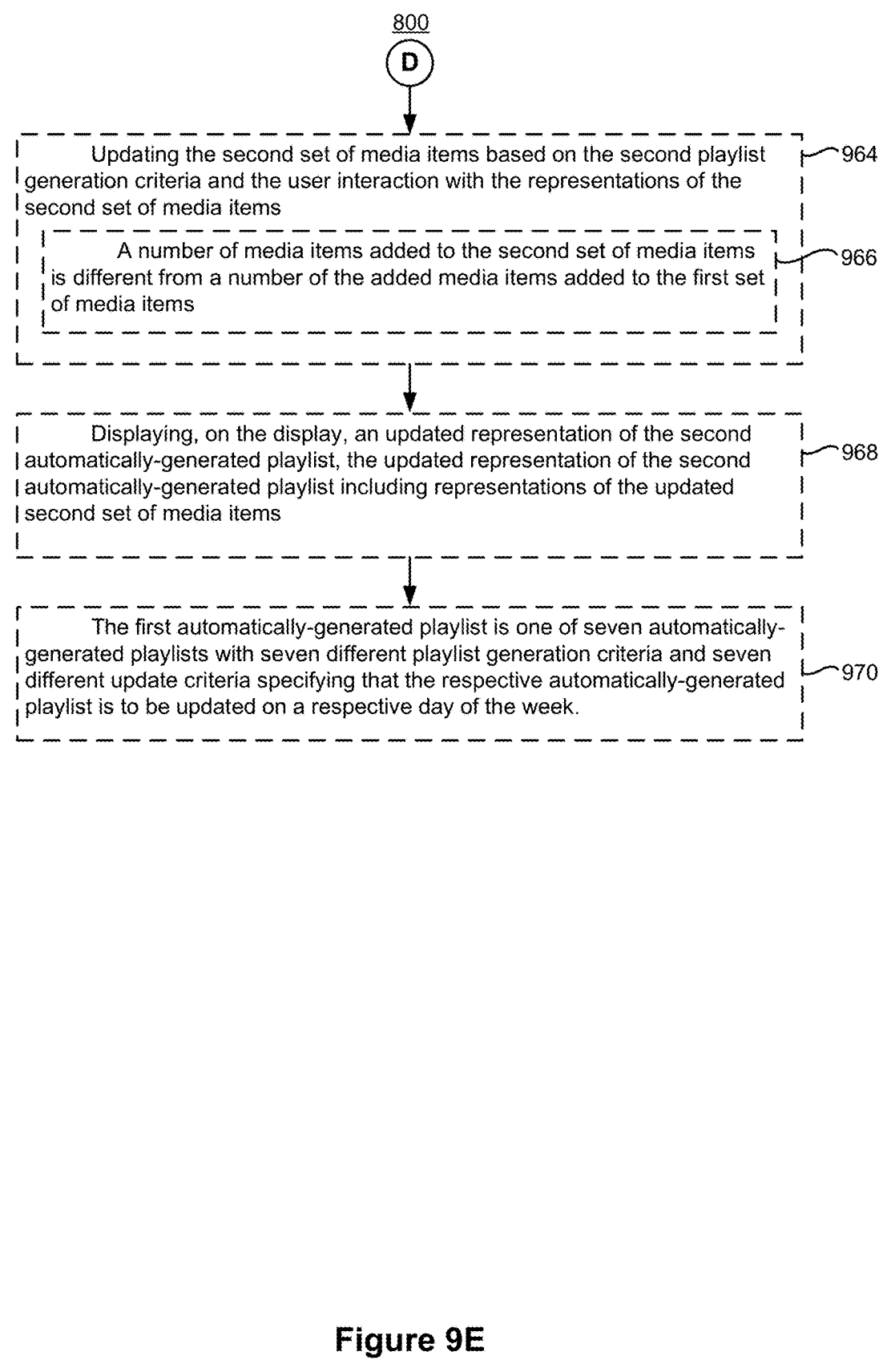

964 Updating the second set of media items based on the second playlist generation criteria and the user interaction with the representations of the second set of media items 966 A number of media items added to the second set of media items is different from a number of the added media items added to the first set of media items 968 Displaying, on the display, an updated representation of the second automatically-generated playlist, the updated representation of the second automatically-generated playlist including representations of the updated second set of media items 970 The first automatically-generated playlist is one of seven automatically-generated playlists with seven different playlist generation criteria and seven different update criteria specifying that the respective automatically-generated playlist is to be updated on a respective day of the week.

Figure 9E

Replacement Sheet

DEVICE, METHOD, AND GRAPHICAL USER INTERFACE FOR MEDIA PLAYBACK

TECHNICAL FIELD

This relates generally to electronic devices with touch-sensitive surfaces, including but not limited to electronic devices with touch-sensitive surfaces that enable playback of media items.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse-based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for playing back media items. Such methods and interfaces optionally complement or replace conventional methods for playing back media items. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes displaying, on the display, a playback status indicator regarding playback of a media item, displaying, on the display, an image associated with the media item, detecting an input interacting with the image, in response to a first portion of the input, adjusting the appearance of the image on the display in accordance with the first portion of the input, and, in response to a second portion of the input, changing playback of media items on the device in accordance with the input in accordance with the second portion of the input.

In accordance with some embodiments, a method is performed at a device with one or more processors, non-transitory memory, a display, and an input device. The method includes while playing a first media item in a queue of media items, detecting a request to add a second media item to the queue, in response to detecting the request to add the second media item to the queue, in accordance with a determination that the first media item meets group-sensitive queuing criteria, wherein the group-sensitive queuing criteria include a criterion that is met when the first media item is part of a predefined group of media items in the queue, providing an option to add the second media item to the queue after the media items in the predefined group that are in the queue after the first media item, and in accordance with a determination that the first media item does not meet the group-sensitive queuing criteria, providing an option to add the second media item to the queue after the first media item and before any other media items that are in the queue.

In accordance with some embodiments, a method is performed at a device with one or more processors, non-transitory memory, a display, and an input device. The method includes, while a plurality of media items are stored on the device, detecting the occurrence of a condition that corresponds to a request to free storage on the device, wherein the plurality of media items uses a first amount of storage on the device and a minimum amount of storage on the device has been reserved for media items, in response to detecting the occurrence of the condition while the plurality of media items uses the first amount of storage, in accordance with a determination that the first amount of storage on the device is greater than the minimum amount of storage on the device that has been reserved for media items, deleting one or more of the plurality of media items, and, in accordance with a determination that the first amount of storage on the device is less than the minimum amount of storage on the device that has been reserved for media items, forgoing deleting one or more of the plurality of media items from the device.

In accordance with some embodiments, a method is performed at a device with one or more processors, non-transitory memory, a display, and an input device. The method includes displaying, on the display, a representation of a first automatically-generated playlist, the representation of the first automatically-generated playlist including representations of a first set of media items selected for inclusion in the first automatically-generated playlist based on first playlist generation criteria for the first automatically-generated playlist, while displaying the representation of the first automatically-generated playlist, detecting user interaction with the representations of the first set of media items, after detecting the user interaction with the representations of the first set of media items, detecting that a first update criterion for the first automatically-generated playlist has been met, and, in response to detecting that the first update criterion has been met, updating the first set of media items based on the first playlist generation criteria and the user interaction with the representations of the first set of media items, wherein updating the first set of media items includes adding one or more added media items to the first set of media items, removing one or more removed media items from the first set of media items, and maintaining a plurality of maintained media items in the first set of media items, and, after updating the first set of media items, the method includes displaying, on the display, an updated representation of the first automatically-generated playlist, the updated representation of the first automatically-generated playlist including representations of the updated first set of media items In accordance with some embodiments, an electronic device includes a display unit configured to display a user interface, one or more input units configured to receive user inputs, and a processing unit coupled with the display unit and the one or more input units. The processing unit is configured to display, on the display unit, a playback status indicator regarding playback of a media item, display, on the display unit, an image associated with the media item, detecting an input interacting with the image, in response to a first portion of the input, adjust the appearance of the image on the display unit in accordance with the first portion of the input, and, in response to a second portion of the input, change playback of media items on the device in accordance with the input in accordance with the second portion of the input.

In accordance with some embodiments, an electronic device includes a display unit configured to display a user interface, one or more input units configured to receive user inputs, and a processing unit coupled with the display unit and the one or more input units. The processing unit is configured to, while playing a first media item in a queue of media items, detect a request to add a second media item to the queue, in response to detecting the request to add the second media item to the queue, in accordance with a determination that the first media item meets group-sensitive queuing criteria, wherein the group-sensitive queuing criteria include a criterion that is met when the first media item is part of a predefined group of media items in the queue, provide an option to add the second media item to the queue after the media items in the predefined group that are in the queue after the first media item, and, in accordance with a determination that the first media item does not meet the group-sensitive queuing criteria, providing an option to add the second media item to the queue after the first media item and before any other media items that are in the queue.

In accordance with some embodiments, an electronic device includes a display unit configured to display a user interface, one or more input units configured to receive user inputs, and a processing unit coupled with the display unit and the one or more input units. The processing unit is configured to, while a plurality of media items are stored on the device, detect the occurrence of a condition that corresponds to a request to free storage on the device, wherein the plurality of media items uses a first amount of storage on the device and a minimum amount of storage on the device has been reserved for media items, in response to detecting the occurrence of the condition while the plurality of media items uses the first amount of storage, in accordance with a determination that the first amount of storage on the device is greater than the minimum amount of storage on the device that has been reserved for media items, delete one or more of the plurality of media items, and, in accordance with a determination that the first amount of storage on the device is less than the minimum amount of storage on the device that has been reserved for media items, forgo deleting one or more of the plurality of media items from the device.

In accordance with some embodiments, an electronic device includes a display unit configured to display a user interface, one or more input units configured to receive user inputs, and a processing unit coupled with the display unit and the one or more input units. The processing unit is configured to display, on the display unit, a representation of a first automatically-generated playlist, the representation of the first automatically-generated playlist including representations of a first set of media items selected for inclusion in the first automatically-generated playlist based on first playlist generation criteria for the first automatically-generated playlist, while displaying the representation of the first automatically-generated playlist, detect user interaction with the representations of the first set of media items, after detecting the user interaction with the representations of the first set of media items, detect that a first update criterion for the first automatically-generated playlist has been met, and, in response to detecting that the first update criterion has been met, update the first set of media items based on the first playlist generation criteria and the user interaction with the representations of the first set of media items, wherein updating the first set of media items includes adding one or more added media items to the first set of media items, removing one or more removed media items from the first set of media items, and maintaining a plurality of maintained media items in the first set of media items, and the processing unit is configured to, after updating the first set of media items, display, on the display unit, an updated representation of the first automatically-generated playlist, the updated representation of the first automatically-generated playlist including representations of the updated first set of media items.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for playing back media items, thereby increasing the effectiveness, efficiency, and user satisfaction with such devices. Such methods and interfaces may complement or replace conventional methods for playing back media items.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7B are flow diagrams illustrating a method of queuing a media item in accordance with some embodiments.

FIGS. 9A-9E are flow diagrams illustrating a method of updating a playlist in accordance with some embodiments.

DESCRIPTION OF EMBODIMENTS

Figure 1A:
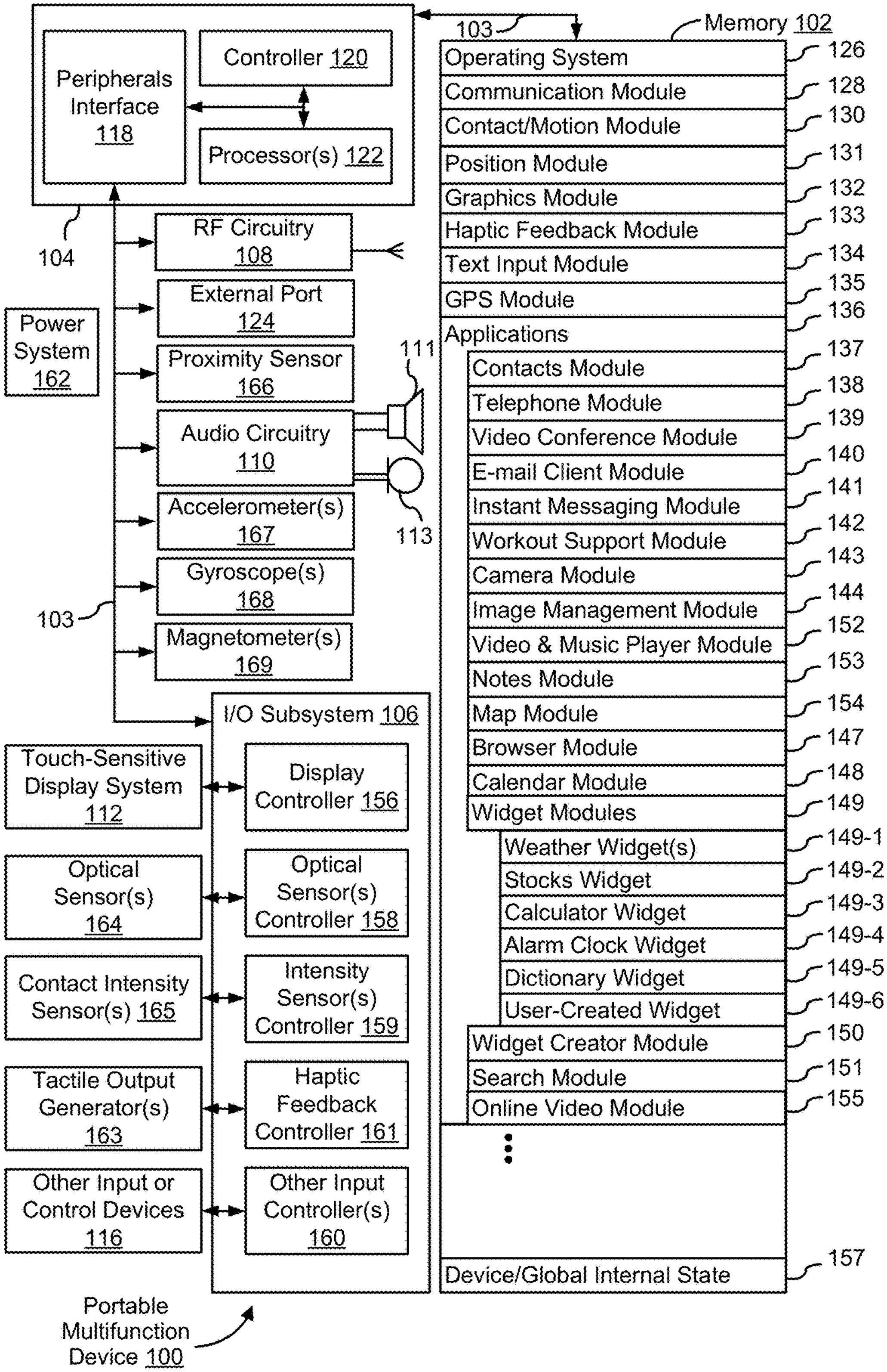
FIG. 1A is a block diagram illustrating a portable multifunction device with a touch-sensitive display in accordance with some embodiments.

Many electronic devices have graphical user interfaces for playing back media items. In some such media player user interfaces, an image associated with a media item being played back is displayed in conjunction with playback of the media item. For example, while playing a song (e.g., through a speaker), album art associated with an album of the song is displayed (e.g., on a display). When the image is displayed on a touch-sensitive surface, the display region of the image occupies display space that could be otherwise occupied by interaction affordances allowing a user to change playback of media items. Accordingly, in embodiments described below, the image itself is configured as an interaction affordance that allows a user to change playback of media items. For example, in response to detecting a touch on the image, the device pauses or plays the media item. As another example, in response to a swipe over the image, the device plays a different media item.

While playing a media item, a user can desire to play other media items without interrupting playback of the current media item. Thus, many electronic devices include affordances for adding media items to a queue. However, in some cases, a user can desire to play other media items without interrupting playback of a predefined group of media items to which the media item belongs (e.g., an album of a song or a playlist including the song). Accordingly, in embodiments described below, options are provided for adding media items to queue to be played after not just the currently playing media item, but after a predefined group of media items to which the media item belongs.

Users may enjoy consuming a large number of media items. However, a large number of media items stored on an electronic device can use a large amount of storage, preventing other storage operations, such as storage of applications. Some electronic devices can delete media items stored by the electronic device in order to free storage for other storage operations. In some cases, this may result in an undesirably low amount of media items stored on the electronic device. Accordingly, in embodiments described below, a user is provided with an option to reserve an amount of storage of the electronic device for media items. The electronic device is allowed to delete media items in order to perform other storage operations, but must maintain at least a threshold amount of media items in storage.

The creation of media item playlists can be an arduous task. Further, such playlists rarely include media items with which a user in unfamiliar, yet may enjoy. Automatically-generated playlist or playlists curated by third parties can include media items with which a user in unfamiliar, but does not enjoy. Accordingly, in embodiments described below, playlists are automatically generated based on user interactions with media items and, in various implementations, a theme. Further, the playlists are automatically updated based on user interactions with the media items of the automatically-generated playlist, removing media items the user does not enjoy and adding media items the user is more likely to enjoy. Thus, over time, the playlist includes media items the user enjoys and frequently includes media items with which the user in unfamiliar, but is likely to enjoy.

Below, FIGS. 1A-1B, 2, and 3 provide a description of example devices. FIGS. 4A-4B and 5A-5CT illustrate example user interfaces for playing back media items. FIGS.

6A-6E illustrate a flow diagram of a method of playing back media items. FIGS. 7A-7B illustrate a flow diagram of a method of queuing a media item. FIGS. 8A-8D illustrate a flow diagram of a method of managing storage of media items. FIGS. 9A-9E illustrate a flow diagram of a method of updating a playlist. The user interfaces in FIGS. 5A-5CT are used to illustrate the processes in FIGS. 6A-6E, 7A-7B, 8A-8D, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
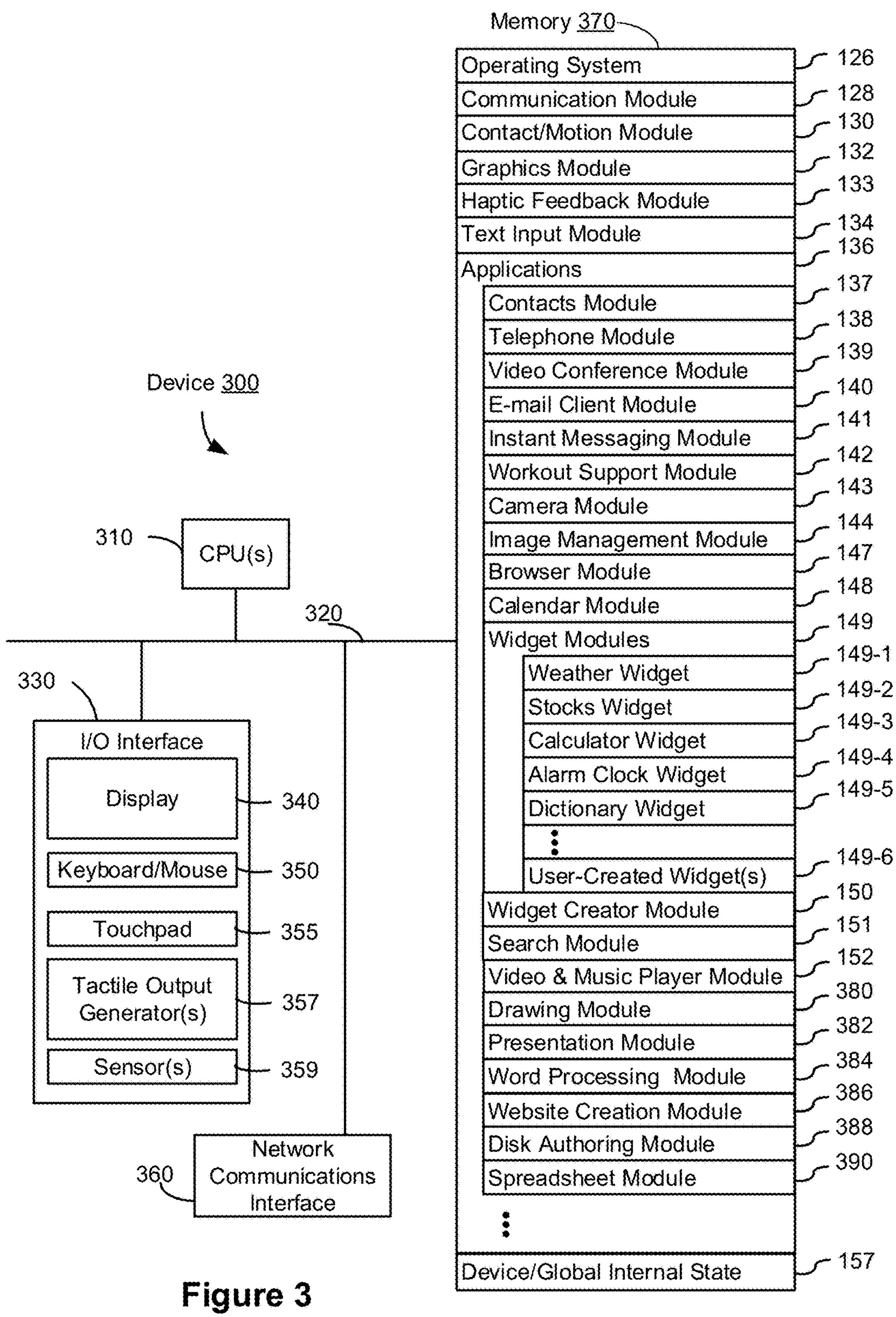
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module

134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
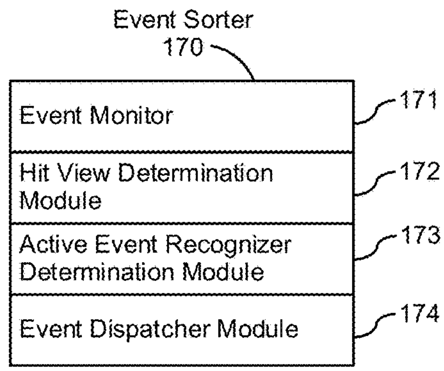
FIG. 1B is a block diagram illustrating example components for event handling in accordance with some embodiments.
Figure 1B:
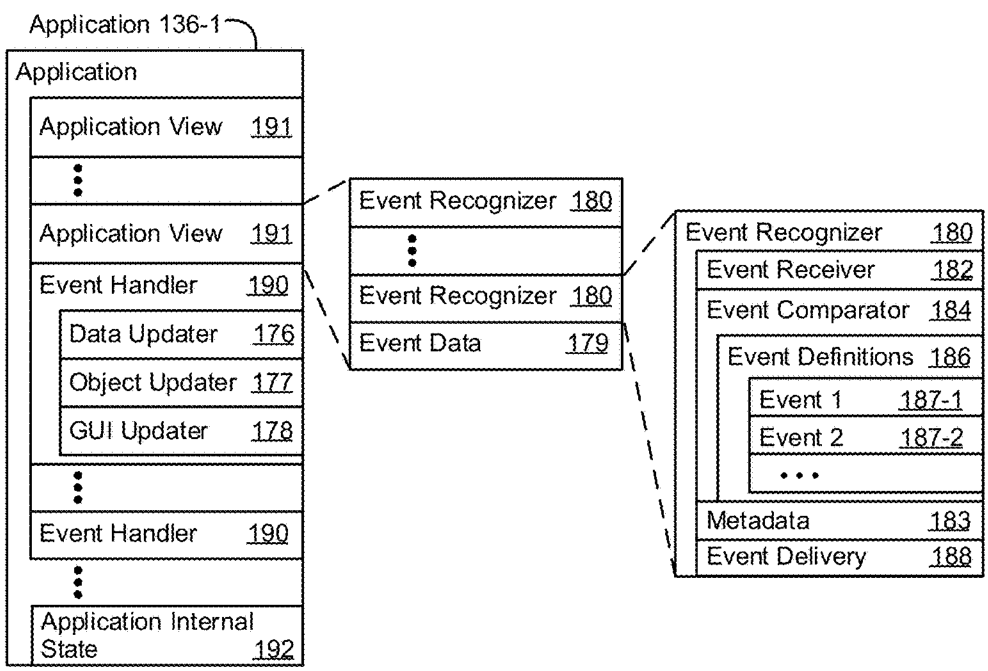

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
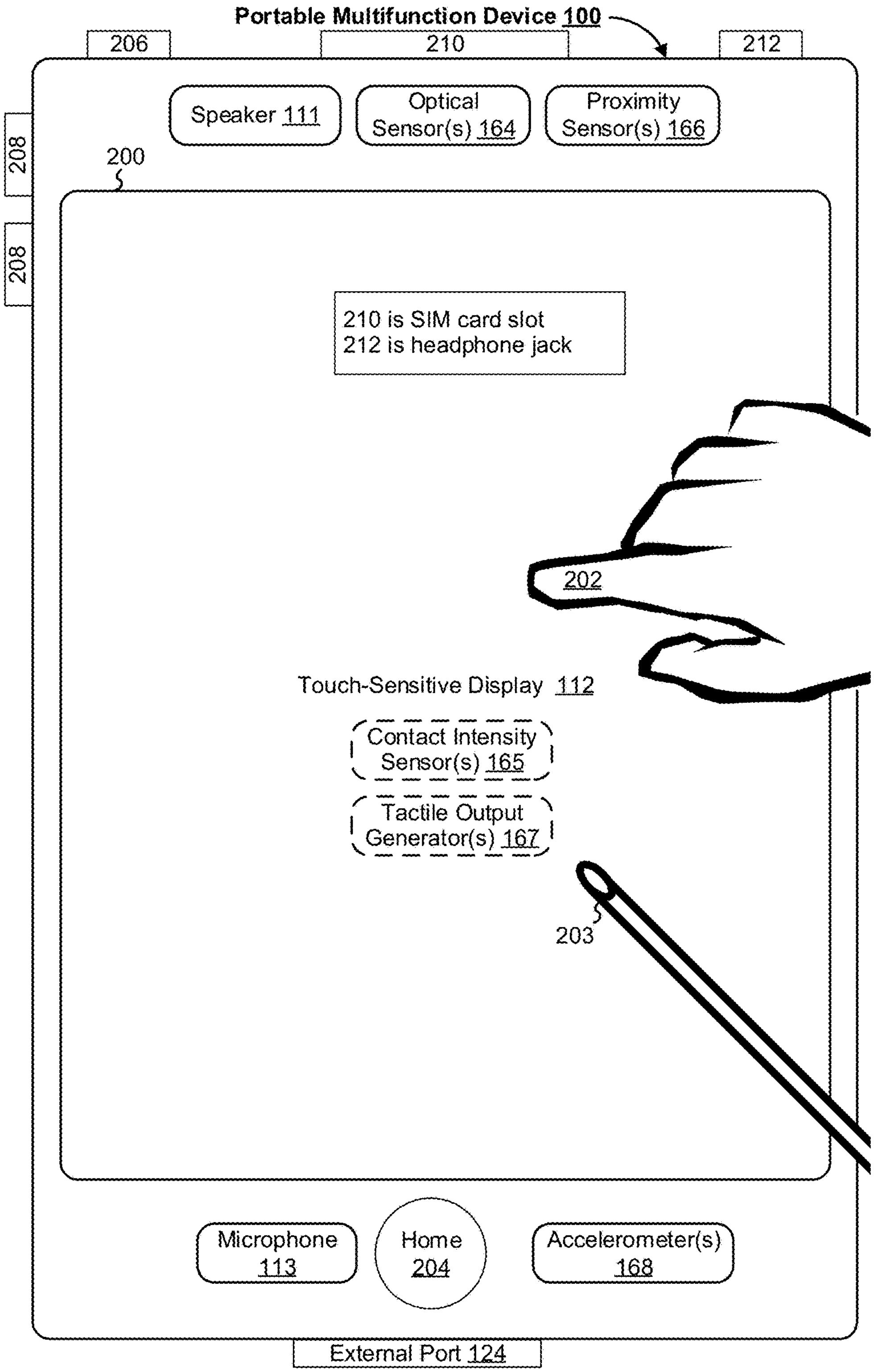
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
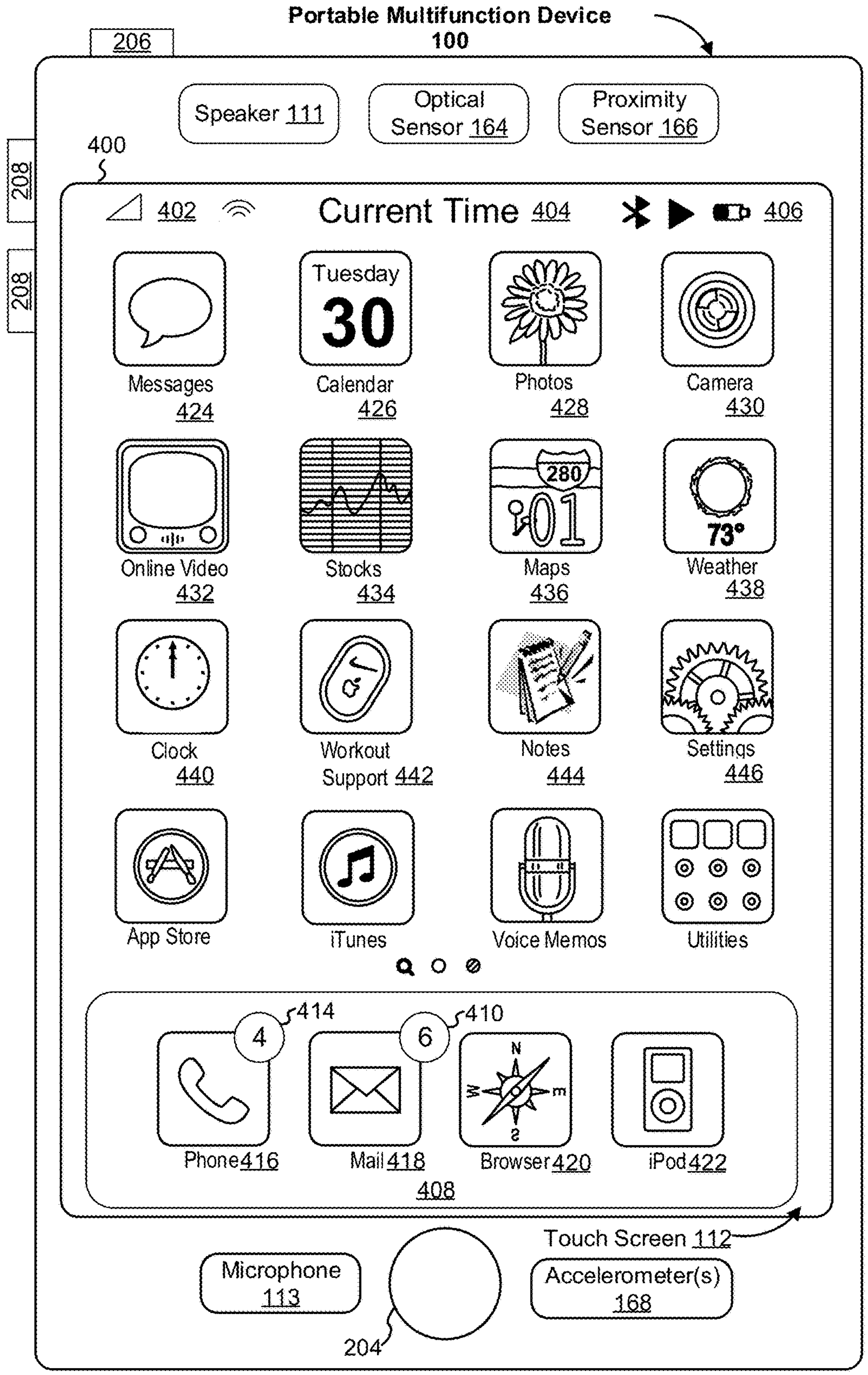
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, also referred to as iPod (trademark of Apple Inc.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 169-6, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
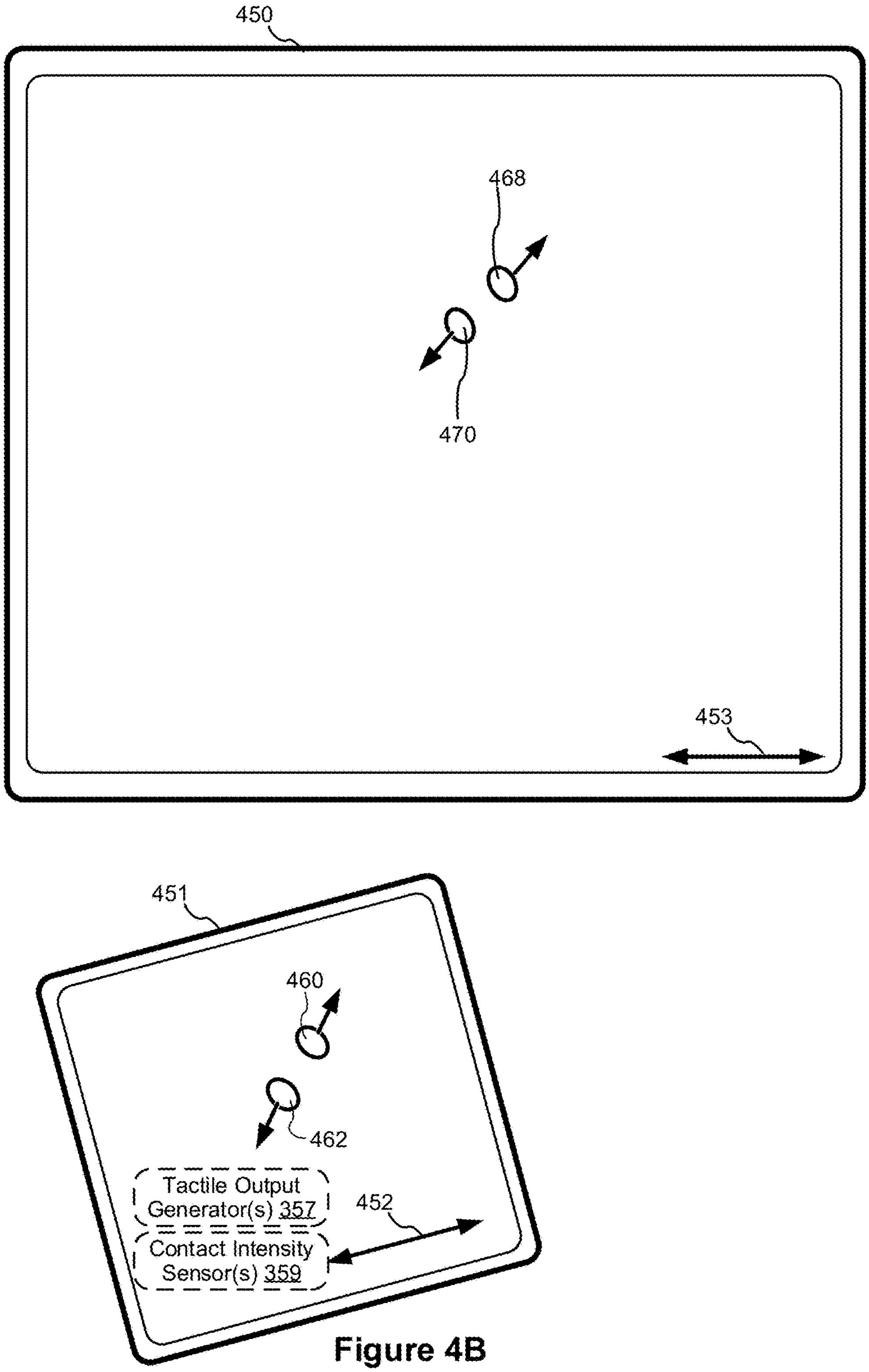
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

Figure 5A:
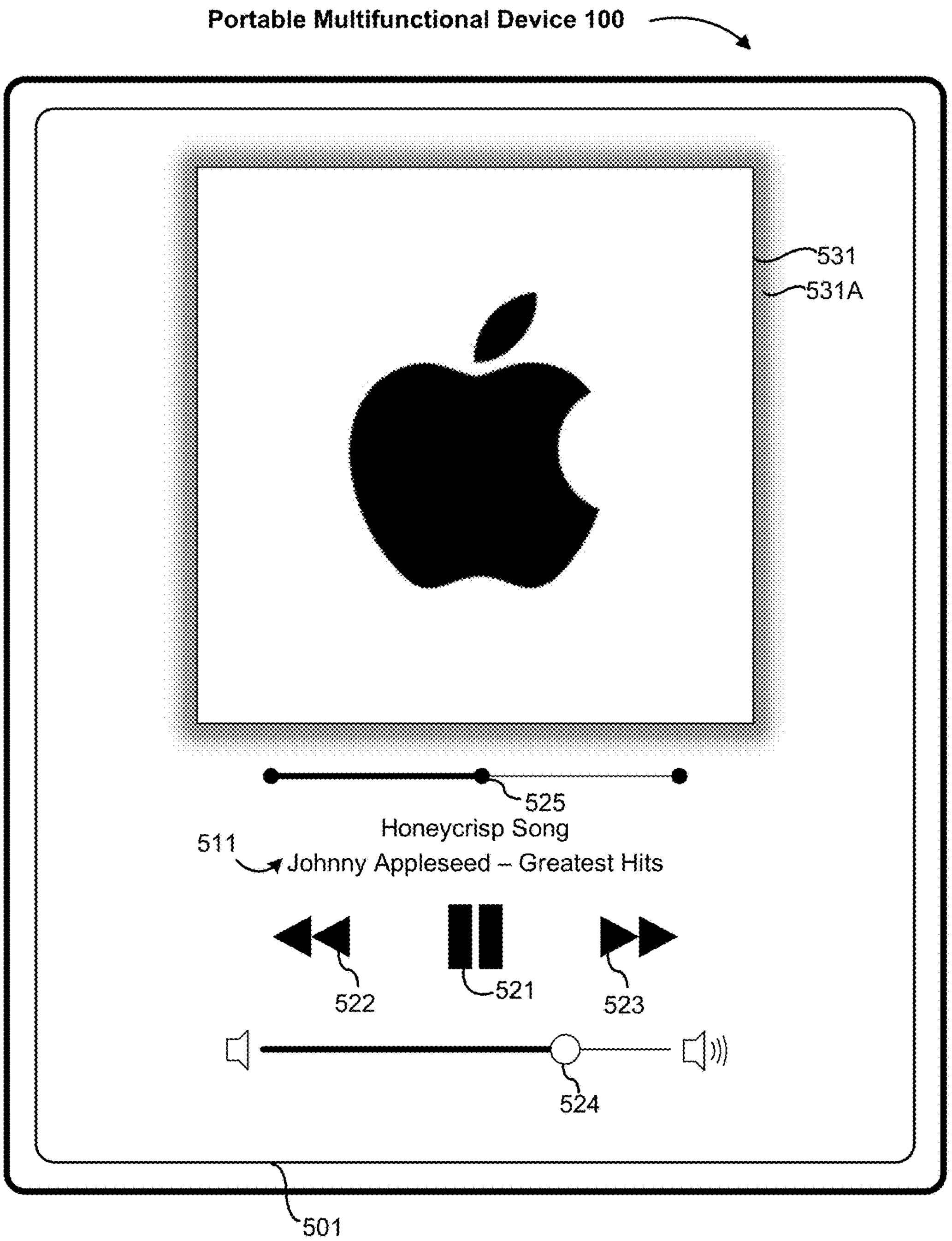
FIGS. 5A-5CT illustrate example user interfaces for playing back media items in accordance with some embodiments.
Figure 5B:
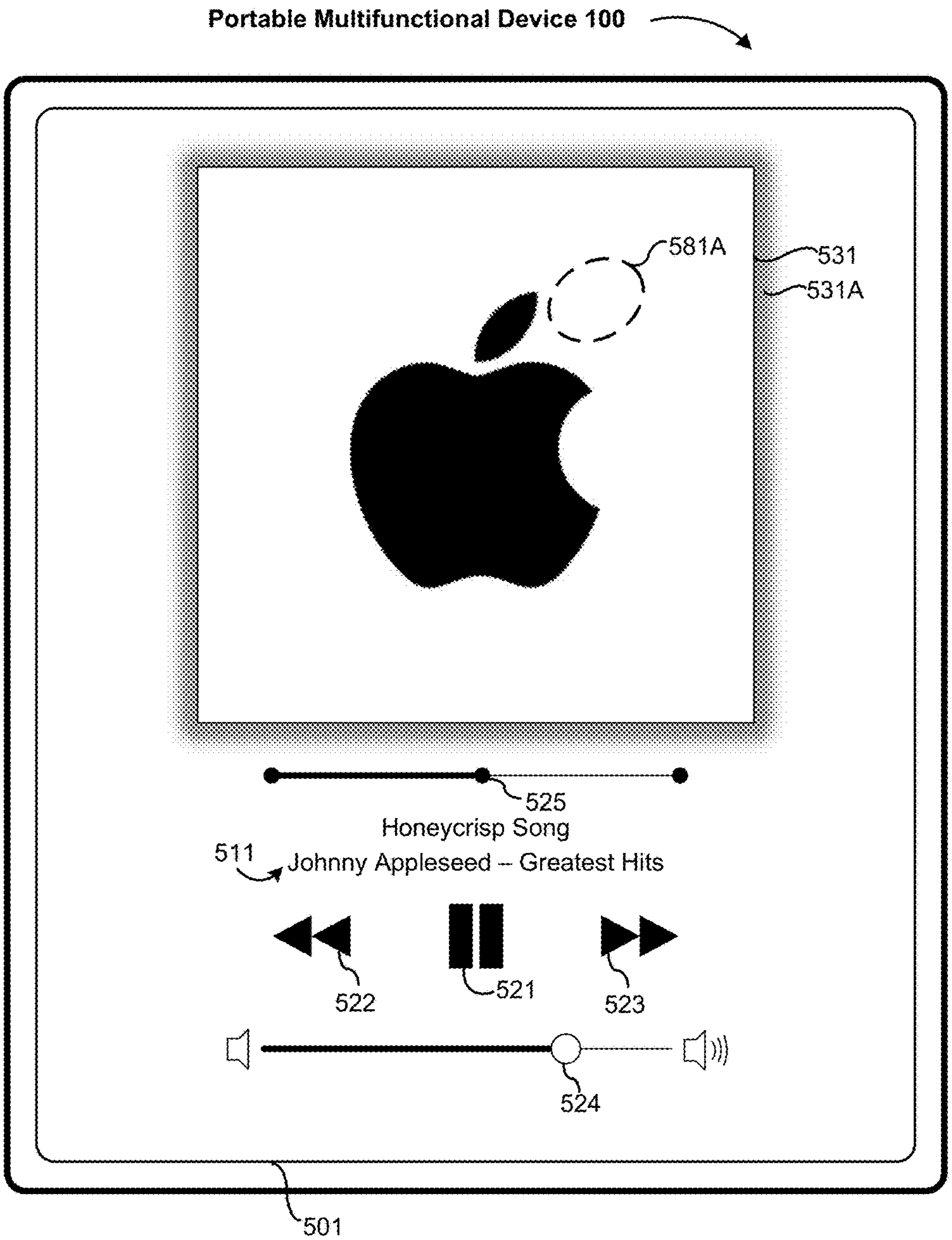
Figure 5C:
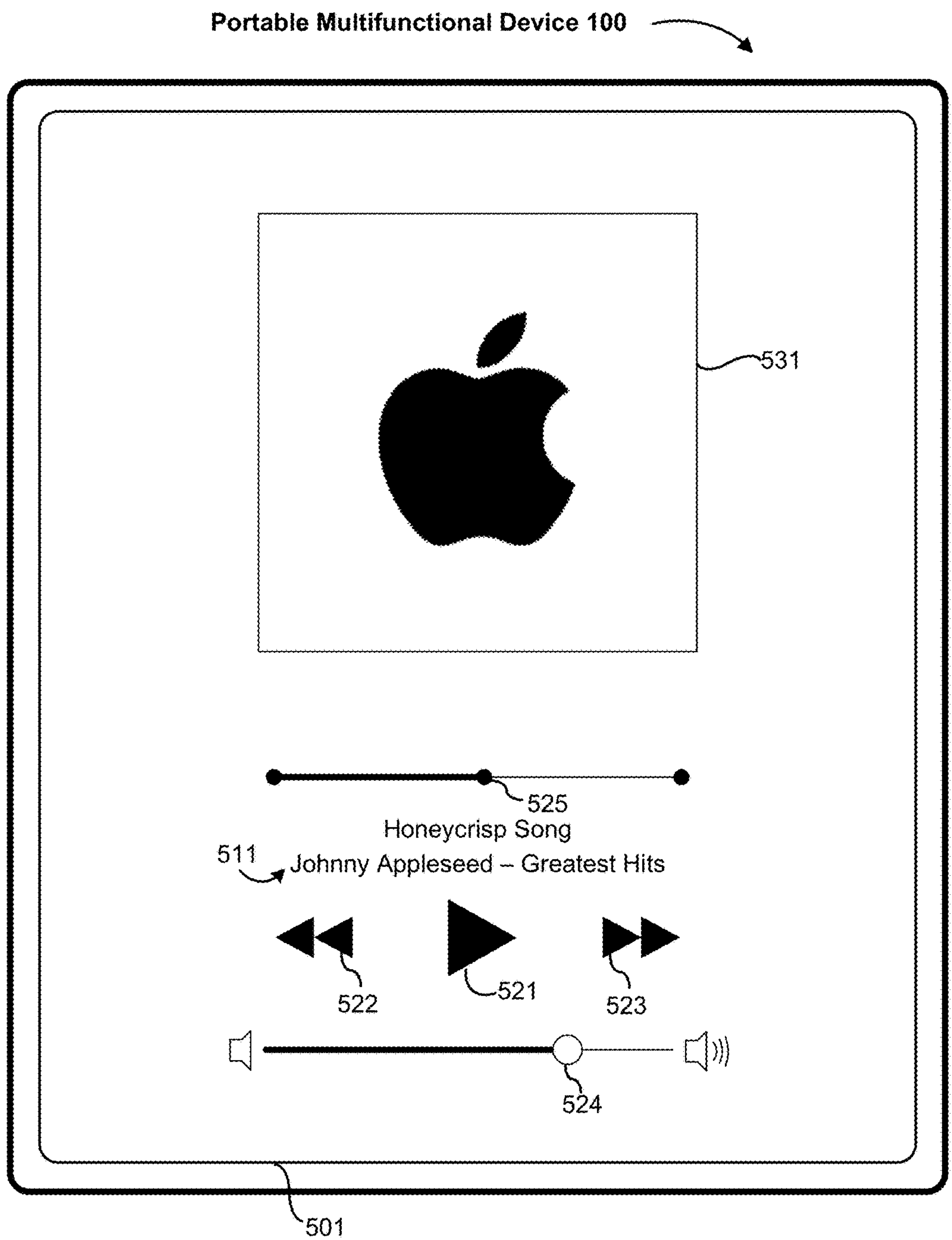

FIGS. 5A-5CT illustrate example user interfaces for playing back media items in accordance with some embodiments. The user interfaces in these figures are used to illustrate the processes described below, including the processes in FIGS. 6A-6E, 7A-7B, 8A-8D, and 9A-9E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates a user interface 501 for playing back media items using a portable multifunctional device 100. The user interface 501 includes identifying text 511 indicating the media item being played back. For example, when the media item is a song, the identifying text 511 can include, for example and as shown in FIG. 5A, a song title, an artist, and an album title. When the media item is a podcast, the identifying text can, for example, include a podcast title, an episode number, an artist, or a date. When the media item is an audiobook, the identifying text can include, for example, a book title, an author, or a chapter number. When the media item is a movie, the identifying text can include, for example, a title, a release date, or a production studio. The media item can be other types of content besides a song, podcast, audiobook, or movie and the identifying text can include other types of information.

The user interface 501 includes a number of playback affordances, described in detail below, for manipulating playback of the media item and/or other media items. The playback affordances can include a play-pause affordance 521 for pausing and resuming playback of the media item being played back, a reverse affordance 522 for starting playback of a prior media item, a forward affordance 523 for starting playback of a next media item, a volume affordance 524 for changing the volume of sound associated with the media item, and a scrubbing affordance 525 for changing a playback time of playback of the media item.

The user interface 501 includes an image 531 associated with the media item. The image 531 can be stored in association with the content of the media item. When the media item is a song, the image 531 can, for example, be album cover art associated with an album upon which the song appears. In some implementations, the image 531 can be a photograph of the artist that performs the song. When the media item is a podcast, the image 531 can be a logo associated with the podcast and/or the performers. When the media item is an audiobook, the image 531 can be book cover art. In some implementations, when an image is not stored in association with the content of the media item, a placeholder image can be used. The placeholder image can be, for example, a default image or a generated image (e.g., a monogram).

The image 531 is displayed within a display region of the display of the portable multifunctional device 100. Thus, the image 531 occupies or spans the display region of the display. As described further below, the display region occupied by the image 531 can change as the image 531 changes size, location, and/or shape.

The identifying text 511 and the pause-play affordance 521 form a playback status indicator regarding playback of the media item. When the pause-play affordance 521 is in a press-to-pause state, or simply, a pause state (as shown in FIG. 5A), the playback status indicator indicates that the media item indicated by the identifying text 511 is being played. When the pause-play affordance 521 is in a press-to-play state, or simply, a play state (as shown in FIG. 5C), the playback status indicator indicates that the media item identified by the identifying text 511 is paused. It is to be appreciated that playing back a media item includes either or both of playing or pausing the media item. Thus, even when playback of the media item is paused, the portable multifunctional device 100 is playing back the media item.

When the media item is being played, the image 531 is surrounded by a border 531A (or a shadow or other visual effect that causes the image to appear to be lifted off from a background of the user interface in a virtual z direction) which also serves (in part) as a playback status indicator. As described below (and shown in FIG. 5C), when the media item is paused, the image 531 is not surround by the border 531A. In various implementations, the border 531A can be replaced with other playback status indicators associated with the image. For example, in some implementations, a brightness, contrast, or color of the image 531 is changed based on the playback status of the media item. In FIG. 5A, the border 531A surrounds the image 531. In some implementations, the border 531A or another playback status indicator associated with the image 531 is present only of two sides of the image or on one side of the image.

FIG. 5B illustrates the user interface 501 of FIG. 5A with a touch 581A detected at a location of the image 531 (e.g., within the display region). The touch 581A is an input interacting with the image. The touch 581A includes a first portion (touchdown of a contact on the image 531 on the touch-sensitive display of the portable multifunctional device 100) and a second portion (liftoff of the contact from the touch-sensitive display of the portable multifunctional device 100).

FIG. 5C illustrates the user interface 501 in response to detecting the touch 581A at the location of the image 531 in FIG. 5B. In response to detecting the touch 581A at the location of the image 531, the pause-play affordance 521 is changed to a play state and the size of the image 531 is reduced (e.g., the size of the display region is reduced). As shown in FIG. 5C, the location of the image 531 (e.g., the center of the image 531) is unchanged. Also in response to detecting the touch 581A at the location of the image 531, the border 531A ceases to be displayed. The pause-play affordance 521 changing to the play state (and ceasing display of the border 531A) indicates that playback of the media item is paused.

In some implementations, the appearance of the image 531 on the display is adjusted (e.g., the size is reduced) in response to and in accordance with a first portion of the touch 581A (e.g., touchdown of the contact) and playback of content on the device is changed (e.g., playback of the media item is paused) in response to and in accordance with a second portion of the touch 581A (e.g., liftoff of the contact).

Figure 5D:
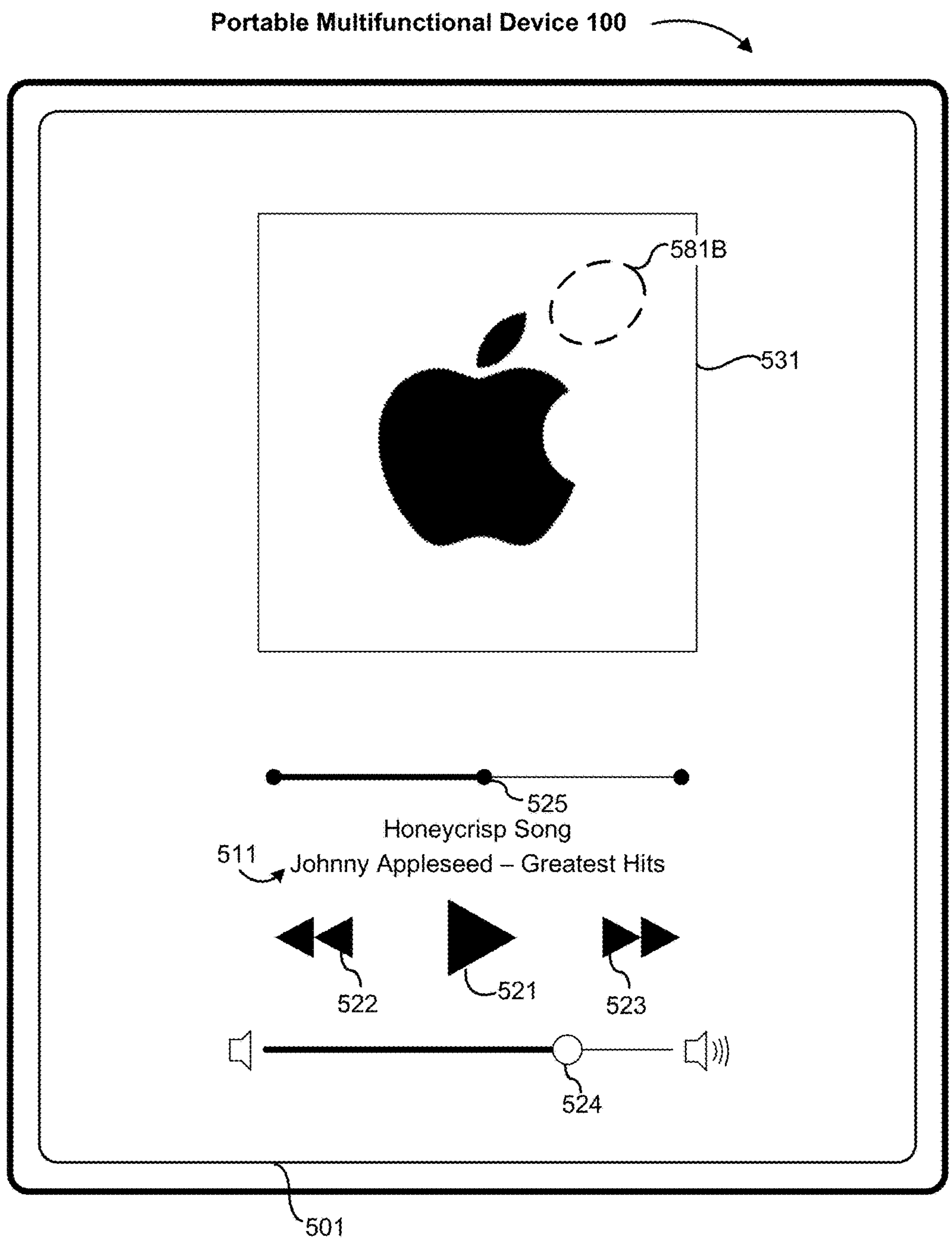

FIG. 5D illustrates the user interface 501 of FIG. 5C with a touch 581B detected at a location of the image 531 (e.g., within the display region). The touch 581B is an input interacting with the image 531. The touch 581B includes a first portion (touchdown of a contact on the image 531 on the touch-sensitive display of the portable multifunctional device 100) and a second portion (liftoff of the contact from the touch-sensitive display of the portable multifunctional device 100).

Figure 5E:
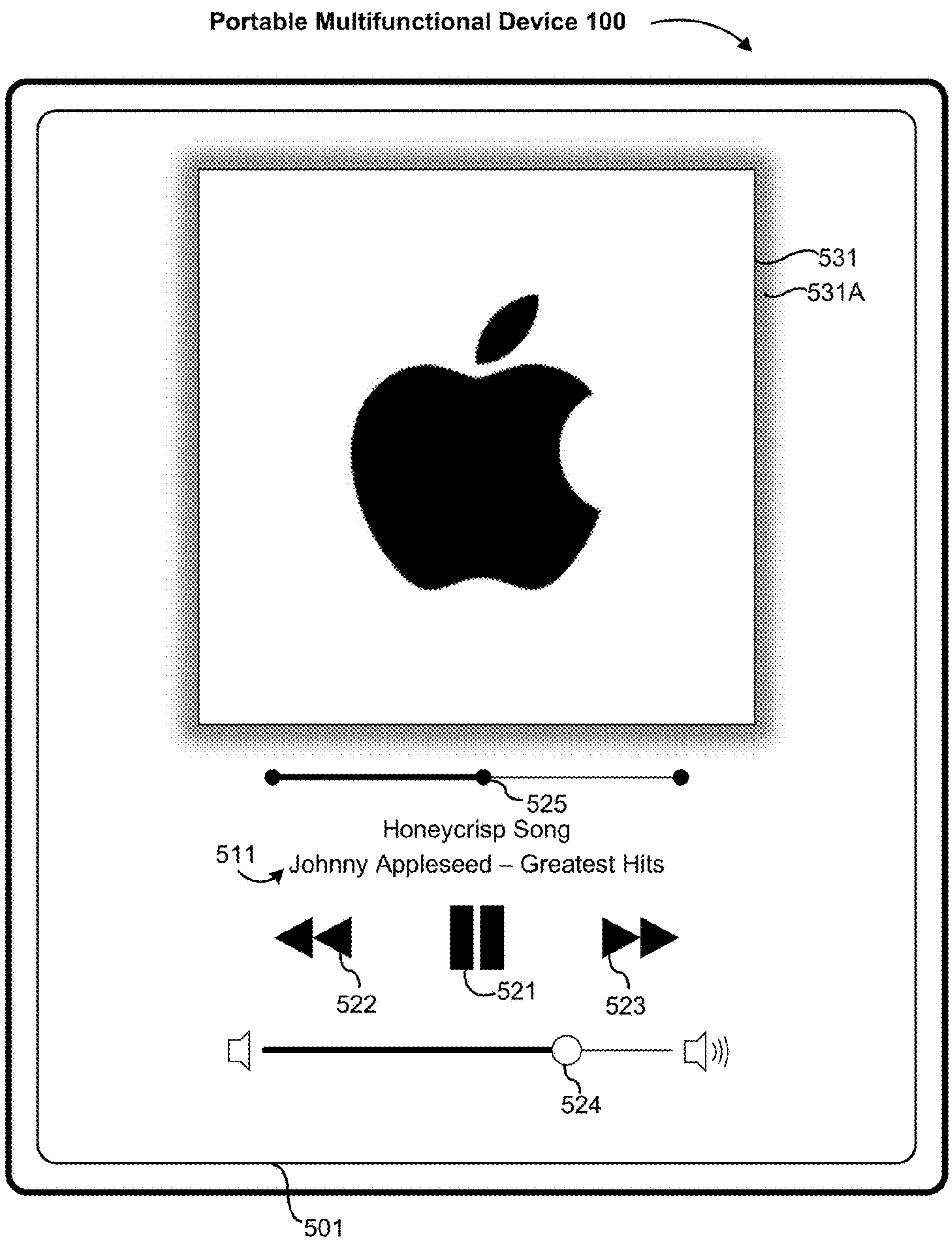

FIG. 5E illustrates the user interface 501 in response to detecting the touch 581B at the location of the image 531 in FIG. 5D. In response to detecting the touch 581B at the location of the image 531, the pause-play affordance 521 is changed back to a pause state and the size of the image 531 is increased (e.g., the size of the display region is increased) back to the size of the image 531 in FIG. 5A. As shown in FIG. 5E, the location of the image 531 (e.g., the center of the image 531) is unchanged. Also in response to detecting the touch 581B at the location of the image 531, the border 531A is, once again, displayed. The pause-play affordance 521 changing to the pause state (and resuming display of the border 531A) indicates that playback of the media item is resumed.

In some implementations, the appearance of the image 531 on the display is adjusted (e.g., the size is increased) in response to and in accordance with a first portion of the touch 581B (e.g., touchdown of the contact) and playback of content on the device is changed (e.g., playback of the media item is resumed) in response to and in accordance with a second portion of the touch 581B (e.g., liftoff of the contact).

Figure 5F:
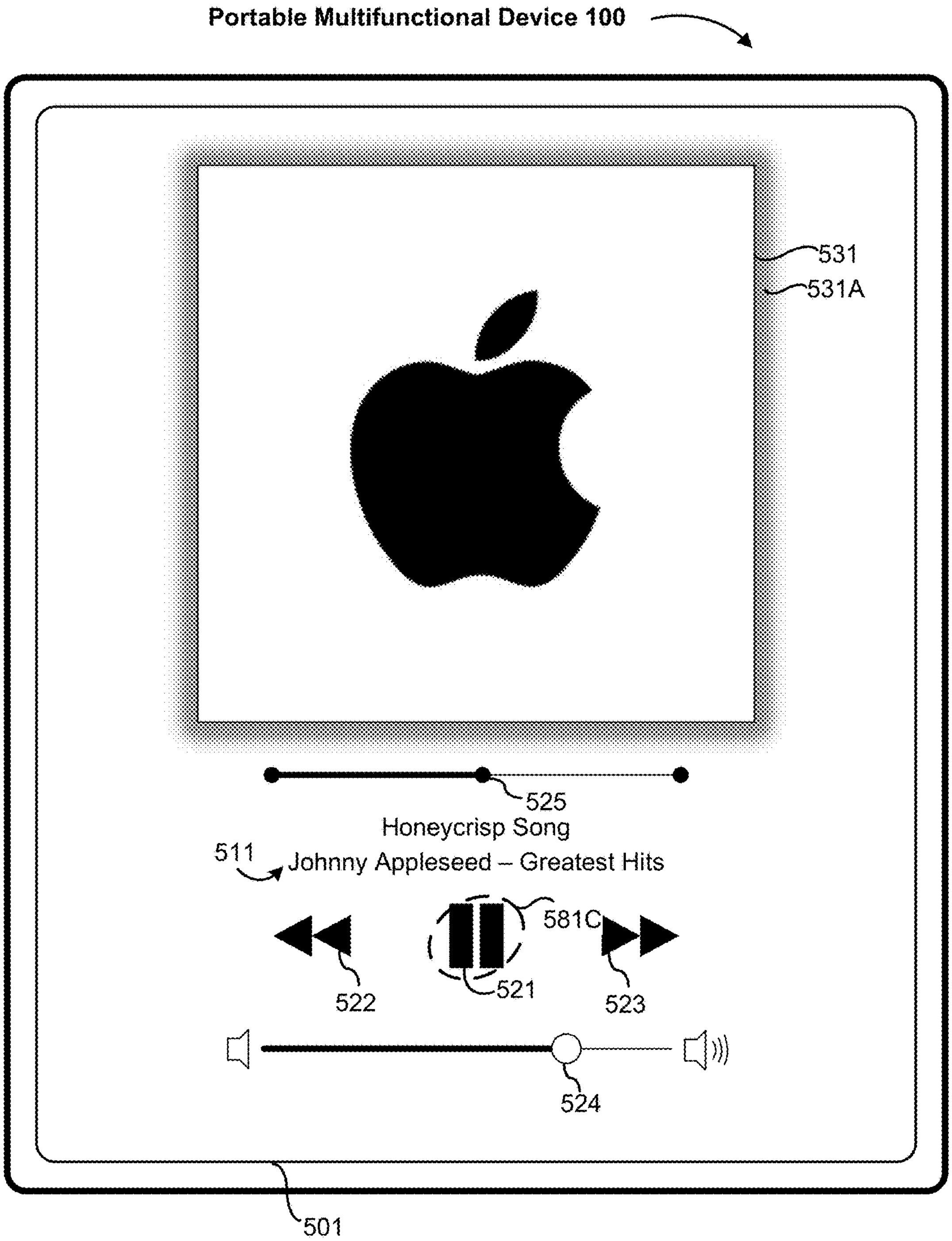

FIG. 5F illustrates the user interface 501 of FIG. 5E with a touch 581C detected at a location of the pause-play affordance 521. The touch 581C is a pause-play user input interacting with the pause-play affordance 521. The touch 581C includes a first portion (touchdown of a contact on the pause-play affordance 521 on the touch-sensitive display of the portable multifunctional device 100) and a second portion (liftoff of the contact from the touch-sensitive display of the portable multifunctional device 100).

Figure 5G:
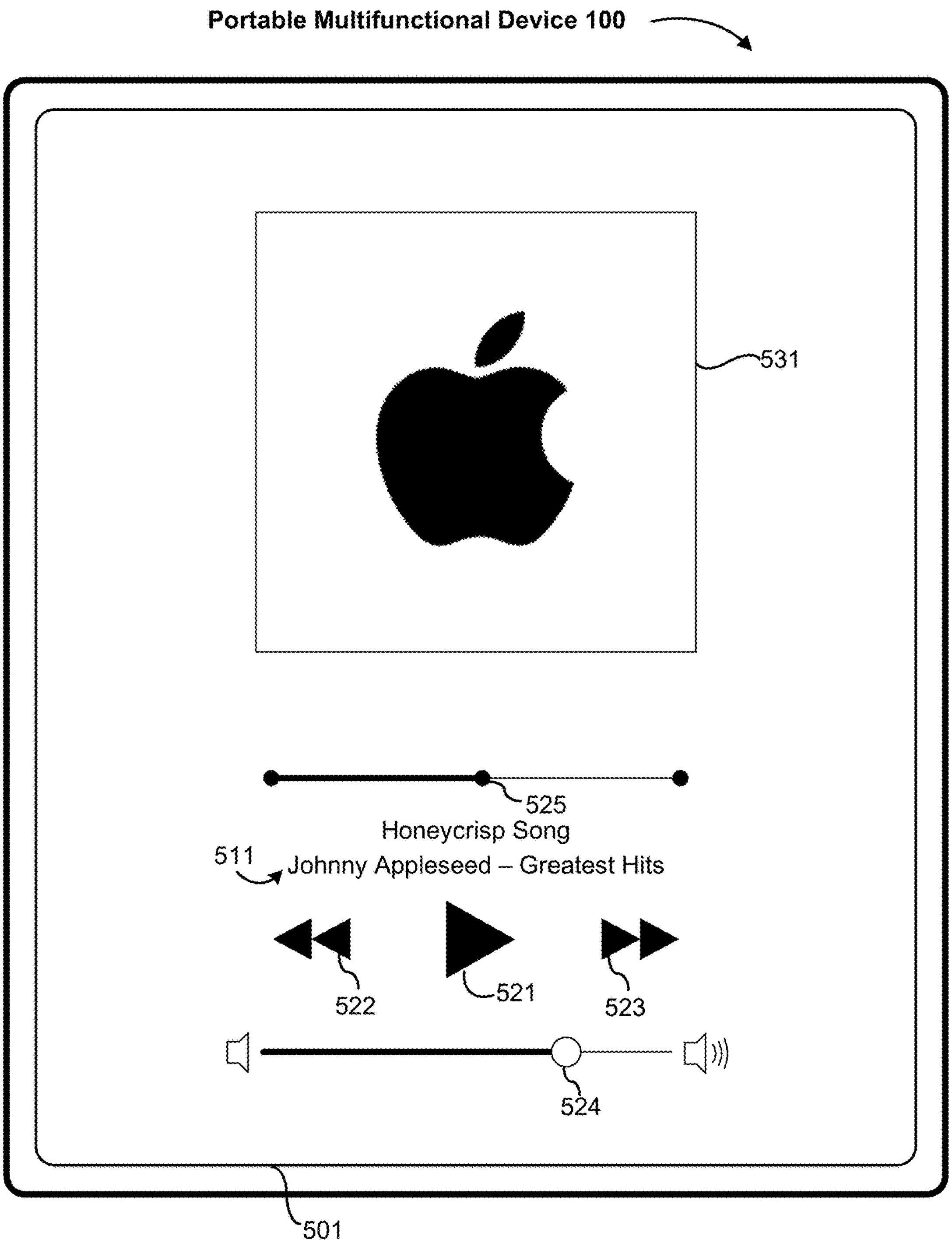

FIG. 5G illustrates the user interface 501 in response to detecting the touch 581C at the location of the pause-play affordance 521 in FIG. 5F. In response to detecting the touch 581C at the location of the pause-play affordance 521, the pause-play affordance 521 is changed to a play state and the size of the image 531 is reduced (e.g., the size of the display region is reduced). As shown in FIG. 5G, the location of the image 531 (e.g., the center of the image 531) is unchanged. Also in response to detecting the touch 581C at the location of the pause-play affordance 521, the border 531A ceases to be displayed. The pause-play affordance 521 changing to the pause state (and ceasing display of the border 531A) indicates that playback of the media item is paused.

In some implementations, the appearance of the image 531 on the display is adjusted (e.g., the size is decreased) in response to and in accordance with a first portion of the touch 581C (e.g., touchdown of the contact) and playback of content on the device is changed (e.g., playback of the media item is paused) in response to and in accordance with a second portion of the touch 581C (e.g., liftoff of the contact).

Figure 5H:
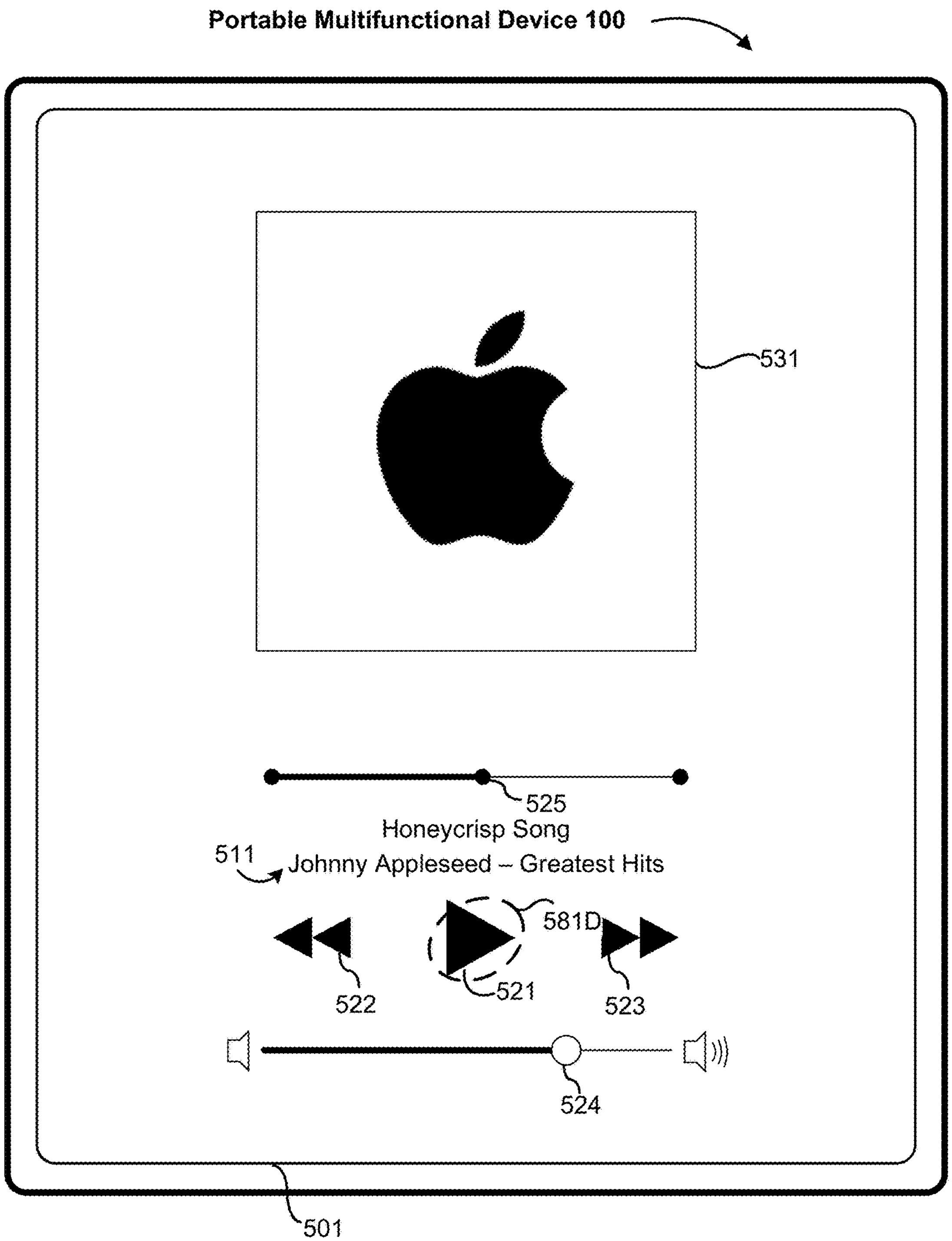

FIG. 5H illustrates the user interface 501 of FIG. 5G with a touch 581D detected at a location of the pause-play affordance 521. The touch 581D is a pause-play user input interacting with the pause-play affordance 521. The touch 581D includes a first portion (touchdown of a contact on the pause-play affordance 521 on the touch-sensitive display of the portable multifunctional device 100) and a second portion (liftoff of the contact from the touch-sensitive display of the portable multifunctional device 100).

Figure 5I:
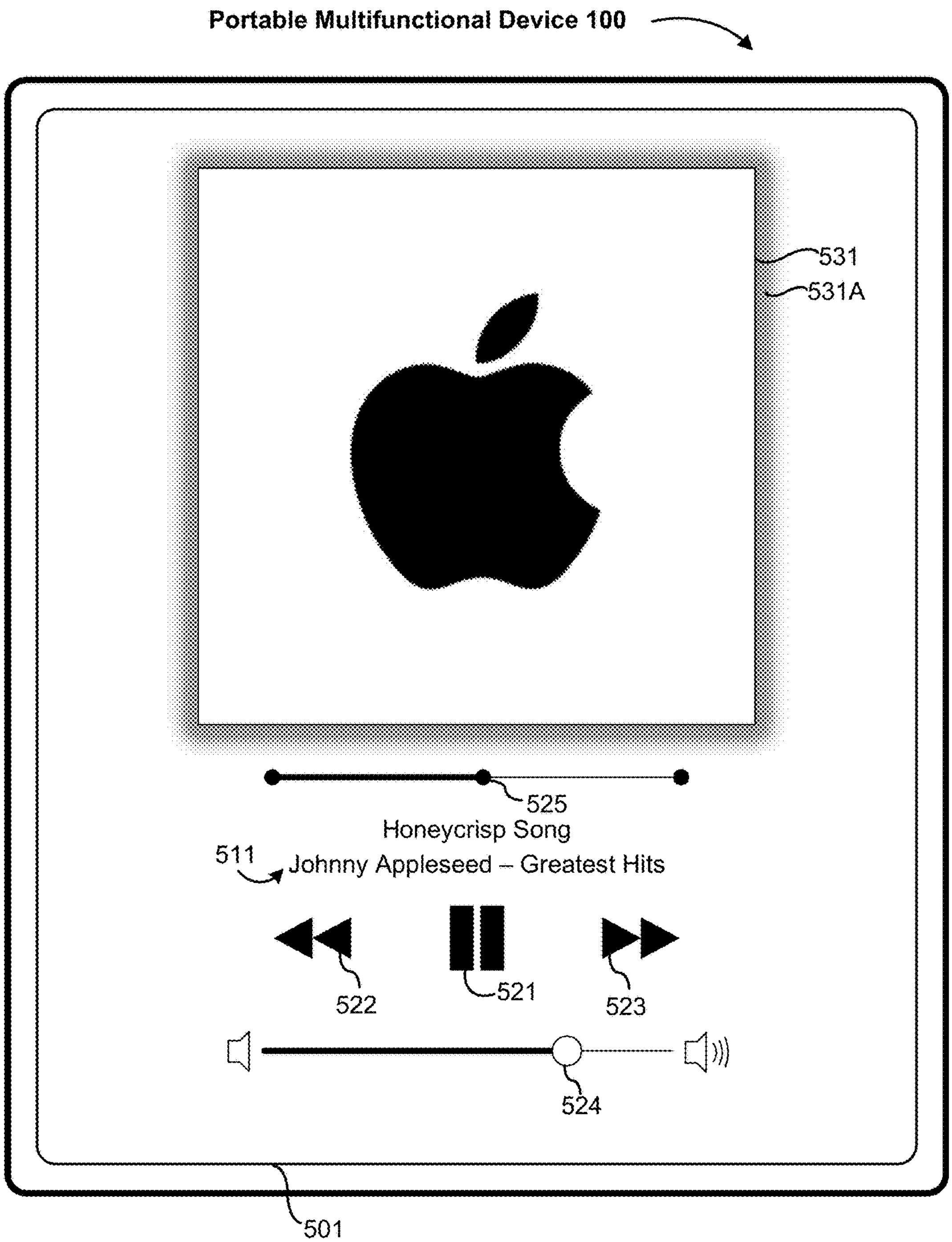

FIG. 5I illustrates the user interface 501 in response to detecting the touch 581D at the location of the pause-play affordance 521 in FIG. 5H. In response to detecting the touch 581D at the location of the pause-play affordance 521, the pause-play affordance 521 is changed back to a pause state and the size of the image 531 is increased (e.g., the size of the display region is increased) back to the size of the image 531 in FIG. 5A. As shown in FIG. 5I, the location of the image 531 (e.g., the center of the image 531) is unchanged. Also in response to detecting the touch 581D at the location of the pause-play affordance 521, the border 531A is, once again, displayed. The pause-play affordance 521 changing to the pause state (and resuming display of the border 531A) indicates that playback of the media item is resumed.

In some implementations, the appearance of the image 531 on the display is adjusted (e.g., the size is increased) in response to and in accordance with a first portion of the touch 581D (e.g., touchdown of the contact) and playback of content on the device is changed (e.g., playback of the media item is resumed) in response to and in accordance with a second portion of the touch 581D (e.g., liftoff of the contact).

Thus, touching the image 531 and touching the pause-play affordance 521 have the same (or a substantially similar) effect. In particular, touching either the image 531 or the pause-play affordance 521 results in switching between pausing and playback of the media item. Further, touching either the image 531 or the pause-play affordance 521 results in a resizing of the image 531 and toggling of display of the border 531A.

Because touching the image 531 and touching the pause-play affordance 521 can have a substantially similar effect, in some implementations, the user interface 501 does not include a pause-play affordance, or at least, does not include a pause-play affordance when the image 531 is displayed. Such a user interface 501 excluding a pause-play affordance may be particularly beneficial in portable multifunctional devices with small touch-sensitive displays (e.g., less than 5 square inches, less than 3 square inches, or less than 2 square inches) as may be found in portable music players or smartwatches.

Figure 5J:
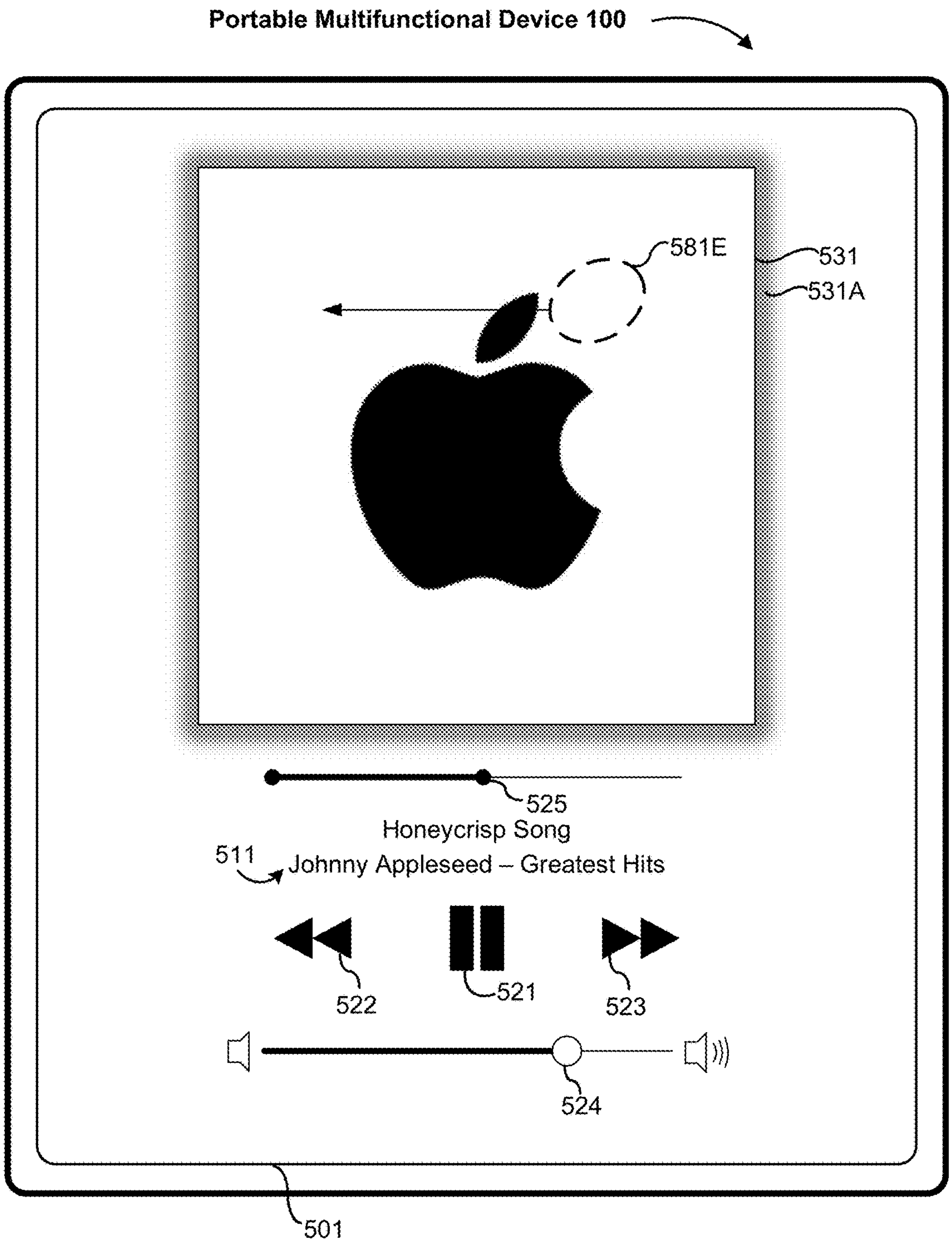

FIG. 5J illustrates the user interface 501 of FIG. 5I with a swipe 581E detected moving over the image 531. The swipe 581E is a user input interacting with the image 531. The swipe 581E includes a first portion (movement of a contact on the touch-sensitive display of the portable multifunctional device 100 a first distance) and a second portion (movement of the contact on the touch-sensitive display of the portable multifunctional device 100 a second distance). The swipe 581E can include additional portions, such as contact on the touch-sensitive display or liftoff of the contact from the touch-sensitive display.

Figure 5K:
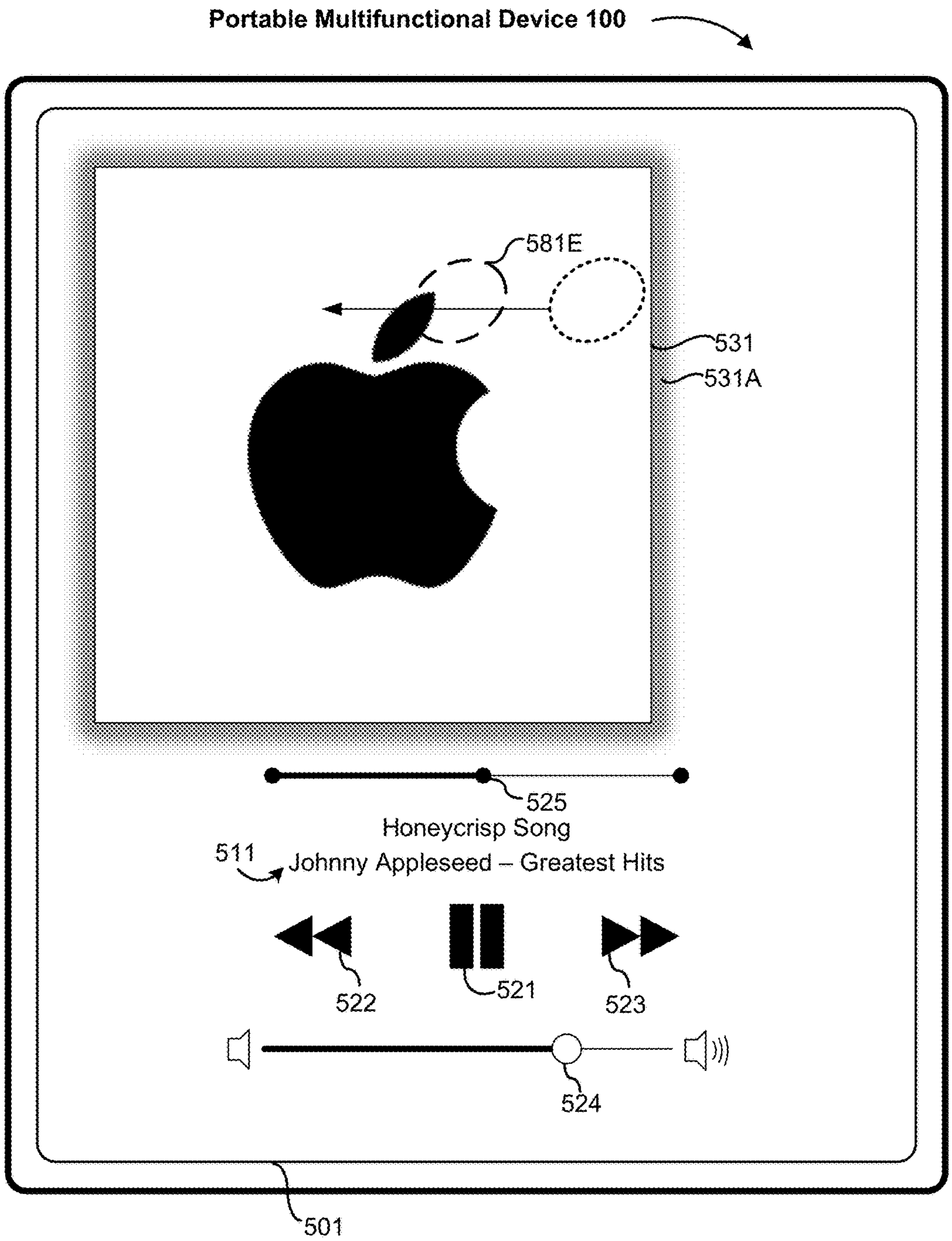

FIG. 5K illustrates the user interface 501 in response to detecting a first portion of the swipe 581E over the image 531. In response to detecting the first portion of the swipe 581E over the image 531, the image 531 is moved in accordance with the direction of the swipe 581E (e.g., the location of the display region is changed). In particular, when the swipe 581E moves from a first location to a second location to the left of the first location, the image is moved to the left. Conversely, when the swipe 581E moves from a first location to a second location to the right of the second location, the image is moved to the right.

In some implementations, the appearance of the image 531 on the display is adjusted (e.g., the image 531 is moved) in response to and in accordance with a first portion of the swipe 581E (e.g., a first distance) and playback of content on the device is changed (e.g., playback of a second media item is started) in response to and in accordance with a second portion of the swipe 581E (e.g., a second distance or liftoff of the contact) as described below.

Figure 5L:
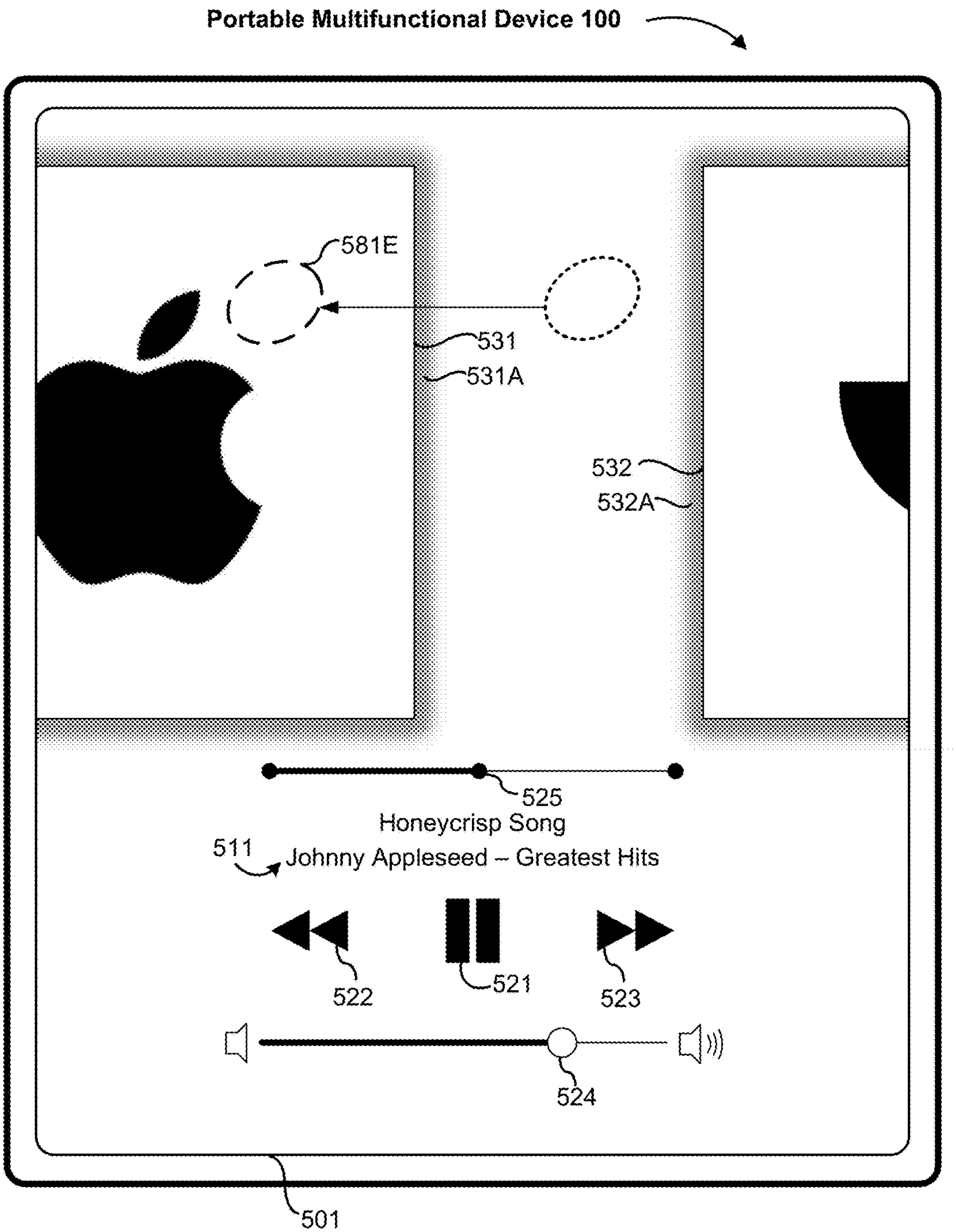

FIG. 5L illustrates the user interface 501 of FIG. 5K with an additional portion of the swipe 581E detected. In response to the additional portion of the swipe 581E, the image 531 is moved further in accordance with the direction of the swipe. Further, a second image 532 (with a corresponding border 532A) associated with a second media item is displayed as the image 531 associated with the first media item is sliding off the display.

Figure 5M:
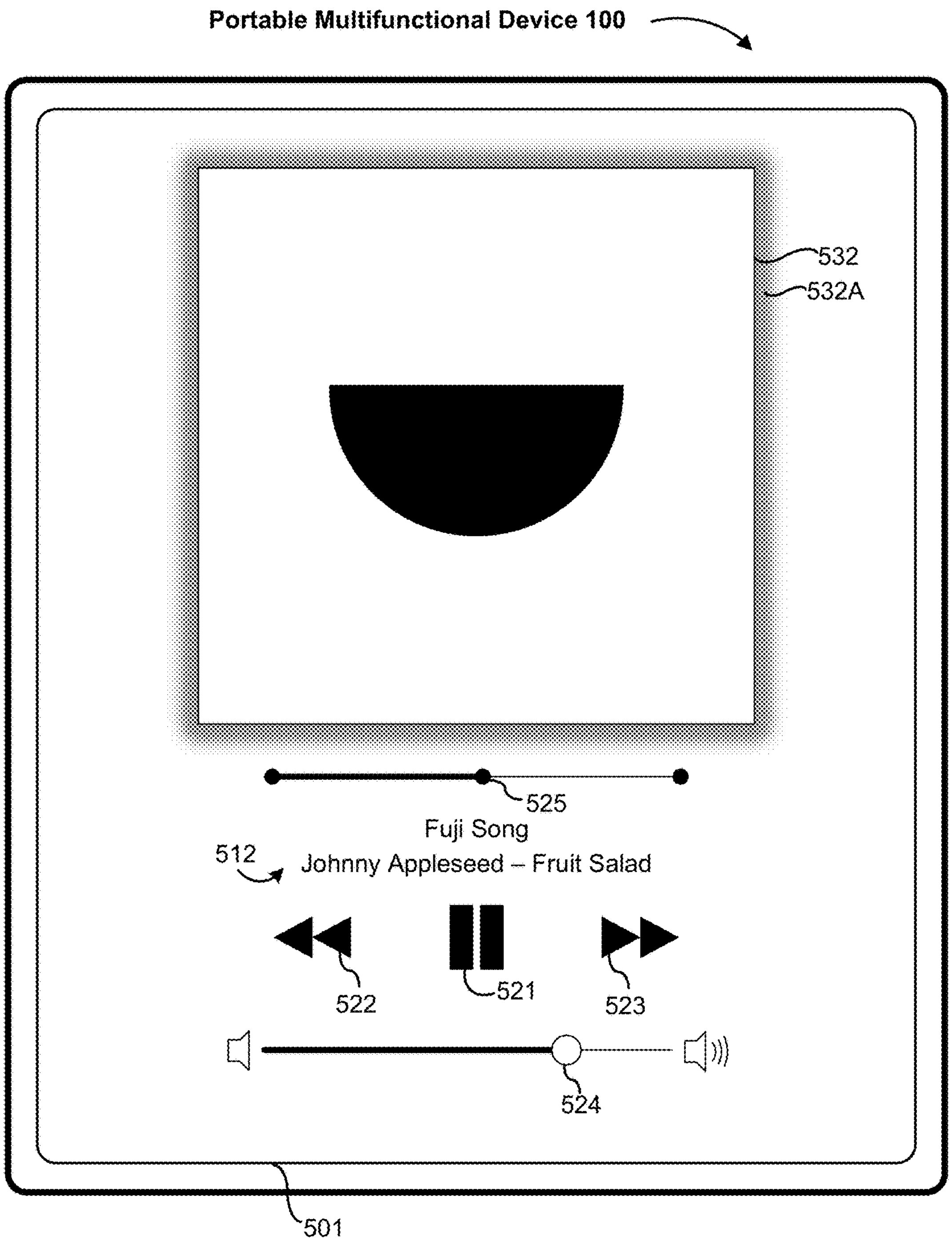

FIG. 5M illustrates the user interface 501 in response to detecting the second portion of the swipe 581E over the image 531. In response to detecting the second portion of the swipe 581E over the image 531, the identifying text 511 for the first media item is replaced with identifying text 512 for the second media item. Further, the image 531 associated with the first item is completely replaced with the image 532 associated with the second media item. Thus, the identifying text 512 (and the pause-play affordance 521) form a playback status indicator indicating that the portable multifunctional device 100 is playing back the second media item. In some implementations, starting playback of the second media item includes crossfading between the media item and the second media item while sliding the image 531 associated with the first media item off the display (e.g., in FIG. 5L).

FIGS. 5J-5M illustrate a swipe 581E to the left causing playback of a next media item in a queue. In some implementations, a swipe over the image 531 to the right causes playback of a prior media item in the queue. Thus, in some implementations, starting playback of the second media item includes, in accordance with a determination that the movement of a contact is in a first direction, selecting a prior media item in a queue as the second media item and, in accordance with a determination that the movement of the contact is in a second direction that is different from (e.g., opposite to) the first direction, selecting a next media item in the queue as the second media item.

Figure 5N:
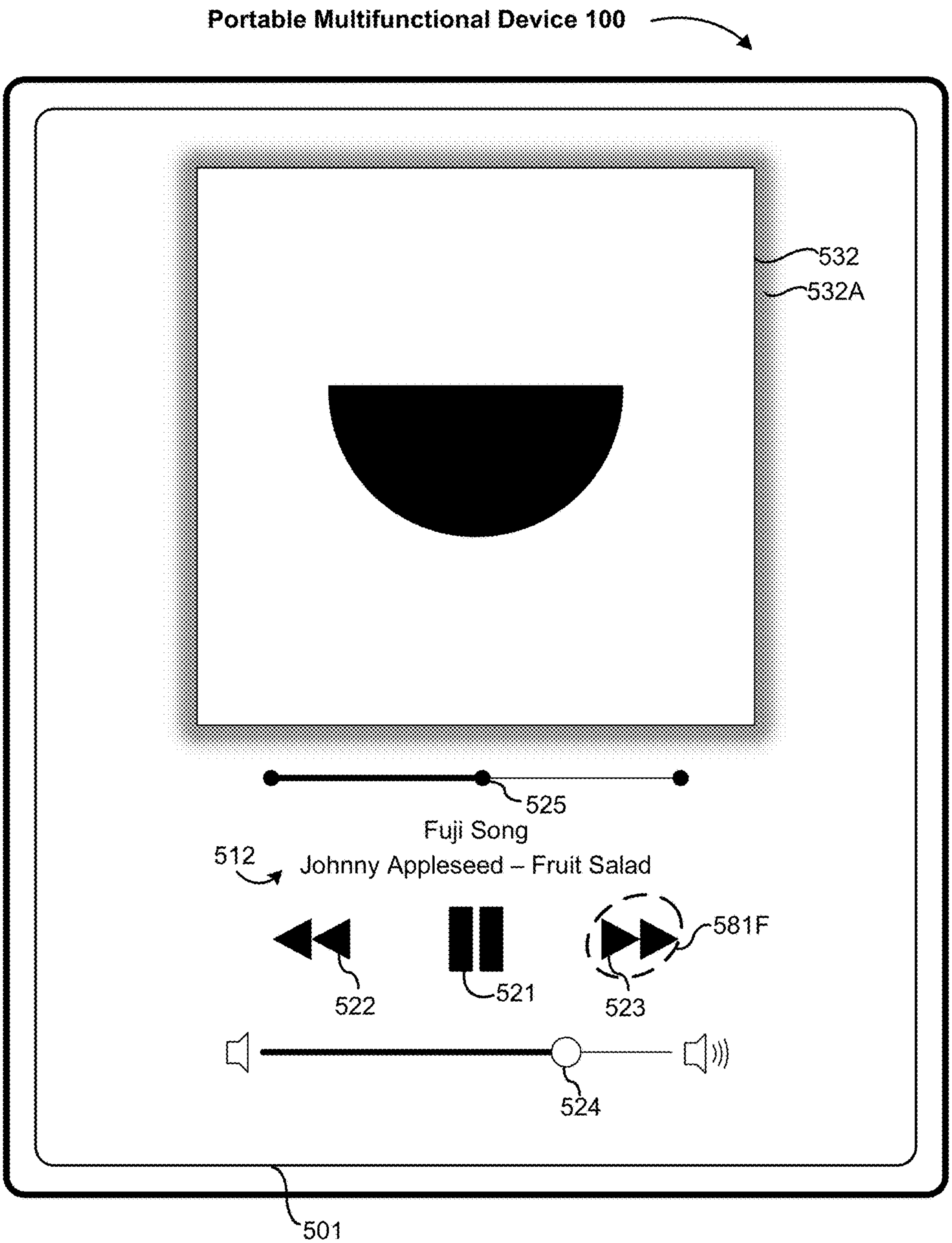

FIG. 5N illustrates the user interface 501 of FIG. 5M with a touch 581F detected at a location of the forward affordance 523. The touch 581F is a skip user input interacting with the forward affordance 523. The touch 581F includes a first portion (touchdown of a contact on the forward affordance 523 on the touch-sensitive display of the portable multifunctional device 100) and a second portion (liftoff of the contact from the touch-sensitive display of the portable multifunctional device 100).

Figure 5O:
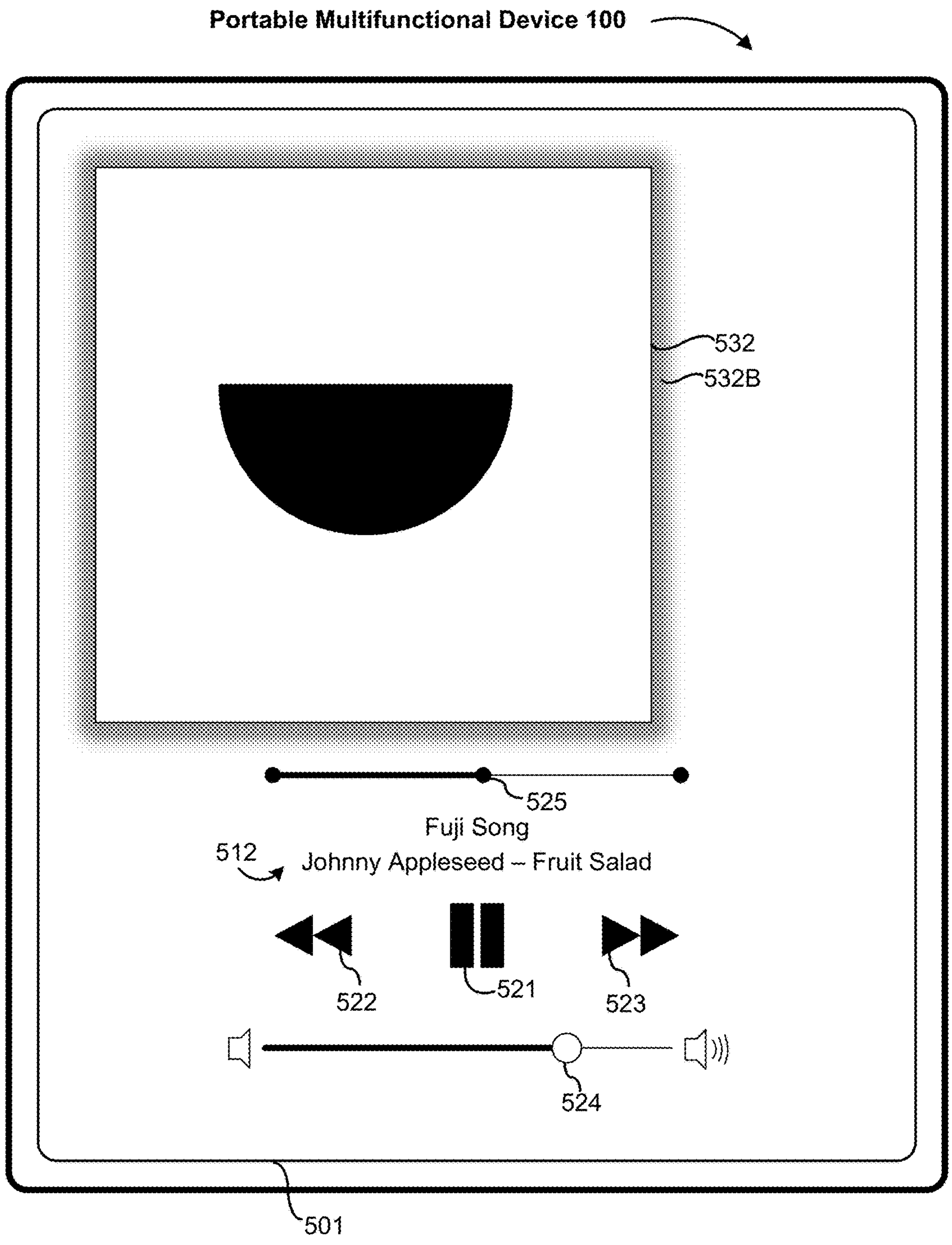

FIG. 5O illustrates the user interface 501 in response to detecting the touch 581F at the location of the forward affordance 523 in FIG. 5N. In response to detecting the touch 581F at the location of the forward affordance 523, the image 532 is moved to left. In some implementations, the appearance of the image 532 on the display is adjusted (e.g., the image 532 is moved) in response to and in accordance with a first portion of the touch 581F (e.g., touchdown of the contact) and playback of content on the device is changed (e.g., playback of a second media item is started) in response to and in accordance with a second portion of the touch 581F (e.g., liftoff of the contact) as described below.

Figure 5P:
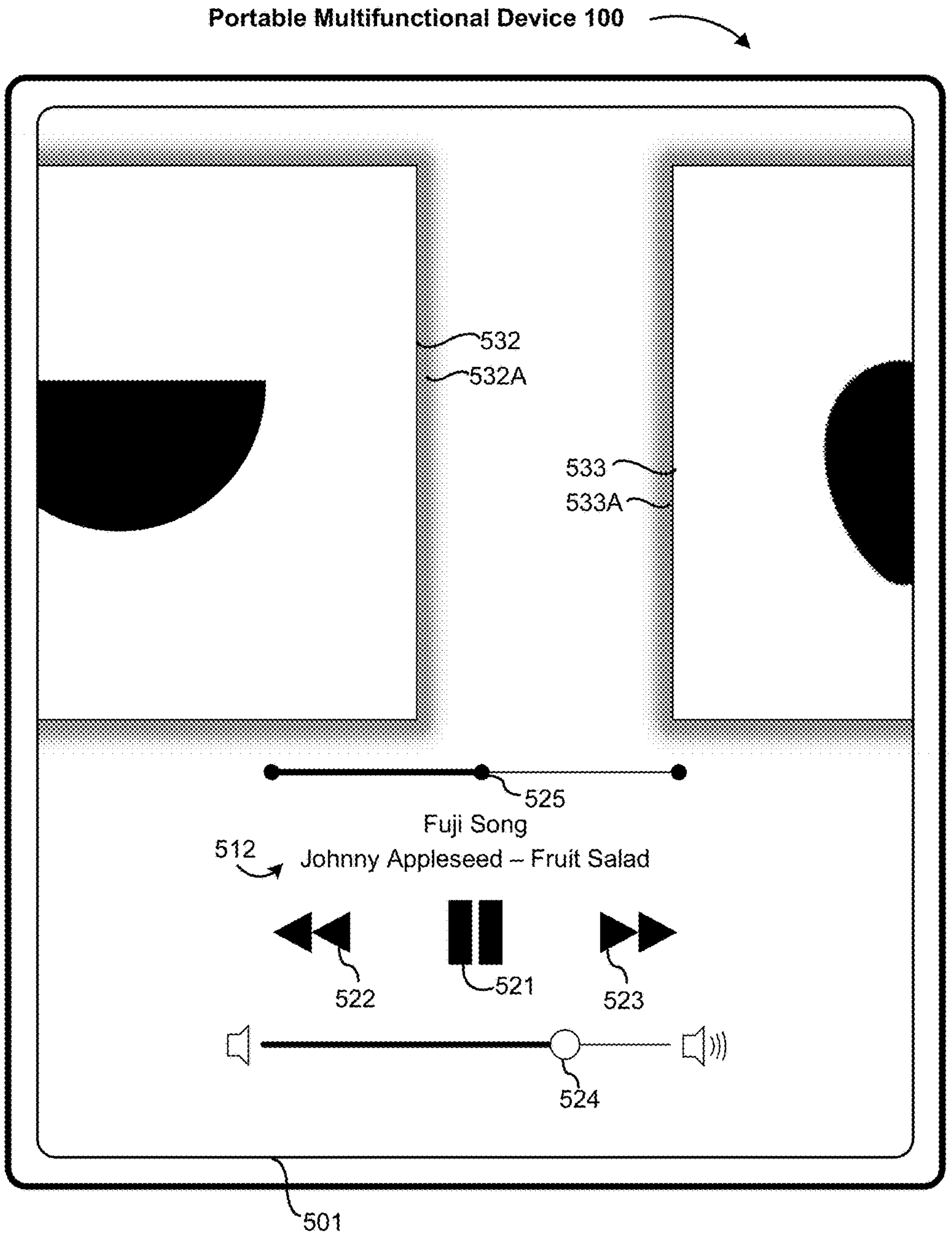

FIG. 5P illustrates the user interface 501 of FIG. 5O at a slightly later time. In response to detecting the touch 581F at the location of the forward affordance in FIG. 5N, the image 532 is moved to left (as shown in FIG. 5O). In FIG. 5P, the image 532 has moved further to left and an image 533 (with a corresponding border 533A) associated with a third media item is partially displayed on the right of the display.

Figure 5Q:
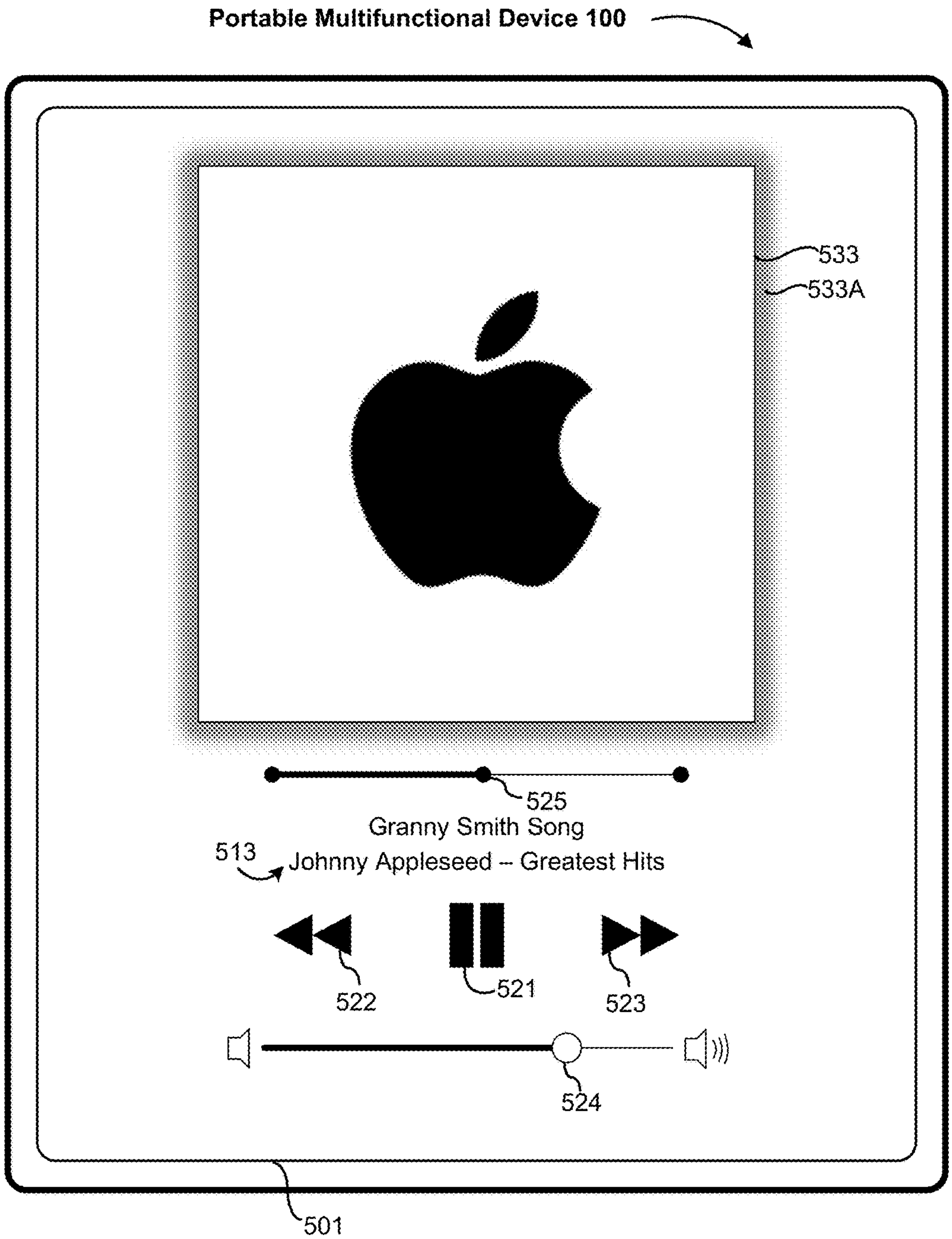

FIG. 5Q illustrates the user interface of FIG. 5P at a slightly later time. In FIG. 5Q, the identifying text 512 for the second media item is replaced with identifying text 513 for the third media item. Further, the image 532 associated with the second media item is completely replaced with the image 533 associated with the third media item. Thus, the identifying text 513 (and the pause-play affordance 521) form a playback status indicator indicating that the portable multifunctional device 100 is playing back the third media item.

FIGS. 5N-5Q illustrate a touch 581F at the location of the forward affordance 523 causing playback of a next media item in a queue. In some implementations, a touch at location of the reverse affordance 522 (also a skip user input)

causes playback of a prior media item in the queue. Thus, in some implementations, a skip user input is detected interacting with one of one or more skip affordances (e.g., the reverse affordance 522 and the forward affordance 523). In response to a first portion of the skip user input, the image 532 is moved in accordance with the one of the one or more skip affordances. For example, if the skip user input is detected interacting with the forward affordance 523, the image moves to the left and if the skip user input is detected interacting with the reverse affordance 522, the image moves to the right. Further, in response to a second portion of the skip user input, playback of another media item is started in accordance with the one of the one or more skip affordances. For example, if the skip user input is detected interacting with the forward affordance 523, a next media item in the queue is played and if the skip user input is detected interacting with the reverse affordance 522, a prior media item in the queue is played.

Figure 5R:
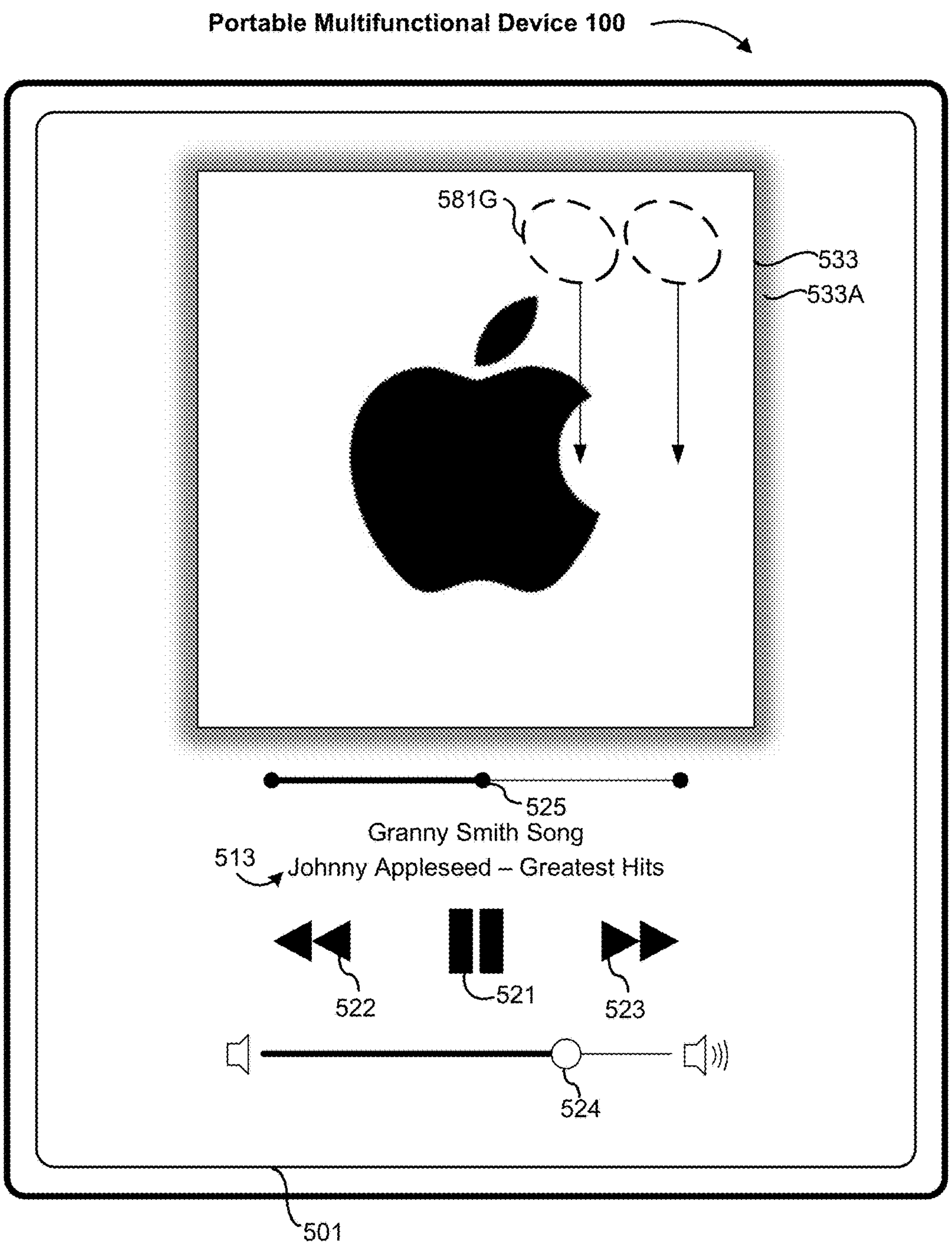

FIG. 5R illustrates the user interface 501 of FIG. 5Q with a vertical multi-touch drag 581G detected over the image 533. The vertical multi-touch drag 581G is a user input interacting with the image 533. The vertical multi-touch drag 581G includes a first portion (touchdown of the contacts on the touch-sensitive display of the portable multifunctional device 100) and a second portion (movement of the contacts on the touch-sensitive display of the portable multifunctional device 100). The vertical multi-touch drag 581G can include additional portions, such as liftoff of the contact from the touch-sensitive display. The second portion of the vertical multi-touch drag 581G can include multiple sub-portions (themselves portions), such as movement a first distance and movement a second distance.

Figure 5S:
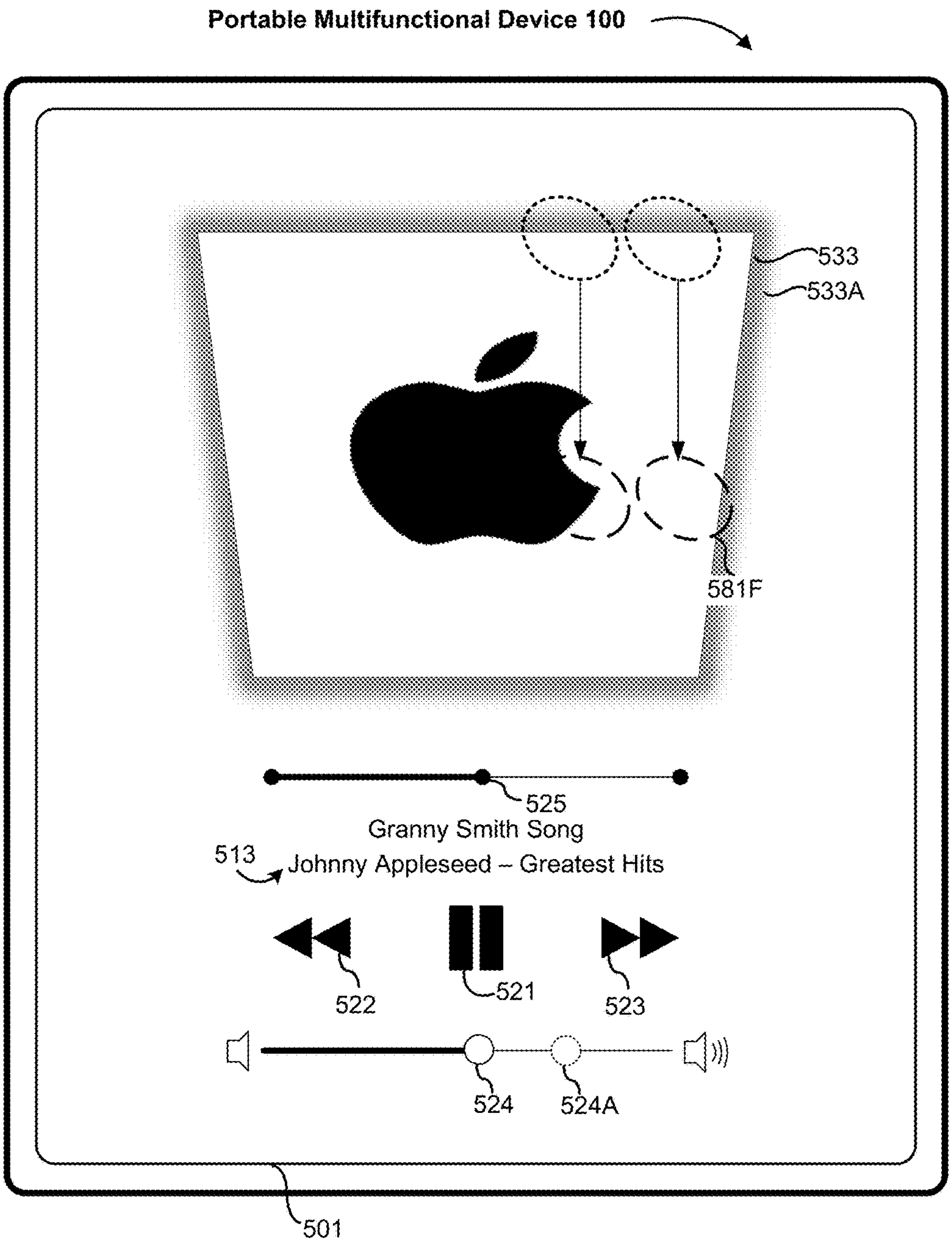

FIG. 5S illustrates the user interface 501 in response to detecting the vertical multi-touch drag 581G over the image 533 in FIG. 5R. In response to detecting the vertical multi-touch drag 581G over the image 533, the shape of the image 533 is changed. As shown in FIG. 5S, a vertical multi-touch drag 581G in a downward direction results in a downward tilting of the image 533. Thus, the shape of the image 533 is skewed. Also in response to detecting the vertical multi-touch drag 581G over the image, the volume affordance 524 is moved from its original location 524A indicating that a volume of the playback of the third media item has been reduced.

Figure 5T:
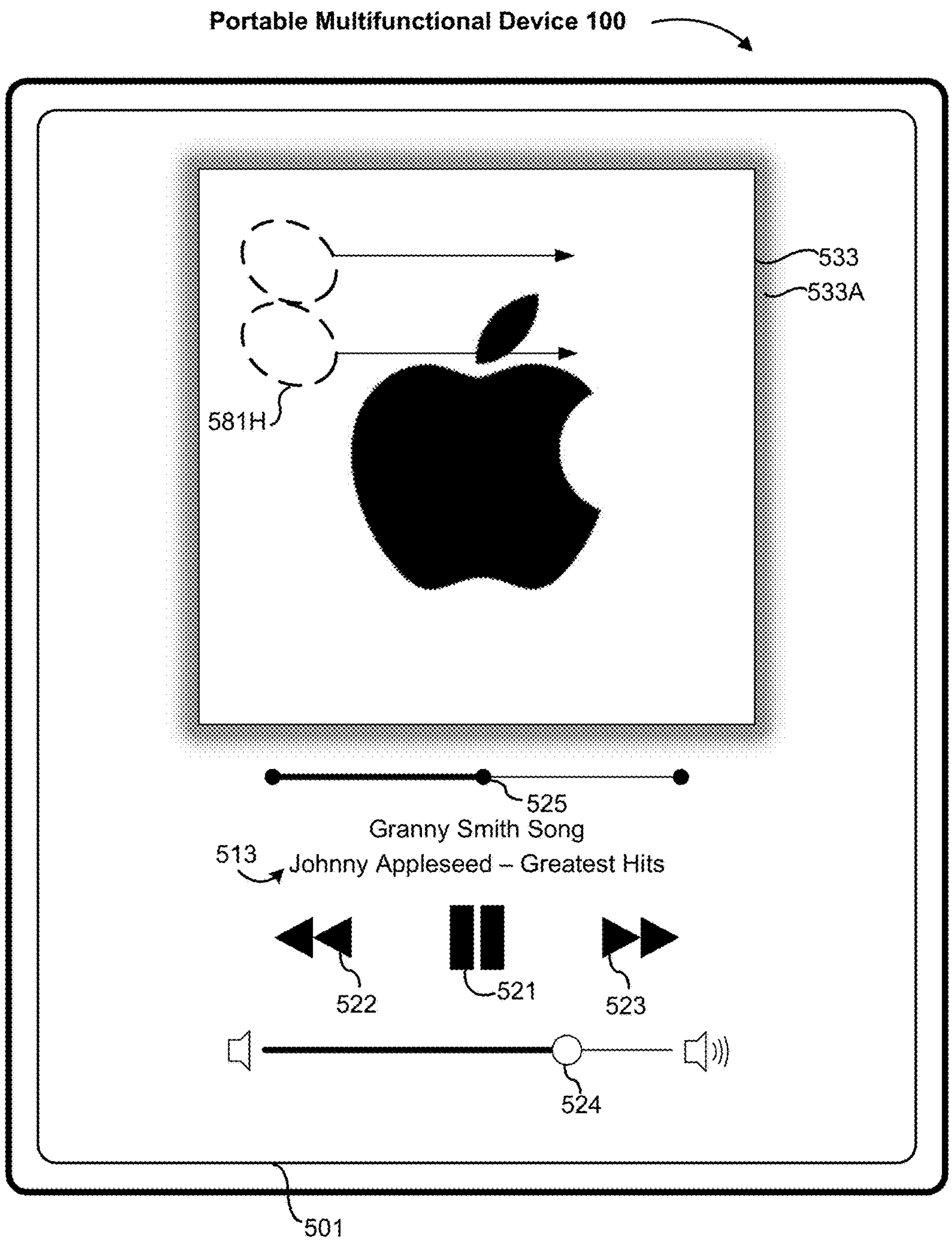

FIG. 5T illustrates the user interface of FIG. 5Q with a horizontal multi-touch drag 581H detected over the image 533. The horizontal multi-touch drag 581H is a user input interacting with the image 533. The horizontal multi-touch drag 581H includes a first portion (touchdown of the contacts on the touch-sensitive display of the portable multifunctional device 100) and a second portion (movement of the contacts on the touch-sensitive display of the portable multifunctional device 100). The horizontal multi-touch drag 581H can include additional portions, such as liftoff of the contact from the touch-sensitive display. The second portion of the horizontal multi-touch drag 581H can include multiple sub-portions (themselves portions), such as movement a first distance and movement a second distance.

Figure 5U:
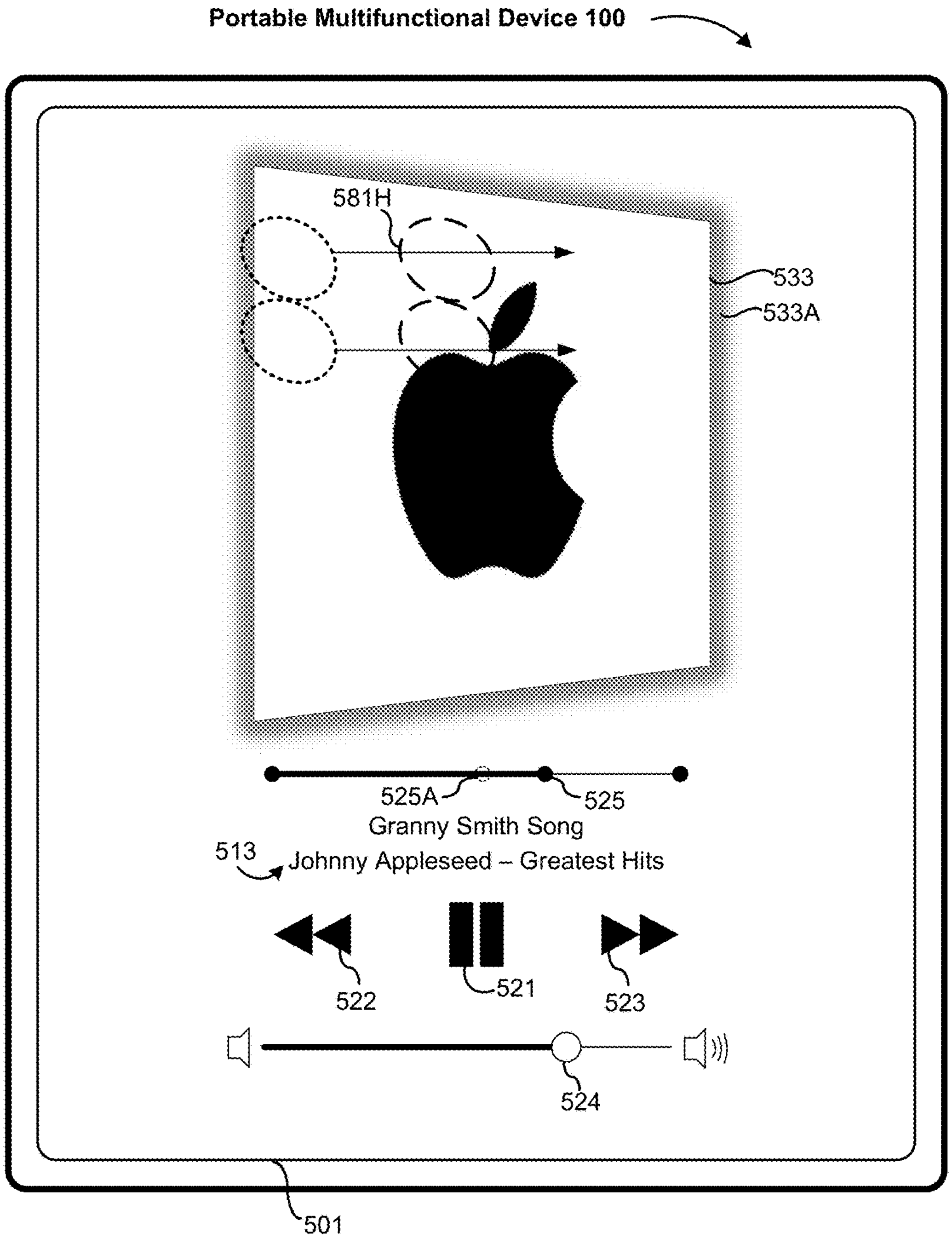

FIG. 5U illustrates the user interface 501 in response to detecting a first portion of the horizontal multi-touch drag 581H over the image 533 in FIG. 5T. In response to detecting the horizontal multi-touch drag 581H over the image 533, the shape of the image 533 is changed. As shown in FIG. 5U, a horizontal multi-touch drag 581H in a rightward direction results in a rightward tilting of the image 533. Thus, the shape of the image 533 is skewed. Also in response to detecting the horizontal multi-touch drag 581H over the image, the scrubbing affordance 525 has changed from its original location 525A indicating that a playback time of the third media item has been changed.

Figure 5V:
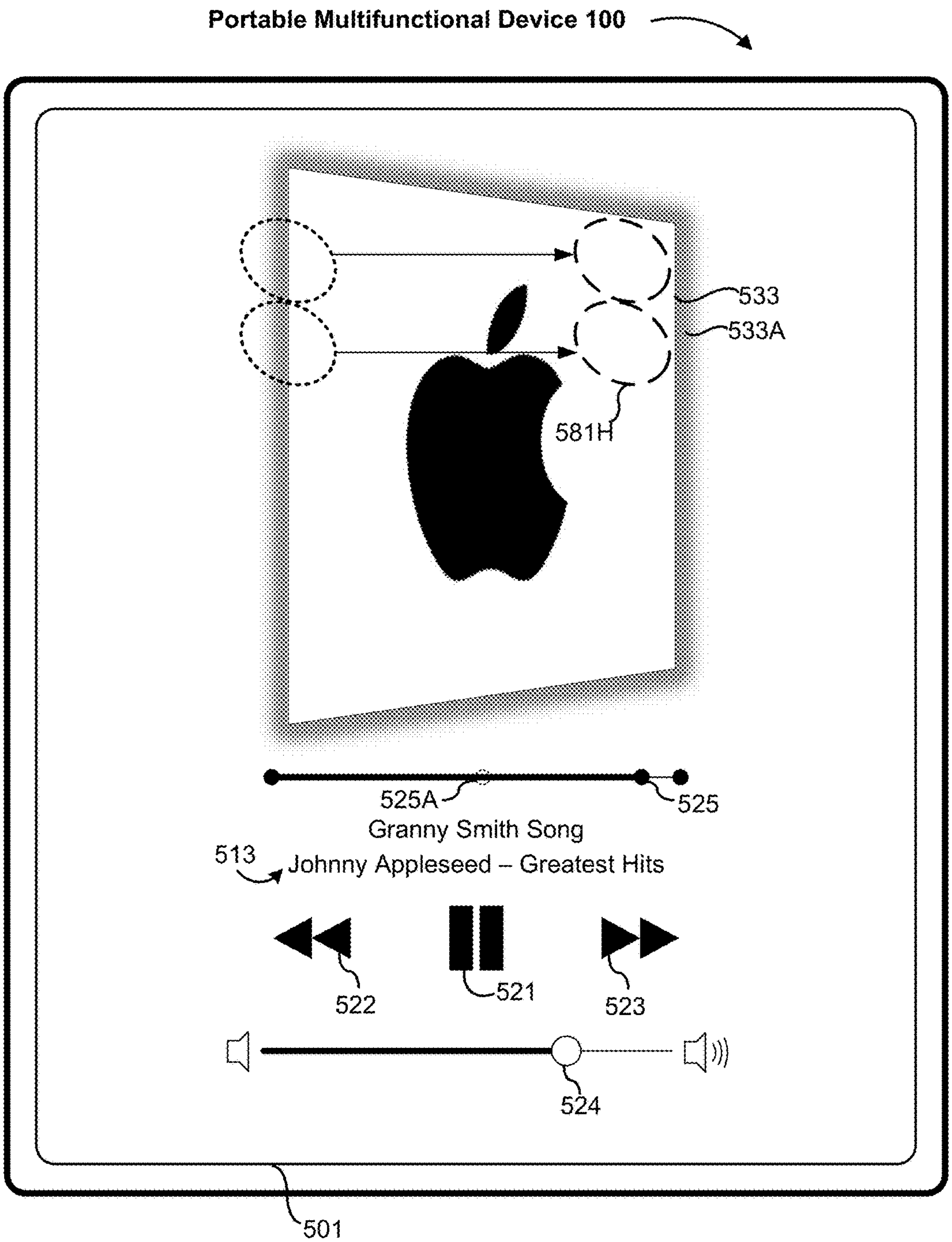

FIG. 5V illustrates the user interface 501 in response to detecting a second portion of the horizontal multi-touch drag 581H over the image 533 in FIG. 5T. In response to detecting the second portion of the horizontal multi-touch drag 581H over the image 533, the shape of the image 533 is further changed. In particular, the shape of the image 533 is further skewed as the image is tilted in accordance with the distance of the horizontal multi-touch drag 581H. Also in response to detecting the second portion of the horizontal multi-touch drag 581H over the image 533, the scrubbing affordance 525 has changed further from its original location 525A indicating that a playback time of the third media item has been further changed. Thus, a magnitude of the change in the playback time and the magnitude of the change in the shape of the image are both proportional to a distance of the horizontal multi-touch drag 581H (e.g., a magnitude of the movement of the multi-touch contact).

FIGS. 5R-5V show the effects of different multi-touch drags. In general, detecting an input interacting with the image 533 can include detecting movement of a multi-touch contact over the image 533. In some implementations, the appearance of the image 533 on the display is adjusted (e.g., the shape of the image 533 is changed) in response to and in accordance with a first portion of the multi-touch contact 581G and playback of content on the device is changed (e.g., a non-binary characteristic is changed) in response to and in accordance with a second portion of the multi-touch drag 581G (e.g., a second distance of the contact). The non-binary characteristic can include, for example, volume (as shown in FIGS. 5R-5S), playback time (as shown in FIGS. 5T-5V), an equalization setting, or any other playback characteristic having more than two values.

In some implementations, the portable multifunctional device 100 detects a multi-touch contact and, in accordance with a determination that the movement is along a first axis (e.g., vertical), changes a first non-binary playback characteristic (e.g., volume) and, in accordance with a determination that the movement is along a second axis (e.g., horizontal), changes a second non-binary playback characteristic (e.g., playback time).

Although FIGS. 5R-5V illustrate increasing the volume and playback time with downward and rightward multi-touch drags, it is to be appreciated that the volume and playback time can be similarly decreased with upward and leftward multi-touch drags, respectively.

Figure 5W:
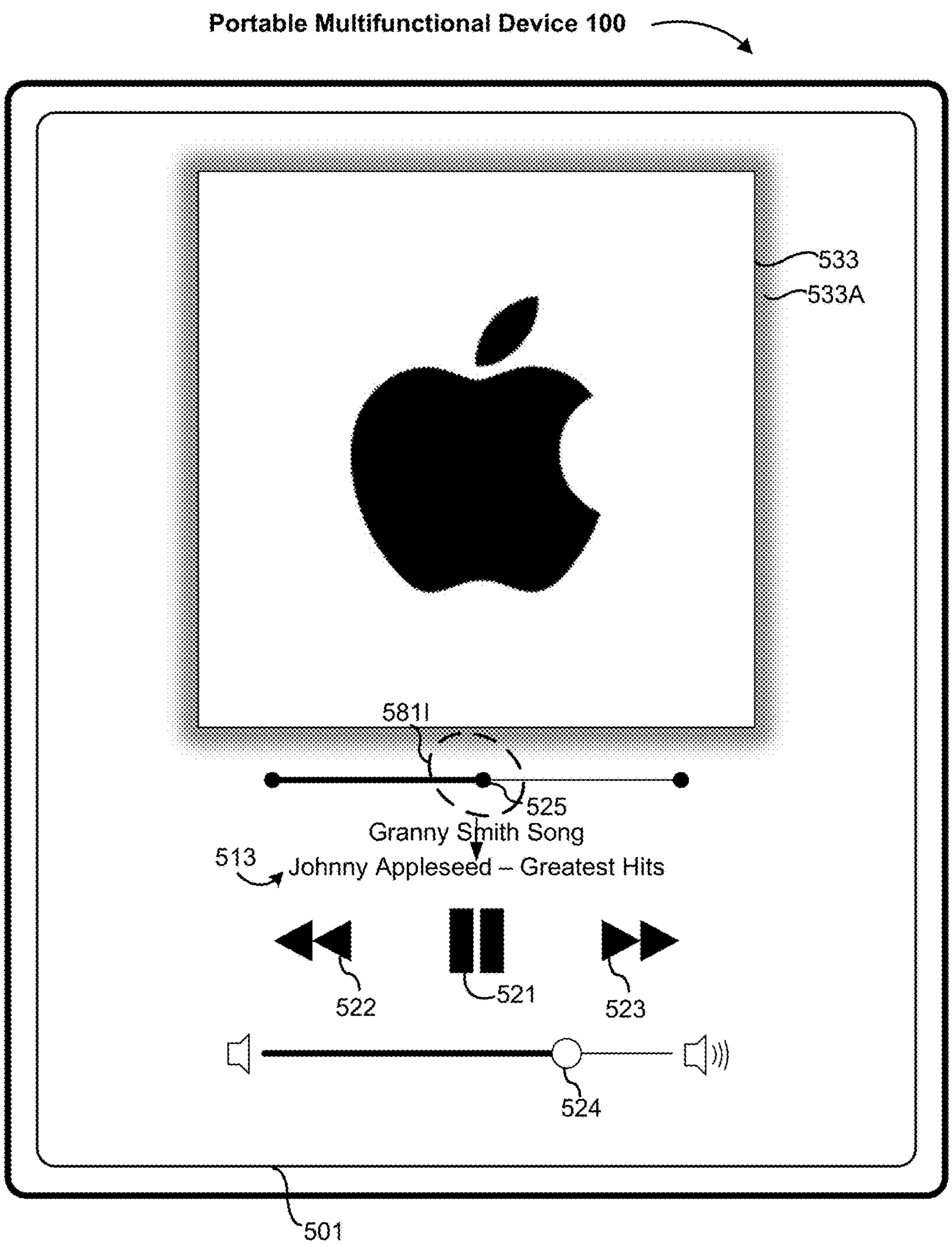

FIG. 5W illustrates the user interface of FIG. 5Q with a drag 581I detected at the location of the scrubbing affordance 525. The drag 581I includes a first portion (touchdown of the contact on the touch-sensitive display of the portable multifunctional device 100) and a second portion (movement of the contact on the touch-sensitive display of the portable multifunctional device 100). The drag 581I can include additional portions, such as liftoff of the contact from the touch-sensitive display. The second portion of the drag 581I can include multiple sub-portions (themselves portions), such as movement a first distance and movement a second distance.

Figure 5X:
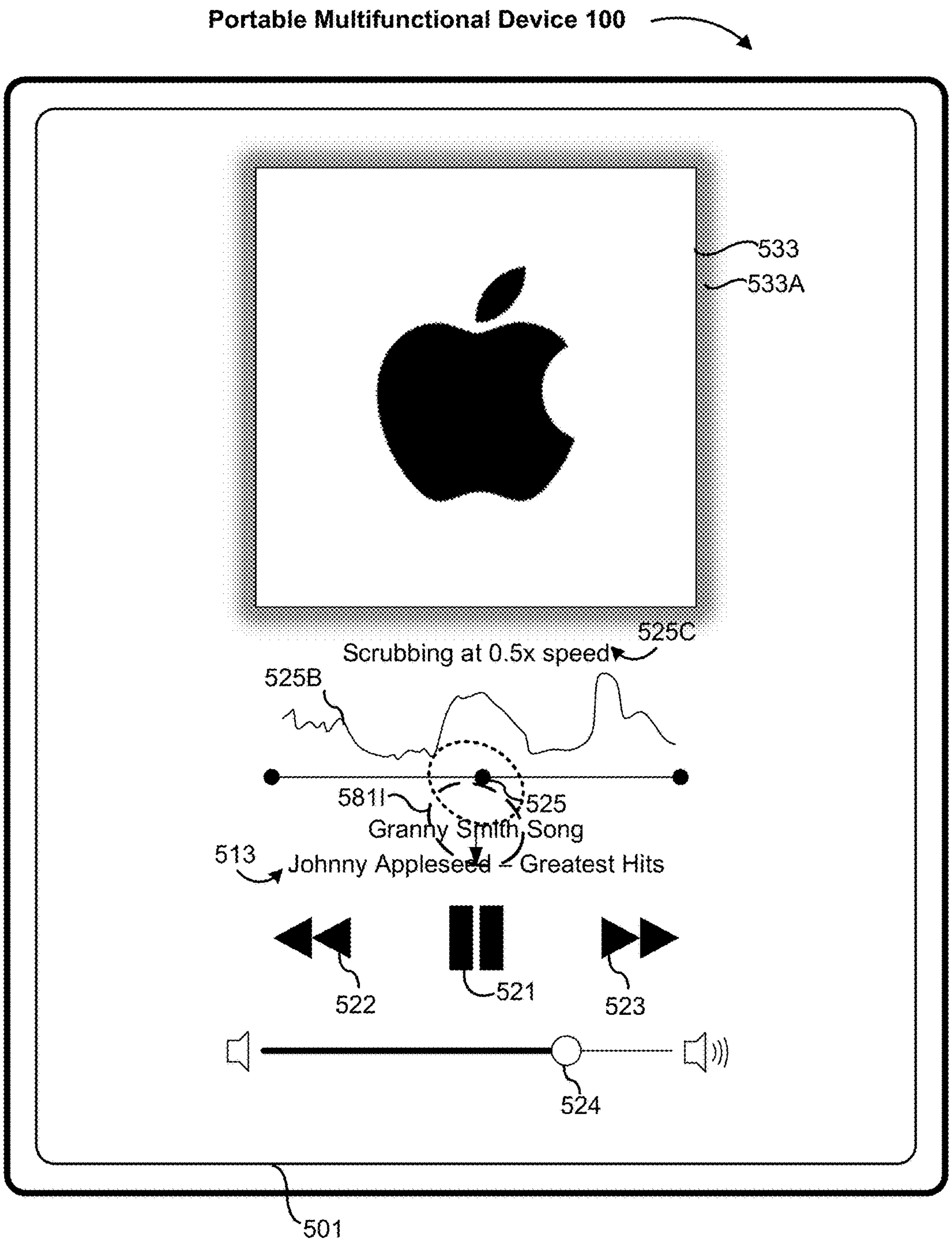

FIG. 5X illustrates the user interface 501 in response to detecting the drag 581I at the location of the scrubbing affordance in FIG. 5W. The image 533 (retaining its border 533A) is reduced in size and moved upward. In the space provided, a scrubbing waveform 525B is displayed indicative of the magnitude of the audio of the third media item at various playback times. Also in the space provided, scrubbing speed information 525C is displayed. When the portable multifunction device 100 detects the drag continuing leftward or rightward, the portable multifunctional device 100 changes the playback time of the third media item.

As described above, interacting with the image 533 and touching the playback affordances 521-525 can have the same (or a substantially similar) effect. Thus, in some implementations, the user interface 501 does not include one or more of the playback affordances 521-525, or at least, does not include one or more of the playback affordances 521-525 when the image 533 is displayed. In some implementations, the user interface 501 does not include any of the playback affordances 521-525 when the image 533 is displayed. Such a user interface 501 excluding playback affordances may be particularly beneficial in portable multifunctional devices with small touch-sensitive displays (e.g., less than 5 square inches, less than 3 square inches, or less than 2 square inches) as may be found in portable music players or smartwatches.

Figure 5Y:
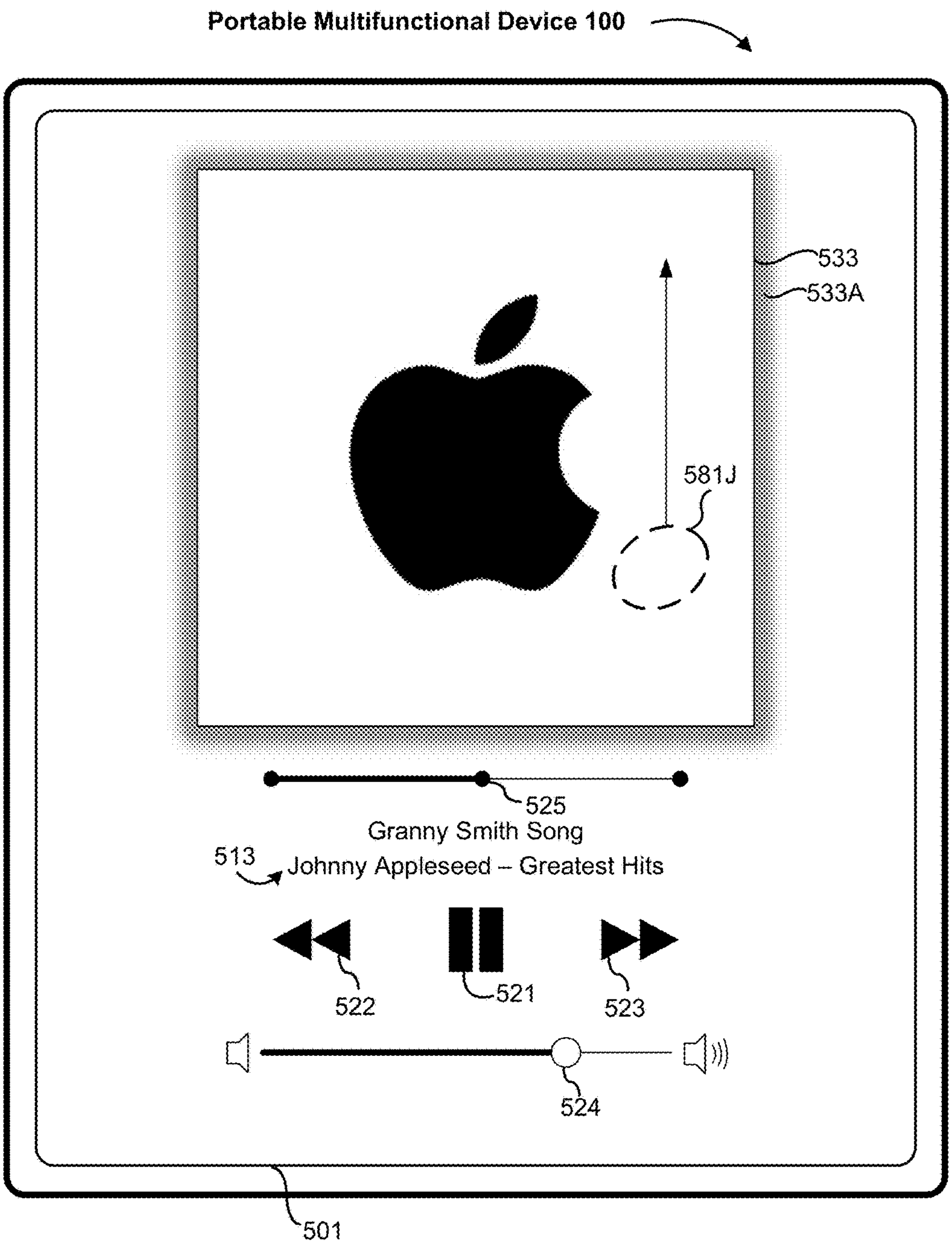

FIG. 5Y illustrates the user interface of FIG. 5Q with a swipe 581J detected at the location of the image 533. The swipe 581J is a user input interacting with the image 533. The swipe 581J includes a first portion (movement of a contact on the touch-sensitive display of the portable multifunctional device 100 a first distance) and a second portion (movement of the contact on the touch-sensitive display of the portable multifunctional device 100 a second distance). The swipe 581J can include additional portions, such as contact on the touch-sensitive display or liftoff of the contact from the touch-sensitive display.

Figure 5Z:
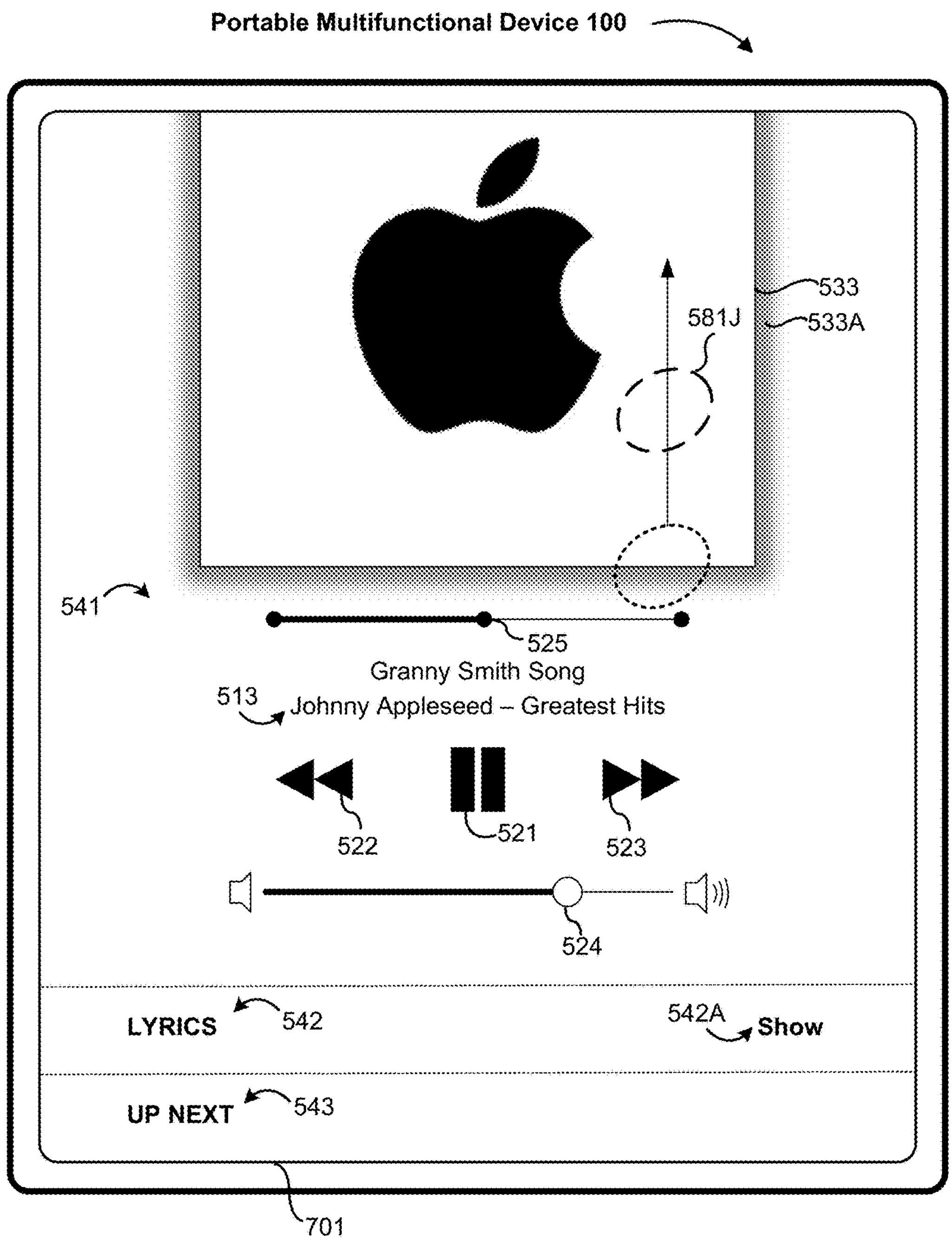
Figure 5A:
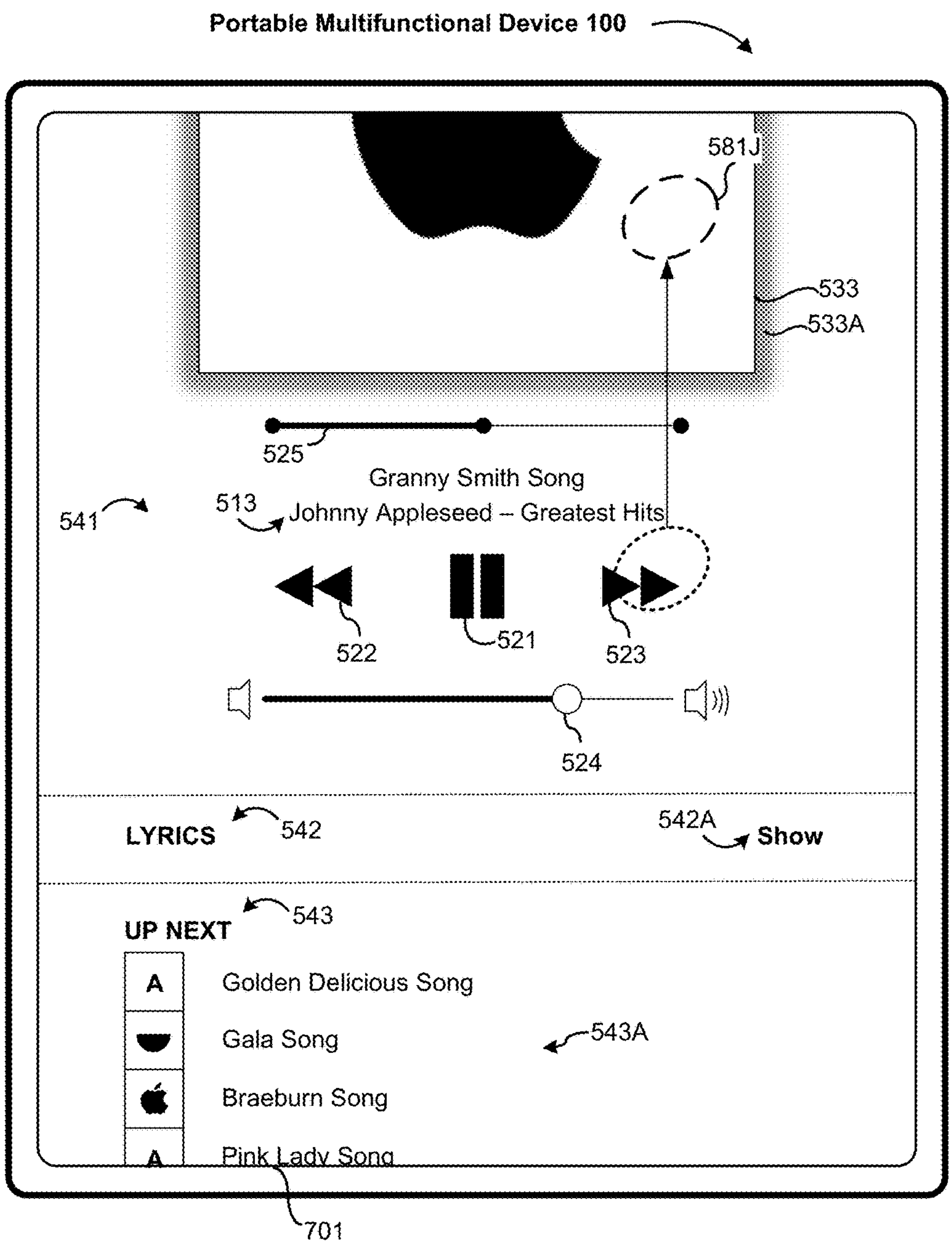
Figure 5A:
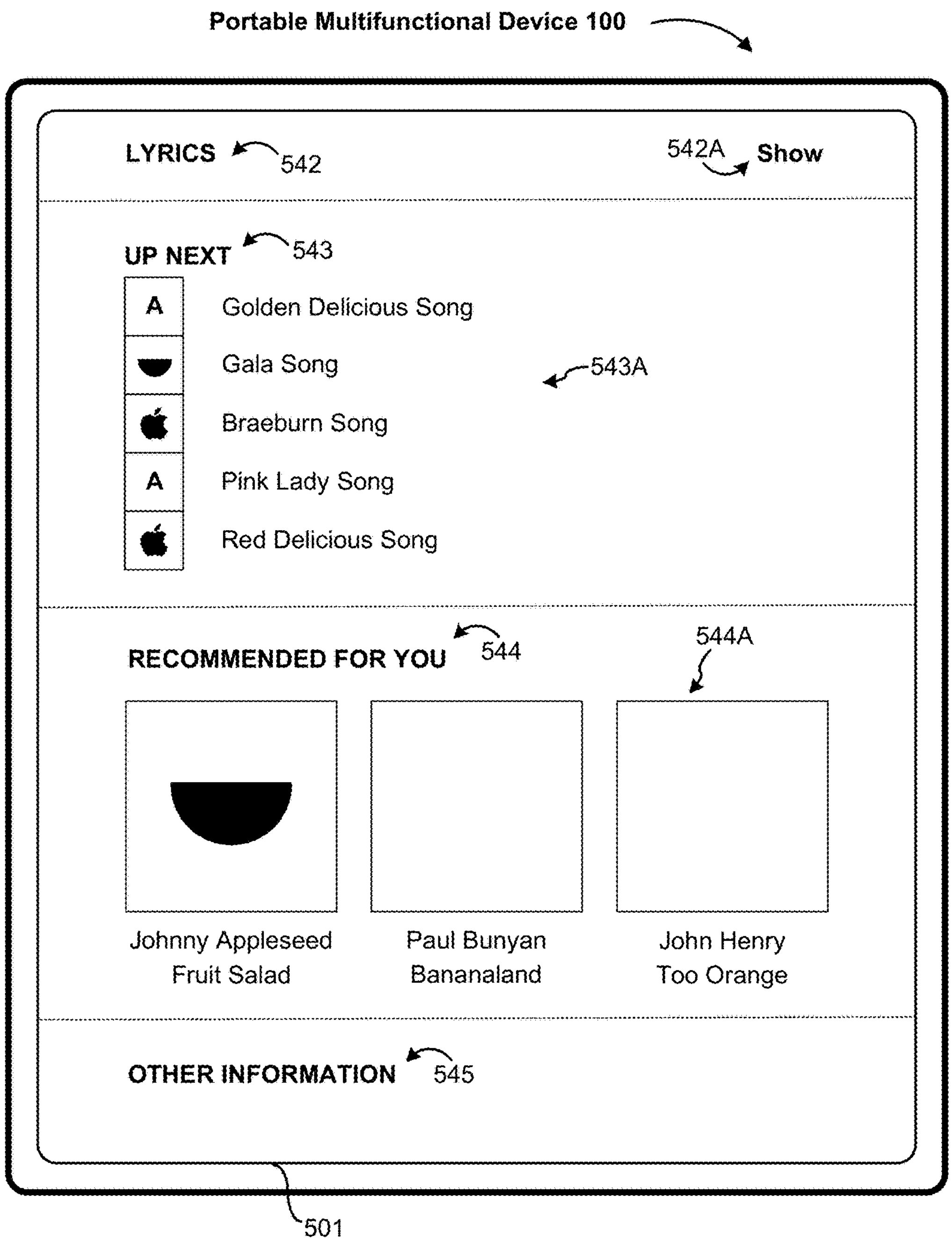
Figure 5A:
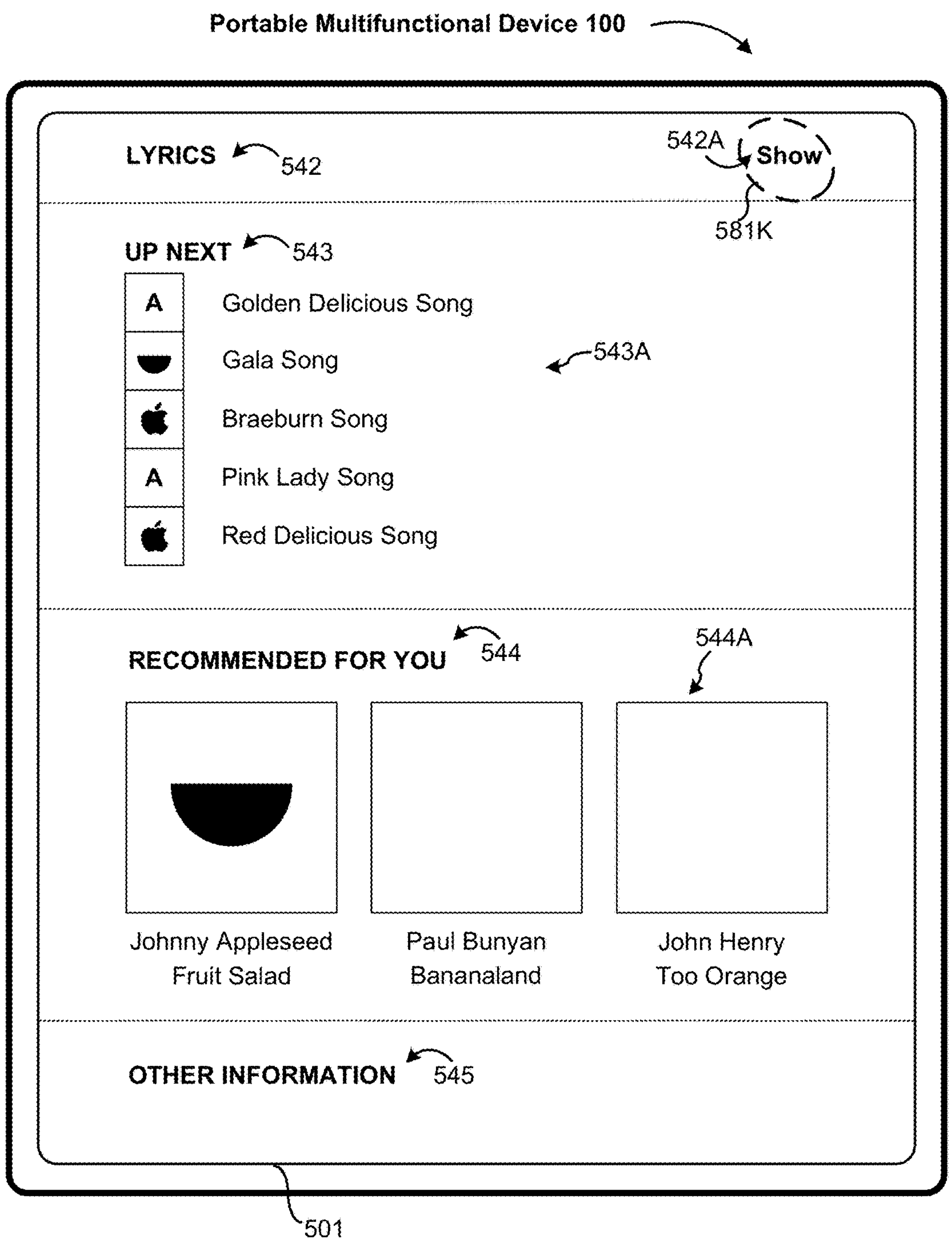
Figure 5A:
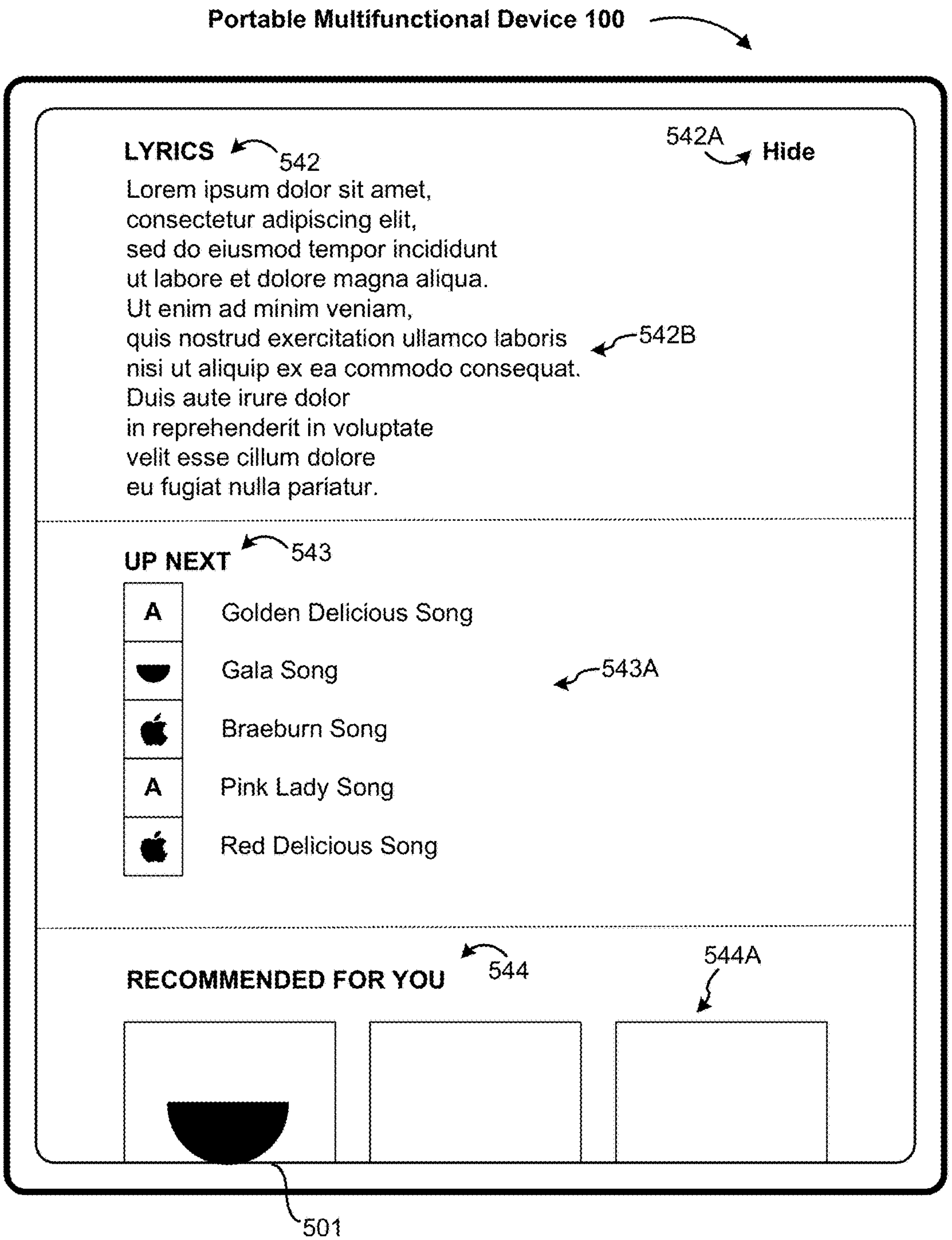
Figure 5A:
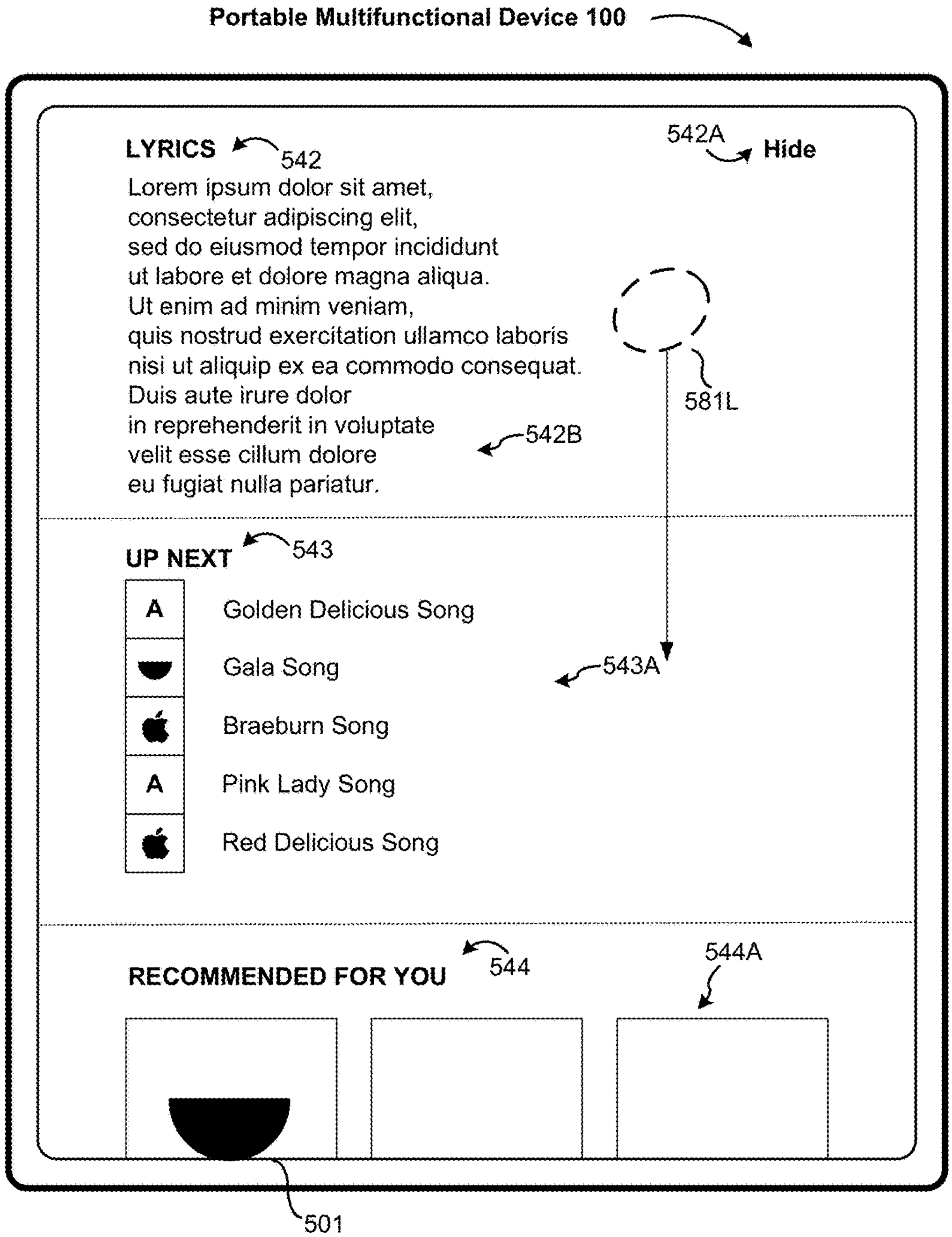
Figure 5A:
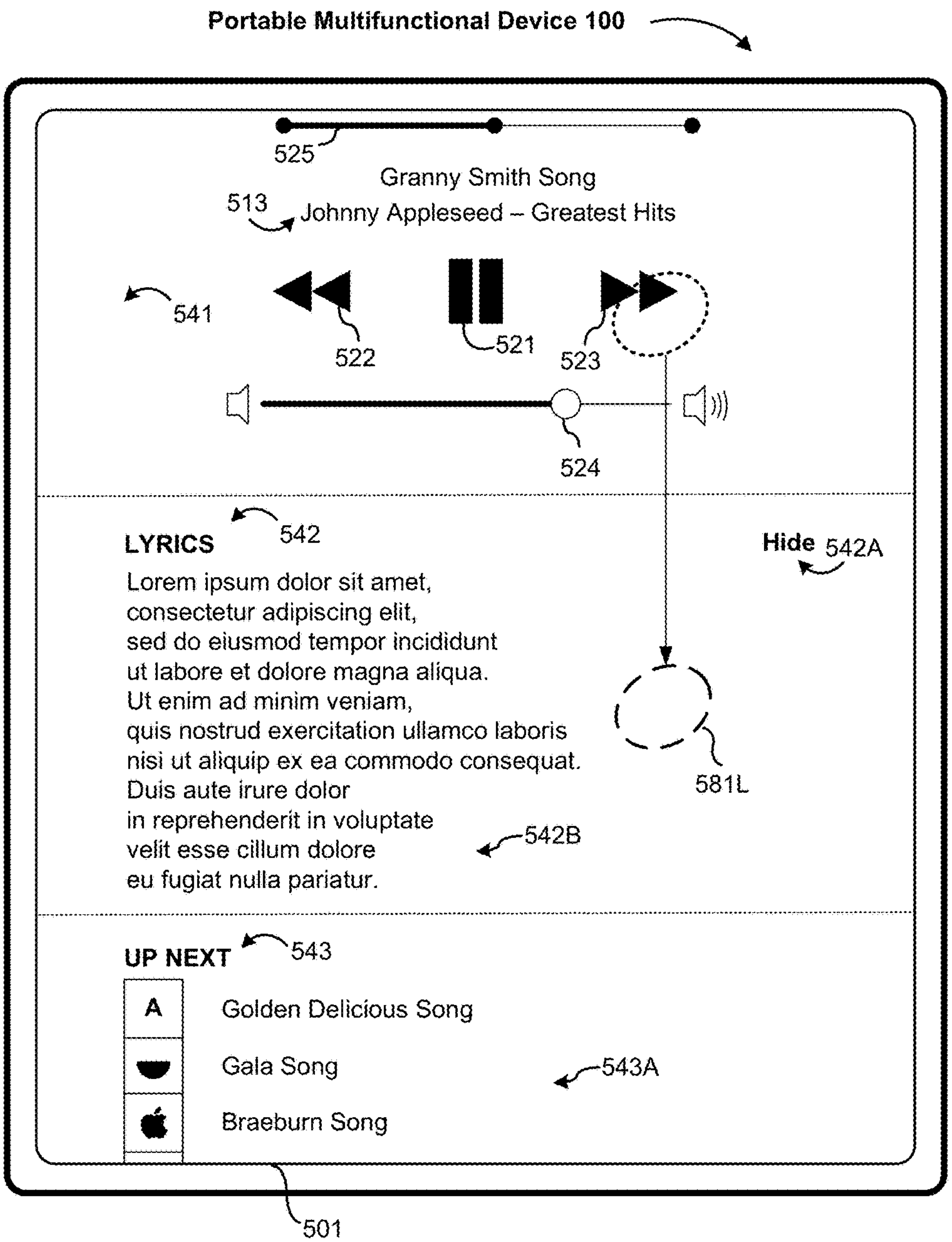
Figure 5A:
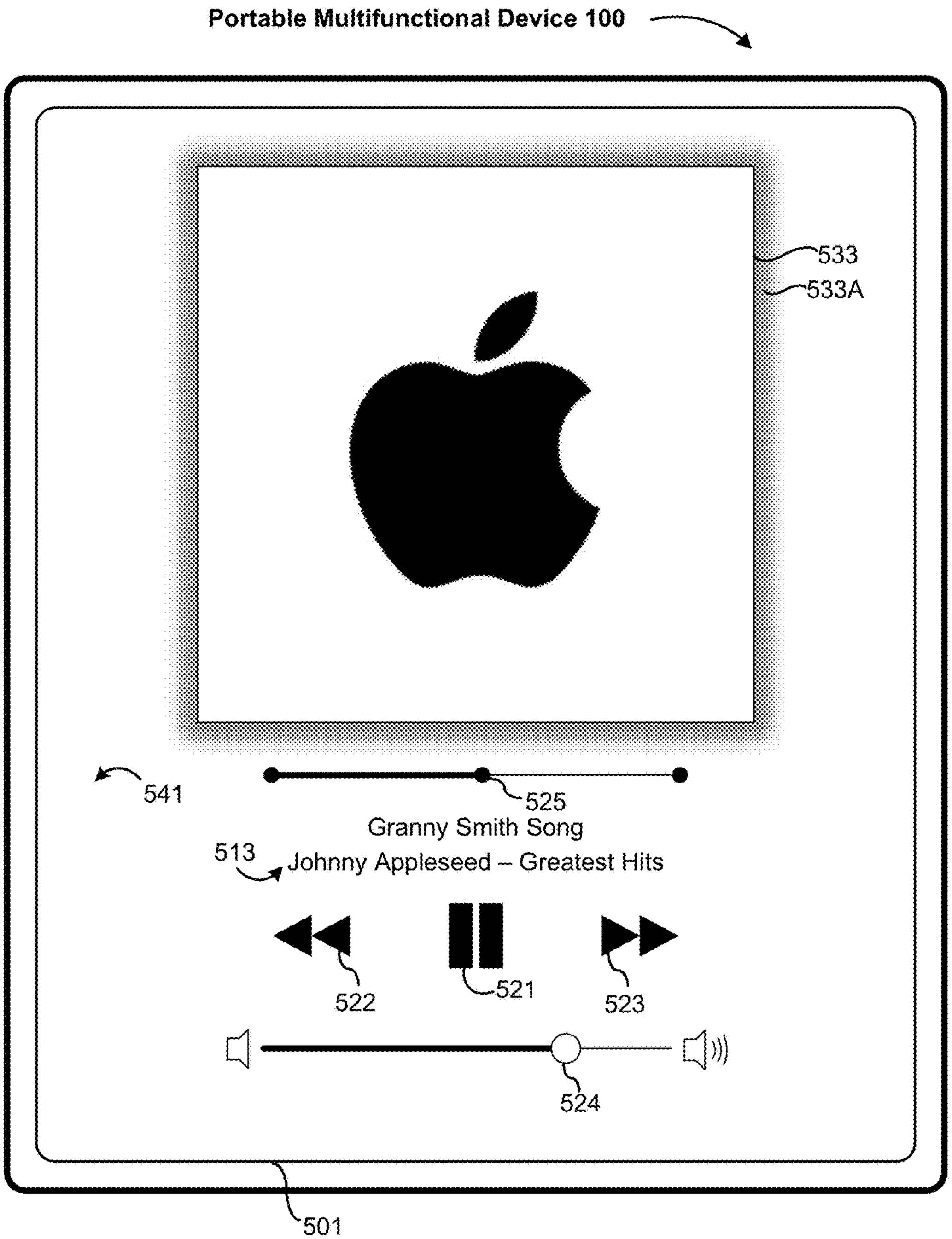
Figure 5A:
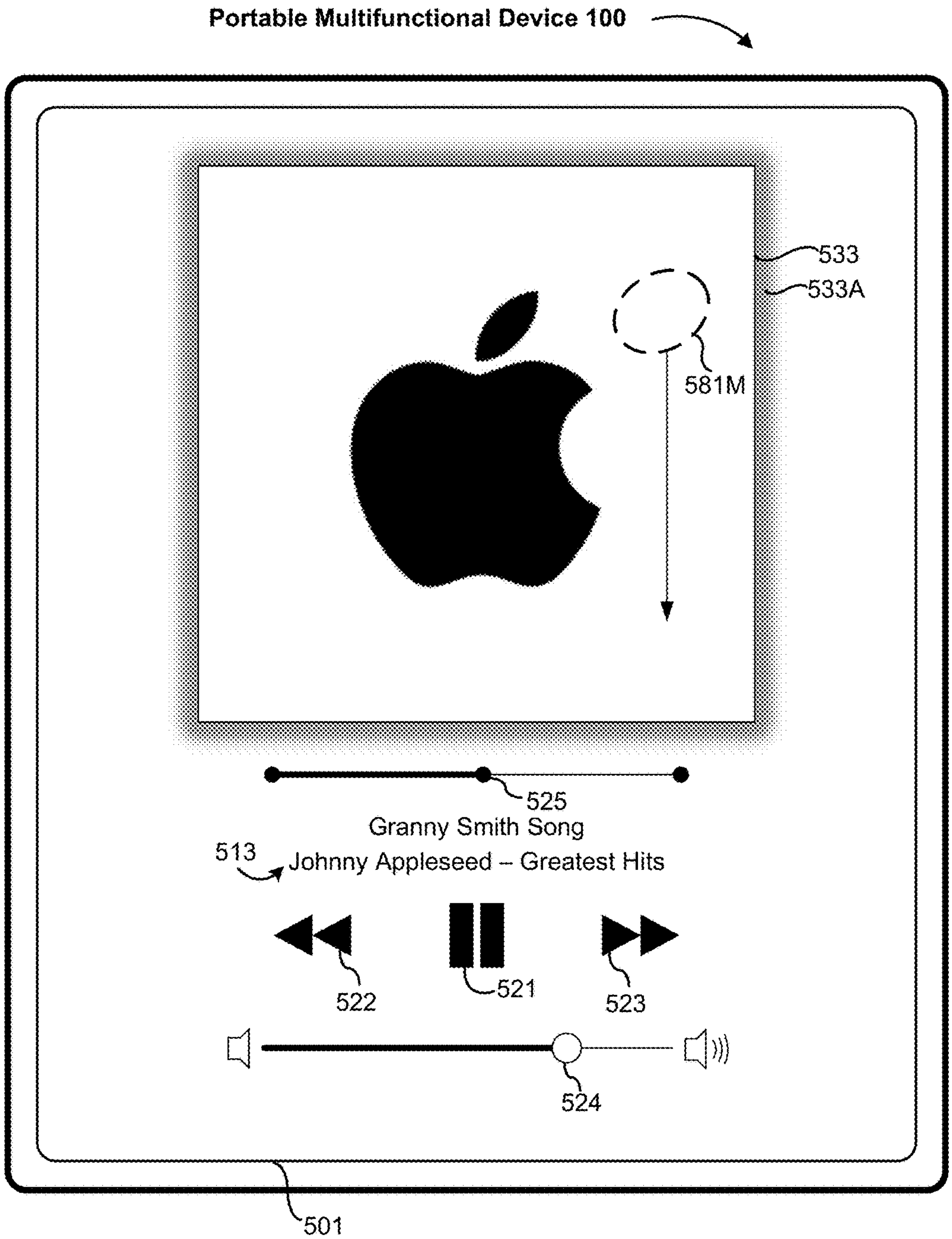
Figure 5A:
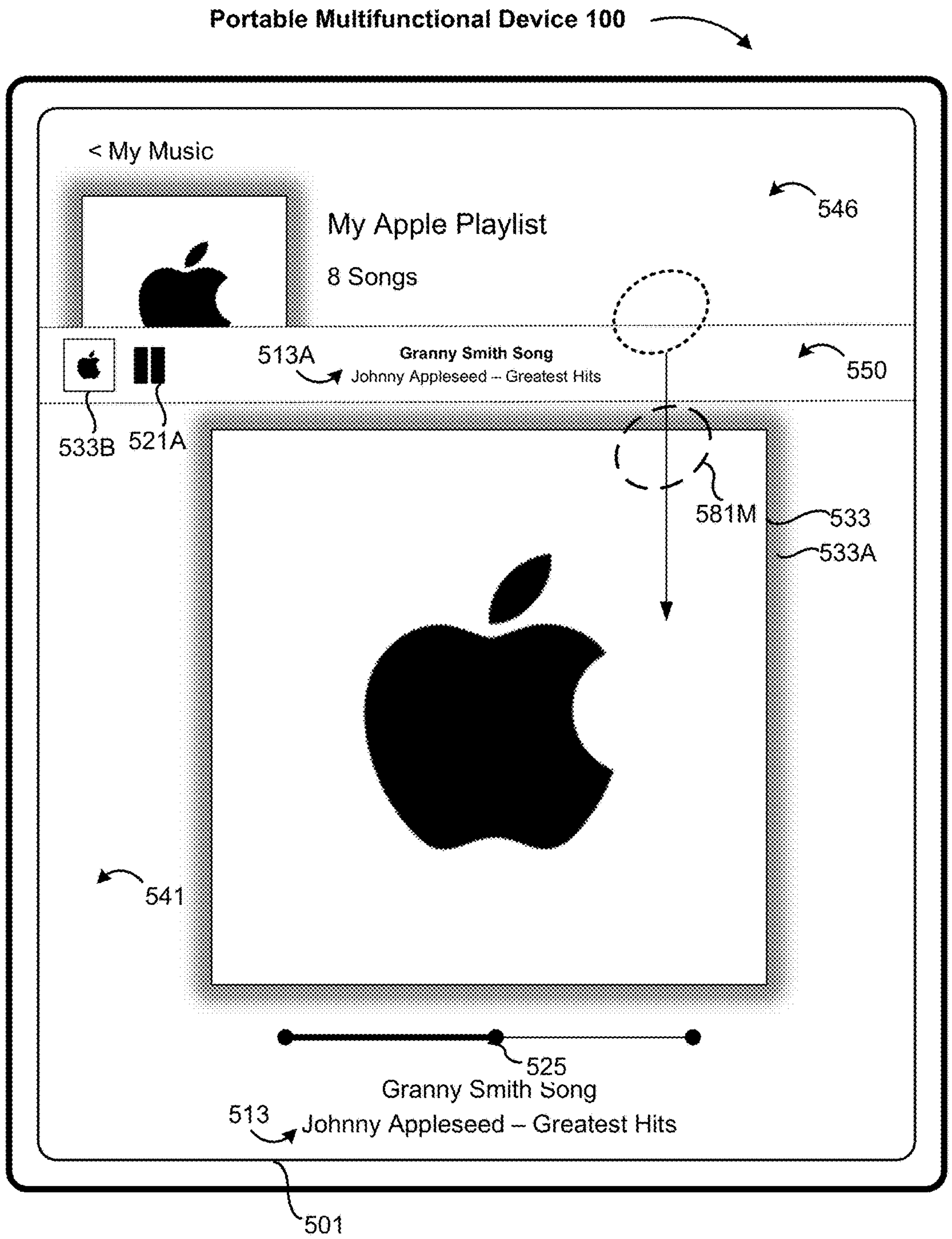
Figure 5A:
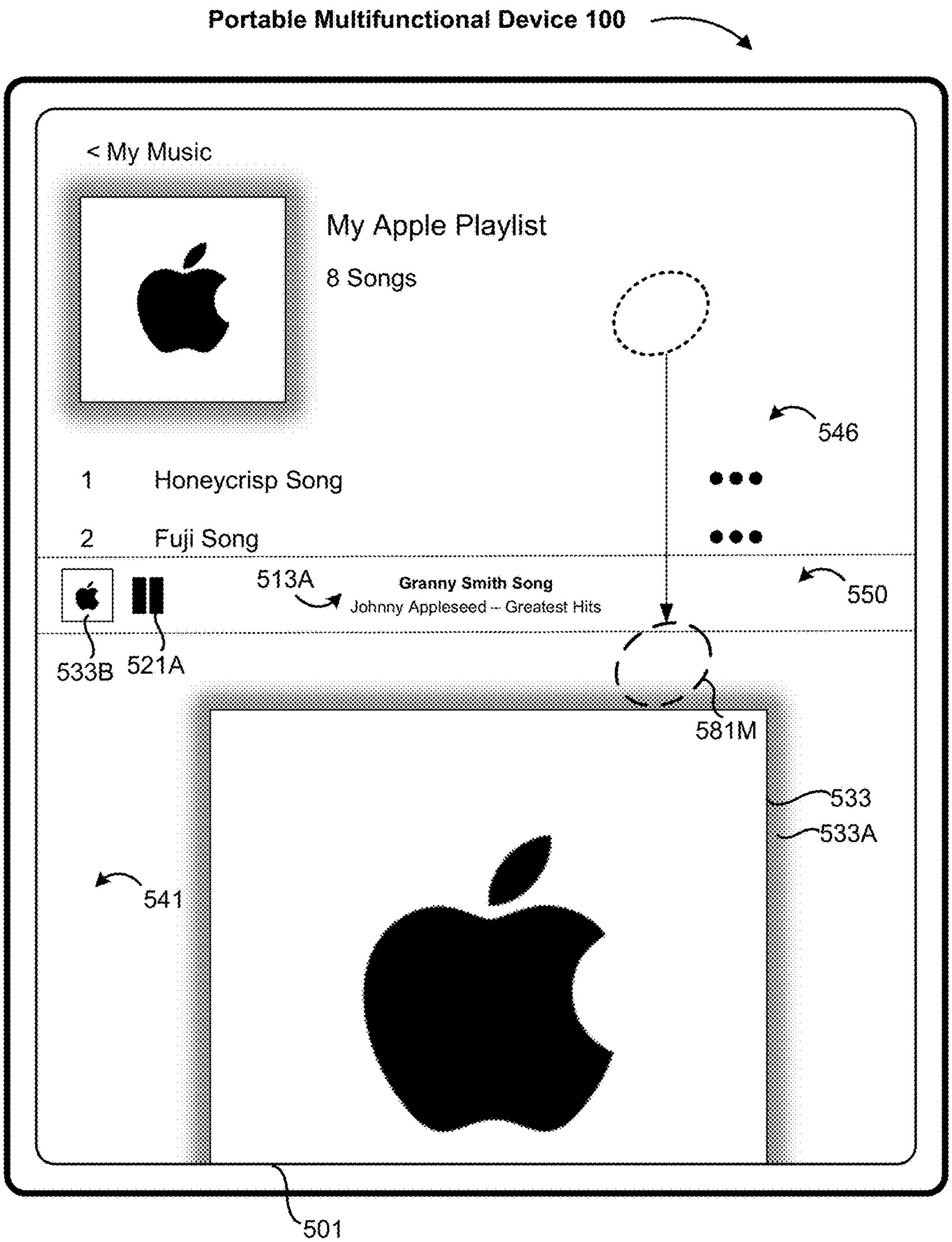
Figure 5A:
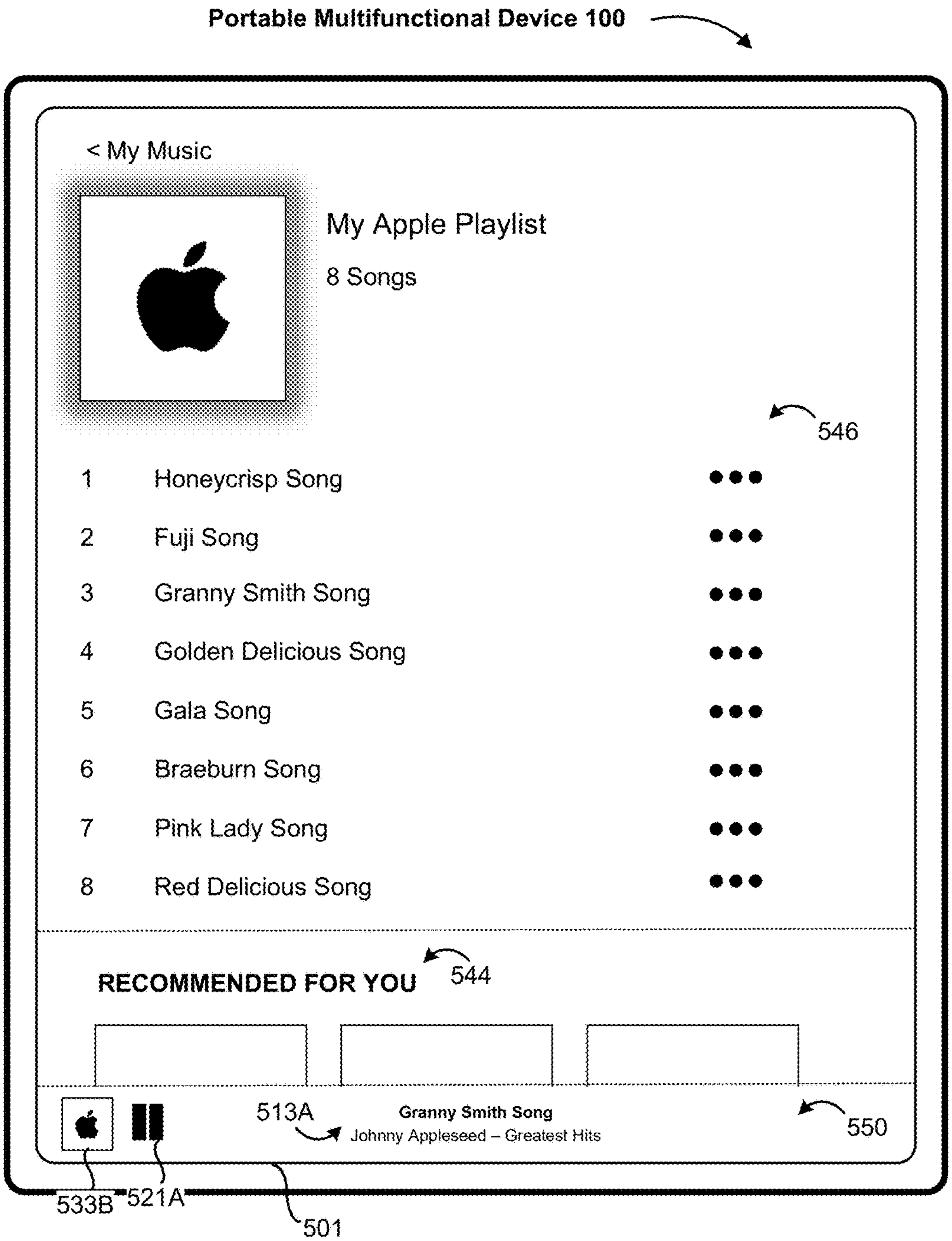
Figure 5A:
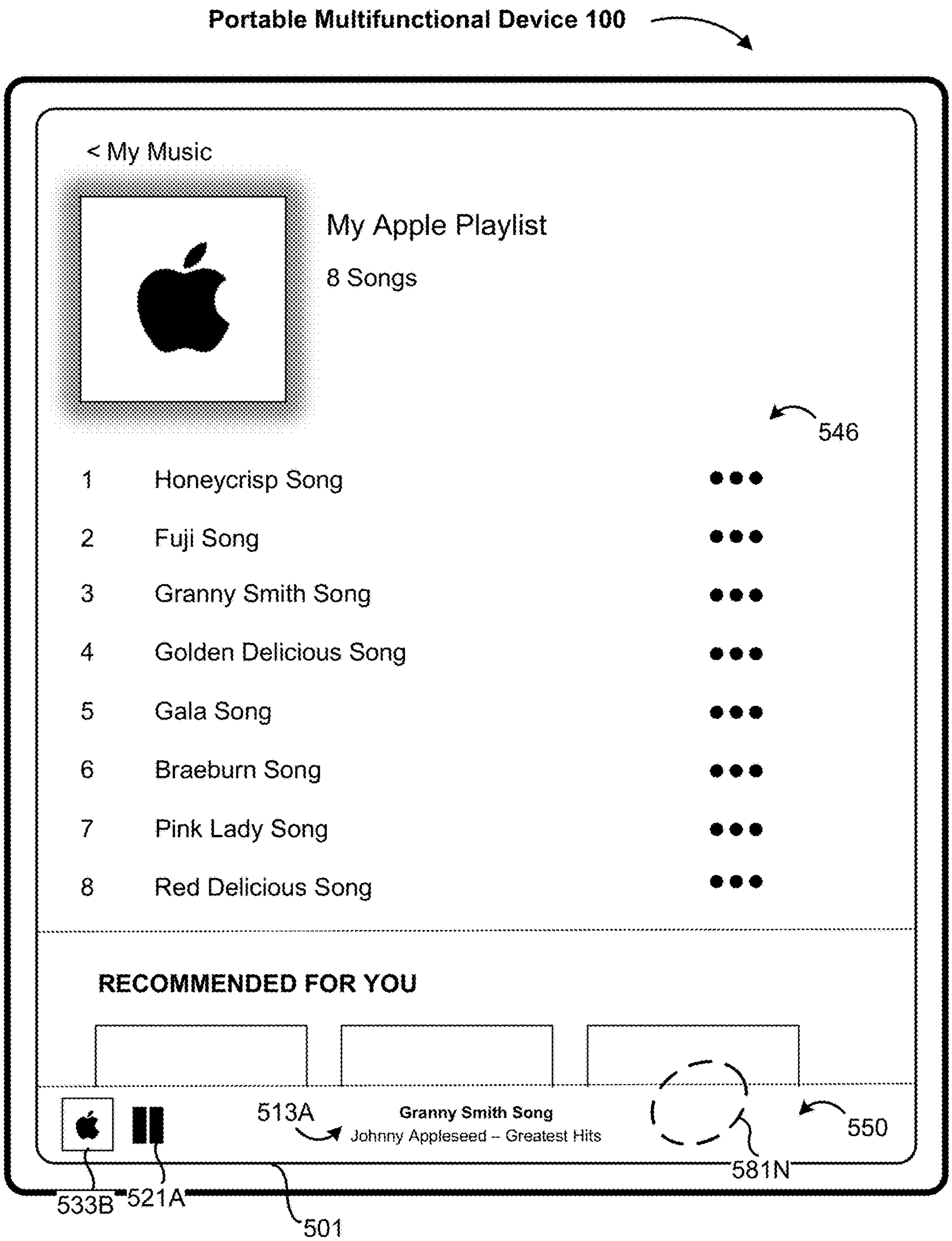
Figure 5A:
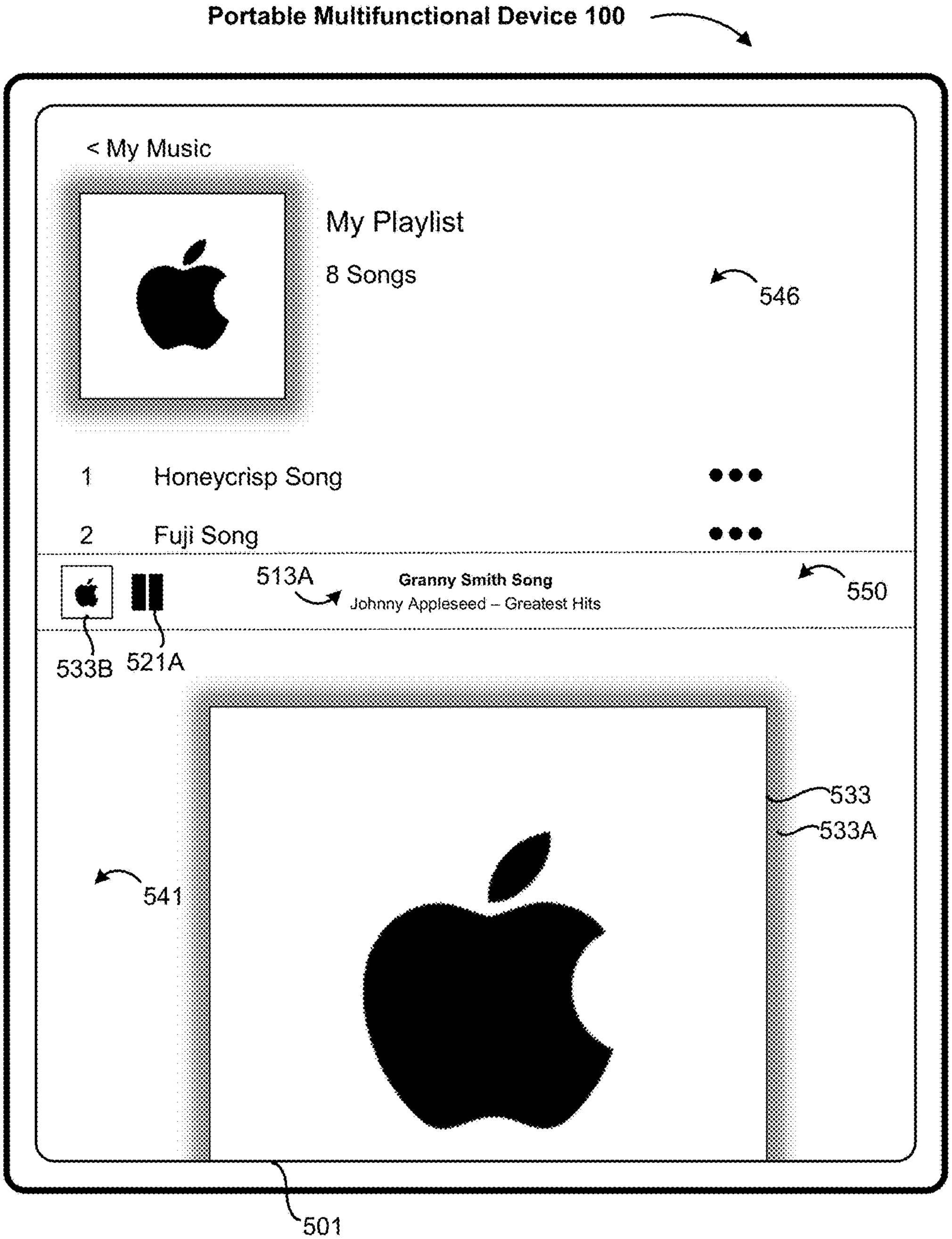
Figure 5A:
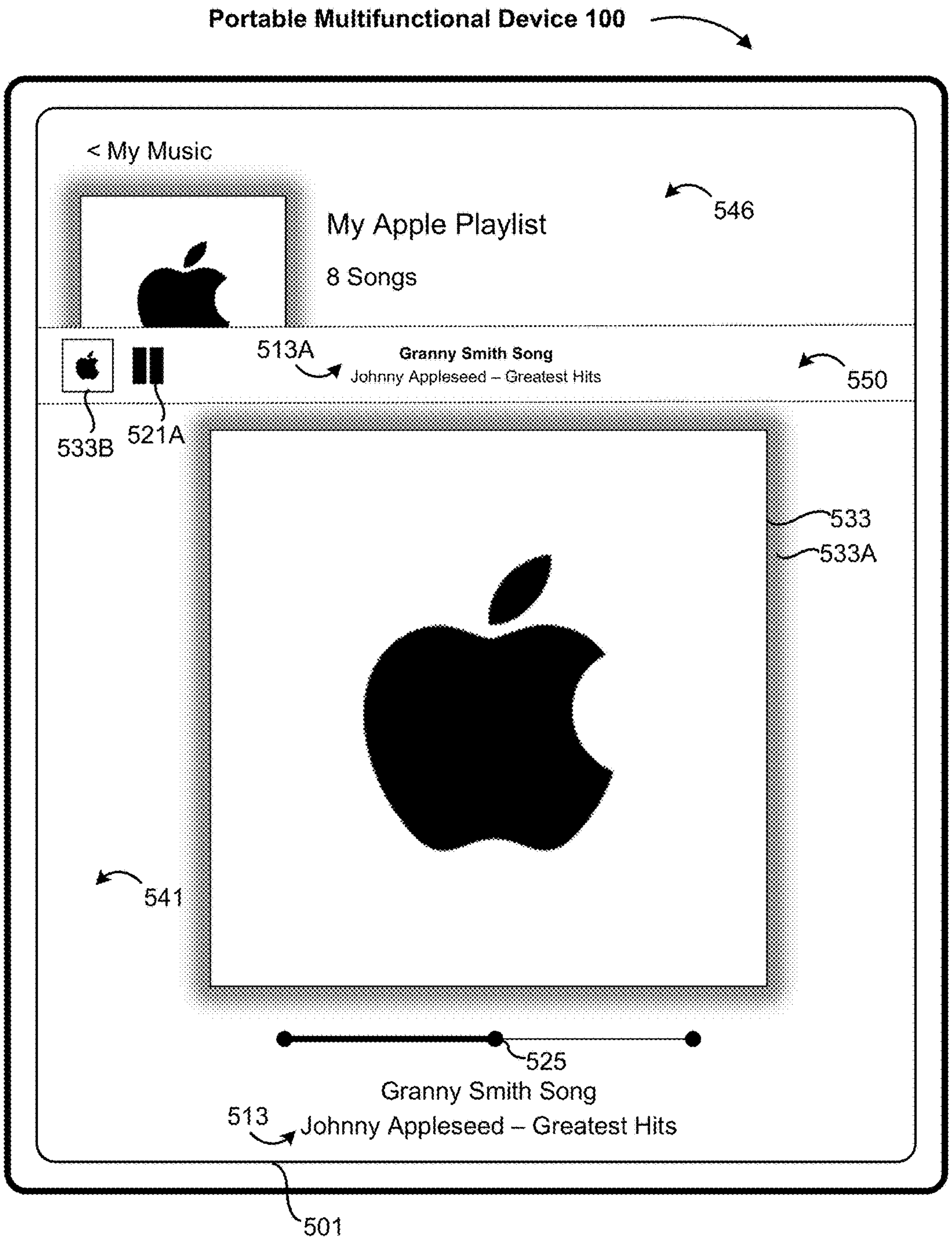
Figure 5A:
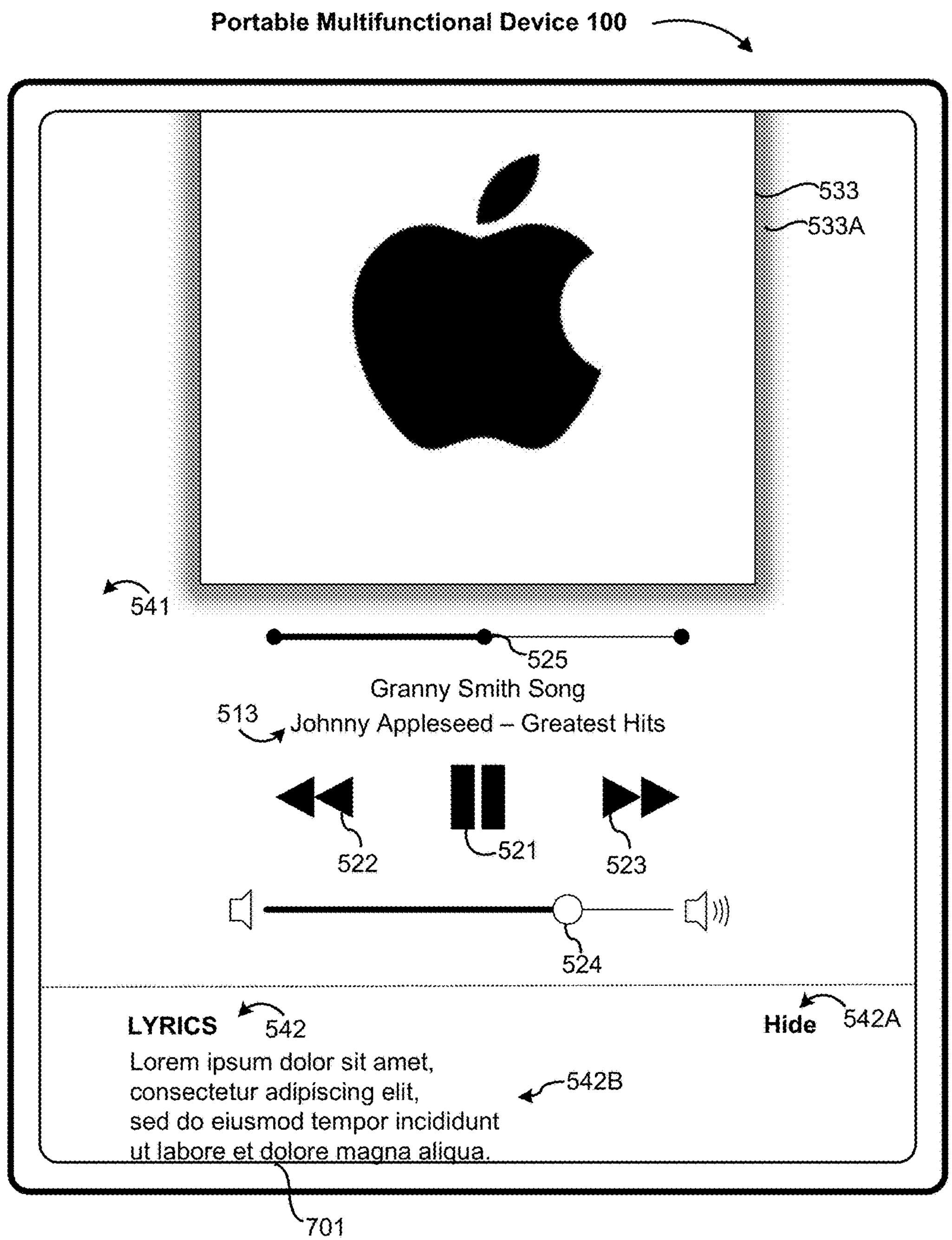
Figure 5A:
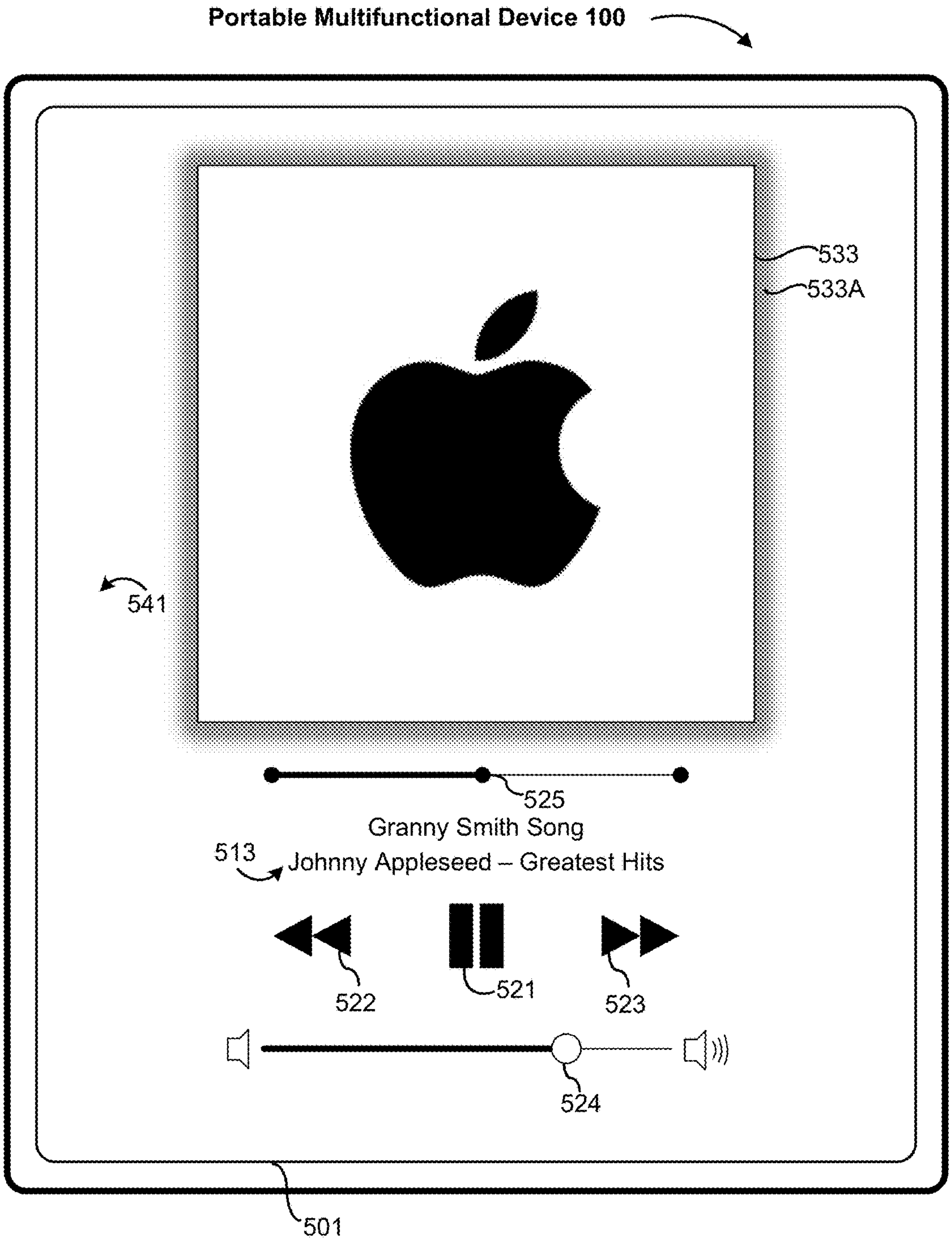
Figure 5A:
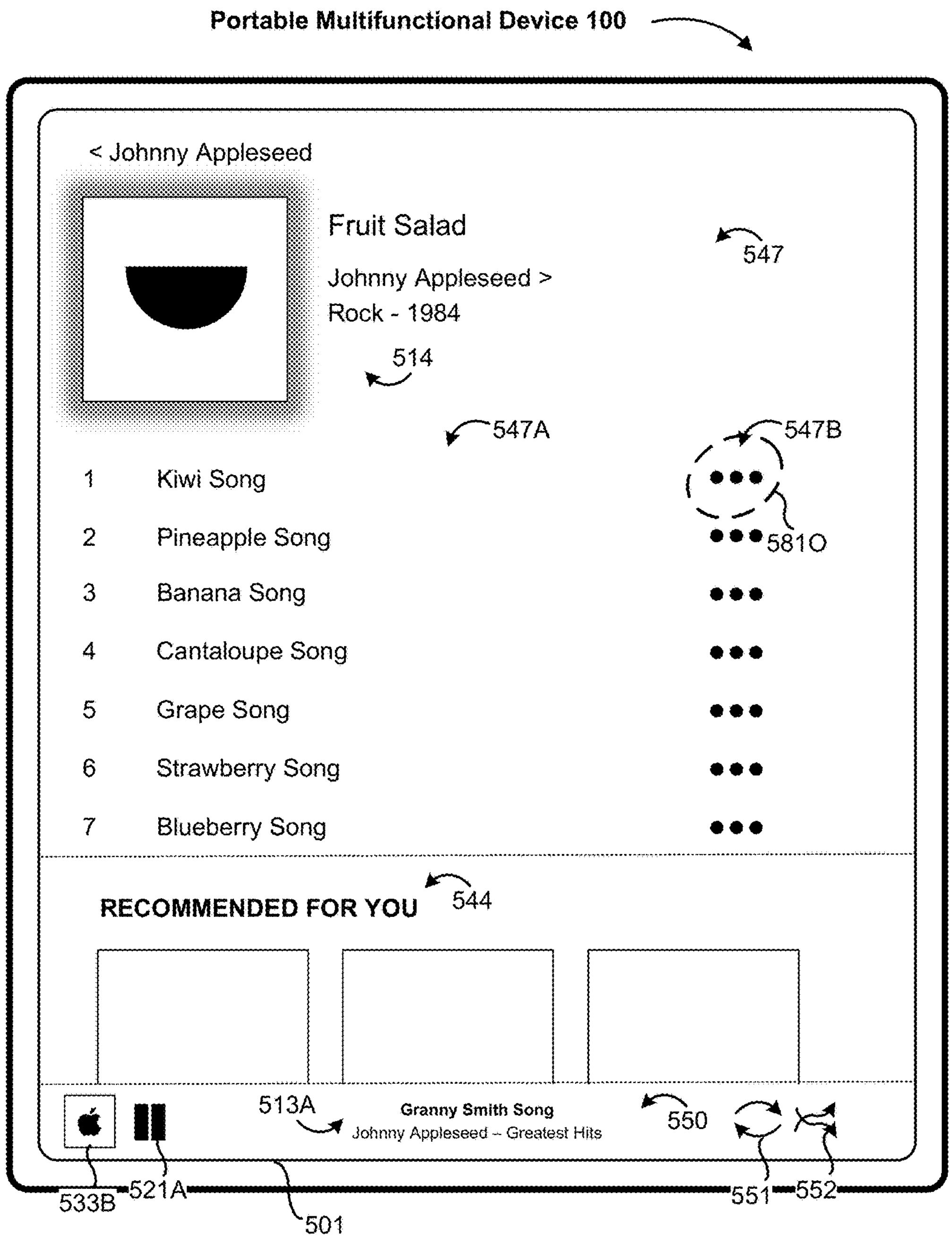
Figure 5A:
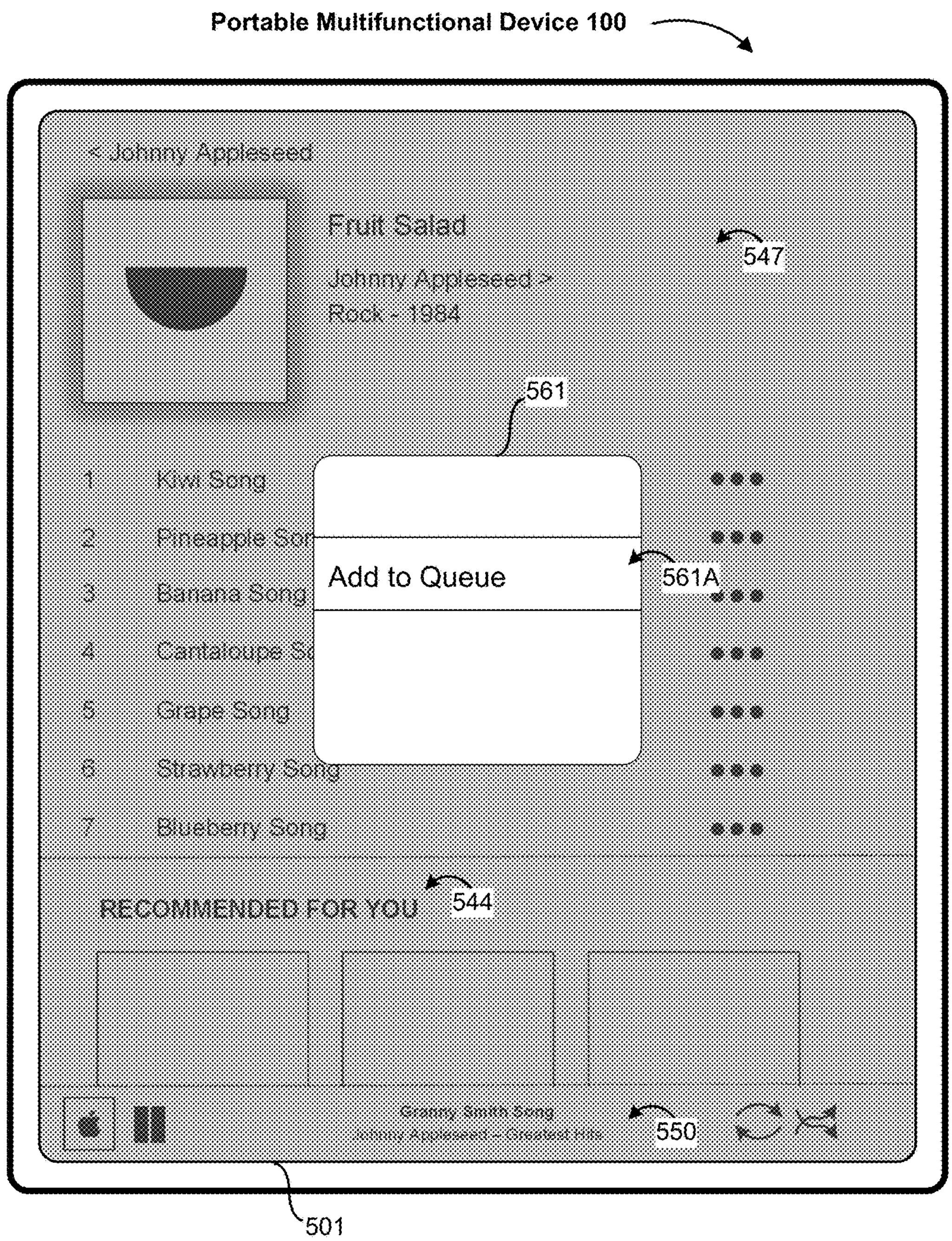
Figure 5A:
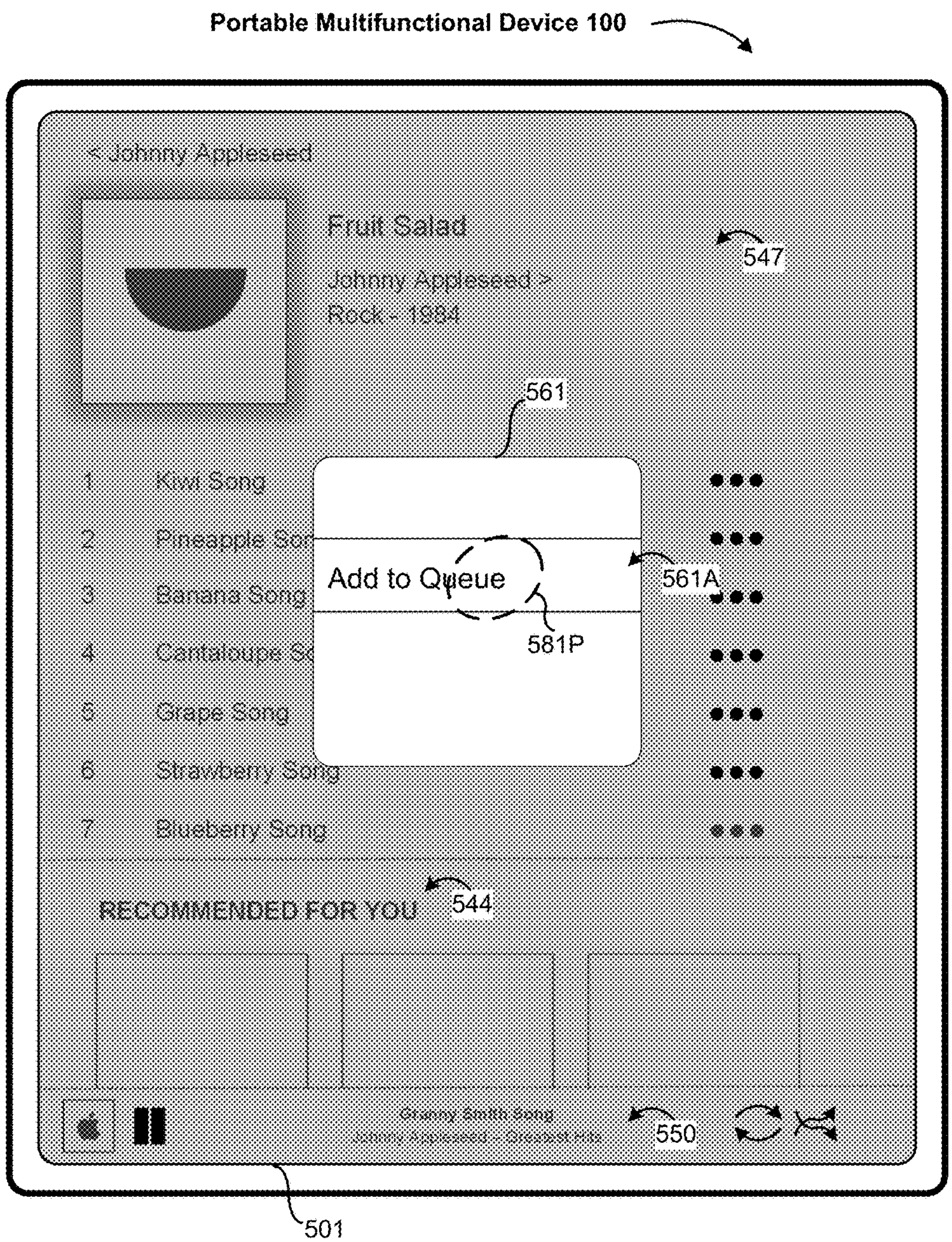
Figure 5A:
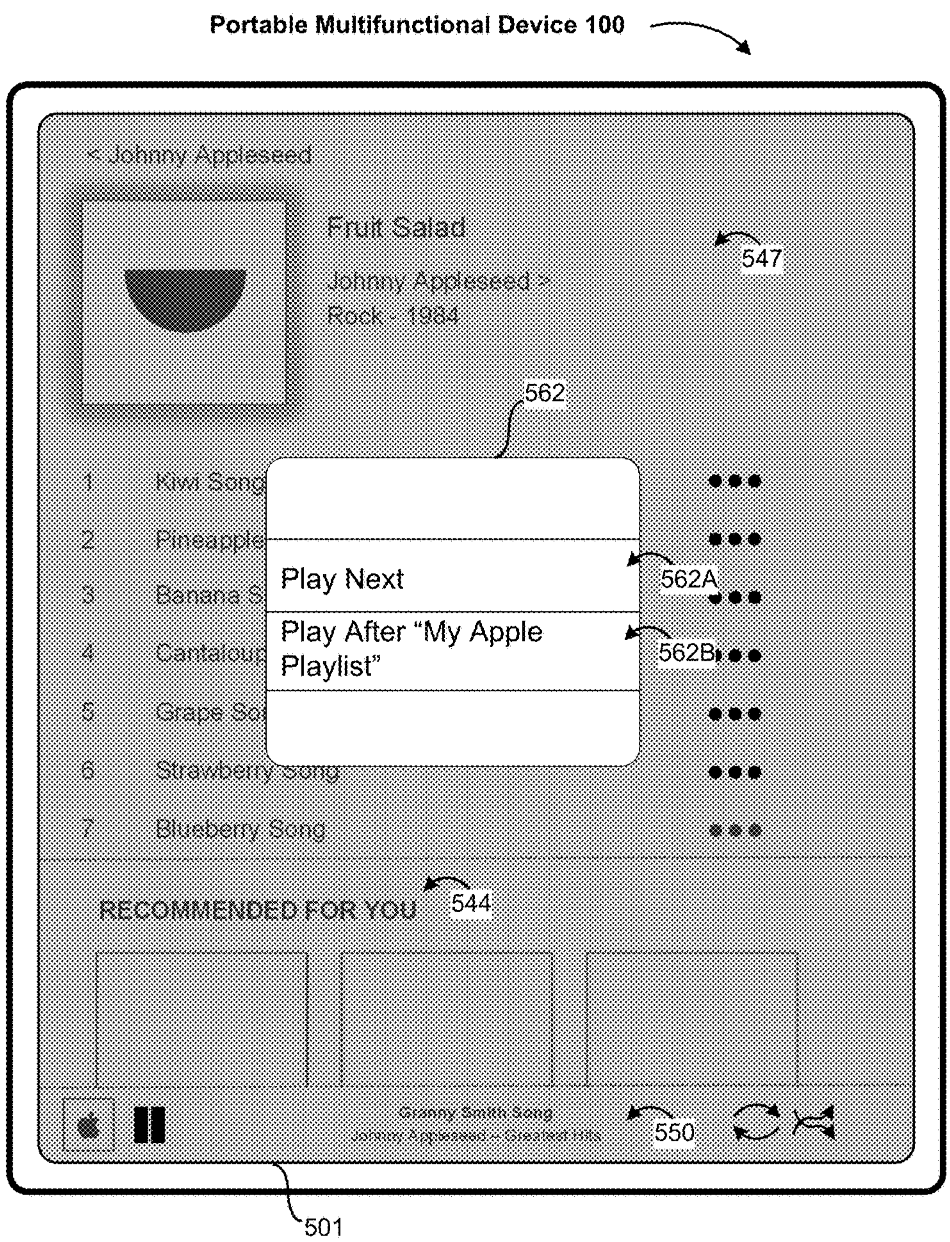
Figure 5A:
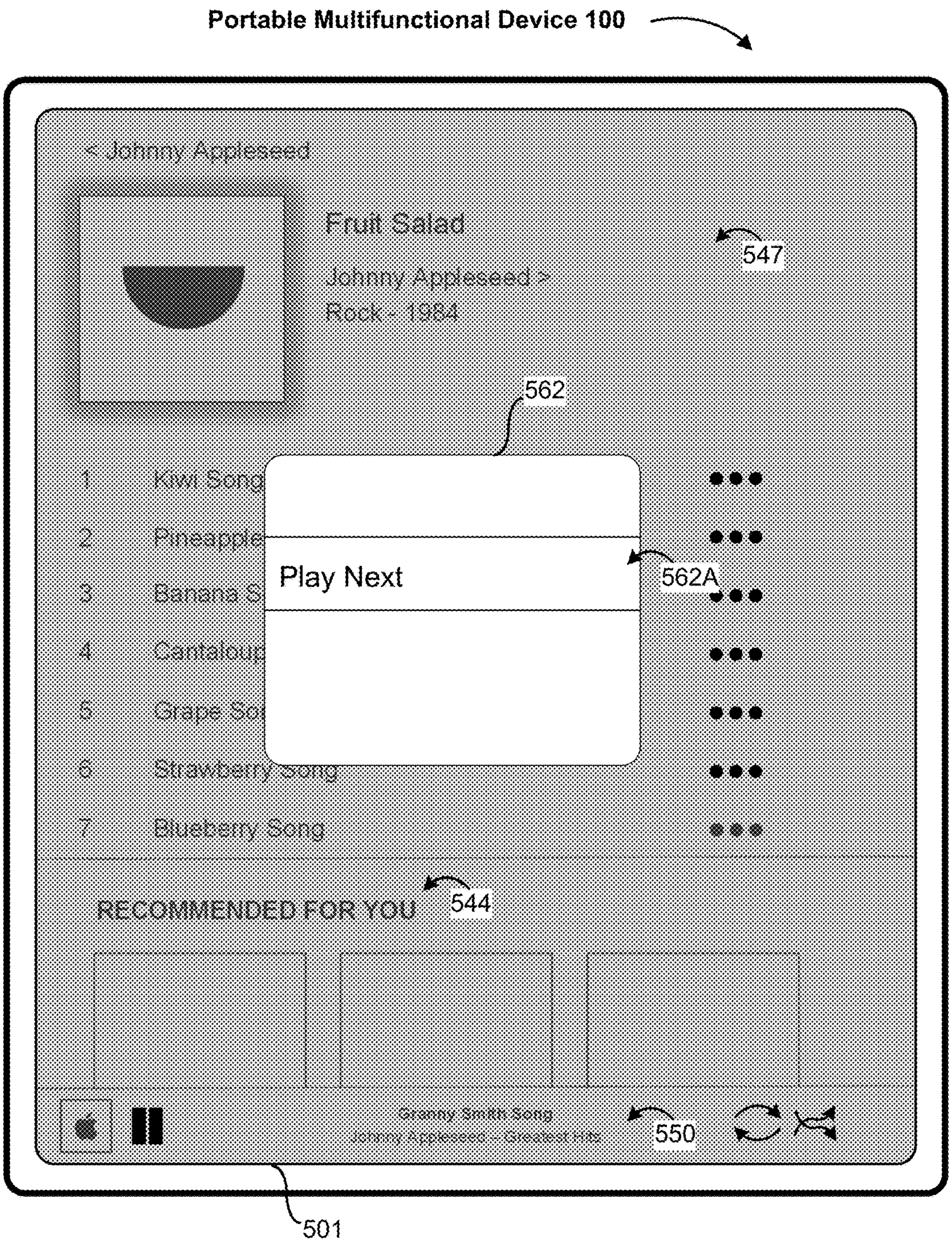
Figure 5A:
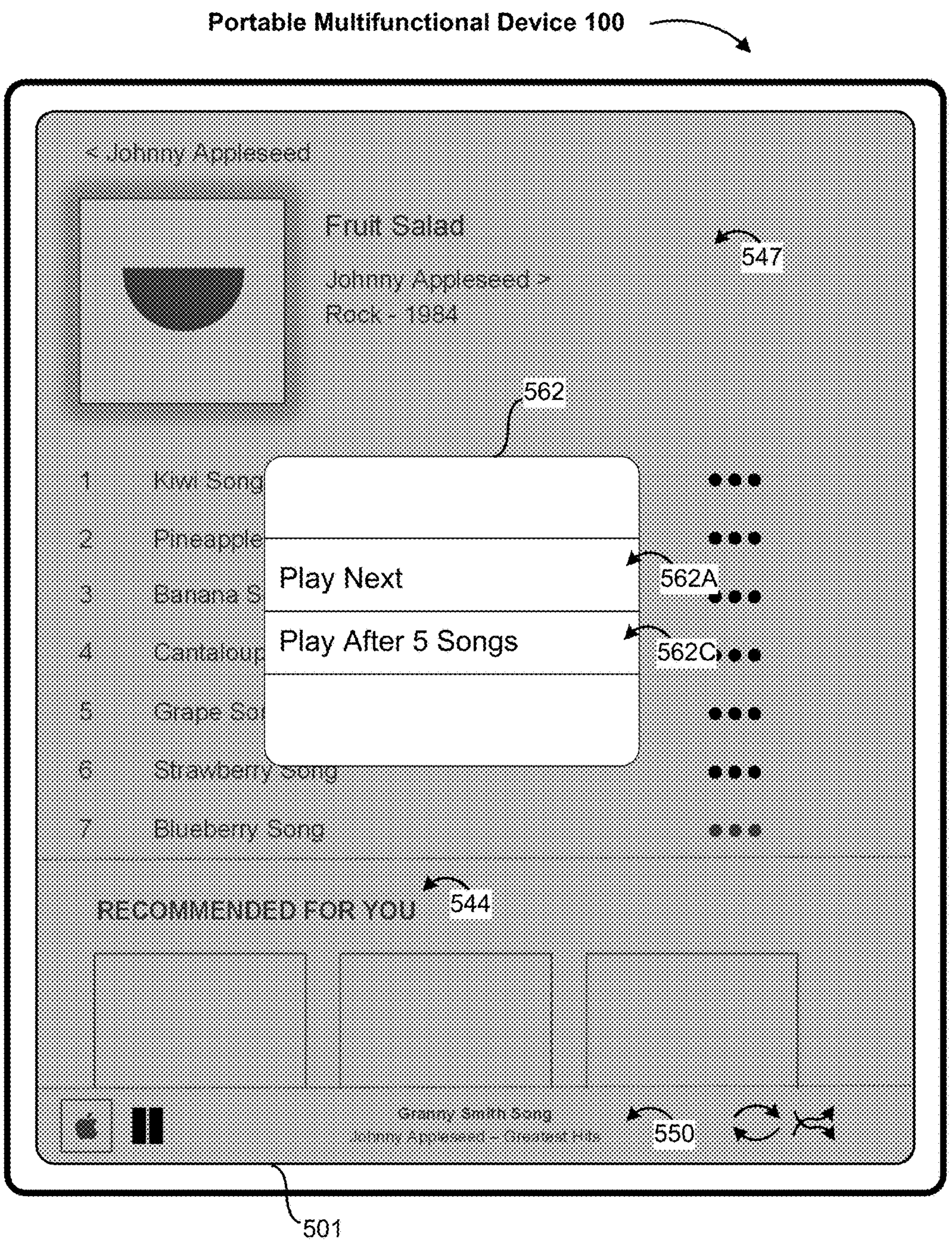
Figure 5A:
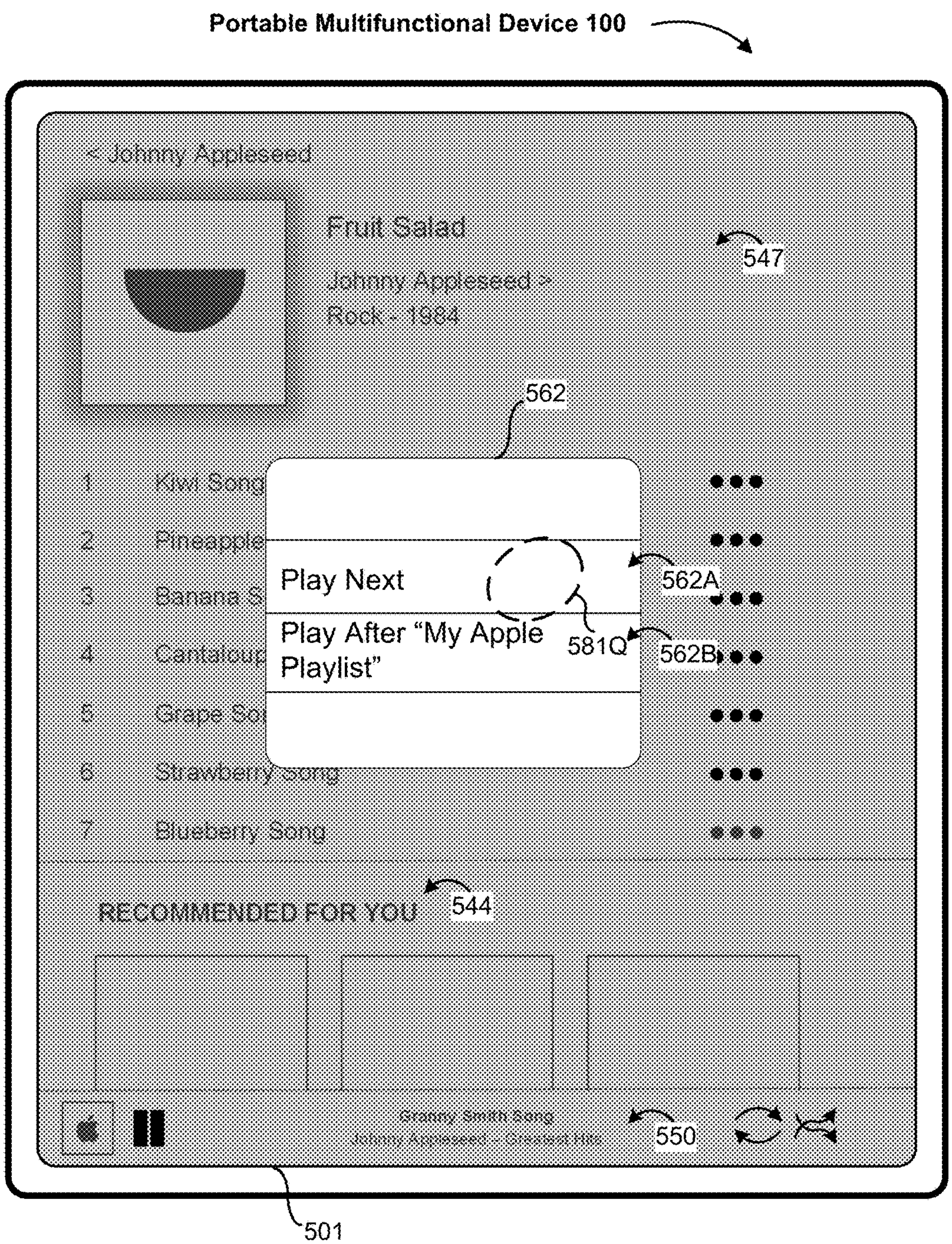
Figure 5A:
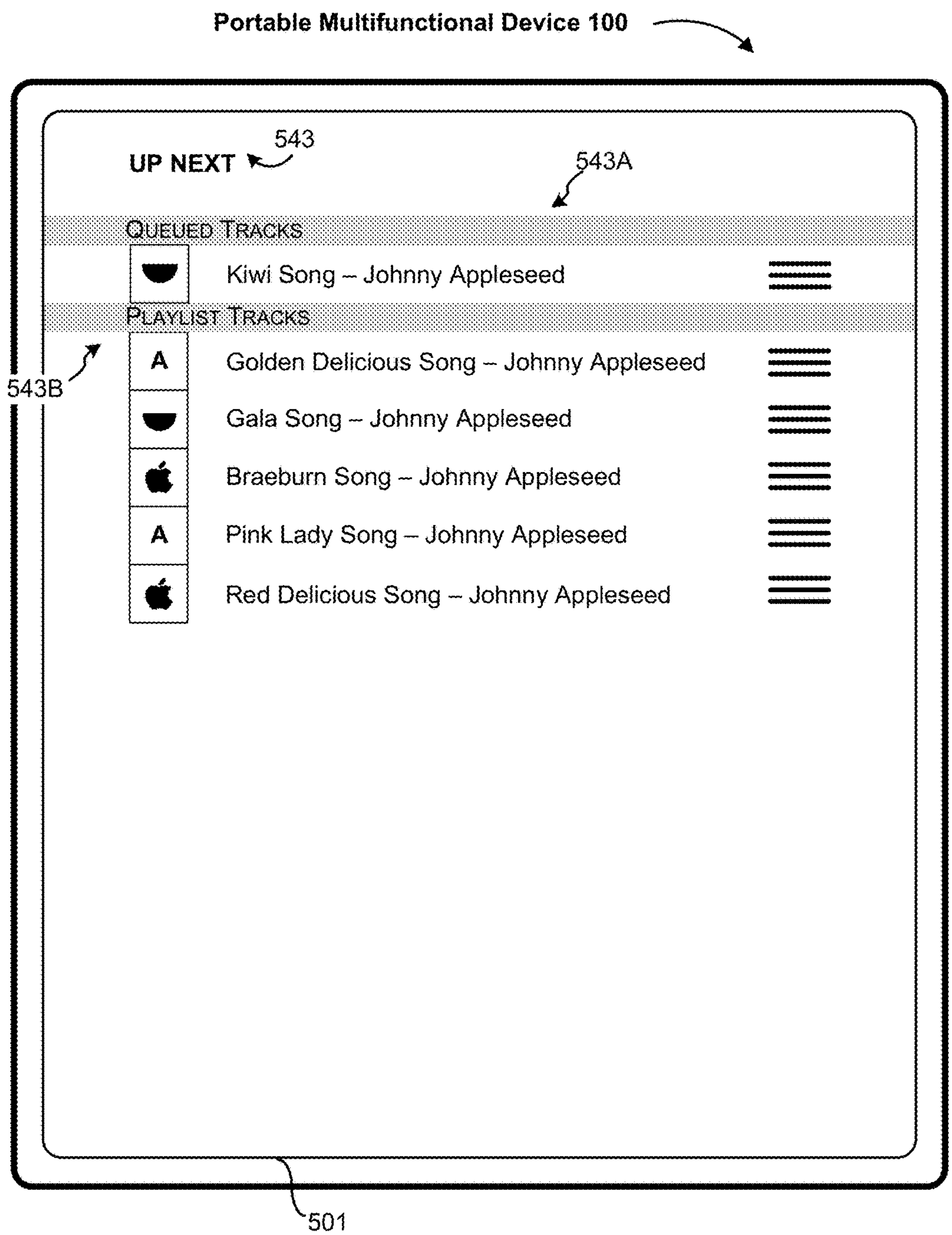
Figure 5A:
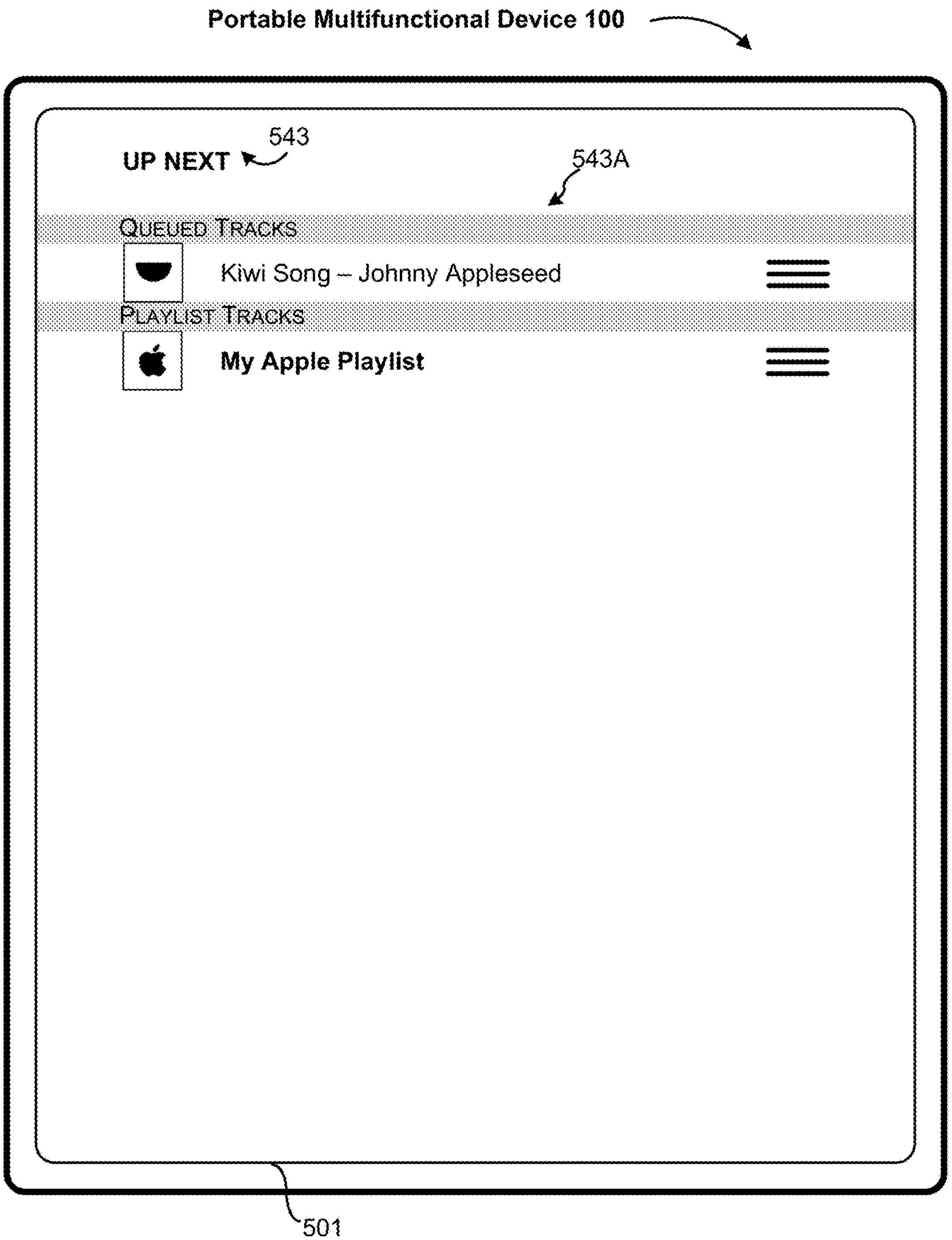
Figure 5A:
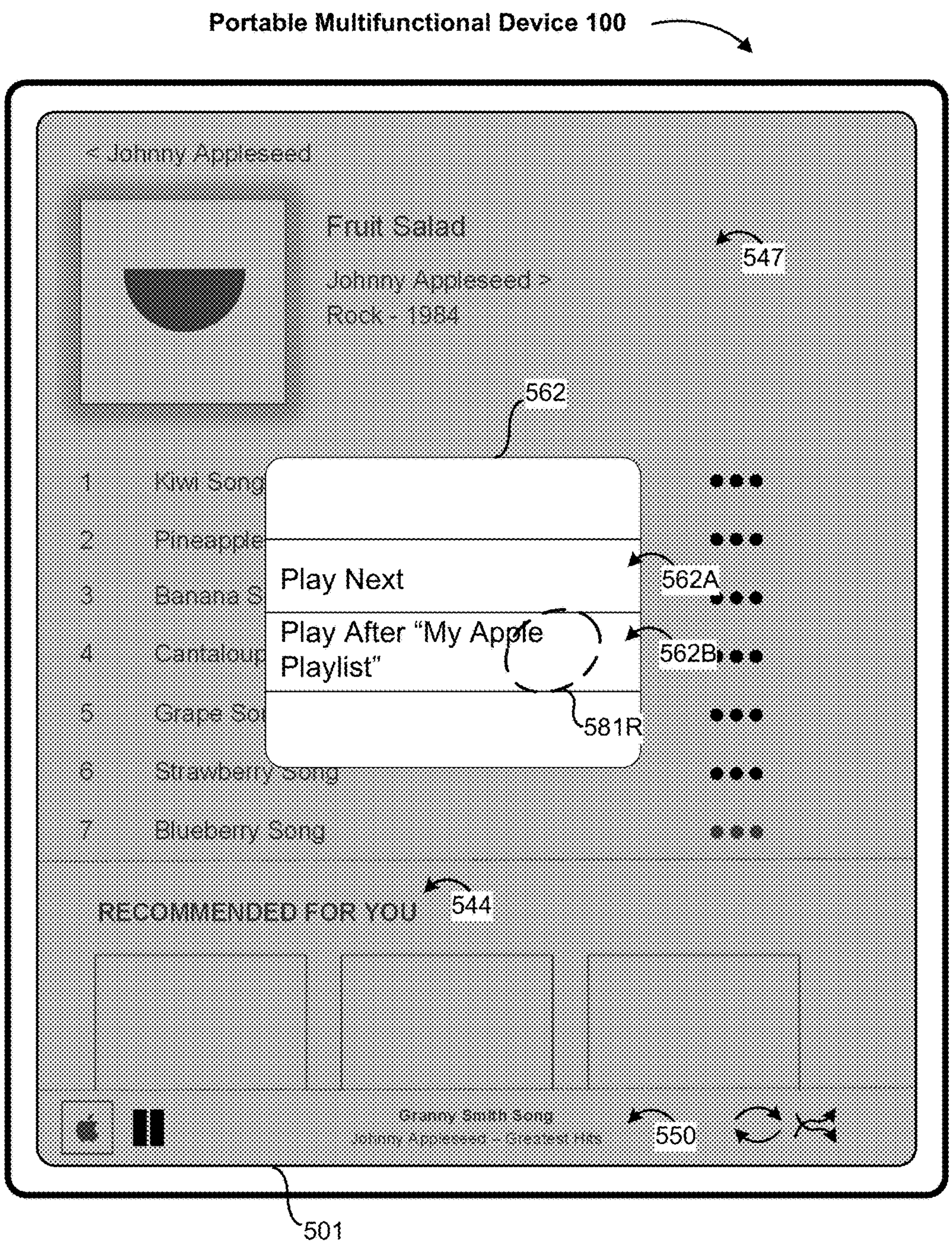
Figure 5B:
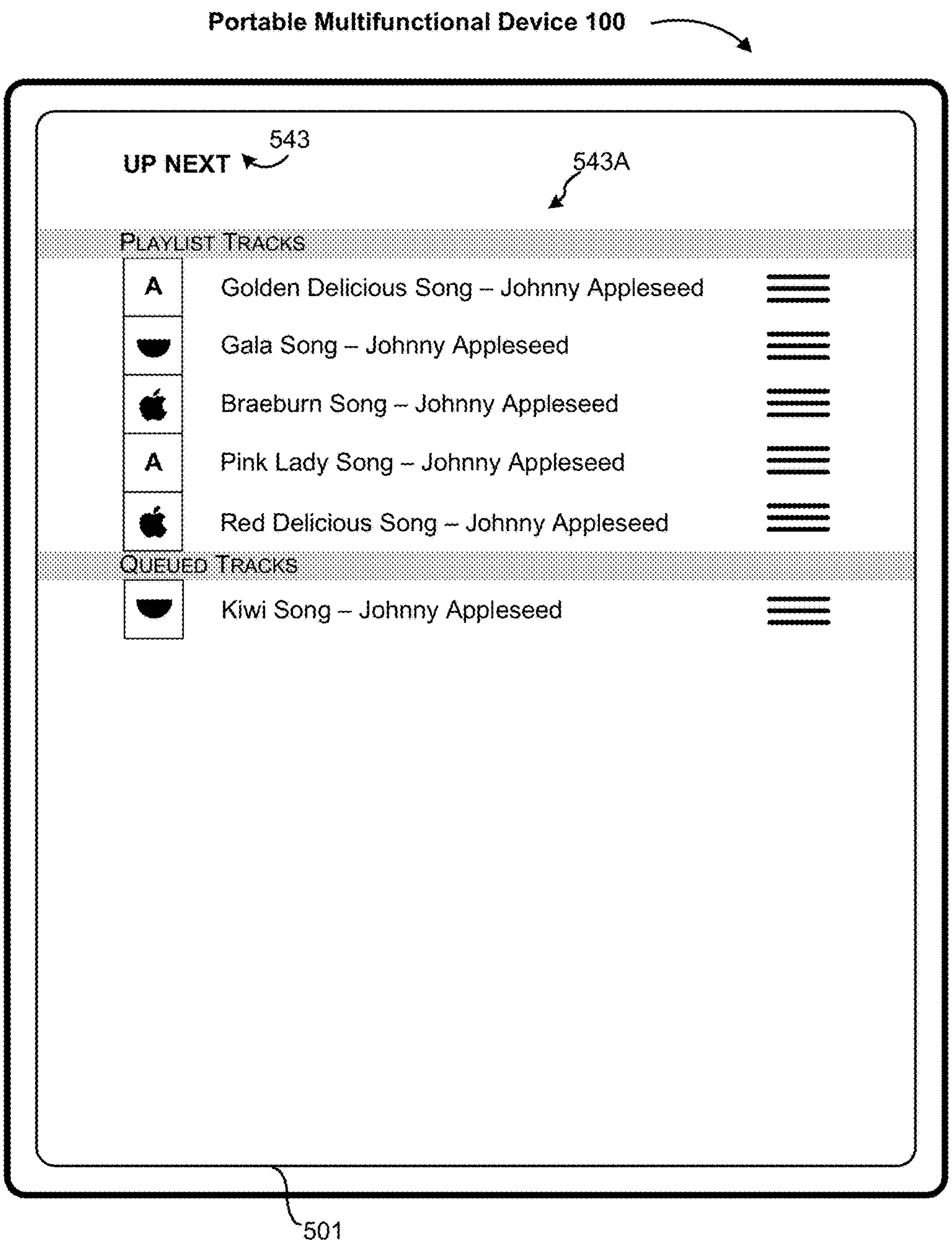
Figure 5B:
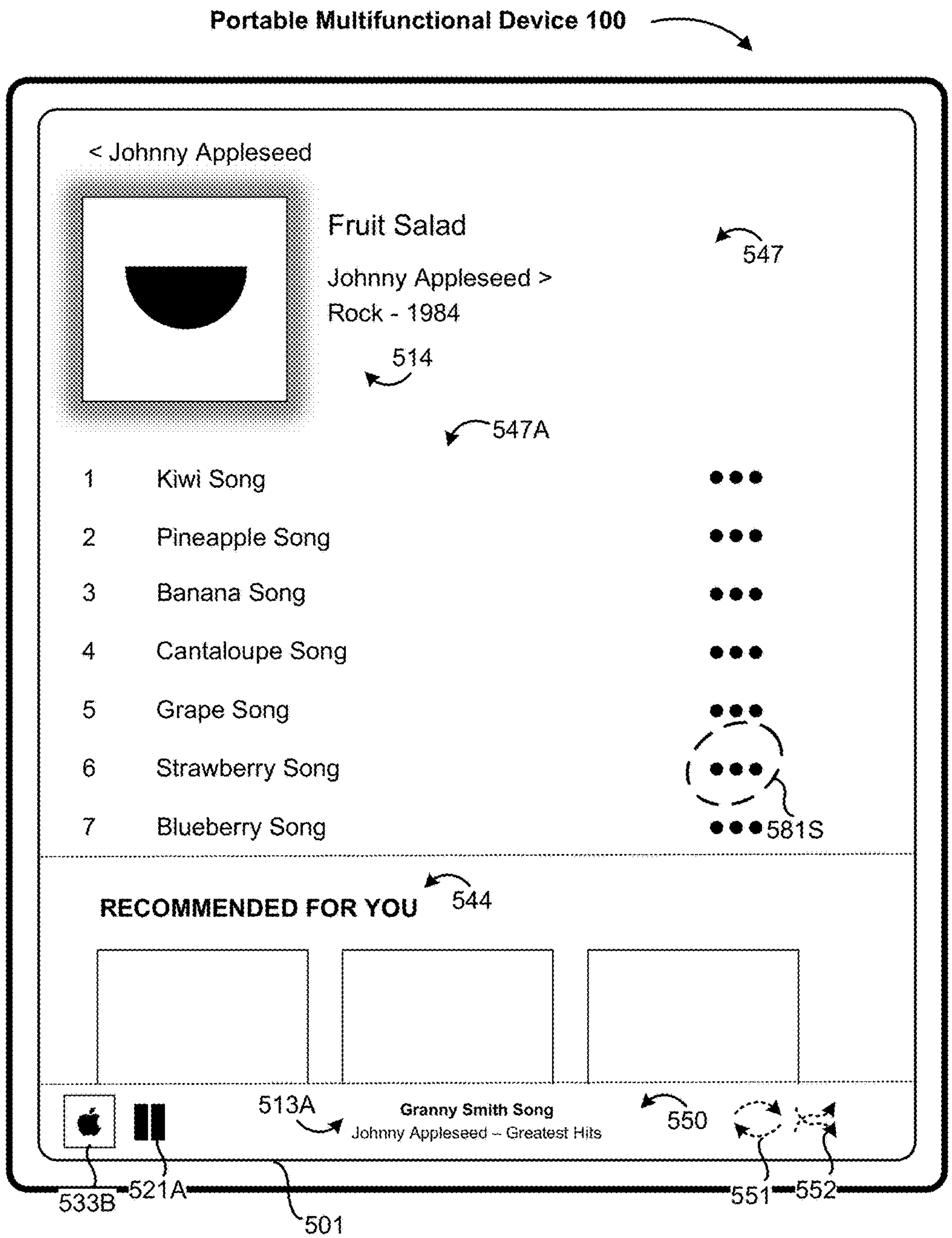
Figure 5B:
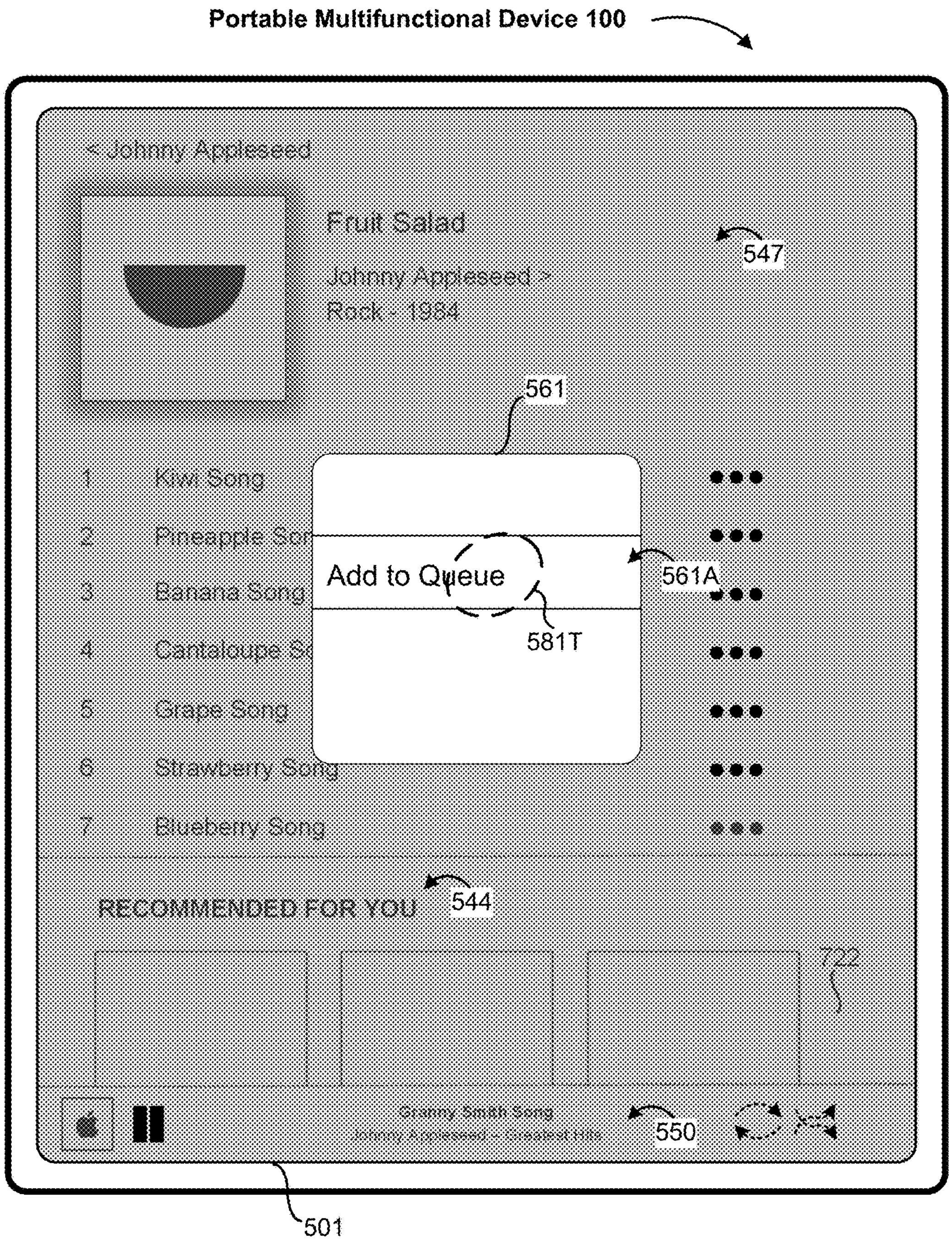
Figure 5B:
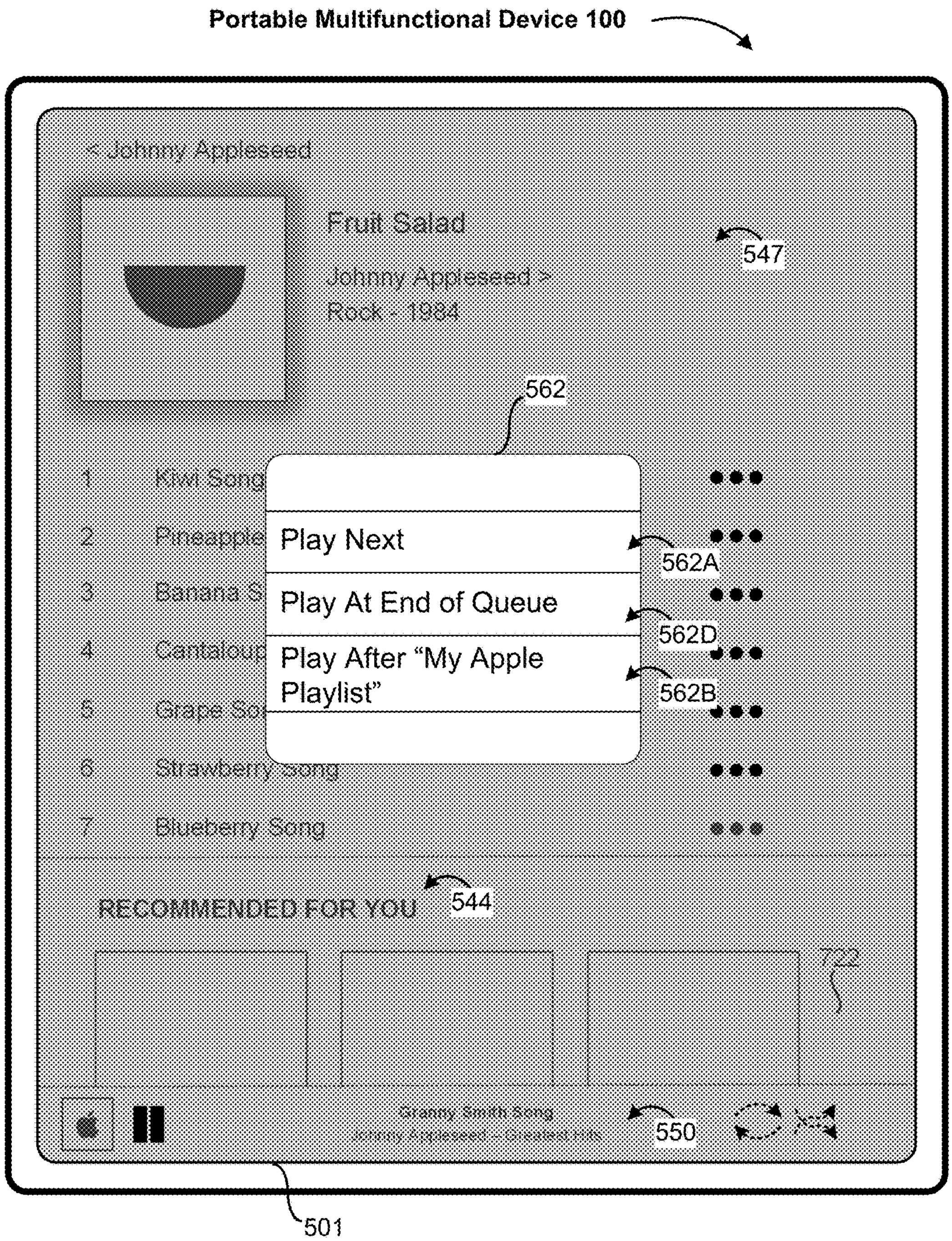
Figure 5B:
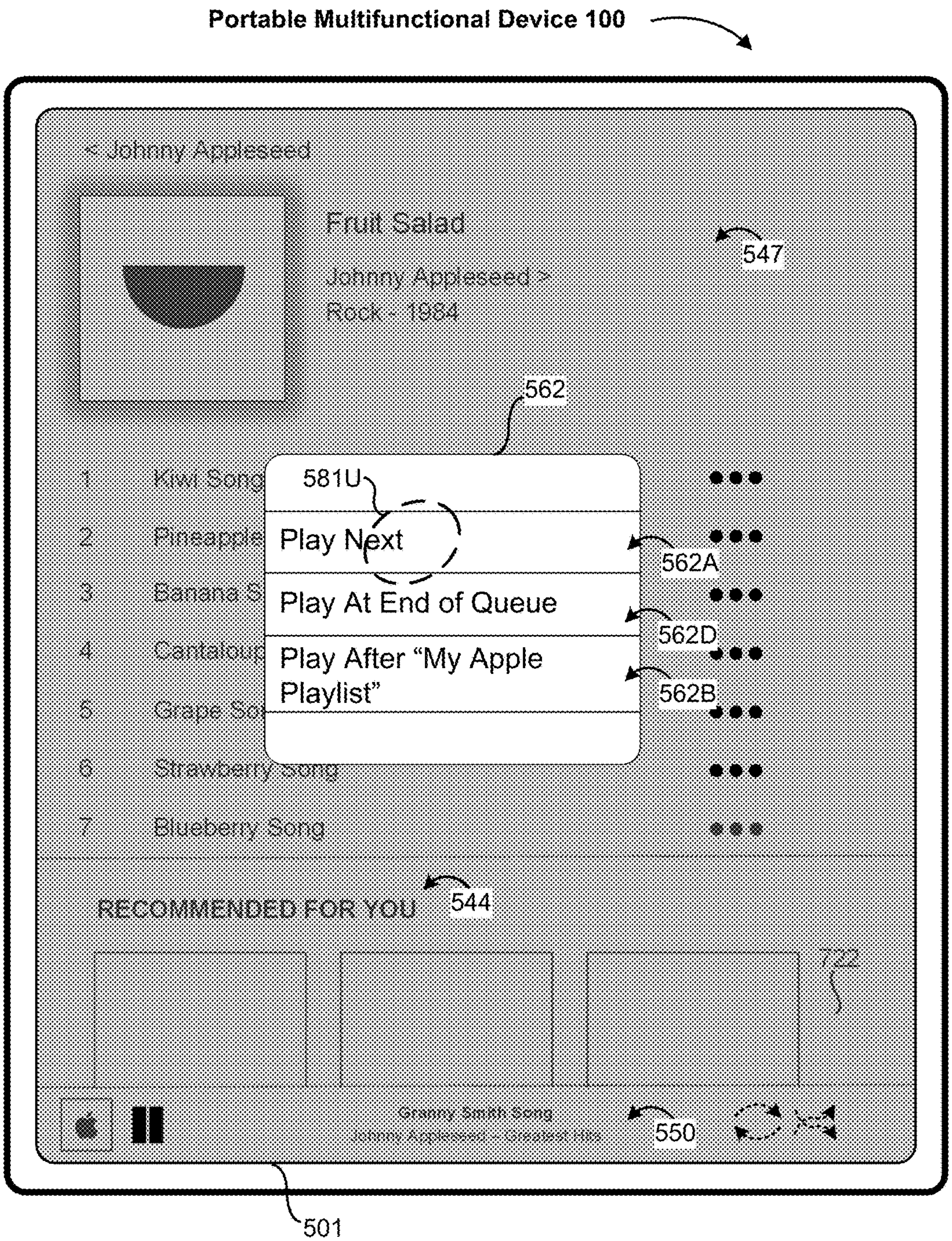
Figure 5B:
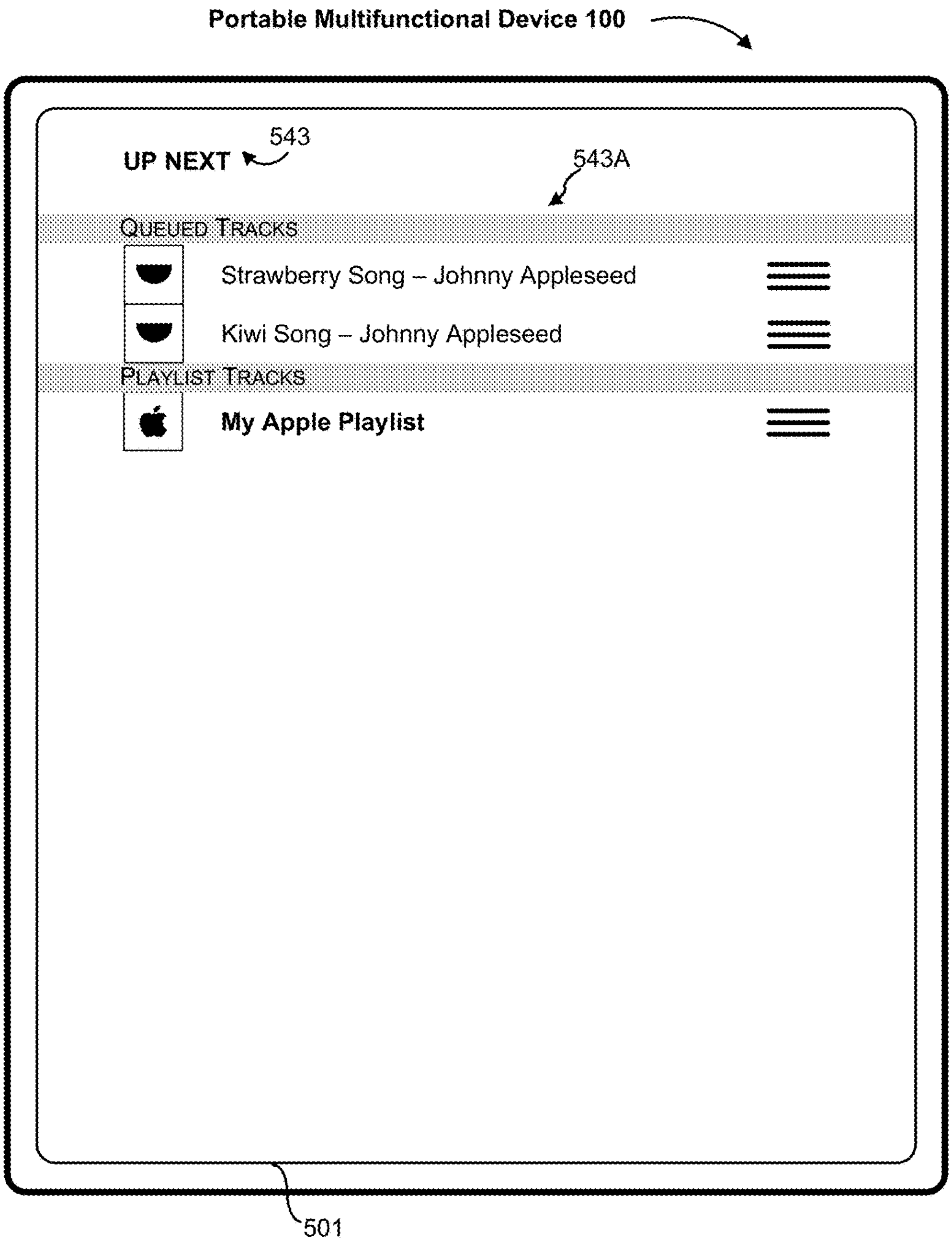
Figure 5B:
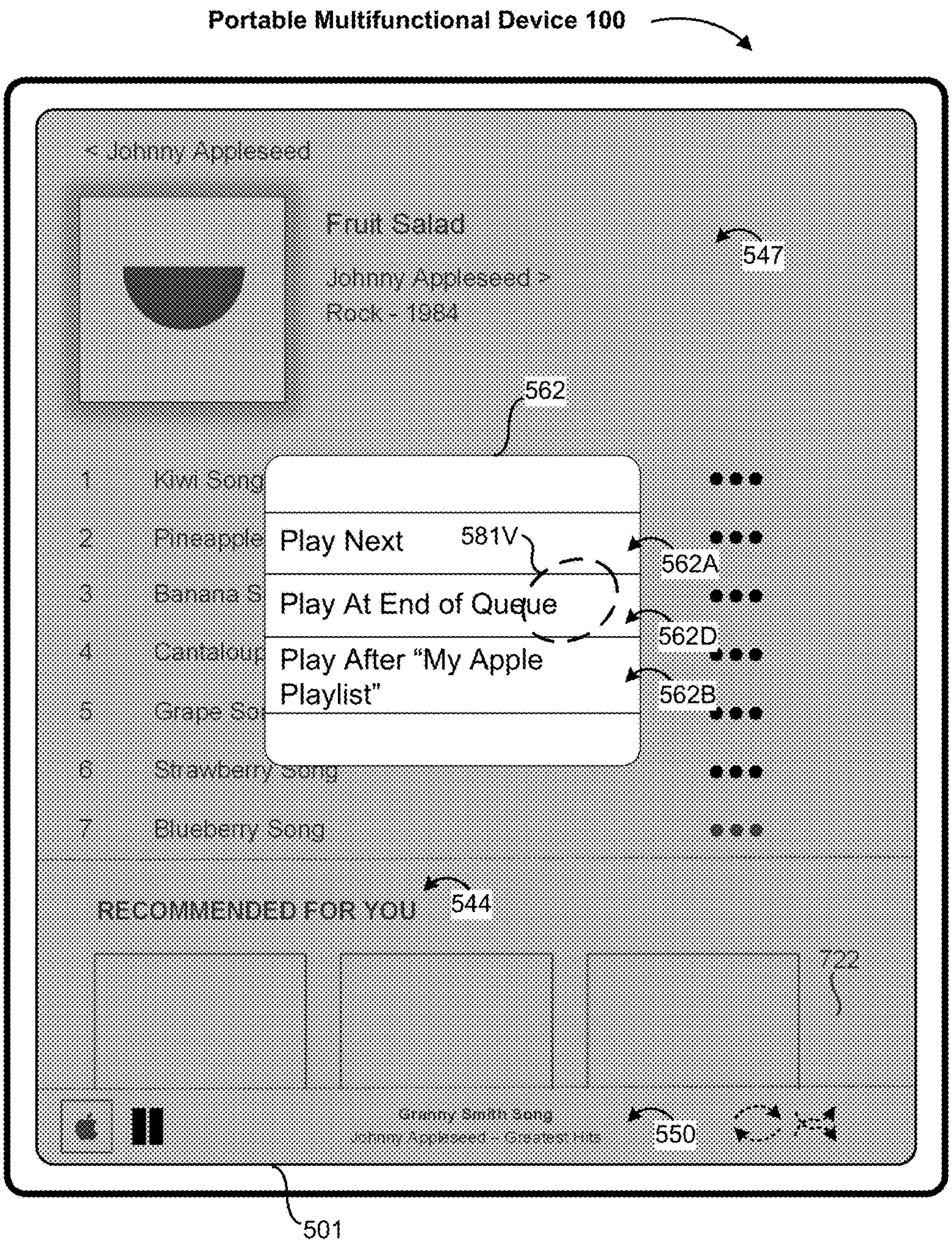
Figure 5B:
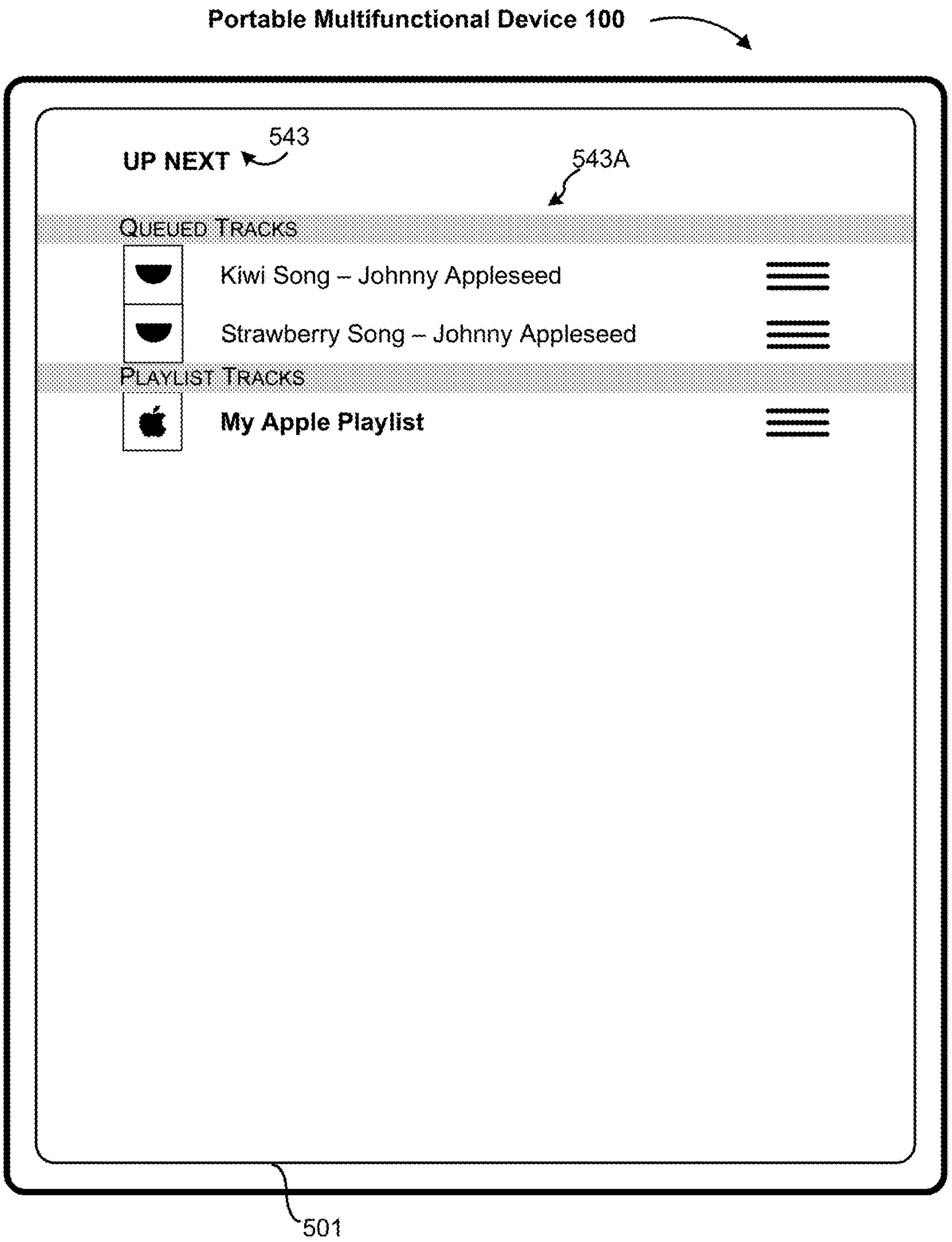
Figure 5B:
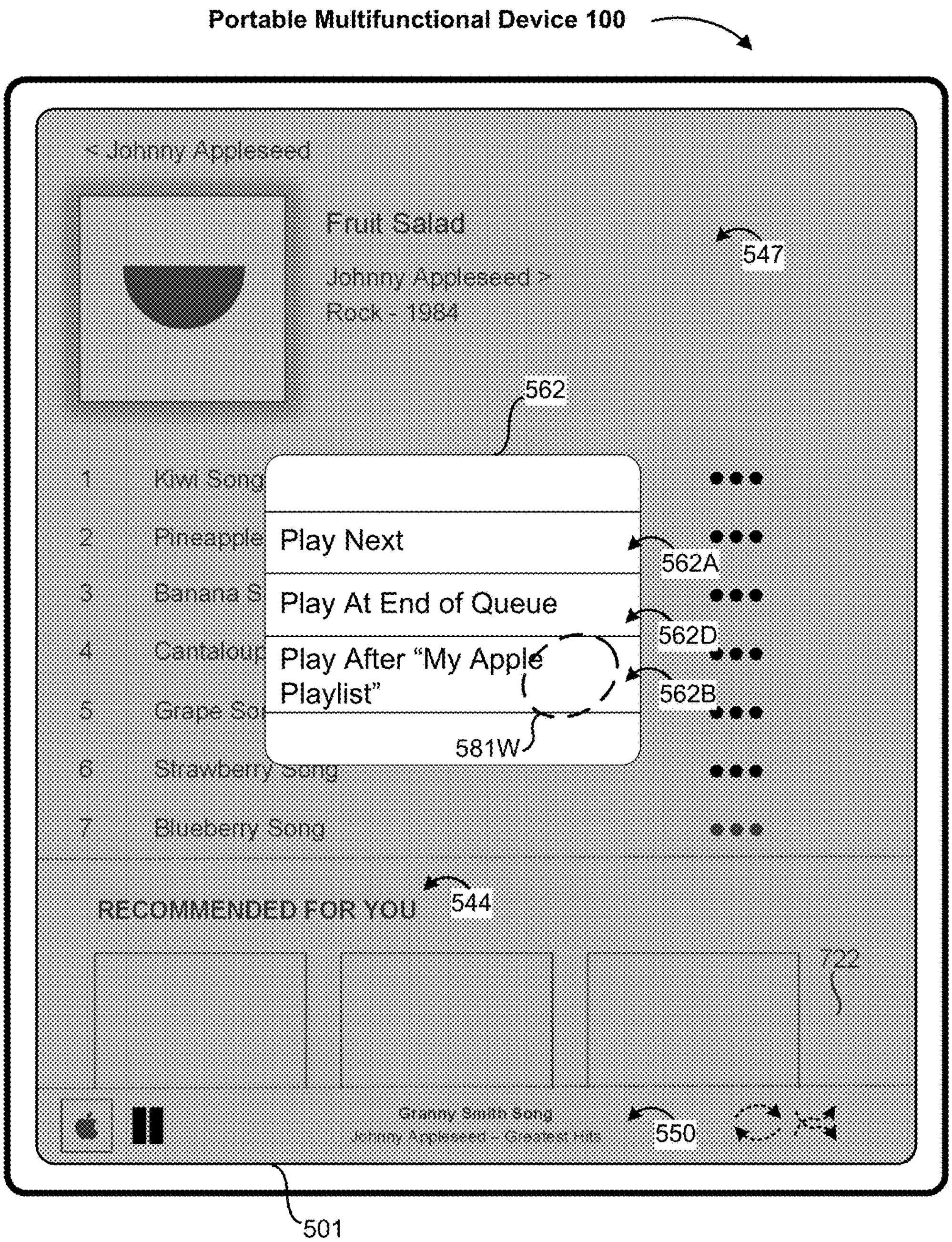
Figure 5B:
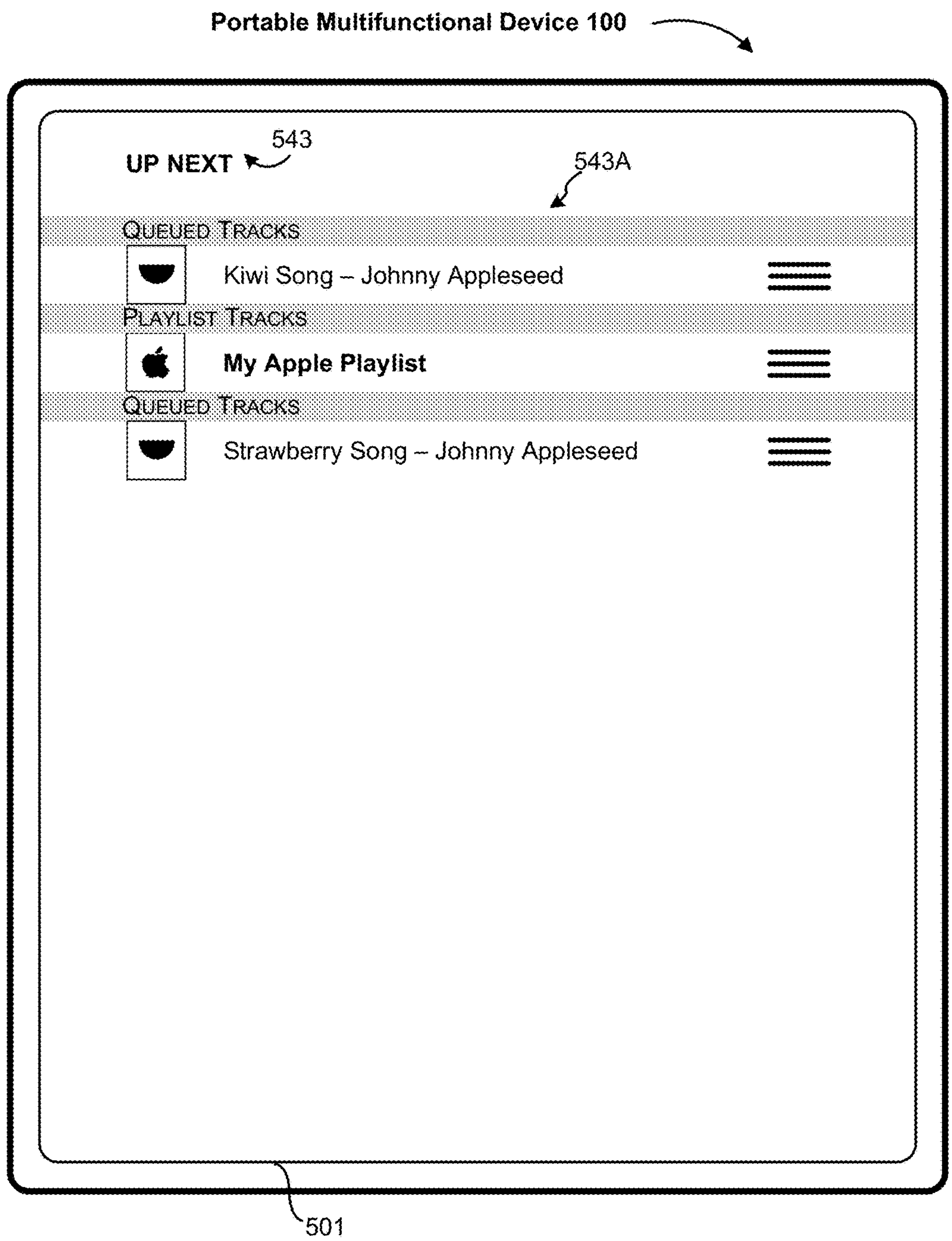
Figure 5B:
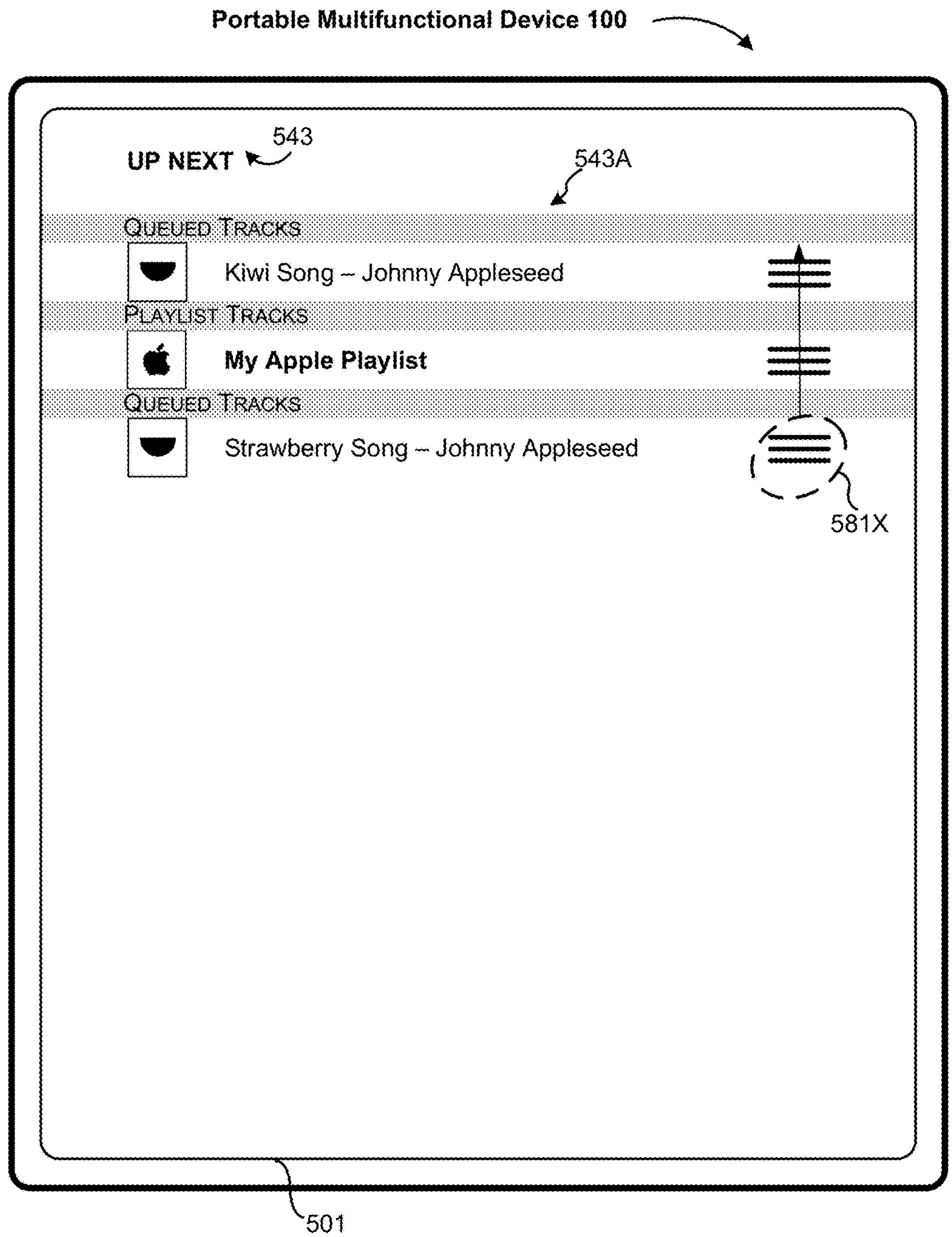
Figure 5B:
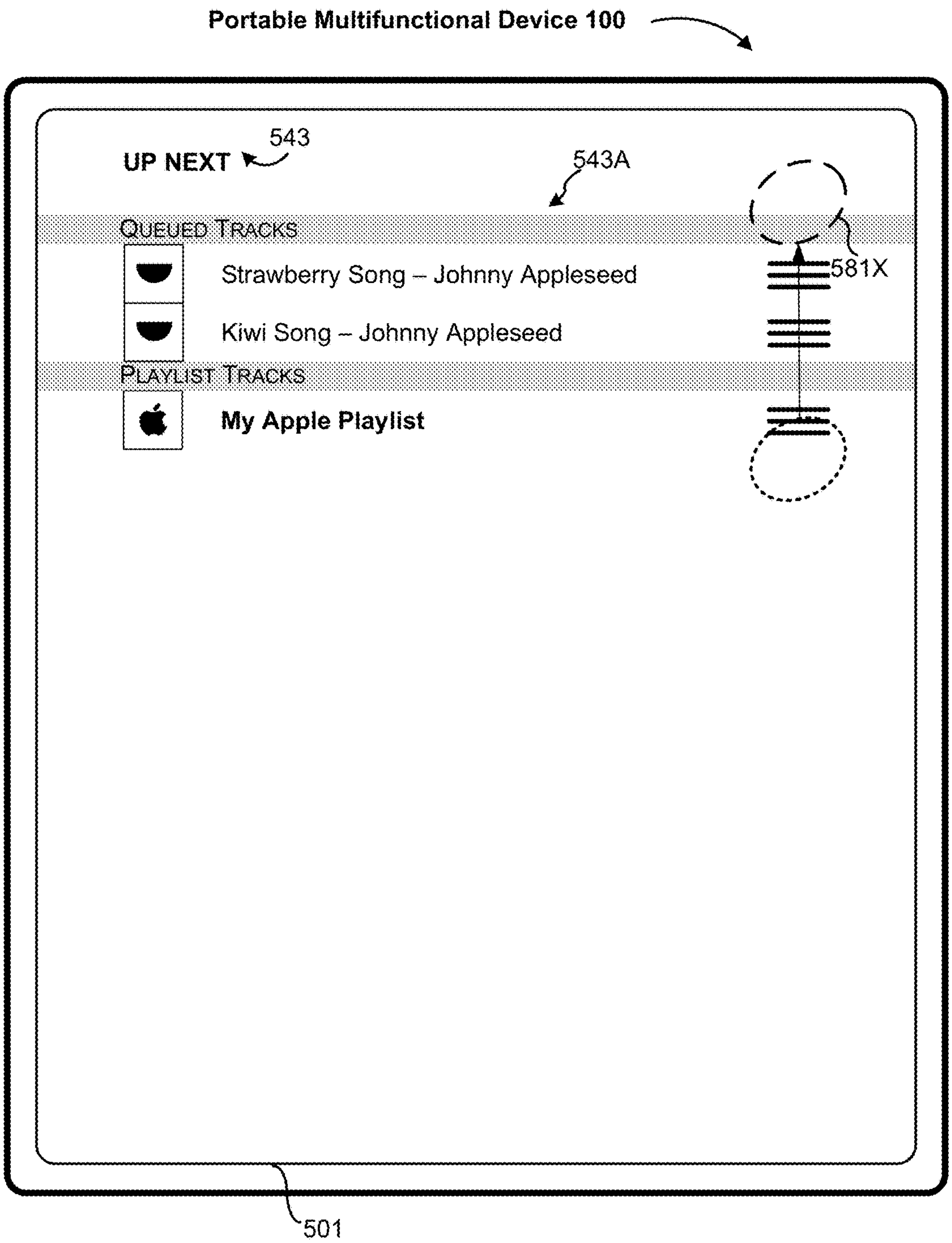
Figure 5B:
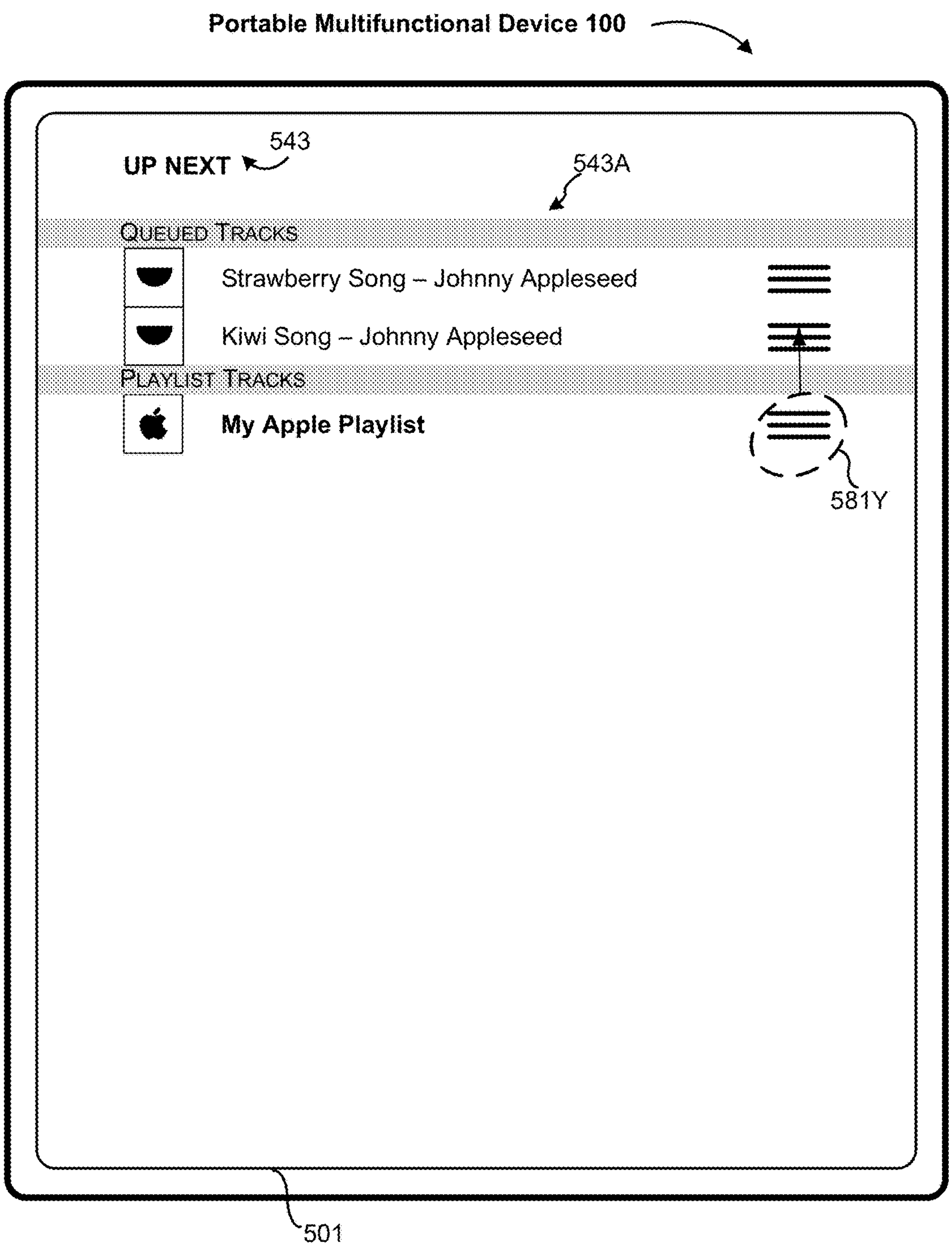
Figure 5B:
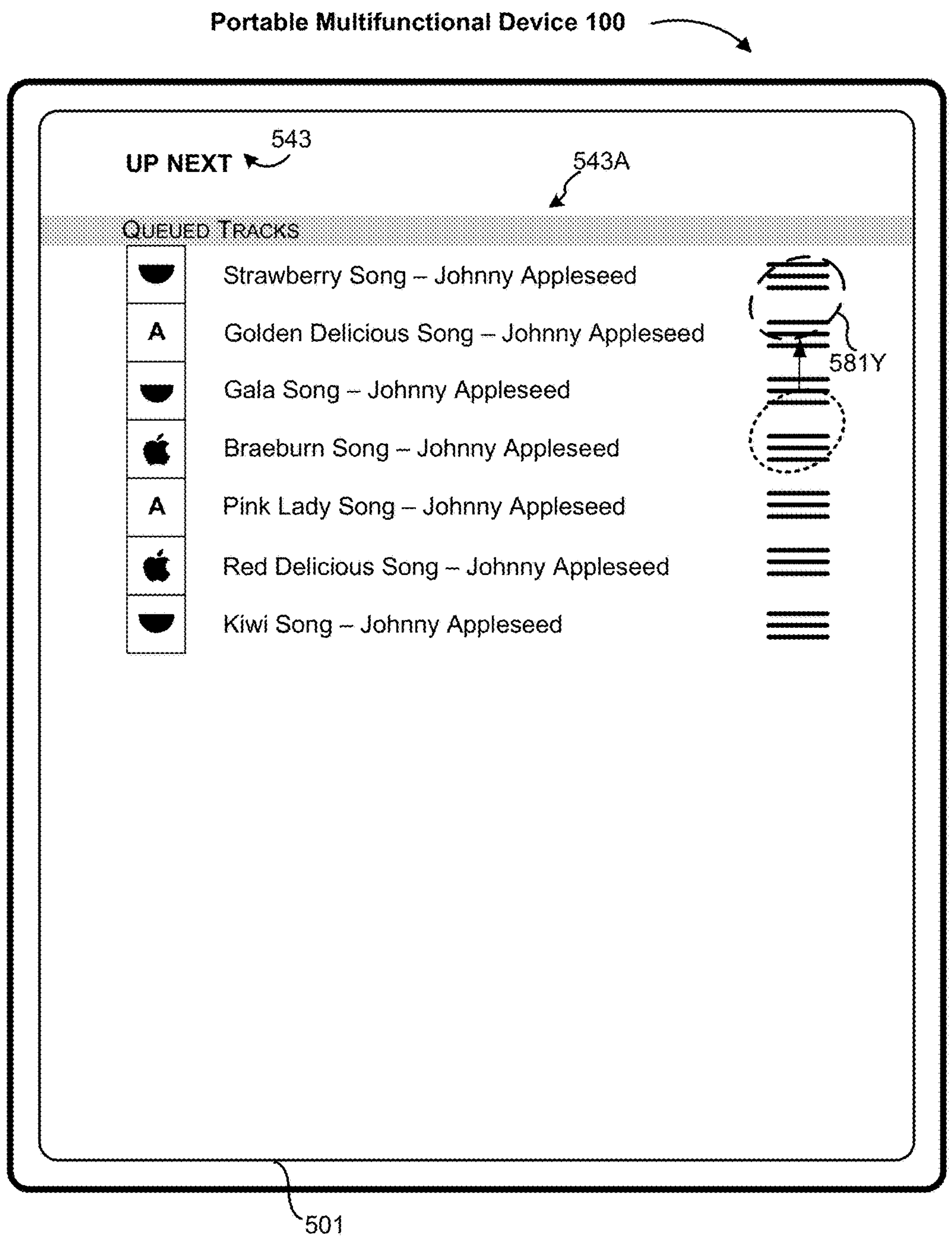
Figure 5B:
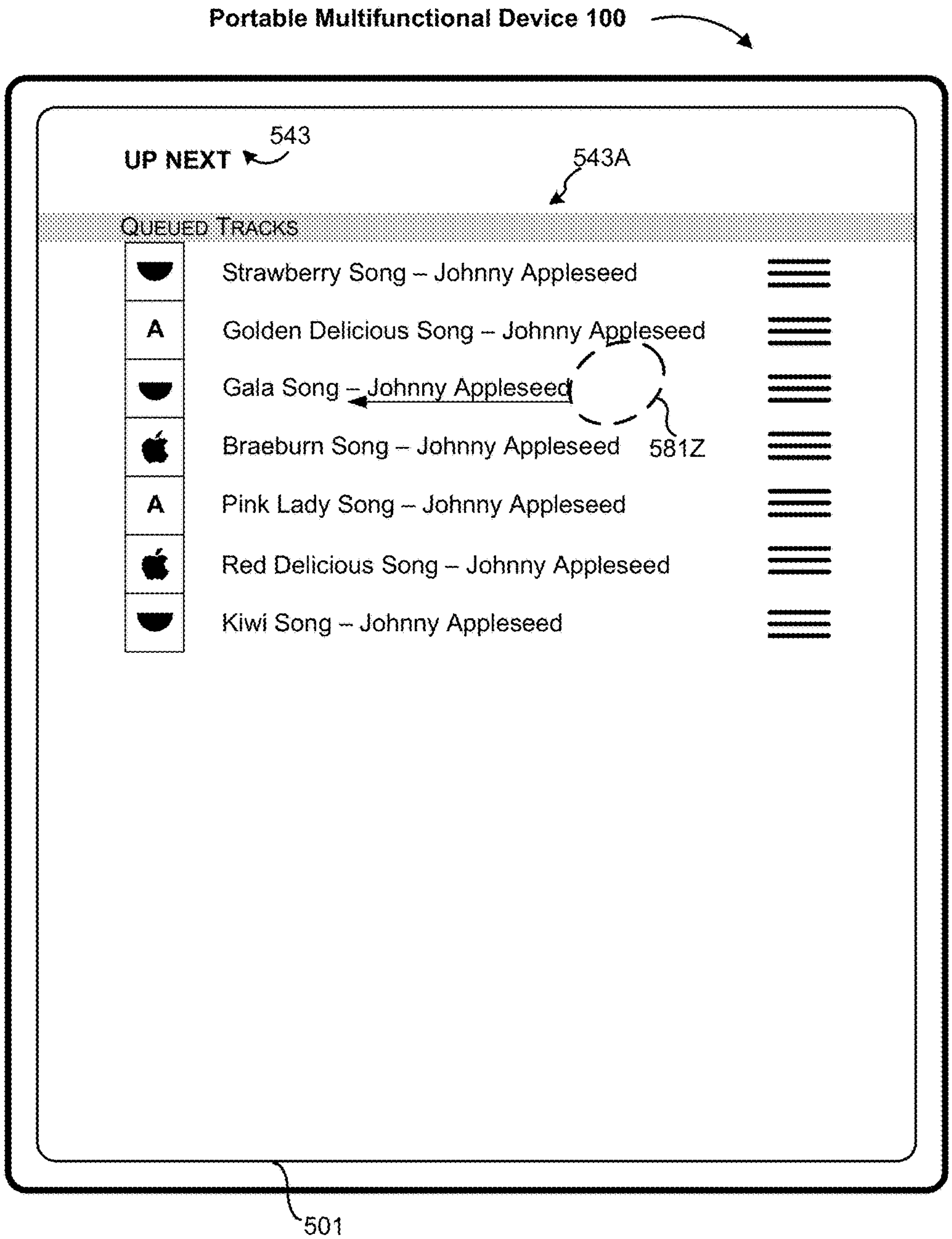
Figure 5B:
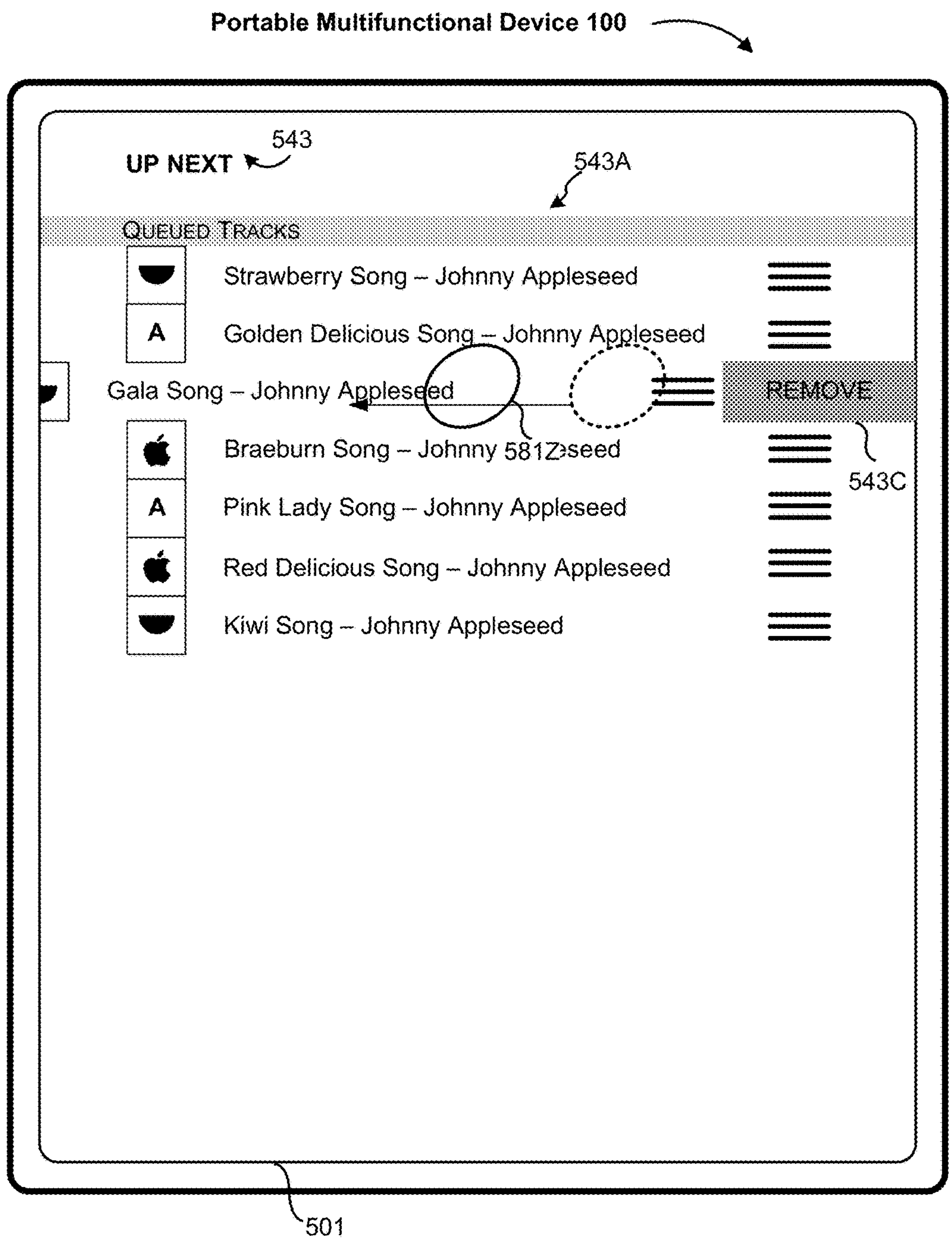
Figure 5B:
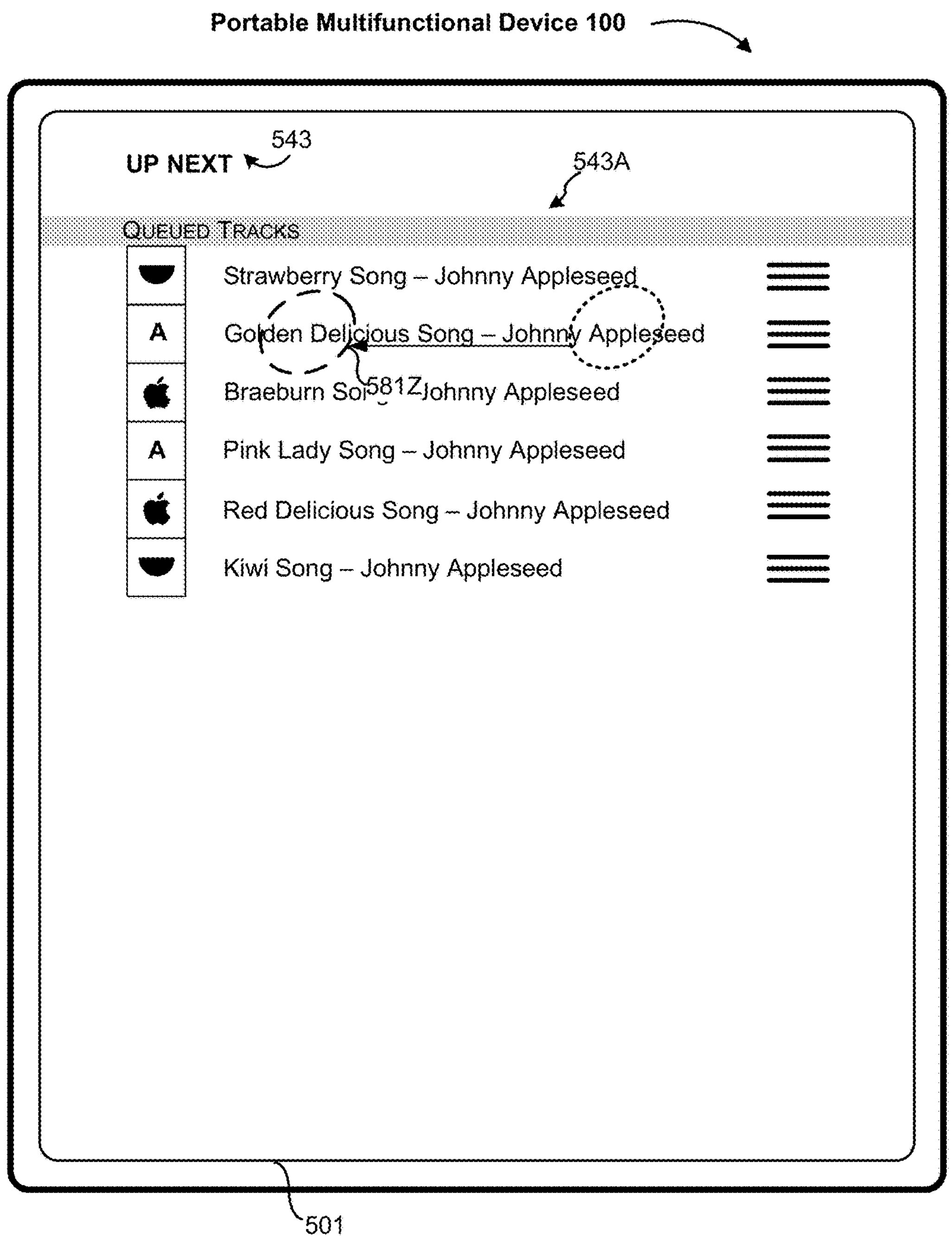
Figure 5B:
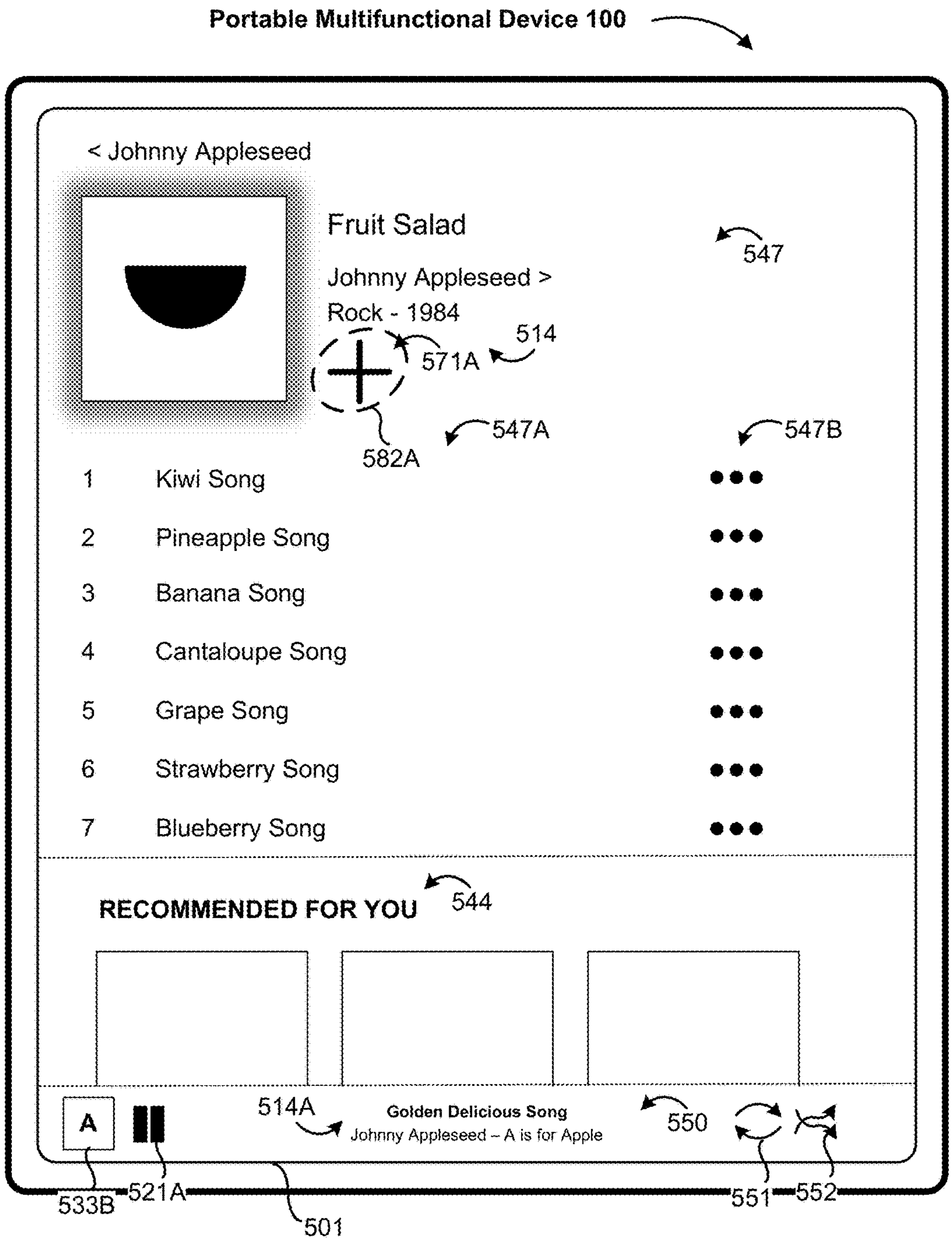
Figure 5B:
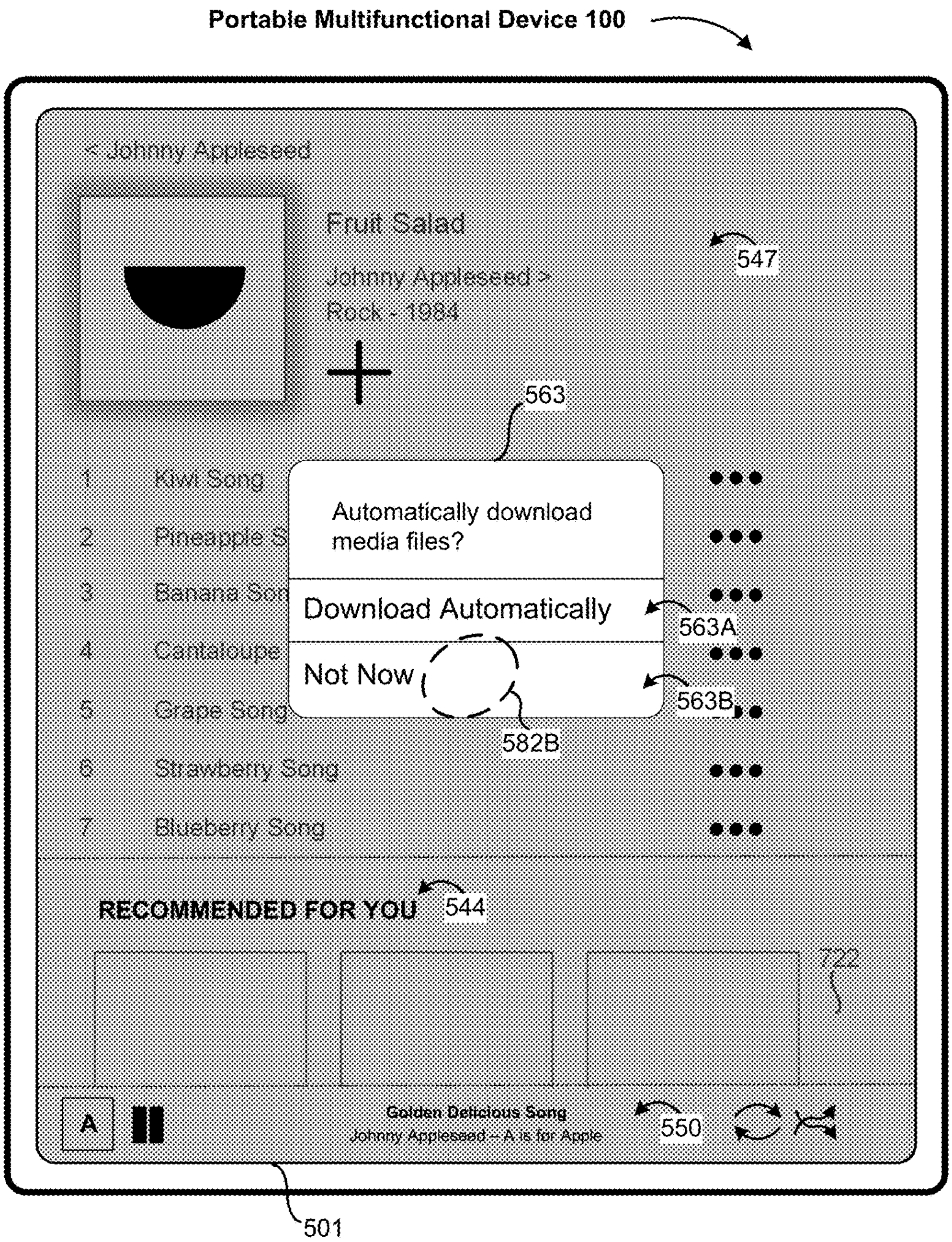
Figure 5B:
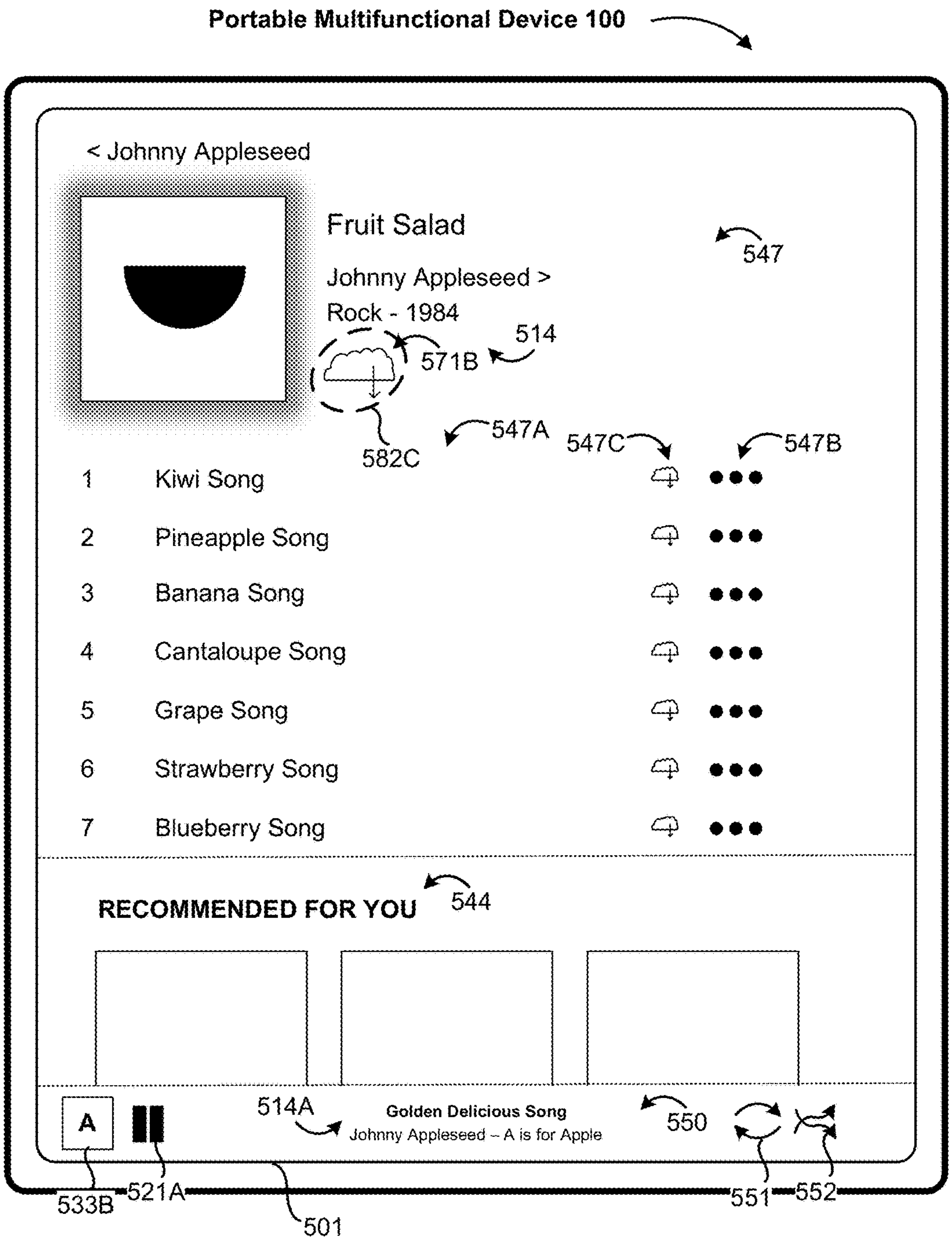
Figure 5B:
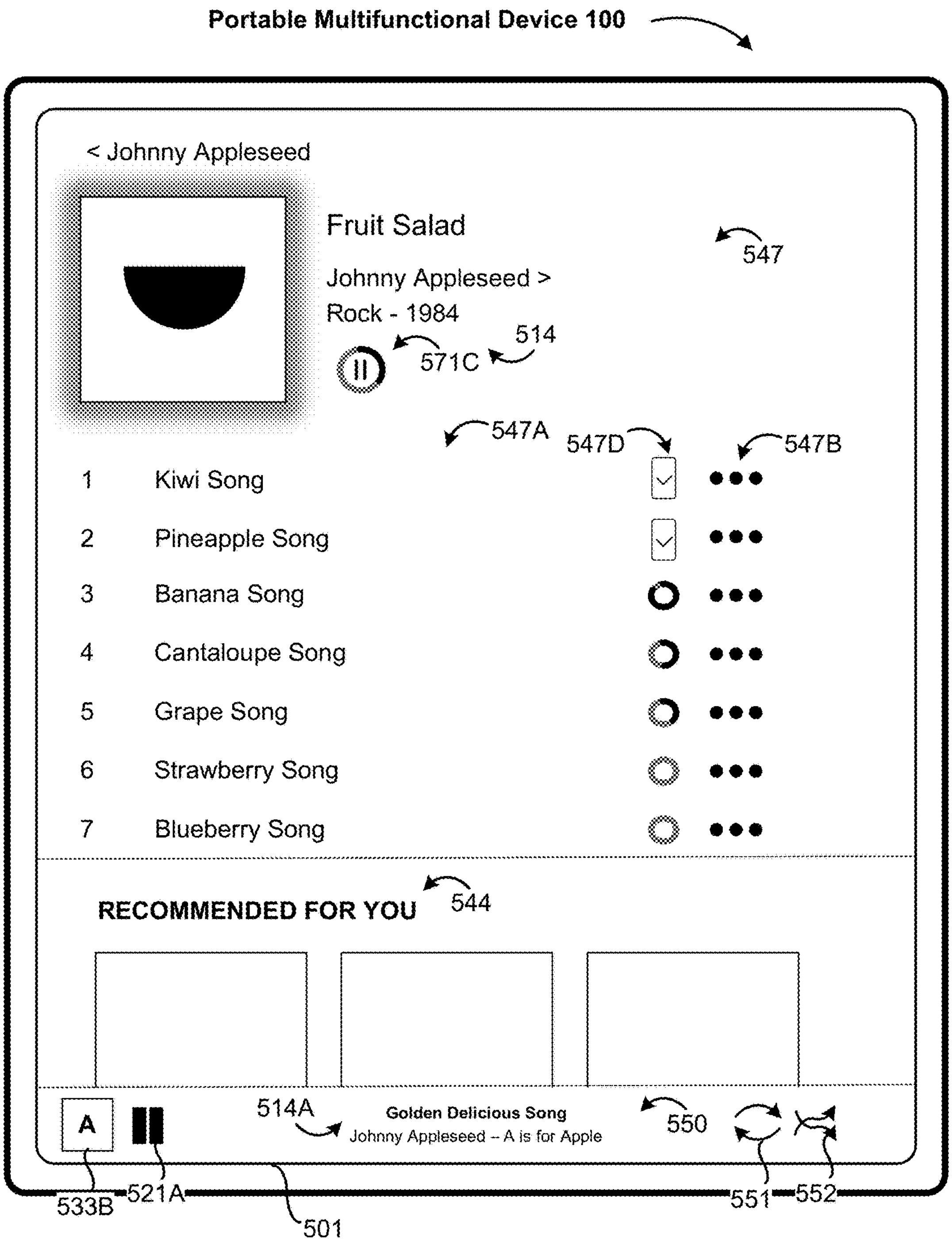
Figure 5B:
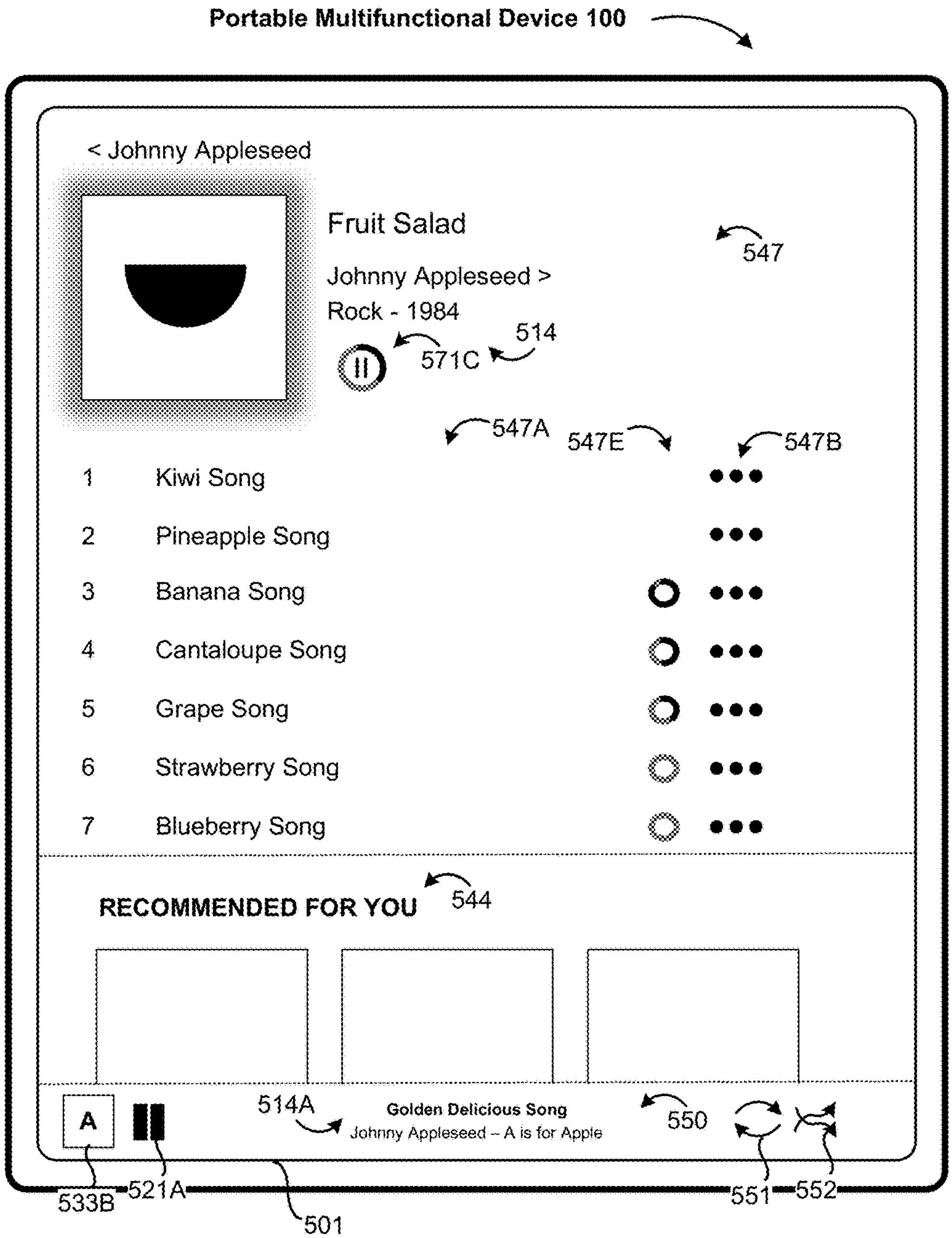
Figure 5B:
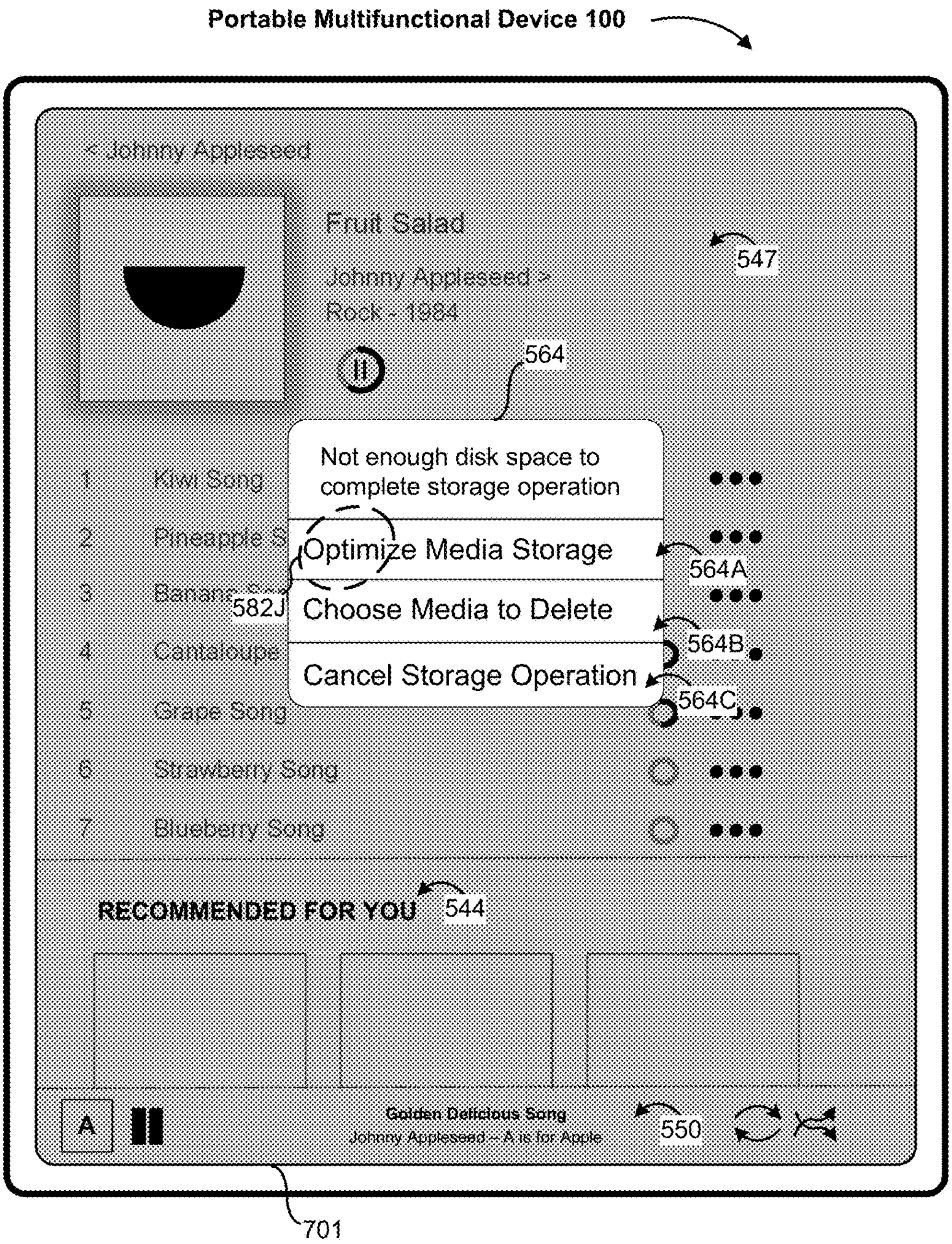
Figure 5B:
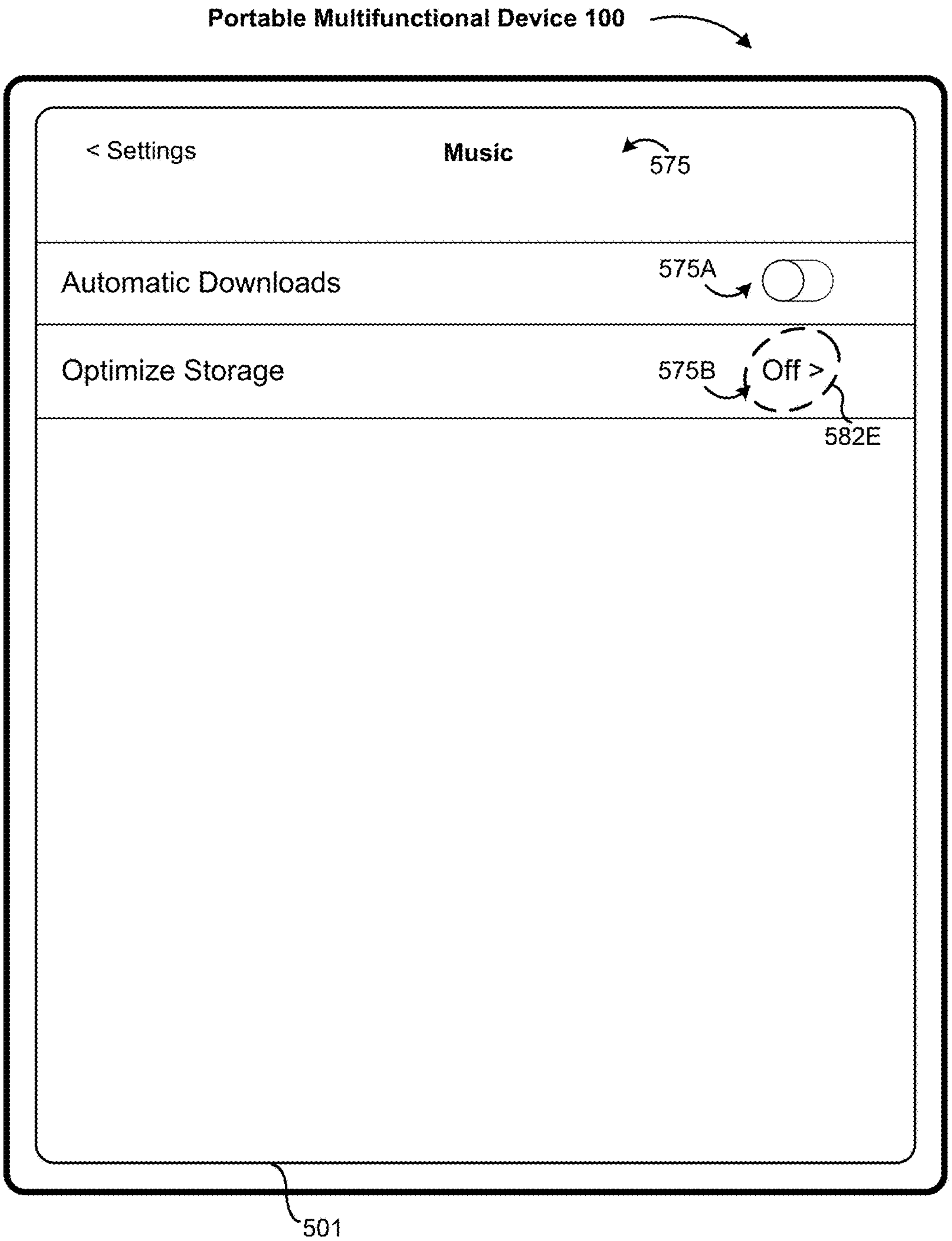
Figure 5B:
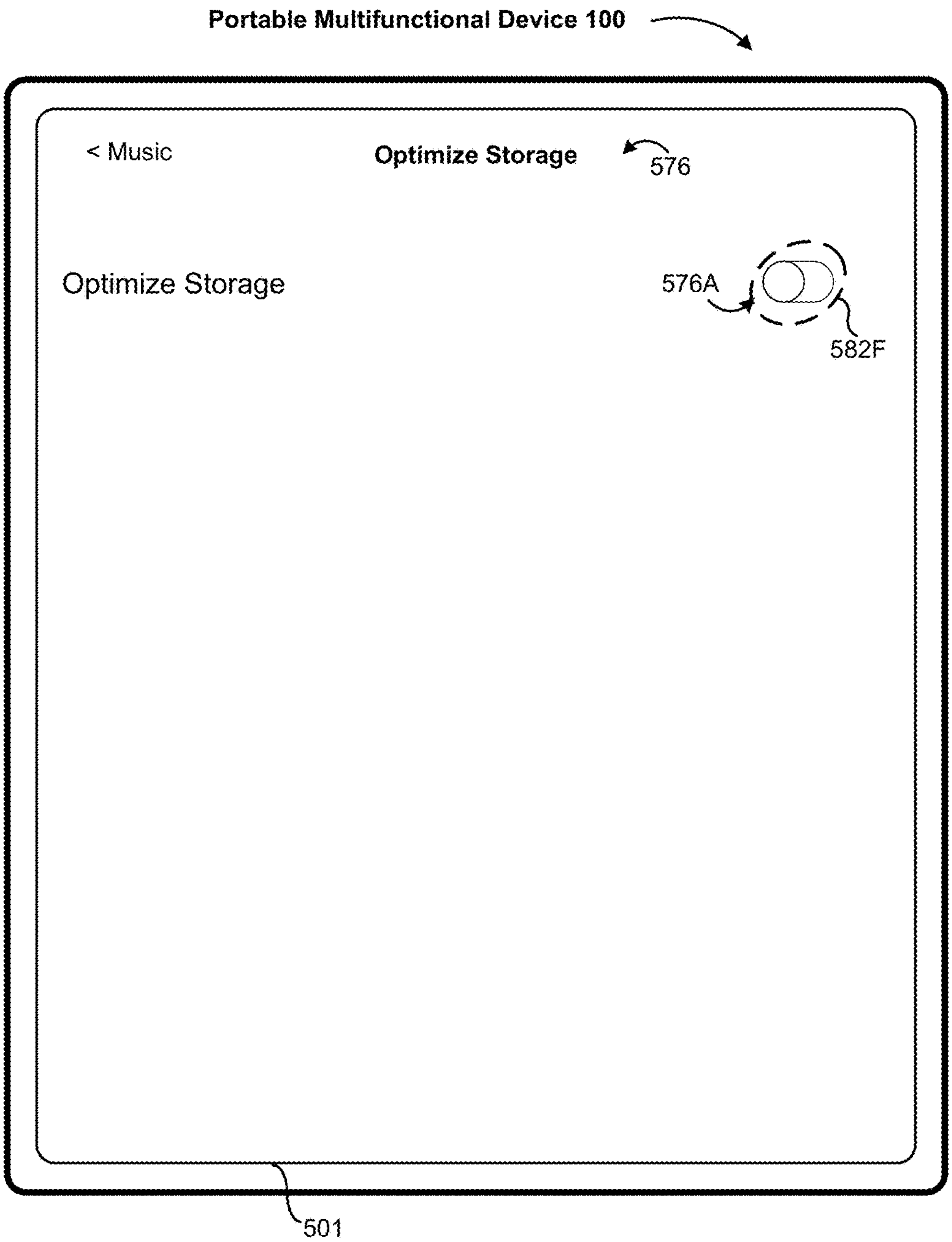
Figure 5B:
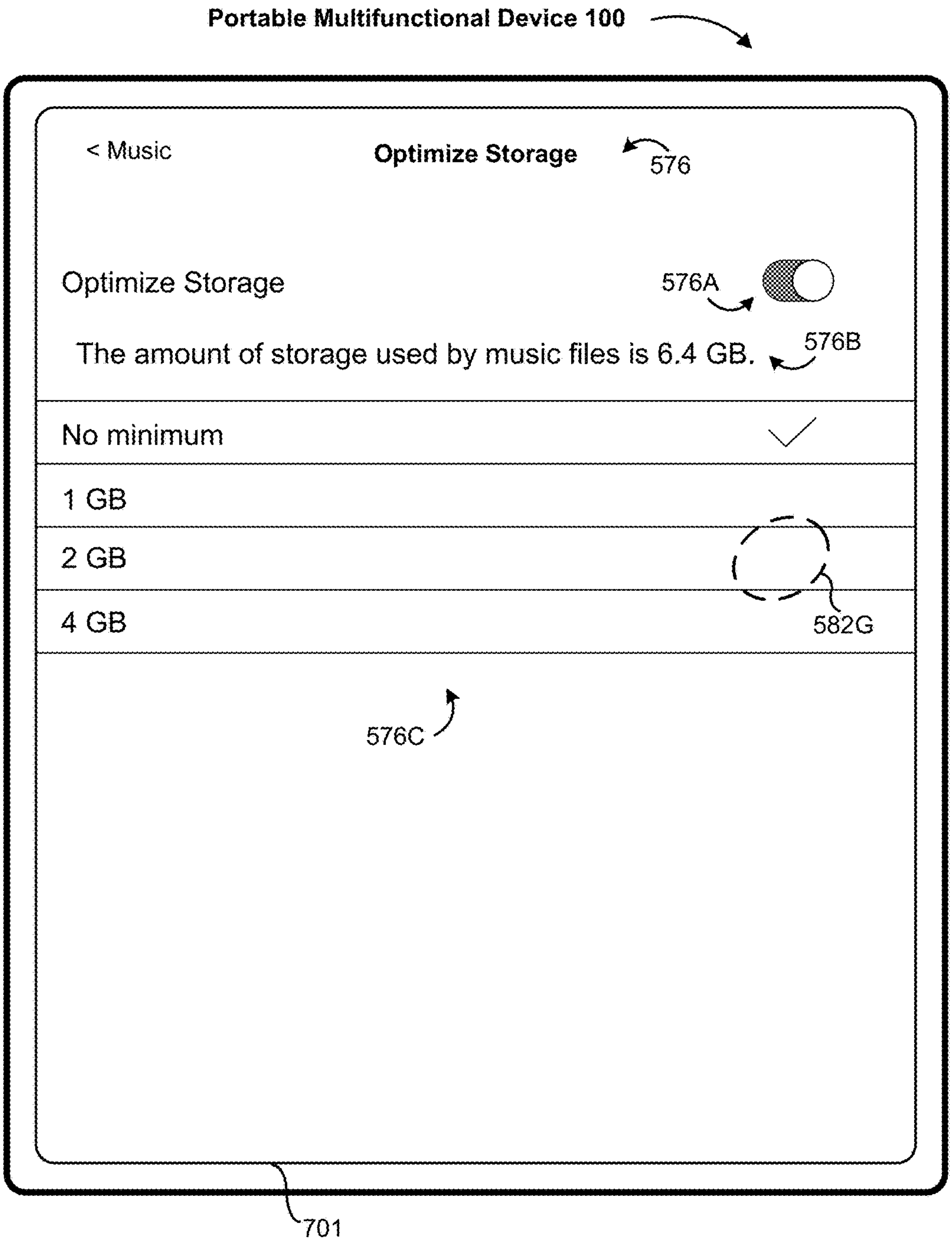
Figure 5C:
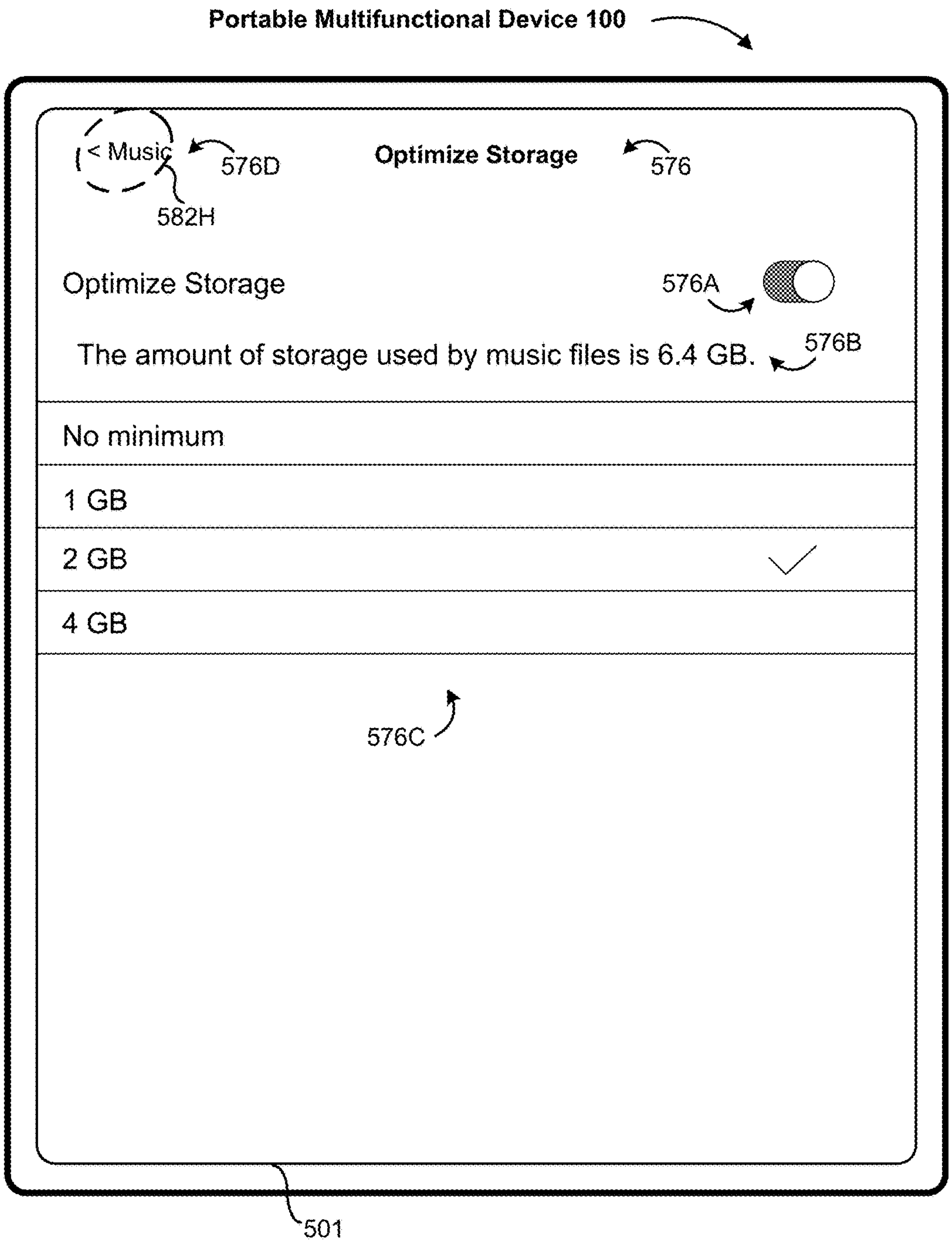
Figure 5C:
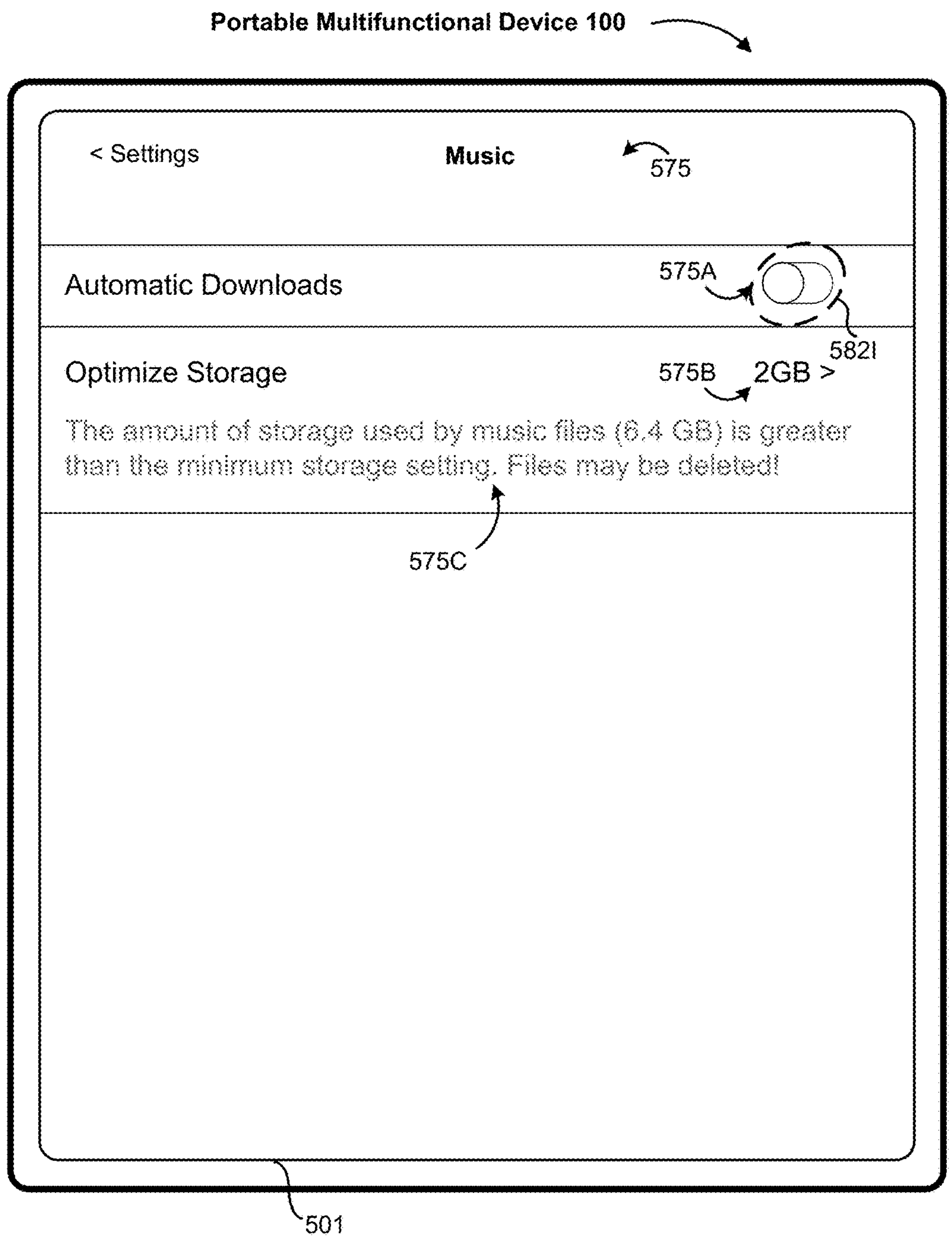
Figure 5C:
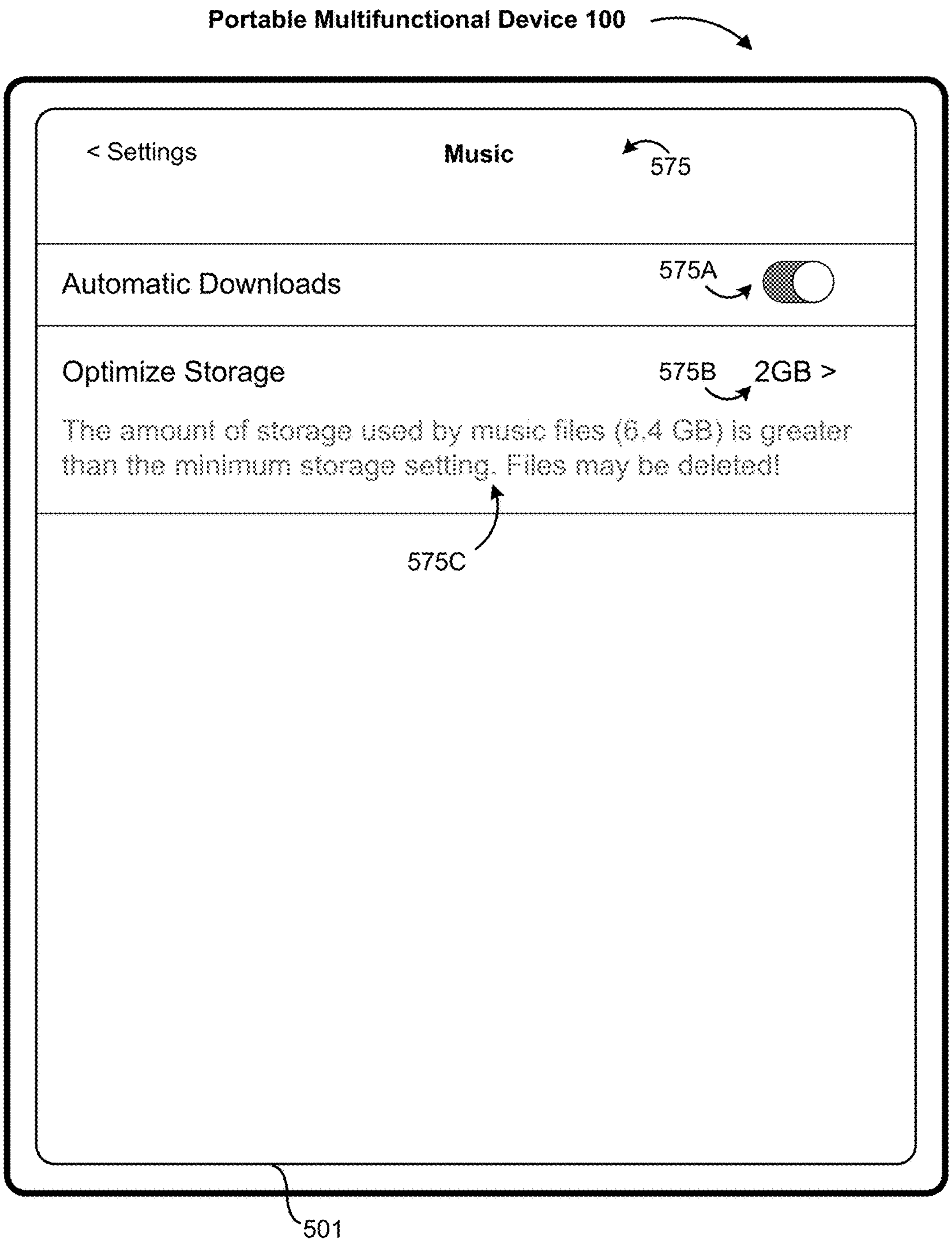
Figure 5C:
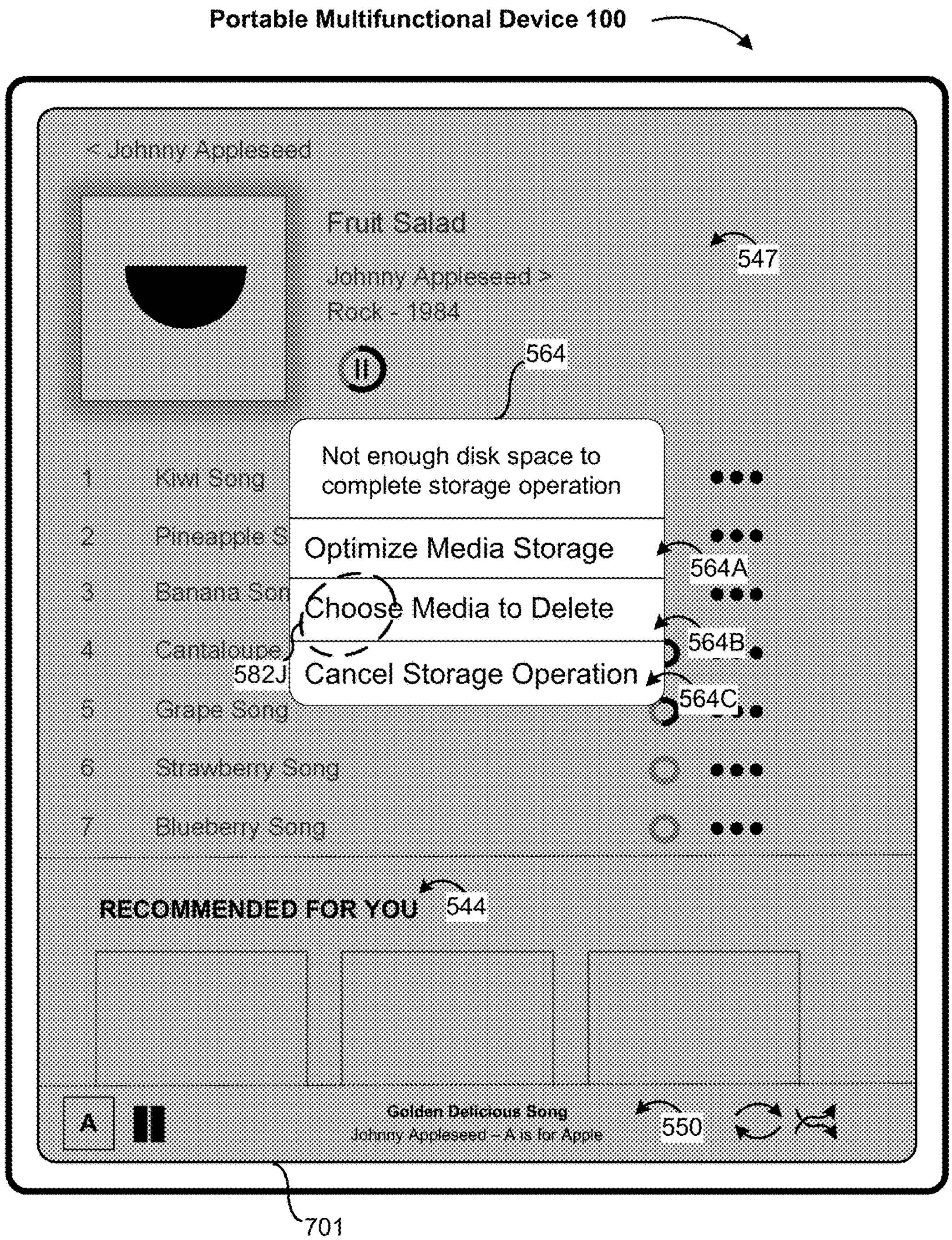
Figure 5C:
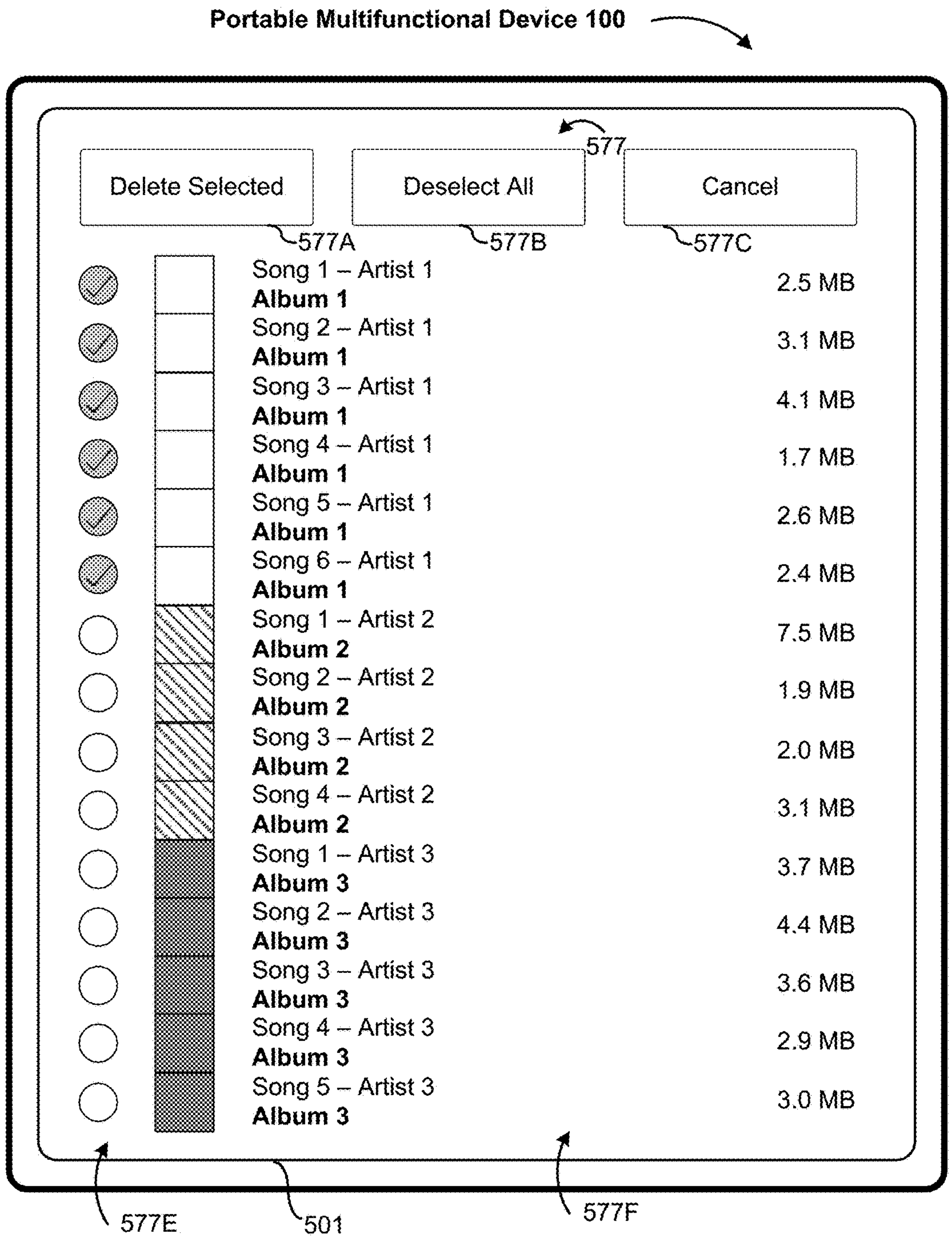
Figure 5C:
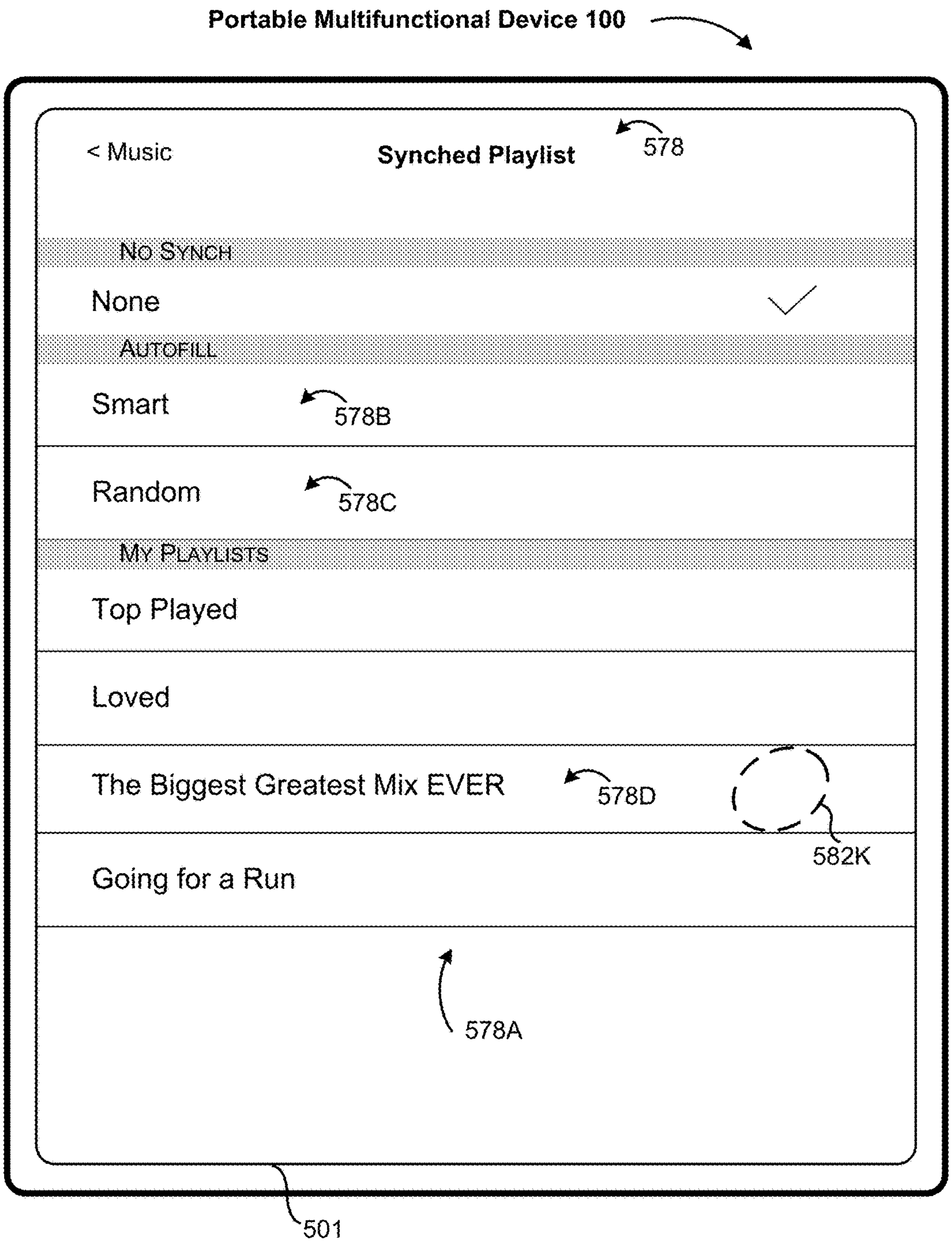
Figure 5C:
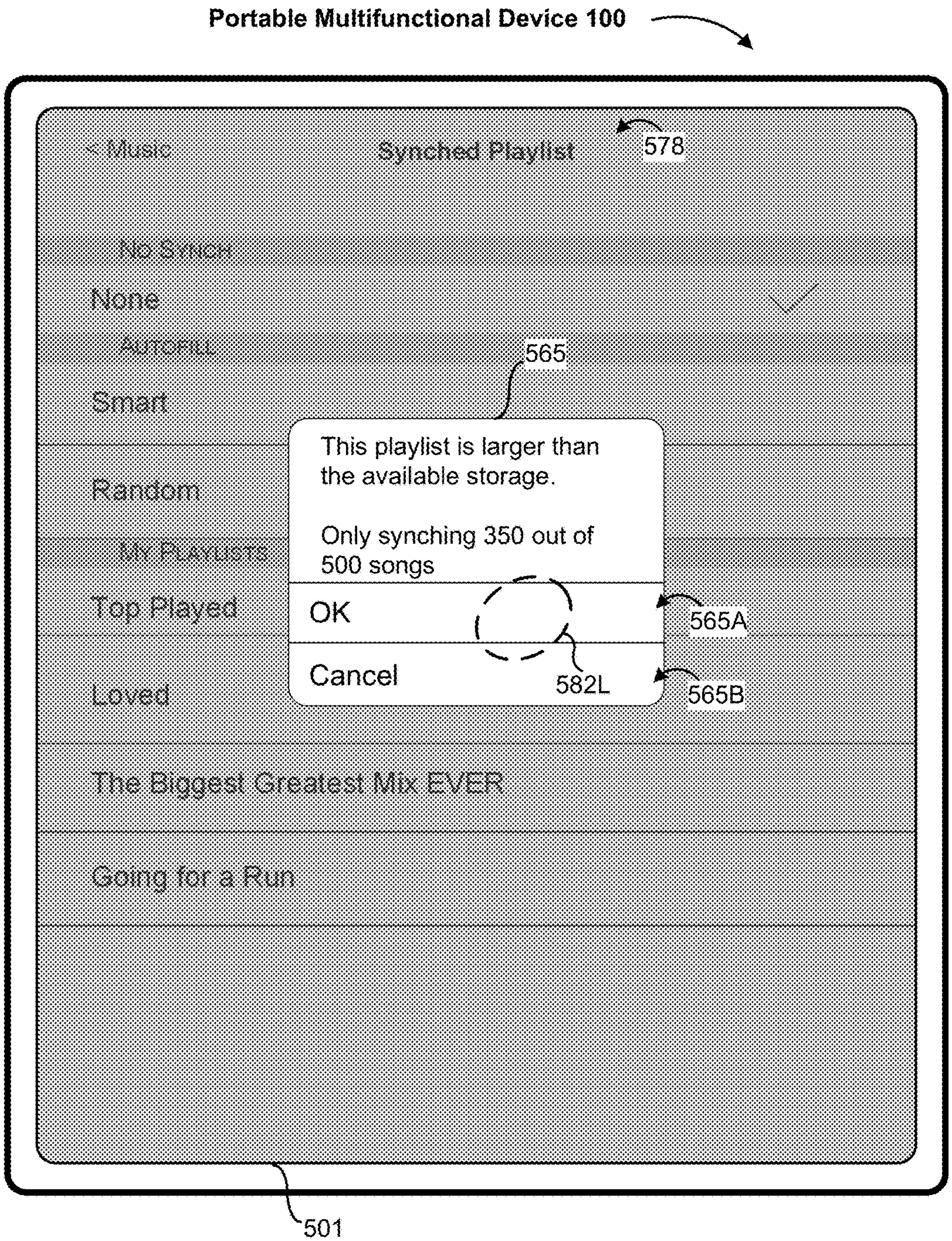
Figure 5C:
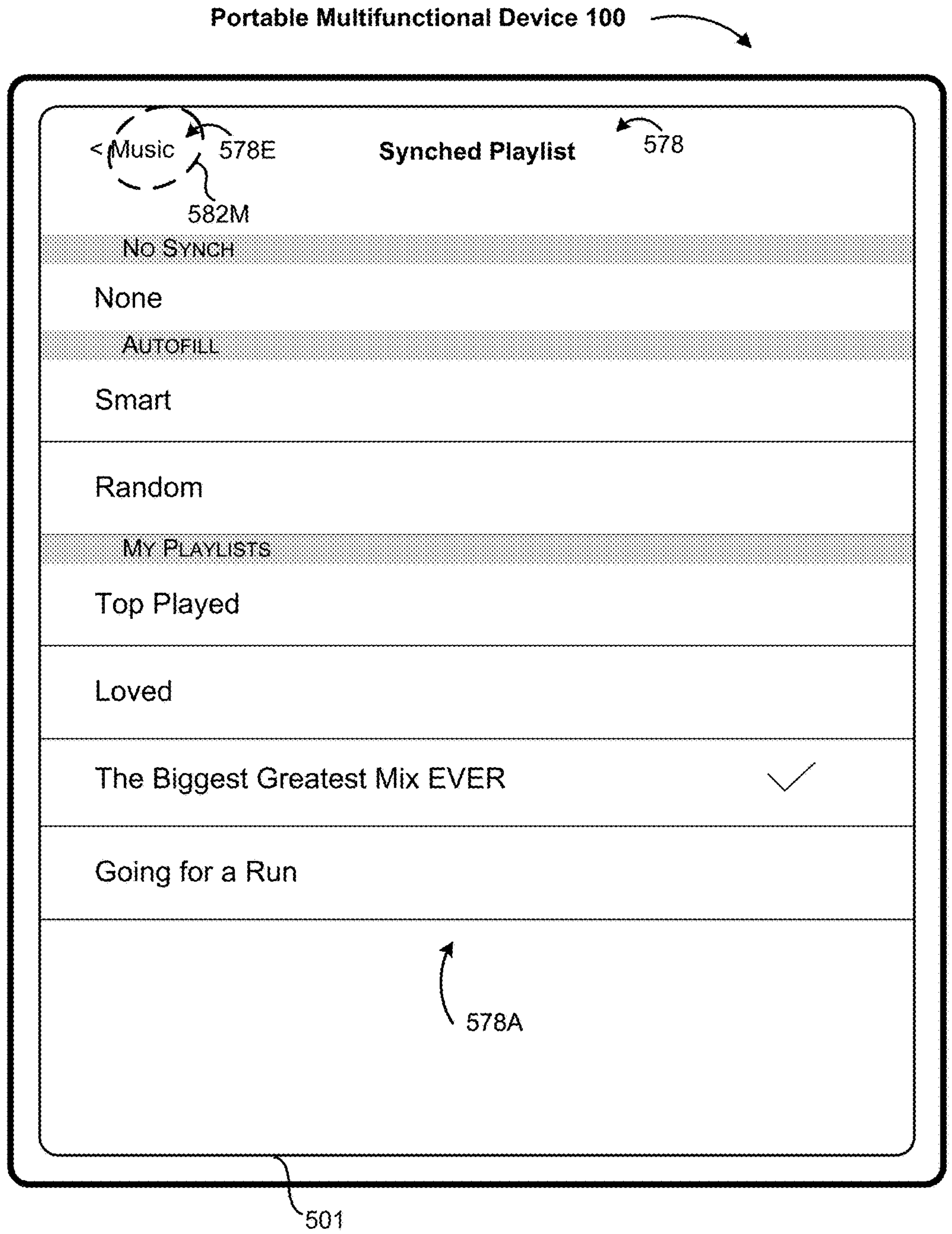
Figure 5C:
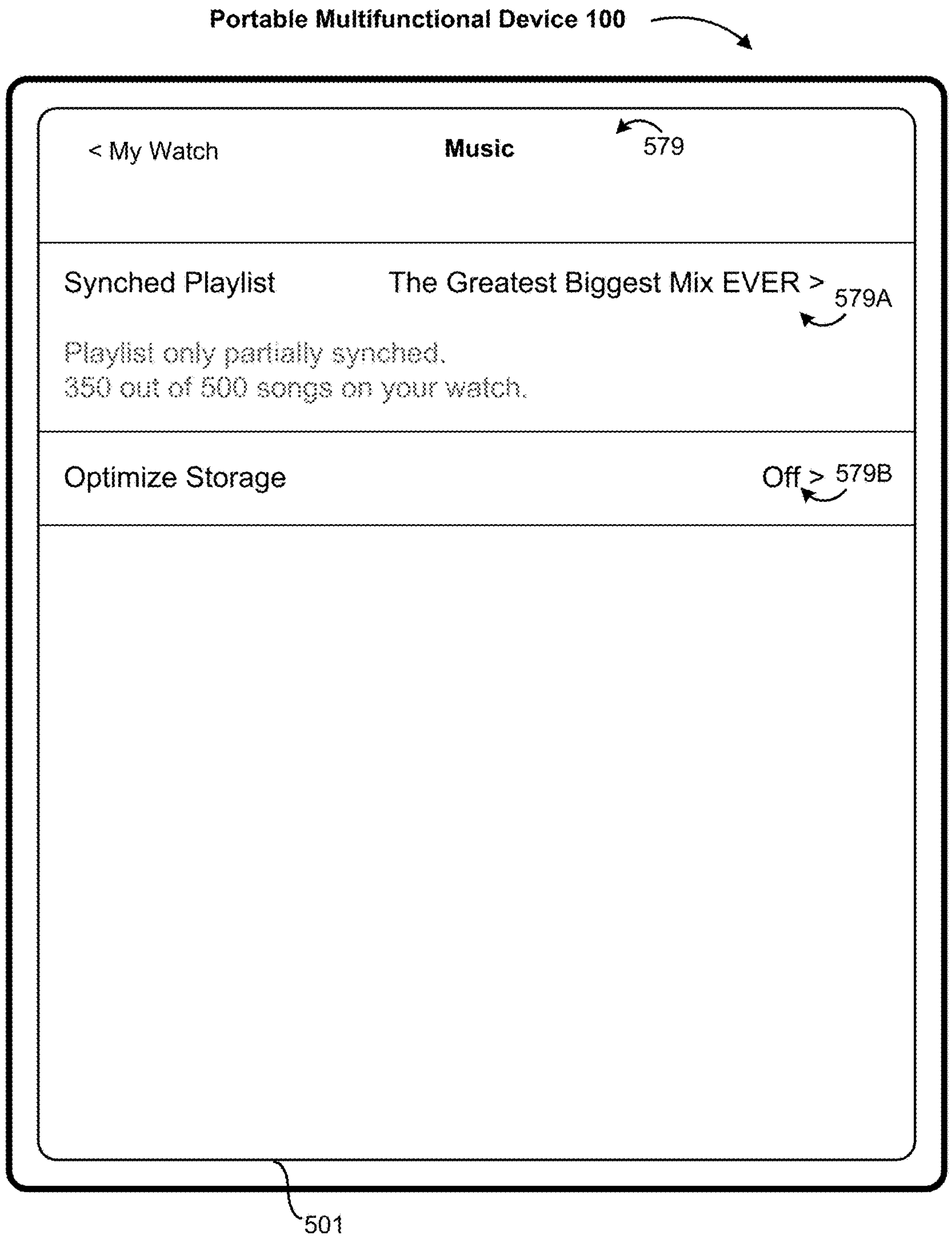
Figure 5C:
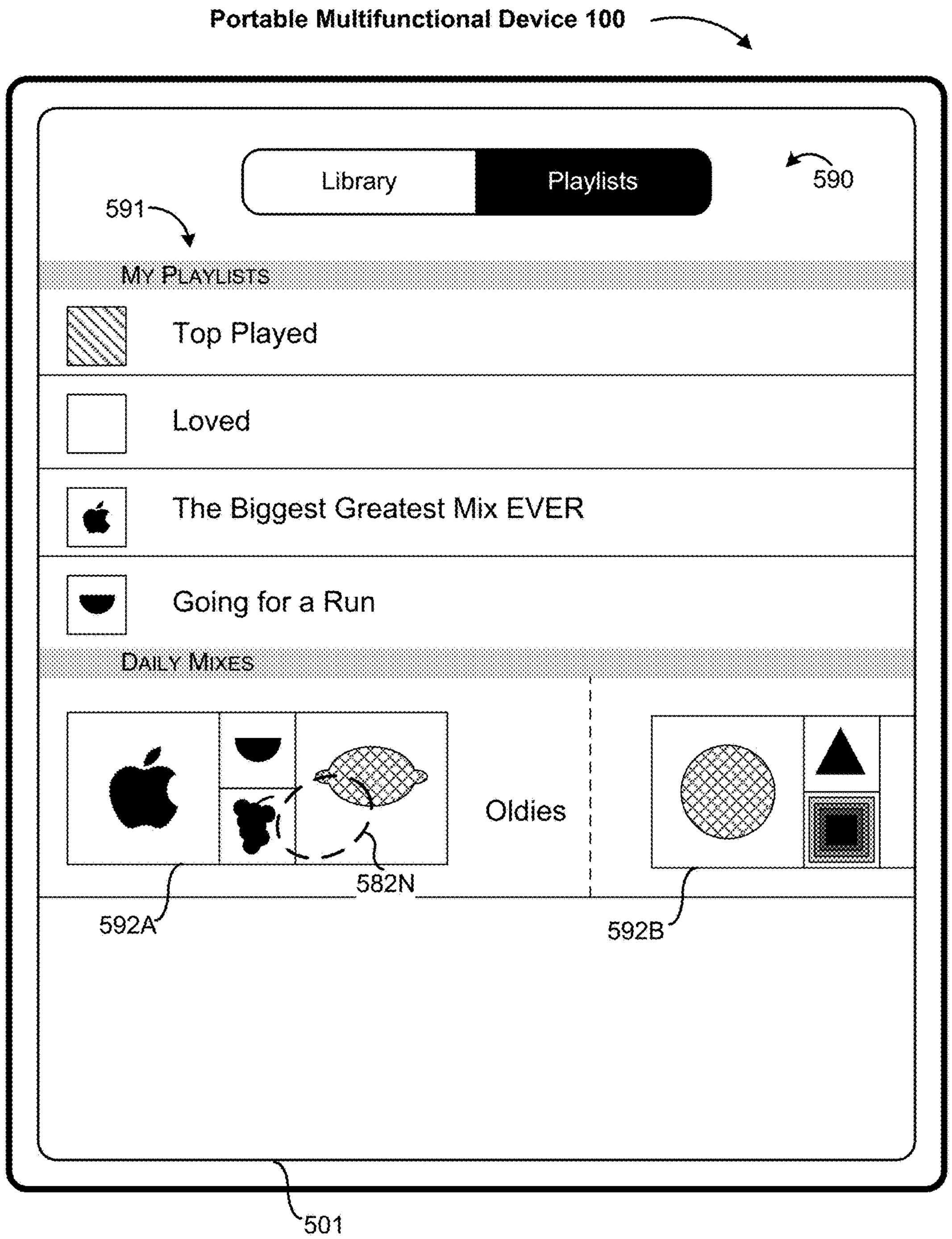
Figure 5C:
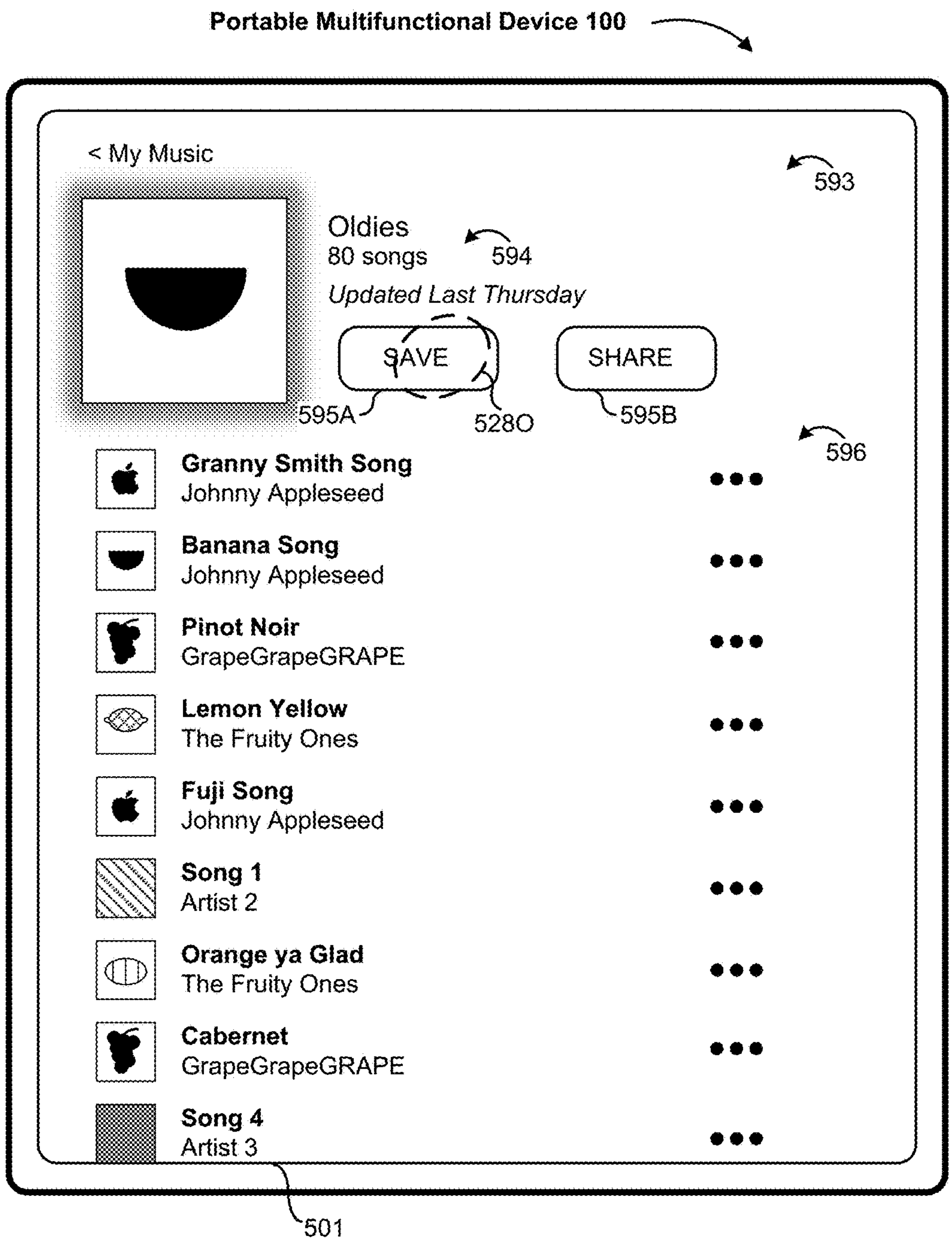
Figure 5C:
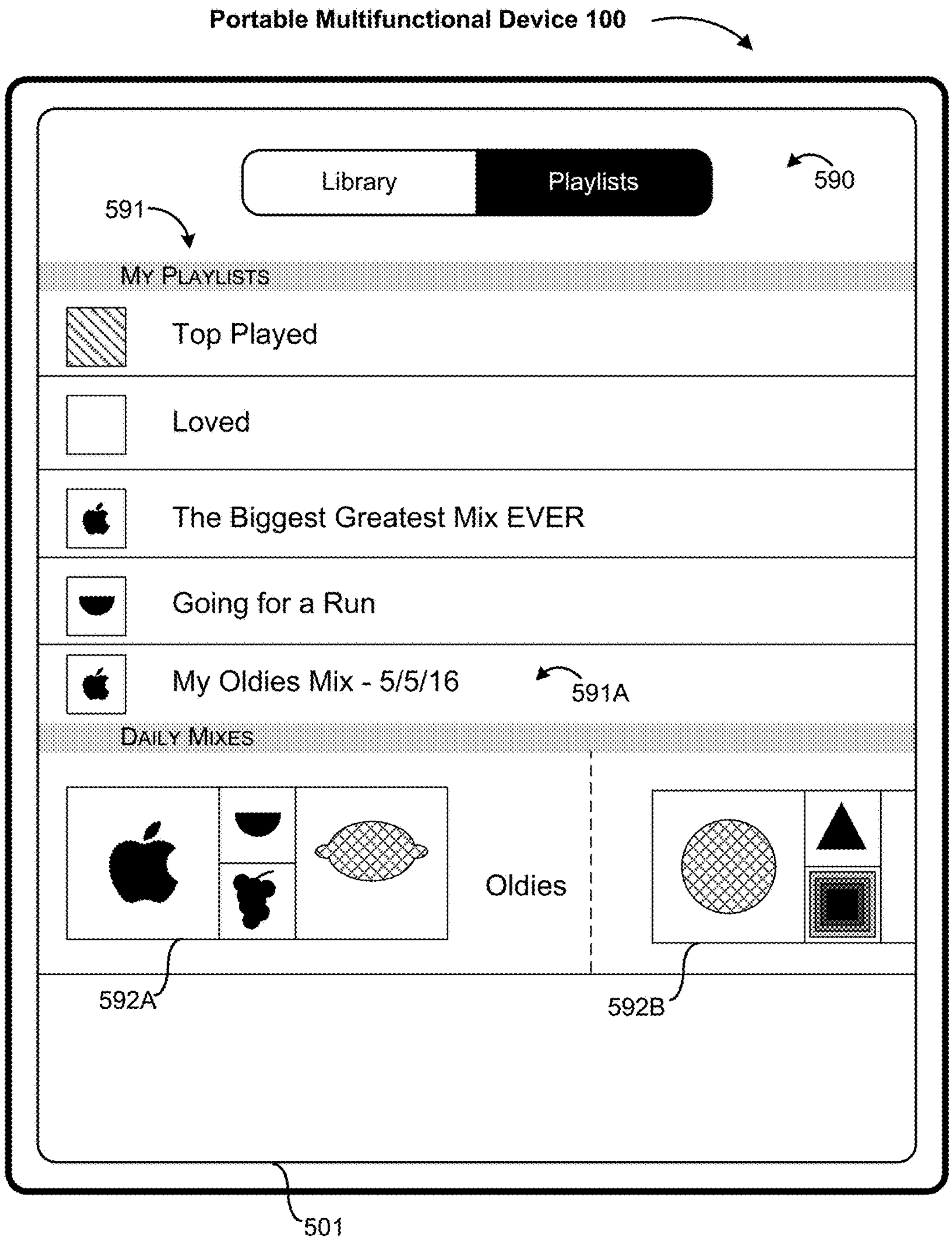
Figure 5C:
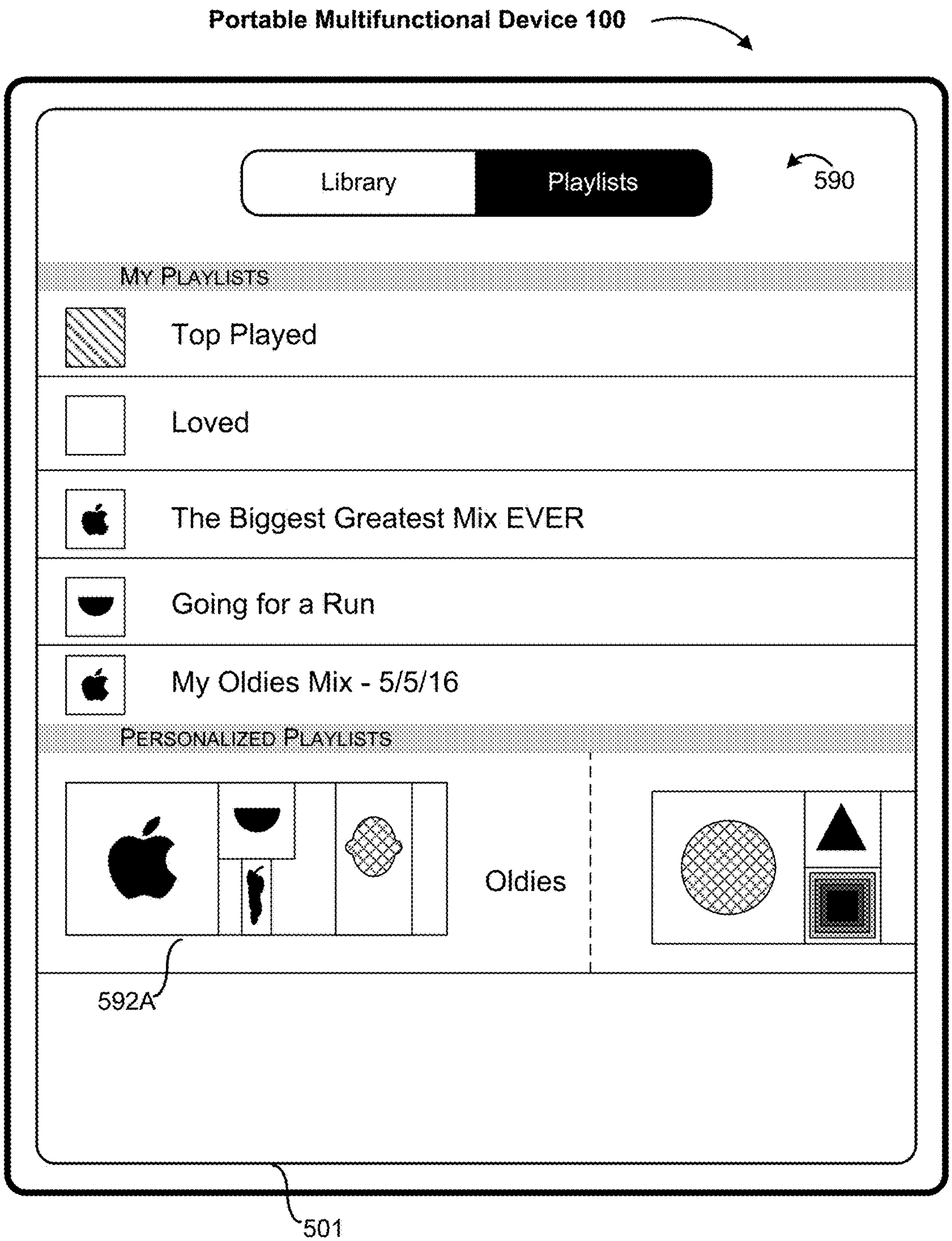
Figure 5C:
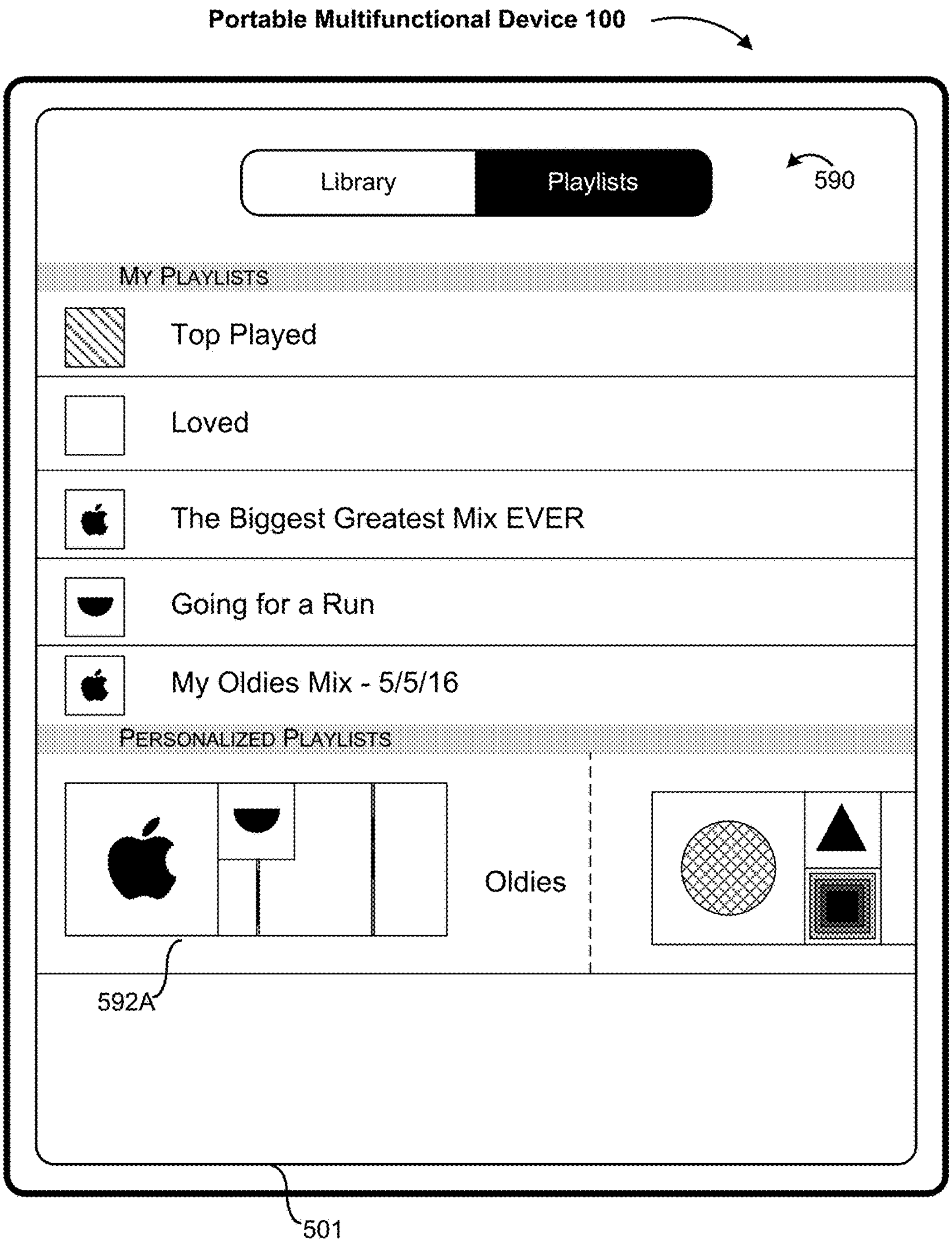
Figure 5C:
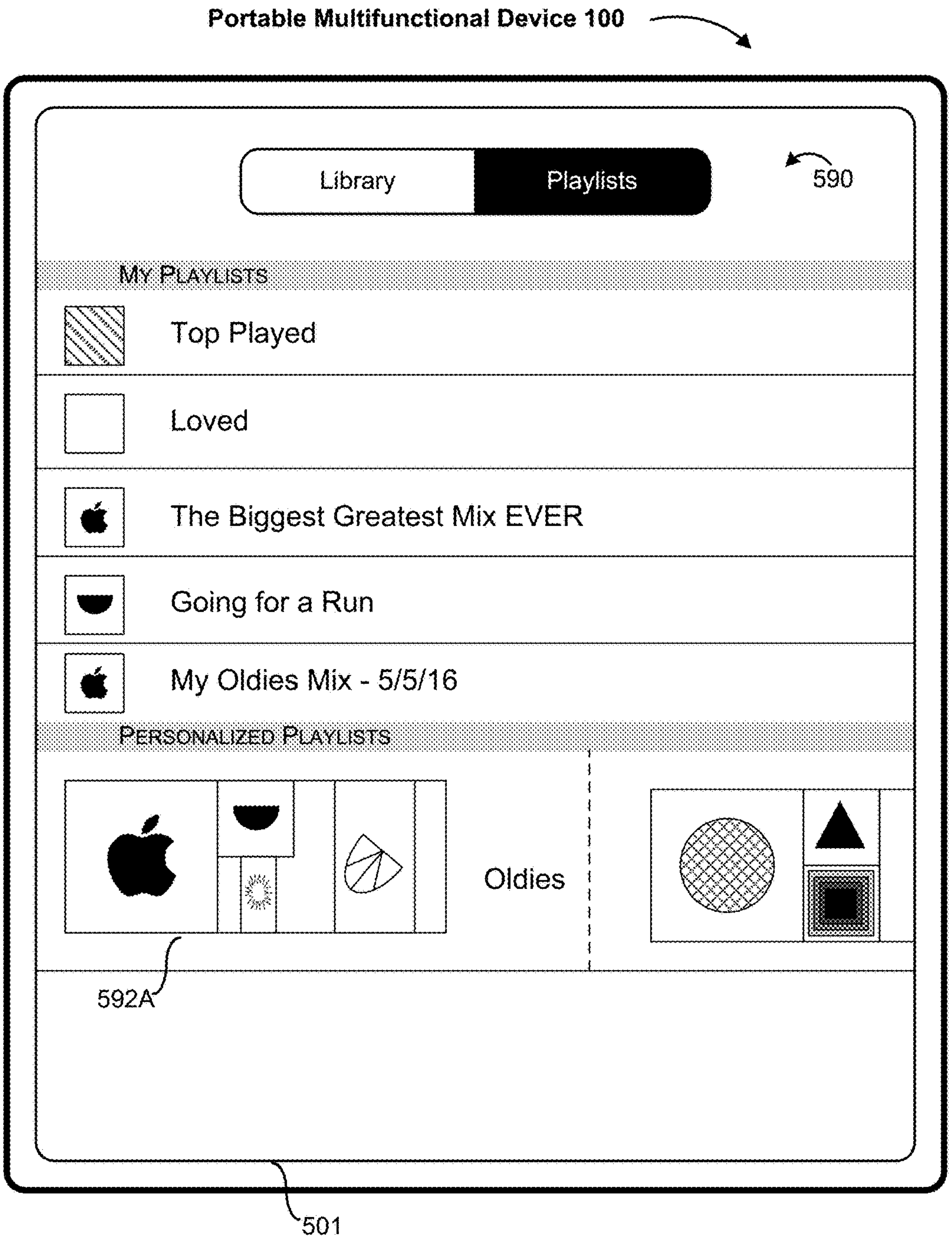
Figure 5C:
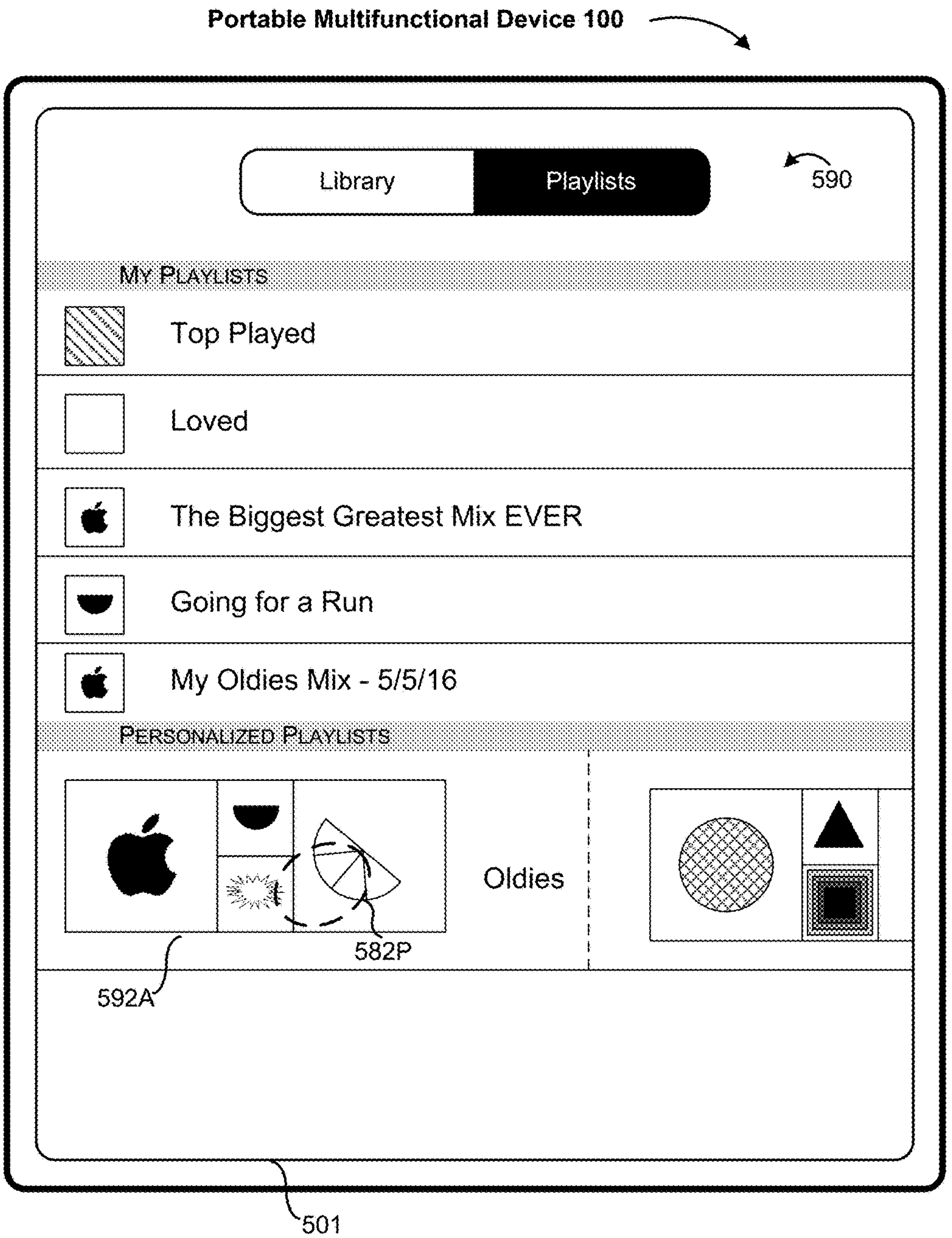
Figure 5C:
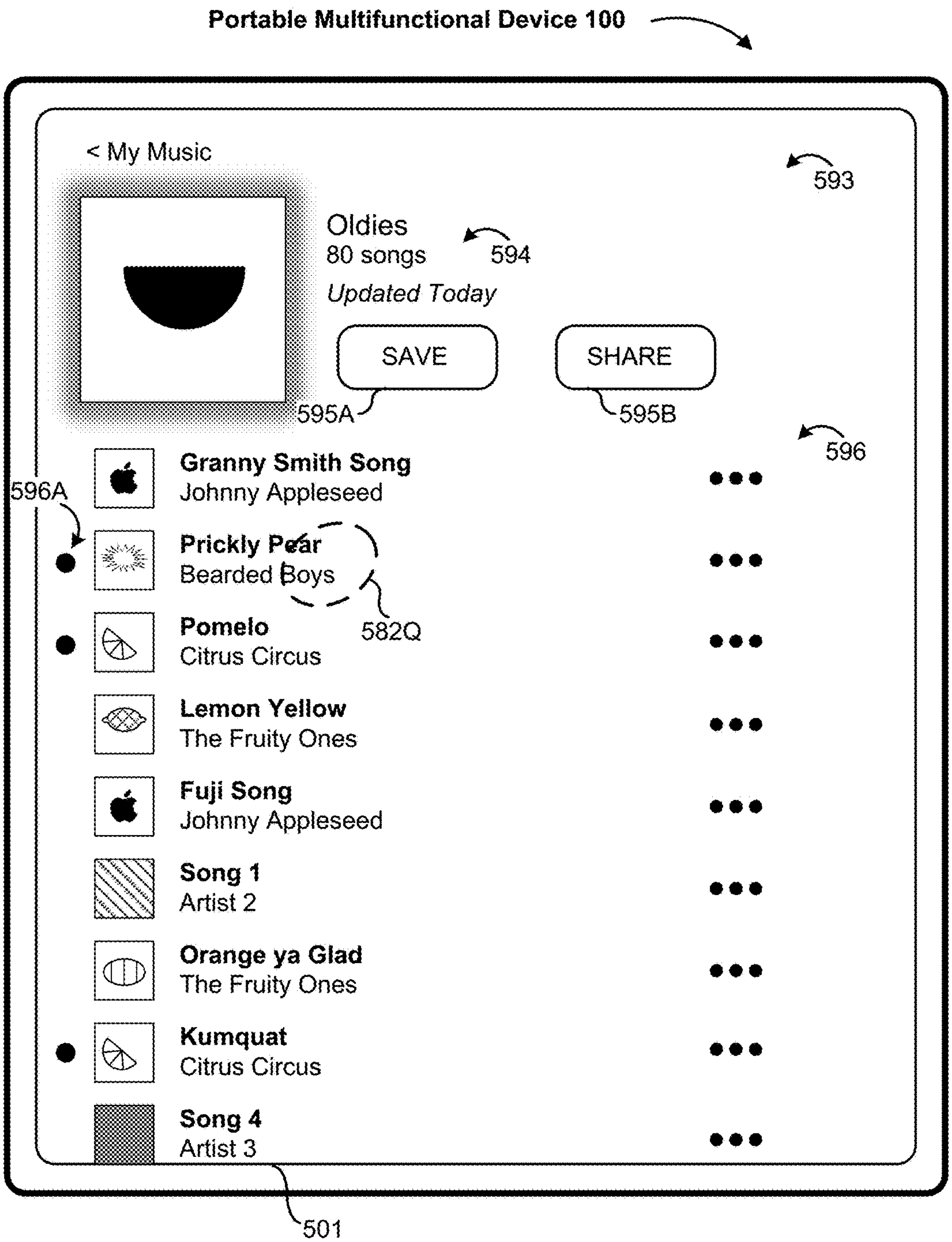
Figure 5C:
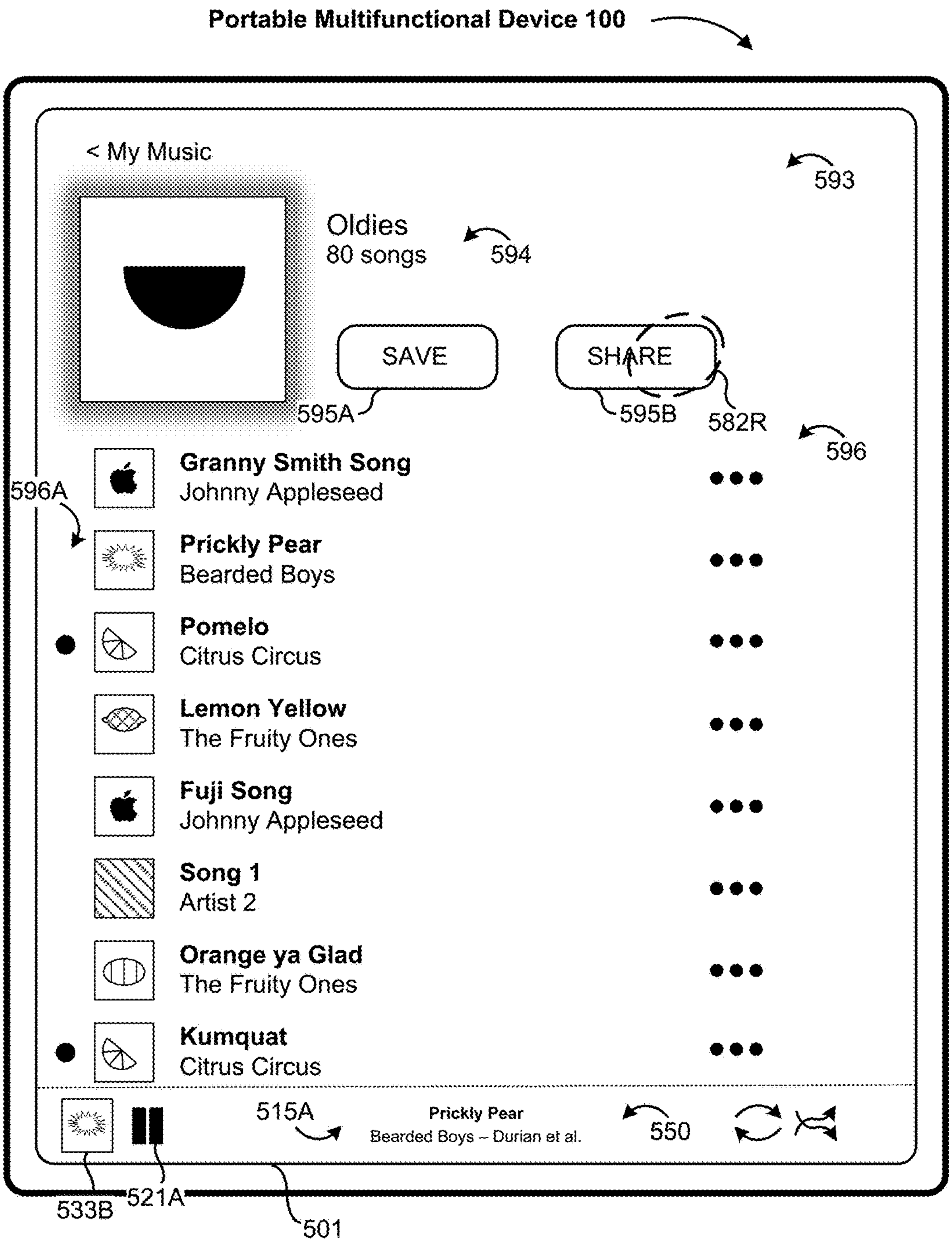
Figure 5C:
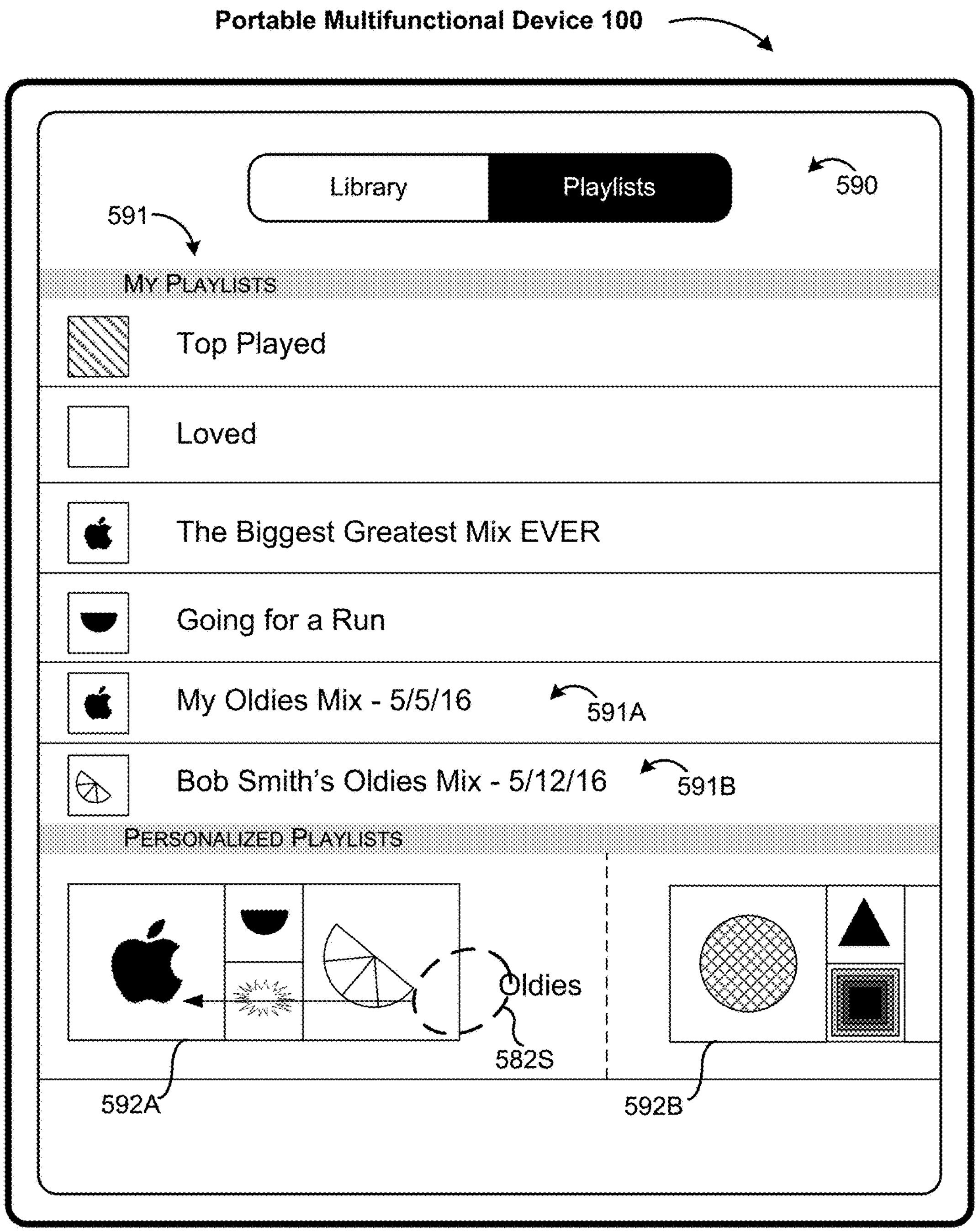
Figure 5C:
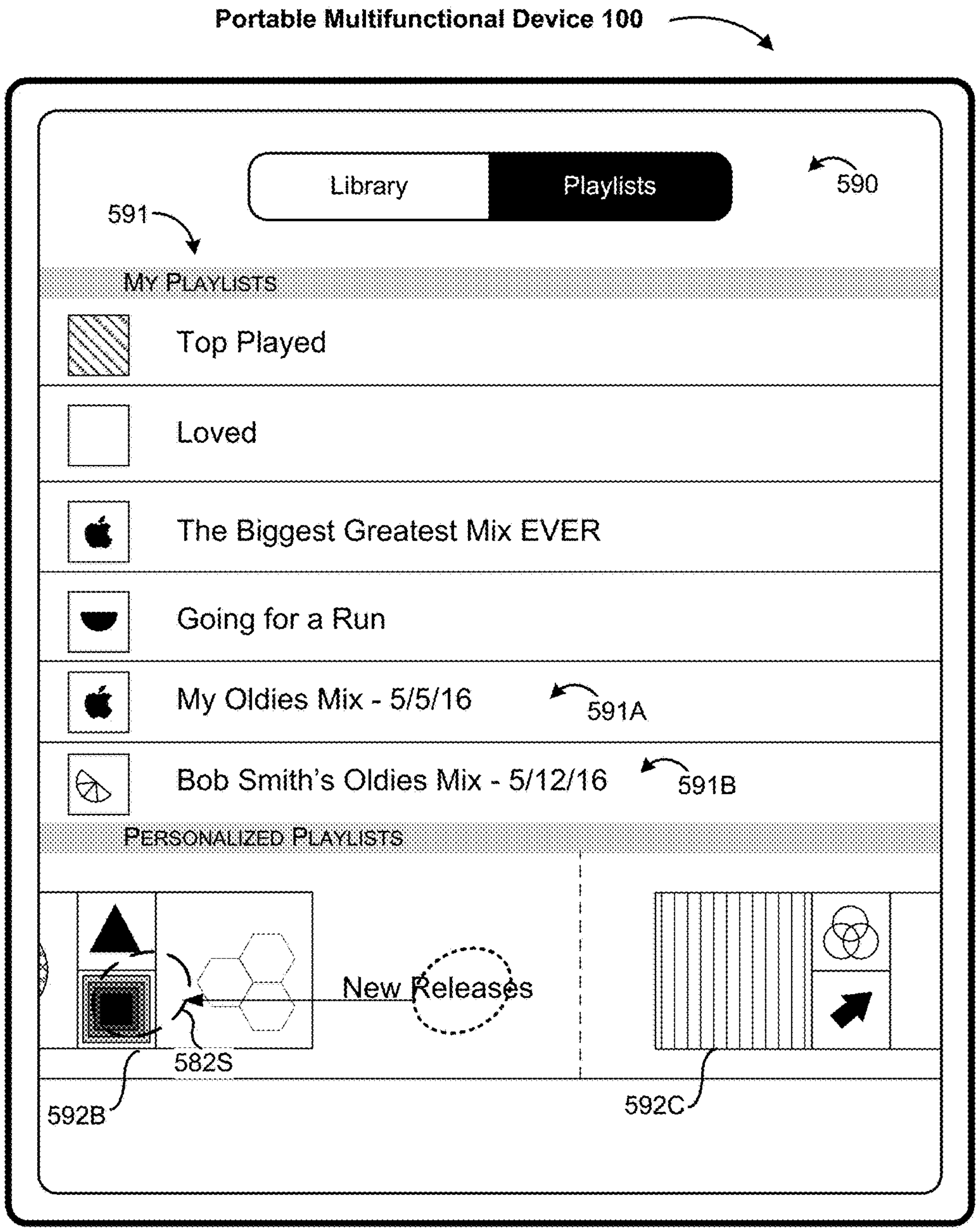

FIG. 5Z illustrates the user interface 501 in response to detecting a first portion of the swipe 581I (e.g., movement a first distance) at the location of the image 533 in FIG. 5Y. The image 533 (retaining its border 533A), the identifying text 513, and the various playback affordances 521-525 are together moved upward as a single unit, referred to as a now-playing pane 541. In the space provided, a lyrics pane 542 is displayed and a queue pane 543 is partially displayed. The lyrics pane 542 includes a lyrics toggle affordance 542A (described further below) for toggling the display of lyrics of the media item.

FIG. 5AA illustrates the user interface 501 in response to detecting a second portion of the swipe 581J (e.g., movement a first distance) at the location of the image in FIG. 5Y. The now-playing pane 541, lyrics pane 542, and queue pane 543 are moved upwards as compared to FIG. 5Z. FIG. 5AA illustrates that the queue pane 543 includes a queue representation 543A (described further below) indicative of upcoming media items.

FIG. 5AB illustrates the user interface 501 in response to detecting a third portion of the swipe 581J (e.g., liftoff) at the location of the image in FIG. 5Y. In FIG. 5AB, the now-playing pane 541 is no longer displayed, the lyrics pane 542 is displayed at the top of the display, the queue pane 543 is fully displayed, a suggestions pane 544 is displayed, and an other information pane 545 is partially displayed. The suggestions pane 544 includes suggestion representations 544A displaying suggested media items selected based on the currently selected media item (e.g., in FIG. 5AB, the third media item). The suggested media items can also be based on other implicit and explicitly determined user preferences, such as media items by the same artist, media items in the same genre, or media items played by other users connected via a social network. The other information pane 545 can display other information related to the media item, such as awards won by the media item or a biography of the artist of the media item. The other information pane 545 can also (or alternatively) display information unrelated to the media item.

Thus, FIGS. 5Y-5AB illustrates that, in response to detecting the swipe 581J over the image 533, the image 533 is moved and related media items are displayed (e.g., media items related to the media item being played back). The related media items can include media items in a queue with the media item (as in the queue pane 543) and/or suggested media items (as in the suggestions pane 544).

FIG. 5AC illustrates the user interface 501 of FIG. 5AC with a touch 581K detected at the location of the lyrics toggle affordance 542A. The touch 581K includes a first portion (touchdown of a contact on the image on the touch-sensitive display of the portable multifunctional device 100) and a second portion (liftoff of the contact from the touch-sensitive display of the portable multifunctional device 100).

FIG. 5AD illustrates the user interface 501 in response to detecting the touch 581K at the location of the lyrics toggle affordance 542A in FIG. 5AC. In FIG. 5AD, the lyrics pane 542 is expanded to display lyrics 542B of the media item. The queue pane 543 and suggestions pane 544 are moved downward by this expansion. Further, the lyrics toggle affordance 542A is changed from a show state (e.g., as in FIG. 5AC) to a hide state.

In some implementations, toggling between showing and hiding lyrics of the media item is persistent. Thus, when a next media item is being played back at a later time and the user interface 501 fully displays the now-playing pane 541, an upward swipe will display the lyrics pane 542 with the lyrics 542B of the next media item without detecting an additional touch of the lyrics toggle affordance 542A.

FIG. 5AE illustrates the user interface 501 of FIG. 5AD with a swipe 581L detected in the lyrics pane 542. Although FIG. 5AE shows the swipe 581L as originating in the lyrics pane 542, a similar effect can be realized with a swipe in other panes, such as the queue pane 543 or the suggestions pane 544. The swipe 581L includes a first portion (e.g., movement of a contact on the touch-sensitive display of the portable multifunctional device 100 a first distance) and a second portion (e.g., movement of the contact on the touch-sensitive display of the portable multifunctional device 100 a second distance). The swipe 581L can include additional portions, such as contact on the touch-sensitive display or liftoff of the contact from the touch-sensitive display.

FIG. 5AF illustrates the user interface 501 in response to detecting a first portion of the swipe 581L (e.g., movement of the contact a first distance) in the lyrics pane 542. The lyrics pane 542 and queue pane 543 have moved down and the suggestions pane 544 has been removed. In the space provided, the now-playing pane 541 is partially displayed.

FIG. 5AG illustrates the user interface 501 in response to detecting a second portion of the swipe 581L (e.g., liftoff of the contact) in the lyrics pane 542. In FIG. 5AG, the lyrics pane 542 and queuing pane 543 are no longer displayed and the now-playing pane 541 fills the display.

FIG. 5AH illustrates the user interface of FIG. 5AG with a swipe 581M detected over the image 533. The swipe 581M includes a first portion (e.g., movement of a contact on the touch-sensitive display of the portable multifunctional device 100 a first distance) and a second portion (e.g., movement of the contact on the touch-sensitive display of the portable multifunctional device 100 a second distance). The swipe 581M can include additional portions, such as contact on the touch-sensitive display or liftoff of the contact from the touch-sensitive display.

FIG. 5AI illustrates the user interface 501 in response to detecting a first portion of the swipe 581M (e.g., movement of the contact a first distance) over the image 533. The now-playing pane 541 is moved downward, revealing a playlist pane 546. Between the now-playing pane 541 and the playlist pane 546 is a miniplayer user interface 540. The miniplayer user interface 540 includes identifying text 513A indicative of the currently selected media item (e.g., in FIG. 5AI, the third media item). The miniplayer user interface 540 includes a pause-play affordance 521A providing the same functionality as the pause-play affordance 521 of the now-playing pane 541. The miniplayer user interface 550 includes a mini-image 533B, a reduced-size version of the image 533 associated with the third media item.

In some implementations, the mini-image 533B operates as an affordance providing the same functionality as the pause-play affordance 521A. Thus, in some implementations, the miniplayer user interface 550 does not include the pause-play affordance 521A. In some implementations, the miniplayer user interface 550 includes other affordances other than those shown in FIG. 5AI.

FIG. 5AJ illustrates the user interface 501 in response to detecting a second portion of the swipe 581M (e.g., movement of the contact a second distance) over the image 533. In FIG. 5AJ, the now-playing pane 541 is moved further downward, revealing more of the playlist pane 546. The miniplayer user interface 550 remains between the now-playing pane 541 and the playlist pane 546.

FIG. 5AK illustrates the user interface 501 in response to detecting a third portion of the swipe 581M (e.g., liftoff of the contact) over the image 533. In FIG. 5AK, the now-playing pane 541 is no longer displayed and the miniplayer user interface 550 is displayed at the bottom of the display. The playlist pane 546 is fully displayed at the top of the display. Beneath the playlist pane 546, the suggestions pane 544 is partially displayed.

FIG. 5AL illustrates the user interface 501 with a touch 581N detected within the miniplayer user interface 550. The touch 581N is not detected at the location of the mini-image 533B or the pause-play affordance 521A. The touch 581N includes a first portion (touchdown of a contact on the image on the touch-sensitive display of the portable multifunctional device 100) and a second portion (liftoff of the contact from the touch-sensitive display of the portable multifunctional device 100).

FIG. 5AM illustrates the user interface 501 in response to detecting the touch 581N within the miniplayer user interface 550. In FIG. 5AM, the miniplayer user interface 550 is moved upward as compared to its location in FIG. 5AL. In space provided, the now-playing pane 541 is partially displayed. Thus, the playlist pane 546 is only partially displayed, obscured by the miniplayer user interface 550 and the now-playing pane 541.

FIG. 5AN illustrates the user interface 501 of FIG. 5AM at a slightly later time. In FIG. 5AN, the miniplayer user interface 500 is moved further upward as compared to its location in FIG. 5AM and more of the now-playing pane 541 is displayed as it is similarly moved upward.

FIG. 5AO illustrates the user interface 501 of FIG. 5AN at a slightly later time. In FIG. 5AO, the now-playing pane is moved further upward as compared to its location in FIG. 5AN to a point that the top of the now-playing pane is off the top of the display (e.g., not displayed). At the bottom of the display, the lyrics pane 542 is displayed.

FIG. 5AP illustrates the user interface 501 of FIG. 5AO at a slightly later time. In FIG. 5AP, the now-playing pane 541 occupies the entire display. The lyrics pane 542, displayed in FIG. 5AO is now longer displayed.

Thus, FIGS. 5AL-5AP illustrate an animation that occurs in response to detecting the touch 581N without detecting further input. The animation temporarily displays the lyrics pane 542 and, at least, the lyrics toggle affordance 542A (e.g., in FIG. 5AO). The animation includes the now-playing pane 541 moving upward from the bottom of the display, filling the display, partially moving off the top of the display to reveal the lyrics pane 542, and moving downward to once again fill the display.

FIG. 5AQ illustrates the user interface 501 with an album pane 547. The album pane 547 can be displayed in response to a number of inputs (not shown) navigating to the album pane 547. FIG. 5AQ also illustrates the user interface 501 with the miniplayer user interface 550 displayed at the bottom of the display. FIG. 5AQ illustrates the miniplayer user interface 550 with a repeat affordance 551 for toggling a repeat setting of the portable multifunctional device 100 and a shuffle affordance 552 for toggling a shuffle setting of the portable multifunctional device 100.

When the repeat setting is set to a repeat all setting, the portable multifunctional device 100 plays back a first media item in a group after playing all the all the media items in a group. When the repeat setting is set to a repeat one setting, the portable multifunctional device 100 restarts playback of a media item when the media item has completed playing. When the repeat setting is set to off, the portable multifunctional device 100 does not play back additional media when the media items in a group have completed playing. When the shuffle setting is set to shuffle, the portable multifunctional device 100 plays back media items of a group in a random order. When the shuffle setting is set to off, the portable multifunctional device 100 plays back media items of a group in a set order.

The album pane 547 includes album identifying information 514 that include, in FIG. 5AQ, an image associated with the album, a title of the album, an artist of the album, a genre of the album, and a release year of the album. The album pane 547 includes a track listing 547A including representations of a number of media items of the album. Each of the representations includes identifying text for the media item and an interaction affordance 547B associated with the media item. FIG. 5AQ illustrates a touch 581O detected at a location of an interaction affordance associated with a first media item of the album.

FIG. 5AR illustrates the user interface 501 of FIG. 5AQ in response to detecting the touch 581O at the location of the interaction affordance associated with the first media item of the album. The user interface 501 includes an interaction window 561 with a queuing affordance 561A for adding the first media item of the album to a queue. In various implementations, the interaction window 561 can include additional affordances for interacting with the media item not shown in the figures for simplicity of illustration and explanation. FIG. 5AR illustrates that when the interaction window 561 is displayed, the rest of the user interface 501 is darkened.

FIG. 5AS illustrates the user interface 501 of FIG. 5AR with a touch 581P detected at a location of the queuing affordance 561A.

FIG. 5AT illustrates the user interface 501 of FIG. 5AS in response to detecting the touch 581P at the location of the queuing affordance 561A and a determination that the currently playing media item meets group-sensitive queuing criteria. The group-sensitive queuing criteria include a criterion that is met if the currently playing media item is part of a predefined group of media items in a queue, such as an album or a playlist. The group-sensitive queuing criteria can also include a criterion that is met if the predefined group of media items is less than a predefined size.

The user interface 501 includes a queuing window 562 with one or more queuing option affordances. In FIG. 5AT, the queuing option affordances include a play next affordance 562A for playing the first media item of the album after the currently playing media item (and before the rest of the media items in the predefined group). In FIG. 5AT, the queuing option affordances include a play after affordance 562B for playing the first media item of the album after the rest of the media items in the predefined group.

FIG. 5AU illustrates the user interface 501 of FIG. 5AS in response to detecting the touch 581P at the location of the queuing affordance 561A and a determination that the currently playing media item does not meet the group-sensitive queuing criteria. The user interface 501 includes the queuing window 562, but, in FIG. 5AU, the queuing window 562 does not include the play after affordance 562B.

FIG. 5AV illustrates another embodiment of the user interface 501 of FIG. 5AS in response to detecting the touch 581P at the location of the queuing affordance 561A and a determination that the currently playing media item does not meet the group-sensitive queuing criteria. The user interface 501 includes the queuing window 561, but, in FIG. 5AV, the play after affordance 562B is replaced with a play later affordance 562C for playing the first media item of the album after a fixed number of media items have played.

FIG. 5AW illustrates the user interface 501 of FIG. 5AT with a touch 581Q detected at a location of the play next affordance 562A.

FIG. 5AX illustrates the user interface 501 in response to detecting the touch 581Q at the location of the play next affordance 562A in FIG. 5AW. The user interface 501 displays the queue pane 543 including a queue representation 543A. The queue representation 543A includes a plurality of elements respectively associated with one or more of the media items in the queue. In FIG. 5AX, the queue includes a number of media items from the group, e.g., the playlist shown in FIG. 5AK. In FIG. 5AX, the queue also includes the first media item of the album, positioned at the top of the queue.

Each of the plurality of elements of the queue representation 543A includes a mini-image and identifying text indicative of the respective media item. The mini-image can be, for example, a reduced-size version of an image associated with the media item (e.g., album art). The identifying text can include, as shown in FIG. 5AX, a title of the media item and artist of the media item. The identifying text can include additional information, such as an album of the media item.

FIG. 5AX illustrates that the elements of the queue associated with the group are visually separate from the other elements of the queue (e.g., the element corresponding to the first media item of the album). In particular, the queue representation 543A includes a banner 543B separating the elements of the queue associated with the group from the other elements of the queue.

FIG. 5AY illustrates an alternative embodiment of the user interface 501 of FIG. 5AX. In FIG. 5AY, the elements of the queue associated with the group are replaced with a single element. Thus, the group (e.g., an album or a playlist) is represented by a single element including an icon and identifying text. In FIG. 5AY, the identifying text includes a name of the group (e.g., a name of the playlist).

FIG. 5AZ illustrates the user interface 501 of FIG. 5AT with a touch 581R detected at the location of the play after affordance 562B.

FIG. 5BA illustrates the user interface 501 in response to detecting the touch 581R at the location of the play after affordance 562B in FIG. 5AZ. The user interface 501 displays the queue pane 543 including a queue representation 543A. The queue representation 543A includes a plurality of elements respectively associated with one or more of the media items in the queue. In FIG. 5BA, the queue includes a number of media items from the group, e.g., the playlist shown in FIG. 5AK. In FIG. 5BA, the queue also includes the first media item of the album, positioned at the bottom of the queue.

FIG. 5BB illustrates the user interface 501 with the album pane 547. The album pane 547 can be displayed in response to a number of inputs (not shown) navigating to the album pane 547 from the state of the user interface 501 in FIG. 5AY (e.g., with the first media album of the item scheduled to play next rather than after the playlist as in FIG. 5BA).

FIG. 5BB, like FIG. 5AQ, also illustrates the user interface 501 with the miniplayer user interface 550 displayed at the bottom of the display. The miniplayer user interface 550 includes the repeat affordance 551 and the shuffling affordance 552.

With the first media item of the album added to the queue, and the queue including media items from the predefined group, the repeat affordance 551 indicates that the repeat setting is set to the off setting and the shuffle affordance 552 indicates that the shuffle setting is set to the off setting. Thus, in response to a media item being added to the queue, the portable multifunctional device 100 disables a non-linear playback function (e.g., repeat of shuffle) by setting the corresponding setting to an off setting. In some implementations, once the media item that has been added to the queue has completed playing, the portable multifunctional device 100 enables the non-linear playback function.

FIG. 5BB illustrates a touch 581S detected at a location of an interaction affordance associated with a sixth media item of the album.

FIG. 5BC illustrates the user interface 501 in response to detecting the touch 581S at the location of the interaction affordance associated with the sixth media item of the album. The user interface 501 includes an interaction window 561 with queuing affordance 561A for adding the sixth media item of the album to a queue. As mentioned above, in various implementations, the interaction window 561 can include additional affordances for interacting with the media item not shown in the figures for simplicity of illustration and explanation.

FIG. 5BC illustrates a touch 581T detected at a location of the queuing affordance 561A.

FIG. 5BD illustrates the user interface 501 in response to detecting the touch 581T at the location of the queuing affordance 561A. The user interface 501 includes the queuing window 562 with one or more queuing option affordances. In FIG. 5BD, the queuing option affordances include a play next affordance 562A for playing the sixth media item of the album after the currently playing media item (and before the rest of the media items in the queue, including the first media item of the album and the rest of the media items of the predefined group). In FIG. 5BD, the queuing option affordances include a play after affordance 562B for playing the sixth media item of the album after the rest of the media items in the predefined group. In FIG. 5BD, the queuing option affordances include a play end affordance 562D for playing the sixth media item of the album after the first media item of the album, but before the rest of the media items in the predefined group.

FIG. 5BE illustrates the user interface 501 of FIG. 5BD with a touch 581U detected at the location of the play next affordance 562A.

FIG. 5BF illustrates the user interface 501 in response to detecting the touch 581U at the location of the play next affordance 562A. The user interface 501 includes the queue pane 543 including the queue representation 543A. The queue representation 543A indicates that the sixth media item of the album is at the top of the queue, followed by the first media item of album, followed by the rest of the media items of the predefined group.

FIG. 5BG illustrates the user interface 501 of FIG. 5BD with a touch 581V detected at the location of the play end affordance 562D.

FIG. 5BH illustrates the user interface 501 in response to detecting the touch 581V at the location of the play end affordance 562D. The user interface 501 includes the queue pane 543 including the queue representation 543A. The queue representation 543A indicates that the first media item of the album is at the top of the queue, followed by the sixth media item of album, followed by the rest of the media items of the predefined group.

FIG. 5BI illustrates the user interface 501 of FIG. 5BD with a touch 581W detected at the location of the play after affordance 562B.

FIG. 5BJ illustrates the user interface 501 in response to detecting the touch 581W at the location of the play after affordance 562B. The user interface 501 includes the queue pane 543 including the queue representation 543A. The queue representation 543A indicates that the first media item of the album is at the top of the queue, followed by the rest of the media items of the predefined group, followed by the sixth media item of album.

FIG. 5BK illustrates the user interface 501 of FIG. 5BJ with a drag 581X detected at a drag affordance associated with the element of the queue representation 543A associated with the sixth media item of the album.

FIG. 5BL illustrates the user interface 501 in response to detecting the drag 581X at the drag affordance associated with the element of the queue representation 543A associated with the sixth media item of the album. The queue representation 543A of the user interface 501 has changed indicating a new ordering of the media items in the queue. In particular, the sixth media item of the album has been moved to the top of the queue.

FIG. 5BM illustrates the user interface 501 of FIG. 5BL with a drag 581Y detected at a drag affordance associated with the element of the queue representation 543A associated with the rest of the media items in the group.

FIG. 5BN illustrates the user interface 501 in response to detecting the drag 581Y at the drag affordance associated with the element of the queue representation 543A associated with the rest of the media items in the group. The queue representation 543A of the user interface 501 has changed indicating a new ordering of the media items in the queue. In particular, the first media item of the album has been moved to the bottom of the queue. Further, the single element associated with the rest of the media items in the group has been replaced with a plurality of elements respectively associated with the rest of the media items in the group.

FIG. 5BO illustrates the user interface 501 of FIG. 5BN with a swipe 581Z detected over an element of the queue representation 543A.

FIG. 5BP illustrates the user interface 501 in response to a first portion of the swipe 581Z detected over the element of the queue representation 543A. The element is moved in the direction of the swipe 581Z. In the space provided, a remove affordance 543C is displayed. In some implementations, the media item associated with the element is removed in response to detecting a touch at the location of the remove affordance 543C.

FIG. 5BQ illustrates the user interface 501 in response to a second portion of the swipe 581Z detected over the element of the queue representation 543A. The queue representation 543A is changed, having had the element removed, indicating that the media item associated with the element is no longer in the queue.

FIG. 5BR illustrates the user interface 501 with the album pane 547. As mentioned above, the album pane 547 can be displayed in response to a number of inputs (not shown) navigating to the album pane 547. FIG. 5BR also illustrates the user interface 501 with the miniplayer user interface 550 displayed at the bottom of the display. In FIG. 5AQ, the miniplayer user interface includes identifying text 514A for a fourth media item (previous represented in the queue representation 553A of Figure BQ).

FIG. 5BR illustrates the album pane 547 including an add affordance 571A proximate to the album identifying information 514. In various implementations, the user interface 501 can display information regarding (and playback) media items of a database accessible via a network using a wired data connection or a wireless data connection such as WiFi or a cellular connection. A set of the media items can be designated as part of a user library for ease of navigation at later times. Further, media items of the user library can be downloaded onto the portable multifunctional device 100 for playback when the network is inaccessible.

FIG. 5BR illustrates a touch 582A detected at a location of the add affordance 571A.

FIG. 5BS illustrates the user interface 501 in response to detecting the touch 582A at the location of the add affordance 571A. The user interface 501 includes an auto-add window 563 with one or more auto-add option affordances. In FIG. 5BS, the auto-add option affordances include an activate affordance 563A for activating an auto-add feature. With the auto-add feature activated, the portable multifunctional device 100 downloads (without further user input) media items added to (or already present in) the user library. In FIG. 5BS, the auto-add option affordances include a dismiss affordance 563B for declining to activate the auto-add feature. In some implementations, the auto-add option affordances include other affordances, such as a later affordance for causing the portable multifunctional device 100 to display the auto-add window 563 at a later date or a selective affordance for partially activating the auto-add feature such that only some (e.g., often played or some other heuristic) media items of the library are downloaded.

FIG. 5BS illustrates a touch 582B detected at a location of the dismiss affordance 563B.

FIG. 5BT illustrates the user interface 501 in response to detecting the touch 582B at the location of the dismiss affordance 563B. The add affordance 571A is replaced with a download affordance 571B for downloading the media files of the album to the portable multifunctional device 100. Further, the track listing 547A, including representations of the media items of the album, includes track download affordances 547C for downloading individual media files of the album.

FIG. 5BT illustrates a touch 582C detected at a location of the download affordance 571B.

FIG. 5BU illustrates the user interface 501 in response to detecting the touch 582C at the location of the download affordance 571B. The download affordance 571B is replaced with a download indicator affordance 571C indicating an amount of the media files of the album downloaded to the portable multifunctional device 100. Further, the track download affordances 547C are replaced with track download indictors 547D indicating an amount of each media file of the album downloaded to the portable multifunctional device 100.

FIG. 5BV illustrates an alternative embodiment of the user interface of FIG. 5BU in which the track download indicators 547E for completed tracks are absent. In various implementations, when the album is completed downloading, the download indicator affordance 571C for the album is also absent, e.g., replaced by a whitespace.

FIG. 5BW illustrates the user interface with an insufficient storage window 564. The user interface 501 can display the insufficient storage window 564 in response to a request to store an additional one or more media items on a storage device of the portable multifunctional device 100 the storage device and determining that storing the additional one or more media items would use more than an available amount of storage of the storage device. As shown in FIG. 5BW, the insufficient storage window 564 is displayed in response to a request to download (and store) the media items of the album.

The insufficient storage window 564 includes a notification (including text) indicating that there is insufficient storage in a storage device of the portable multifunctional device 100 to store all of the media items of the album. The insufficient storage window 564 also includes a plurality of storage management affordances.

In FIG. 5BW, the storage management affordances include an optimize storage affordance 564A for setting an optimize storage setting (as described further below). In FIG. 5BW, the storage management affordances include a manual storage management affordance 564B for manually managing storage of media (as described further below), and a cancel affordance 564C for cancelling the storage operation that prompted the display of the insufficient storage window 564, e.g., cancelling download of the media items of the album.

FIG. 5BW illustrates a touch 582D detected at a location of the optimize storage affordance 564A.

FIG. 5BX illustrates the user interface 501 in response to detecting the touch 582D at the location of the optimize storage affordance 564A. The user interface 501 includes a music settings user interface 575. The music settings user interface 575 includes a plurality a music setting affordances for changing music settings. In FIG. 5BX, the music settings user interface 575 includes an auto-add toggle affordance 575A for toggling the auto-add feature. In FIG. 5BX, the music settings user interface 575 includes an optimize storage settings affordance 575B for displaying an optimize storage user interface (as described below) and, ultimately, changing optimize storage settings. In various implementations, the music settings user interface 575 can include additional music setting affordances for changing other music settings.

In FIG. 5BX, the auto-add toggle affordance 575A indicates that the auto-add feature is not activated and the optimize storage settings affordance 575B indicates that the optimize storage setting is set to off.

FIG. 5BX illustrates a touch 582E detected at a location of the optimize settings storage affordance 575B.

FIG. 5BY illustrates the user interface 501 in response to detecting the touch 582E at the location of the optimize storage settings affordance 575B. The user interface 501 includes an optimize storage user settings user interface 576. The optimize storage settings user interface 576 includes one or more optimize storage settings affordances for changing optimize storage settings. In FIG. 5BY, the optimize storage settings affordances include an optimize storage feature toggle 576A for toggling an optimize storage feature.

FIG. 5BY illustrates a touch 582F detected at a location of the optimize storage feature toggle 576A.

FIG. 5BZ illustrates the user interface 501 in response to the touch 582F detected at the location of the optimize storage feature toggle 576A. The user interface 501 includes the optimize storage user interface 576 in which the optimize storage feature toggle 576A is set to on. The optimize storage user interface 576 includes a media storage display 576B indicative of an amount of storage on a storage device of the portable multifunctional device 100 used by media files.

The optimize storage user interface 576 includes a plurality of media storage reservation size affordances 576C for selecting an amount of storage to reserve for media items. The amounts of storage indicated by the media storage reservation size affordances 576C are, in some implementations, based on a size of the storage device. For example, for a storage device with 32 GB of storage space, the media storage reservation size affordances 576C can (as shown in FIG. 5BZ) include affordances for no minimum, 1 GB, 2 GB, and 4 GB. For a storage device with 4 GB of storage space, the media storage reservation size affordances 576C can include affordances for no minimum, 100 MB, 250 MB, and 1 GB.

FIG. 5BZ illustrates a touch 582G detected at a location of a 2 GB media storage reservation size affordance of the plurality of media storage reservation size affordances 576C.

FIG. 5CA illustrates the user interface 501 in response to detecting the touch 582G at the location of the 2 GB storage reservation size affordance. In FIG. 5CA, the optimize storage feature is activated, as indicated by the optimize storage feature toggle 576A in the on state. Further, the media storage reservation size is set to 2 GB, as indicated by the media storage reservation size affordances 576C.

When the optimize storage feature is active, the portable multifunctional device 100 can, without further user input, delete media files to free storage of a storage device of the portable multifunctional device 100 while maintaining at least the media storage reservation size of media files. For example, as shown in FIG. 5CA, the portable multifunctional device 100 is storing 6.4 GB of media files, but has reserved 2 GB for media files. Thus, the portable multifunctional device 100 can, without further user input, delete up to 4.4 GB of media files in order to perform other storage operations. However, the portable multifunctional device 100 does not delete more than 4.4 GB of media files without further user input.

In operation, the portable multifunctional device 100 can detect the occurrence of a condition that corresponds to a request to free storage (e.g., the request to download the media files of the album in FIG. 5BT when there is insufficient storage to complete the download as indicated by FIG. 5BW). In accordance with a determination that the amount of storage used by media files (e.g., 6.4 GB in FIG. 5CA) is greater than the minimum amount of media storage that has been reserved for media items (e.g., 2 GB in FIG. 5CA), the portable multifunctional device 100 can delete one or more of the stored media items. In accordance with a determination that the amount of storage used by media files is less than the minimum amount of media storage reserved for media items, the portable multifunctional device 100 can forgo deleting media items from the device.

It is to be understood that although the media storage reservation size limits the amount of media items that can be deleted without further user input, the media storage reservation size does not set of a maximum limit for the amount of media files that can be stored on the device.

FIG. 5CA illustrates a touch 582H detected at a music settings affordance 576D for returning to the music settings user interface 575.

FIG. 5CB illustrates the user interface 501 in response to detecting the touch 582H at the music settings affordance 576D. The music settings user interface 575 (in contrast to FIG. 5BX) includes a media deletion warning 575C indicating that, due to the optimize storage feature being activated and the media storage reservation size being less than the amount of storage used by media files, media files may be deleted without further user input.

FIG. 5CB illustrates a touch 582I at a location of the auto-add toggle affordance 575A.

FIG. 5CC illustrates the user interface 501 in response to detecting the touch 582I at the location of the auto-add toggle affordance 575A. The user interface 501 continues to display the music settings user interface 575. The music settings user interface 575 includes the auto-add toggle affordance 575A in an on state, indicating that the auto-add feature is activated. The music settings user interface 575 includes the optimize storage settings affordance 575B indicating that the optimize storage feature is activated with a media storage reservation size of 2 GB.

With both of these features activated, the portable multifunctional device 100 automatically downloads media files added to (or present in) the user library. When storage space is needed for other storage operations, the portable multifunctional device 100 can delete media items in order to perform the other storage operations.

FIG. 5CD illustrates the user interface 501 with the insufficient storage window 564. FIG. 5CD differs from FIG. 5BW in that FIG. 5CD illustrates a touch 582J detected at a location of the manual storage management affordance 564B.

FIG. 5CE illustrates the user interface 501 in response to detecting the touch 582J at the location of the manual storage management affordance 564B. The user interface 501 includes a manual storage management user interface 577. The manual storage management user interface 577 includes a list of media items 577F stored in the portable multifunctional device 100 (or a storage device thereof).

In various implementations, the list of media items 577F is prioritized accordance to a size of the media item and/or a listening history of the media item. For example, the list of media items 577F can be ordered according to the size of the media items and/or listening history of the media items. As another example, the list of media items 577F can include only media items that are being proposed for deletion based on the size of the media items and/or listening history.

In some implementations, the list of media items 577F includes one or more the media files of one or more albums, and the media files associated with a particular album are listed together as a group.

The list of media items 577F includes a plurality of elements, each corresponding to a media file. As shown in FIG. 5CE, each element includes a selection affordance 577E for selecting or deselecting the media file, an icon and identifying text indicative of the respective media item, and a size of the media item.

The manual storage management user interface 577 includes a delete selected affordance 577A for deleting the selected media files, a deselect all affordance 577B for deselecting all the media files (e.g., changing the selection affordances 577E into a deselected state), and a cancel affordance 577C for leaving the manual storage management user interface 577.

In some implementations, the manual storage management user interface 577 includes additional affordances for deleting media items. In one embodiment, the manual storage management user interface 577 includes a delete all affordance for deleting all the media files. In such an embodiment, the manual storage management user interface 577 may not include selection affordances 577E and the list of media items 577F may include only media items that are being proposed for deletion based on the size of the media items and/or listening history.

In some implementations, the manual storage management user interface 577 includes a plurality of delete affordances in the list of media items 577F for deleting respective ones of the media items.

FIG. 5CF illustrates the user interface 501 including a synched playlist user interface 578. The synched playlist user interface 578 can be displayed in response to a number of inputs (not shown) navigating to the synched playlist user interface 578. For example, from a settings user interface, a user input can be detected navigating to a watch settings user interface. From the watch settings user interface, a user input can be detected navigating to a watch music settings user interface (described below). From the watch settings user interface, a user input can be detected navigating to the synched playlist user interface 578. The synched playlist user interface 578 includes a list of playlist selection affordances 578A for selecting a playlist to be synched. When a playlist is synched with a device, the media items of the playlist are stored on the device for offline consumption.

The playlist selection affordances 578A include a smart playlist selection affordance 578B for synching an algorithmically selected set of media items. The playlist selection affordances 578A include a random playlist selection affordance 578C for synching a random set of media items with the user device. The playlist selection affordances 578A include a number of user playlist selection affordances for synching a user-selected set of media items, including a large playlist selection affordance 578D for synching a large user-selected set of media items.

FIG. 5CF illustrates a touch 582K detected at a location of the large playlist selection affordance 578D.

FIG. 5CG illustrates the user interface 501 in response to detecting the touch 582K at the location of the large playlist selection affordance 578D. The user interface 501 includes a large playlist window 565. The large playlist window 565 includes a notification indicating that the size of the playlist is larger than a size of a storage device of the device to which the playlist is to be synched. The notification further indicates that the playlist is to be only partially synched, in which less than all of the media items of the playlist are stored on the device. The large playlist window 565 includes an accept affordance 565A for partially synching the playlist and a cancel affordance 565B for not synching the playlist (and allowing another playlist to be selected).

FIG. 5CG illustrates a touch 582L detected at a location of the accept affordance 565A.

FIG. 5CH illustrates the user interface 501 in response to detecting the touch 582L at the location of the accept affordance 565A. The user interface 501 includes the synched playlist user interface 578.

FIG. 5CH illustrates a touch 582M at a location of a watch music settings affordance 578E for navigating to a watch music settings user interface.

FIG. 5CI illustrates the user interface 501 in response to detecting the touch 582M at the watch music settings affordance 578E. The user interface 501 includes a watch music settings user interface 579. The watch music settings user interface 579 includes a synched playlist selection affordance 579A for navigating to the synched playlist user interface 578. The synched playlist selection affordance 579A indicates the large playlist is selected for synching and that the large playlist is only partially synched. The watch music settings user interface 579 includes an optimize storage affordance 579B for activating the optimize storage feature for the device (or for an associated device).

FIG. 5CJ illustrates the user interface 501 including a playlist user interface 590. The playlist user interface 590 can be displayed in response to a number of inputs (not shown) navigating to the playlist user interface 590. The playlist user interface 590 includes a plurality of playlist affordances 591 for displaying representations of respective playlists which include affordances for playing back the media items of the playlist.

The playlist affordances 591 include a first automatically-generated playlist affordance 592A for displaying a representation of a first automatically-generated playlist and a second automatically-generated playlist affordance 592B for displaying a representation of a second automatically-generated playlist.

FIG. 5CJ illustrates a touch 582N detected at a location of the first automatically-generated playlist affordance 592A.

FIG. 5CK illustrates the user interface 501 in response to detecting the touch 582N at the location of the first automatically-generated playlist affordance 592A. The user interface 501 includes a representation of the first automatically-generated playlist 593. The representation of the first automatically-generated playlist 593 includes representations of a first set of media items 596 selected for inclusion in the first automatically-generated playlist based on first playlist generation criteria for the first automatically-generated playlist.

The representation of the first automatically-generated playlist 593 includes identifying information 594 that includes, in FIG. 5CK, a title of the first automatically-generated playlist, the number of media items in the first automatically-generated playlist, and a time the automatically-generated playlist was last updated.

The representation of the first automatically-generated playlist 593 include a save affordance 595A for saving the first set of media items as a user playlist. The representation of the first automatically-generated playlist 593 includes a share affordance 595B for sharing the first set of media items as a shared playlist.

FIG. 5CK illustrates a touch 5280 detected at a location of the save affordance 595A.

FIG. 5CL illustrates the user interface 501 in response to detecting the touch 5280 at the location of the save affordance 595A. The user interface 501 includes the playlist user interface 590. The playlist user interface includes a saved affordance 591A corresponding to a user playlist of the first set of media items in the first automatically-generated playlist.

FIG. 5CL illustrates a state in which a first update criterion has been met. In various implementations, the first update criterion specifies that the first set of media items is to be updated on a predefined day of the week.

FIGS. 5CL-5CP illustrate an update animation that occurs in response to the first update criterion having been met. In FIG. 5CL, the first automatically-generated playlist affordance 592A includes a first plurality of images respectively associated with a plurality of the first set of media items. In FIG. 5CP, the first automatically-generated playlist affordance 592A includes an updated first plurality of images respectively associated with a plurality of an updated first set of media item.

Thus, FIGS. 5CL-5CP illustrate an update animation in which one or more of the first plurality of images are replaced with one or more of the updated first plurality of images. The animation indicates that new media items have been added to the first automatically-generated playlist.

Although FIG. 5CL-5CP illustrate an update animation in which one or more of the first plurality of images are flipped over to review one or more of the updated first plurality of images, other update animations can be used. For example, in some implementations, one or more of the first plurality of images drop off the bottom of the display (or the first automatically-generated playlist affordance 592A) and are replaced by one of more of the updated first plurality of images falling in from the top of the display (or the first automatically-generated playlist affordance 592A).

FIG. 5CP illustrates a touch 582P detected at a location of the first automatically-generated playlist affordance 592A.

FIG. 5CQ illustrates the user interface 501 in response to detecting the touch 582P at the location of the first automatically-generated playlist affordance 592A. The user interface 501 includes an updated representation of the first automatically-generated playlist 593 that includes representations of an updated first set of media items 596.

In response to detecting that the first update criterion for the first automatically-generated playlist has been met, the portable multifunctional device 100 (in addition to displaying the update animation as described above) updates the first automatically-generated playlist based on the first playlist generation criteria and user interaction with the media items in the first set of media items. Updating the first automatically-generated playlist (e.g., updating the first set of media items), includes adding one or more added media items to the first set of media items, removing one or more removed media items from the first set of media items, and maintaining a plurality of media items in the first set of media items. In some implementations, a plurality of media items in the first set of media items are maintained.

The user interactions with the representations of the media items can include playing various media items of the first automatically-generated playlist (e.g., multiple times), rating the media items of the first automatically-generated playlist (e.g., on a scale of 1 to 5 stars), like/dislike flagging the media items of the first automatically-generated playlist, sharing one or more of the media items of the first automatically-generated playlist, viewing related media items of the media items of the first automatically-generated playlist, viewing lyrics of the media items of the first automatically-generated playlist, or otherwise interacting with the media items.

For example, in some embodiments, if the user interactions with the representations of the media items include playback of one of the media items multiple times, the media item can be maintained and similar media items can be added. If the user interactions with the representations of the media items include skipping a media item (especially, repeatedly skipping a media item), the media item can be removed. If the user interactions include like (or love) flagging a media item, the media item can be maintained and similar media items can be added. Similarly, if the user interactions include dislike (or hate) flagging a media item, the media item can be removed.

In some embodiments, the first set of media items is updated without a user manually adding and/or removing media items from the automatically-generated playlist. In some embodiments, a user is permitted to removed media items from the automatically-generated playlist, but is not permitted to add media items to the automatically-generated playlist. However, in some embodiments, a user can add and/or remove media items from a saved version (e.g., using the save affordance In various implementations, the number of the added media items and the number of the removed media items are selected such that a size of the first automatically-generated playlist is maintained within a playlist size range. The playlist size range can be, for example, a fixed number (e.g., 80 songs in FIG. 5CQ) or a range of numbers, e.g., between 75 and 90 songs. The playlist size range can be a range of a duration of playlist (e.g., a range of times) such that the amount of time to play back all the updated first set of media items is within a time window (e.g., between 3.5 and 4.5 hours).

In some implementations, the number of the added media items is fixed and the number of the removed media items is selected such that size of the first automatically-generated playlist is maintained within the playlist size range. In some implementations, the number of the added media items is equal to the number of the removed media items. In some implementations, the number of the added media items is greater or less than the number of the removed media items.

The representation of the updated first set of media items 596 includes new media item indicators 596A displayed in association with respective added media items. Each new media item indicator 596A can be, for example, a dot or icon displayed beside a corresponding representation of the added media item. In various implementations, the new media item indicators 596A can be substantially similar to a new message indicator used to indicate new messages in a messaging application (e.g., a mail application) of the portable multifunctional device 100.

FIG. 5CQ illustrates a touch 582Q detected at a location of a representation of one of the updated first set of media items 596.

FIG. 5CR illustrates the user interface 501 in response to detecting the touch 582Q at the location of the representation of the one of the updated first set of media items 596. The user interface 501 includes the playlist user interface 593 with the miniplayer user interface 550 displayed at the bottom of the display. In FIG. 5CR, the miniplayer user interface includes identifying text 515A for a fifth media item (e.g., the one of the updated first set of media items).

FIG. 5CR illustrates that the new media item indicators 596A do not include a new media item indicator for the fifth media item. Thus, in some implementations, the portable multifunctional device 100 ceases to display one of the new media item indicators in response to a user interaction with a corresponding media item.

FIG. 5CR illustrates a touch 582R detected at a location of the share affordance 595B.

FIG. 5CS illustrates the user interface 501 in response to a touch at the location of a share affordance of another user's device. The user interface 501 includes the playlist user interface 590. The playlist user interface includes a shared affordance 591B corresponding to a shared playlist from another user to the user of the portable multifunctional device 100. In various implementations, the shared playlist includes a set of media items that is different from the first set of media items or the updated first set of media items. In some implementations, the shared playlist is fixed (and includes a date at which it was fixed). In other implementations, the shared playlist is updated when the other user's playlist is updated.

FIG. 5CS illustrates a drag 582S detected at a location of the first automatically-generated playlist affordance 592A.

FIG. 5CT illustrates the user interface 501 in response to detecting the drag 582S at the location of the first automatically-generated playlist affordance 592A. The user interface 501 continues to the display the playlist user interface 590. In addition to the second automatically-generated playlist affordance 592B, a third automatically-generated playlist affordance 592C is at least partially displayed.

In various implementations, the multiple automatically-generated playlists are generated according to different playlist generation criteria (e.g., have different themes) and are updated according to different update criteria (e.g., on different days of the week).

FIGS. 6A-6E illustrate a flow diagram of a method 600 of playing back media items in accordance with some embodiments. The method 600 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to playback media items. The method reduces the cognitive burden on a user when playing back media items, thereby creating a more efficient human-machine interface. For battery-operated electronic devices, enabling a user to playback media items faster and more efficiently conserves power and increases the time between battery charges.

The device displays (602), on the display, a playback status indicator regarding playback of a media item. For example, in FIG. 5A, the device displays a pause-play affordance 521 (in a pause state) and identifying text 511 for a first media item indicating that the first media item is playing. As another example, in FIG. 5C, the device displays the pause-play affordance 521 (in a play state) and the identifying text 511 for the first media item indicating that the first media item is paused. As another example, in FIG. 5M, the device displays the pause-play affordance 521 (in a pause state) and identifying text 512 for a second media item indicating that the second media item is playing. As another example, in FIG. 5AK, the device displays a miniplayer user interface 550 including a pause-play affordance 521A and identifying text 513A for a third media item indicating that the third media item is playing.

The device displays (604), on the display, an image associated with the media item. For example, in FIG. 5A, the device displays an image 531 associated with the first media item.

The device detects (606) an input interacting with the image. In some embodiments, the device detects (608) a contact at the location of the image. The contact can be, for example, a touch or a tap at the location of the image. Thus, the image provides information to a user and also acts as an interactive affordance. This uses the space on the screen more efficiently, resulting in a more efficient human-machine interface (as a user need not manipulate the user interface to find affordances for performing the functions of interacting with the image). For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability. For example, in FIG. 5B, the device detects a touch 581A at the location of the image 531 associated with the first media item. As another example, in FIG. 5D, the device detects a touch 581B at the location of the image 531 associated with the first media item.

In some embodiments, the device detects (610) movement of a contact over the image. The movement of the contact over the image can be, for example, a drag or a swipe. For example, in FIG. 5J, the device detects a horizontal leftward swipe 581E over the image 531 associated with the first media item. As another example, in FIG. 5Y, the device detects a vertical upward swipe 581J over the image 533 associated with the third media item. As another example, in FIG. 5AH, the device detect a vertical downward swipe 581M over the image 533 associated with the third media item.

In some embodiments, the device detect (612) movement of a multi-touch contact over the image. The movement of the multi-touch contact over the image can be, for example, a multi-touch drag, a multi-touch swipe, a pinch or zoom, or a rotation. For example, in FIG. 5R, the device detects a vertical downward multi-touch drag 581G over the image 533 associated with the third media item. As another example, in FIG. 5T, the device detects a horizontal leftward multi-touch drag 581H over the image 533 associated with the third media item.

In response to a first portion of the input, the device adjusts (616) the appearance of the image on the display in accordance with the first portion of the input. By adjusting the appearance of the image on the display, additional visual information is provided to the user regarding the playback of media items. This visual information provides a more efficient human-machine interface. As noted above, a more efficient human-machine user interface conserves power and increases the time between battery charges and reduces the amount of user interaction with the device and reduces wear-and-tear of the device. In some embodiments, e.g., when the device detects movement of a contact over the image as in block 610, the device moves (618) the image on the display in accordance with the direction of the movement of the contact. For example, in FIG. 5K, the device moves the image 531 associated with the first media item to the left in accordance with a leftward swipe 581E. In some embodiments, the device starts to display (620) a second image associated with a second media item as the image is sliding off the display. For example, in FIG. 5L, the device displays the image 532 associated with the second media item as the image 531 associated with the first media item is sliding off the display.

As another example of the device moving the image in accordance with the direction of the movement of the contact, in FIG. 5Z, the device moves the image 533 associated with the third media item upward in accordance with an upward swipe 581J. In some embodiments, the device displays (622) related media items, related to the media item. In some embodiments, the device displays (624) media items in a queue to be played after the media item. For example, in FIG. 5AA, the device displays the queue pane 543 including a queue representation 543A that includes a plurality of elements respectively associated with one or more of the media items in the queue. In some embodiments, the device displays (626) suggested media items selected based on the media item. For example, in FIG. 5AB, the device displays the suggestions pane 544 including suggestion representations 544A displaying suggested media items selected based on the third media item. In some embodiments, the device displays (628) a lyrics toggle affordance for displaying lyrics of the media item. For example, in FIG. 5AC, the device displays the lyrics toggle affordance 542A. In FIG. 5AD, the device toggles display of the lyrics 642B of the third media item.

As noted above, in response to a first portion of the input, the device adjusts (616) the appearance of the image on the display in accordance with the first portion of the input. In some embodiments, e.g., when the device detects a contact at a location of the image as in block 608, the device changes (630) a size of the image on the display. For example, from FIG. 5B to FIG. 5C, the device reduces the size of the image 531 associated with the first media item. As another example, from FIG. 5D to FIG. 5E, the device increases the size of the image 531 associated with the first media item. In some embodiments, the device toggles (632) display of a border around the image (or gradually changes a virtual z height of the image and adjusts a depth effect such as a virtual shadow as the virtual z height of the image is changed). For example, from FIG. 5B to FIG. 5C, the device ceases display of the border 531A around the image 531 associated with the first media item. As another example, from FIG. 5D to FIG. 5E, the device resumes displaying the borer 531A around the image 531 associated with the first media item.

In some embodiments, e.g., when the device detects movement of a multi-touch contact over the image as in block 612, the device changes (634) a shape of the image on the display (or applies a virtual tilting effect tilting the image around an axis that is parallel to the display, so that a portion of the image is higher in a virtual z direction and a portion of the image is lower in the virtual z direction when the image is tilted). In some embodiments, the device skews (636) the image on the display. For example, from FIG. 5R to FIG. 5S, the device skews the image 533 associated with the third media item such that it appears to tilt downward. As another example, from FIG. 5T to FIG. 5V, the device skews the image 533 associated with the third media item such that it appears to tilt rightward. In some embodiments, a magnitude of the change in the shape of the image is (638) proportional to a magnitude of the movement of the multi-touch contact. For example, in FIG. 5V, the magnitude of the movement of the multi-touch drag 581H is greater than the movement of the multi-touch drag 581H in FIG. 5U. Thus, the magnitude of the change in the shape of the image 533 associated with the third media item is greater in FIG. 5V than in FIG. 5U.

In response to a second portion of the input, the device changes (640) playback of media items on the device in accordance with a second portion of the input. Thus, the image provides information to a user regarding a media item that is being played back and also acts as an affordance for changing the playback of the media item. This uses the space on the screen more efficiently, resulting in a more efficient human-machine interface (as a user need not manipulate the user interface to find affordances for performing the functions of interacting with the image). As noted above, a more efficient human-machine user interface conserves power and increases the time between battery charges and reduces the amount of user interaction with the device and reduces wear-and-tear of the device. In some embodiments, e.g., when the device detects movement of a contact over the image as in block 610, the device starts playback (642) of a second media item. For example, in FIG. 5M, the device starts playback of the second media item, identifying by the identifying text 512 for the second media item and associated with the image 532 associated with the second media item. In some embodiments, in accordance with a determination that movement of the contact is in a first direction, the device selects (644) a prior media item in a queue as the second media item and, in accordance with a determination that the movement of the contact is in a second direction, the device selects a next media item in a queue as the second media item. For example, in FIG. 5M, the device starts playback of the second media item in accordance with a determination that the swipe 581E is to the left. In some embodiments, the device starts playback of the second media item by crossfading (646) between the media item and the second media item.

In some embodiments, e.g., when the device detects a contact at the location of the image as in block 608, the device pauses (648) or resumes (650) playback of the media item. For example, from FIG. 5B to FIG. 5C, the device pauses playback of the first media item (as indicated by the change in the pause-play affordance 521). As another example, from FIG. 5D to FIG. 5E, the device resumes playback of the first media item (as indicated by the change in the pause-play affordance 521).

In some embodiments, e.g., when the device detects movement of a multi-touch contact over the image as in block 612, the device changes (652) a non-binary characteristic of the playback of the media item. For example, from FIG. 5R to 5S, the device changes (decreases) the volume of the playback of the media item, as indicated by the volume affordance 524 moving from its original location 524A. As another example, from FIG. 5T to 5V, the device changes (increases) the playback time of the playback of the third media item, as indicated by the scrubbing affordance 525 moving from its original location.

In some embodiments, in accordance with a determination that the movement of the multi-touch contact is along a first axis, the device changes (654) a first non-binary playback characteristic and, in accordance with a determination that the movement of the multi-touch contact is along a second axis, the device changes a second non-binary playback characteristic. Thus a user can change either a first non-binary playback characteristic or a second non-binary characteristic by interacting with a single affordance. A single affordance that can perform multiple functions uses the space on the screen more efficiently, conversing power and increasing the time between battery charges, reducing the amount of user interaction with the device and corresponding wear-and-tear of the device, and providing the same usability with a smaller (and less expensive) screen. For example, in FIG. 5S, in accordance with a determination that the multi-touch drag 581G is along a vertical axis, the device changes the volume of the playback of the third media item and, in FIG. 5U, in accordance with a determination that the multi-touch drag 581H is along a horizontal axis, the device changes the playback time of the playback of the third media item.

In some embodiments, a magnitude of the change of the non-binary playback characteristic is (656) proportional to a magnitude of the movement of the multi-touch contact. For example, in FIG. 5V, the magnitude of the movement of the multi-touch drag 581H is greater than the movement of the multi-touch drag 581H in FIG. 5U. Thus, the magnitude of the change in the playback time of the playback of the third media item is greater in FIG. 5V than in FIG. 5U.

In some embodiments, the device displays (658), on the display, a pause-play affordance. For example, in FIG. 5E, the device display a pause-play affordance 521 in a pause state. As another example, in FIG. 5G, the device displays a pause-play affordance 521 in a play state. As another example, in FIG. 5AK, the device display a miniplayer user interface 550 including a pause-play affordance 521A. In some embodiments, the device detects (660) a pause-play input interacting with the pause-play affordance. For example, in FIG. 5F, the device detects a touch 581C at a location of the pause-play affordance 521 while the pause-play affordance 521 is in a pause state. As another example, in FIG. 5H, the device detects a touch 581D at a location of the pause-play affordance 521 while the pause-play affordance 521 in a play state. In some embodiments, in response to a first portion of the pause-play input, the device changes (662) a size of the image on the display. For example, from FIG. 5F to FIG. 5G, the device reduces the size of the image 531 associated with the first media item. As another example, from FIG. 5H to FIG. 5I, the device increases the size of the image 531 associated with the first media item. In some embodiments, in response to a second portion of the pause-play input, the device switches (664) between pausing and playback of the media item. For example, from FIG. 5F to FIG. 5G, the device switches from playing back to pausing the first media item, as indicated by the play-pause affordance 521 switching from a pause state to a play state. As another example, from FIG. 5H to FIG. 5I, the device switches from pausing to playing back the first media item, as indicated by the play-pause affordance 521 switched from a play state to a pause state.

In some embodiments, the device displays (666), on the display, one or more skip affordances. For example, in FIG. 5M, the device displays a reverse affordance 522 and a forward affordance 523. In some embodiments, the device detects (668) a skip input interacting with one of the one or more skip affordances. For example, in FIG. 5N, the device detects a touch 581F at a location of the forward affordance 523. In some embodiments, in response to a first portion of the skip input, the device moves (670) the image on the display in accordance with one of the one or more skip affordances. By adjusting the location of the image on the display, additional visual information is provided to the user regarding the playback of media items. Further, this movement of image on the display provides an indication to the user that the image itself can be manipulated to achieve a similar effect and increases the likelihood that the user will manipulate the user interface in an efficient manner, conserving power and increases the time between battery charges and reducing wear-and-tear of the device. For example, in FIG. 5O and FIG. 5P, the device moves the image 532 associated with the second media item to the left in accordance with detection of the touch 581F at the location of the forward affordance 523. As another example, the device can move the image 532 associated with the second media item to the right in accordance with detection of a touch at the location of the reverse affordance 522. In some embodiments, in response to a second portion of the skip input, the device starts playback (672) of a second media item in accordance with the one of the one or more skip affordances. For example, in FIG. 5Q, the device starts playback of the third media item, as indicated by the identifying text 513 for the third media item, in accordance with detection of the touch 581F at the location of the forward affordance 523. As another example, the device can start playback of the first media item in accordance with detection of a touch at the location of the reverse affordance 522.

In some embodiments, the device displays (674), on the display, a scrubbing affordance. For example, in FIG. 5W, the device displays the scrubbing affordance 525. In some embodiments, the device detects (676) a scrubbing input interacting with the scrubbing affordance 525. For example, in FIG. 5W, the device detects a drag 581I beginning at a location of the scrubbing affordance 525. In some embodiments, in response to a first portion of the skip input, the device reduces (678) a size of the image on the display. For example, in from FIG. 5W to FIG. 5X, the device reduces the size of the image 533 associated with the third media item. In some embodiments, the device changes (680) display of the scrubbing affordance to a waveform indicative of the magnitude of the audio of the media item at various playback times. For example, from FIG. 5W to FIG. 5X, the device changes display of the scrubbing affordance 525 to include a scrubbing waveform 525B indicative of the magnitude of the audio of the third media item at various playback times. In some embodiments, the device displays (682) scrubbing speed information in a display area previous occupied by the image. For example, in FIG. 5X, the device displays scrubbing speed information 525C in a display area previously occupied (e.g., in FIG. 5W) by the image 533 associated with the third media item. In some embodiments, in response to a second portion of the scrubbing input, the device changes (684) a playback time of the playback of the media item.

In some embodiments, e.g., when the device detects movement of a contact over the image as in block 610, in accordance with a determination that the movement of the contact over the image is in a first direction, the device displays (686) a miniplayer user interface, the miniplayer user interface including a reduced-sized version of the image and, in accordance with a determination that movement of the contact over the image is in a second direction, the device displays related media items. For example, in FIG. 5AI, in accordance with a determination that the swipe 581M is in a downward direction, the device displays the miniplayer user interface 550. The miniplayer user interface 550 includes a reduced-size version of the image 533B associated with the third media item. And, in FIG. 5Z, in accordance with a determination that the swipe 581J is in an upward direction, the device displays related media items (e.g., media items in a queue in FIG. 5AA or suggested media items in FIG. 5AB).

In some embodiments, e.g., when the device detects movement of a contact over the image as in block 610, in accordance with a determination that movement of the contact over the image is along a first axis, the device displays (688) a miniplayer user interface, the miniplayer user interface including a reduced-sized version of the image and, in accordance with a determination that movement of the contact over the image is along a second axis, the device starts playback of a second media item. For example, in FIG. 5AI, in accordance with a determination that the swipe 581M is in along a vertical axis, the device displays the miniplayer user interface 550. The miniplayer user interface 550 includes a reduced-size version of the image 533B associated with the third media item. And, in FIG. 5L, in accordance with a determination that the swipe 581E is along a horizontal axis, the device starts playback of the second media item (as indicated in FIG. 5L including identifying text 512 for the second media item).

In some embodiments, the device detects (690) a miniplayer input interacting with the miniplayer user interface. For example, in FIG. 5AL, the device detects a touch 581N at a location of the miniplayer user interface 550. In some embodiments, the device displays (692) a full-sized version of the image in response to detecting the miniplayer input. For example, in FIG. 5AP, the device displays the image 533 associated with the third media item. In some embodiments, the device displays (694) an animation temporarily including a lyrics toggle affordance in response to detecting the miniplayer input. For example, FIGS. 5AL-5AP illustrate an animation temporarily including a lyrics toggle affordance 542A (in FIG. 5AO).

Figure 6A:
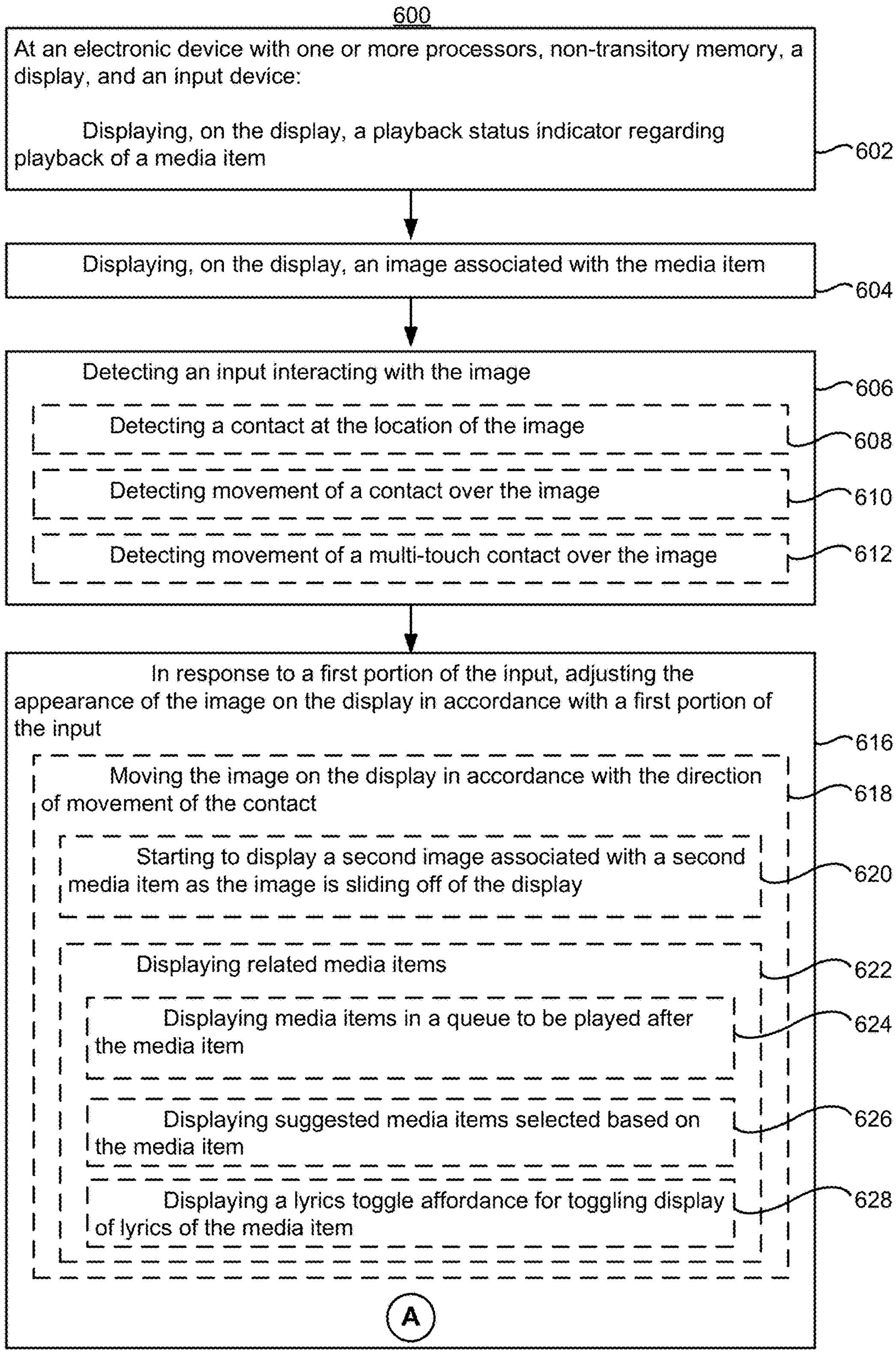
FIGS. 6A-6E are flow diagrams illustrating a method of playing back media items in accordance with some embodiments.
Figure 6B:
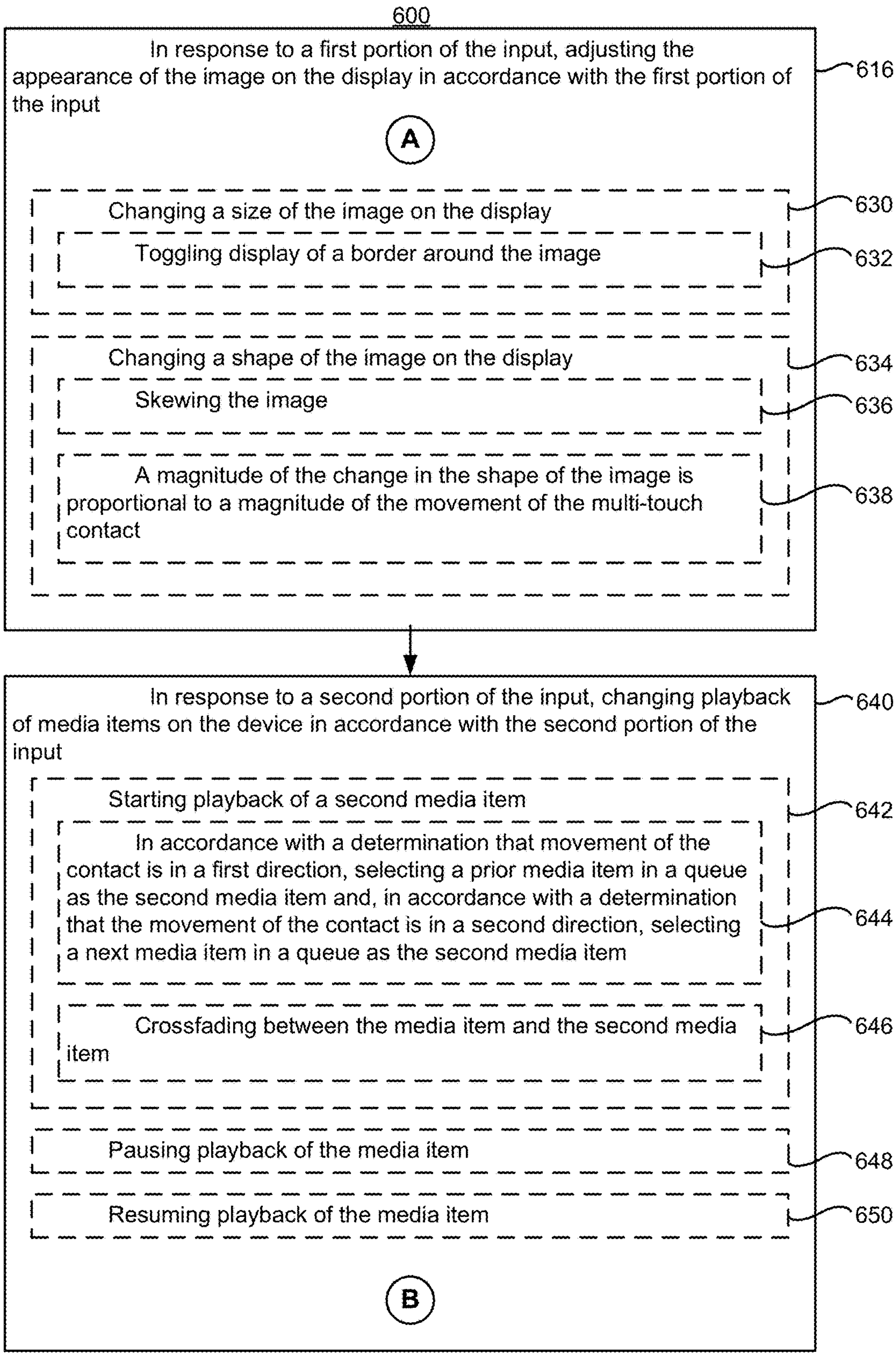
Figure 6C:
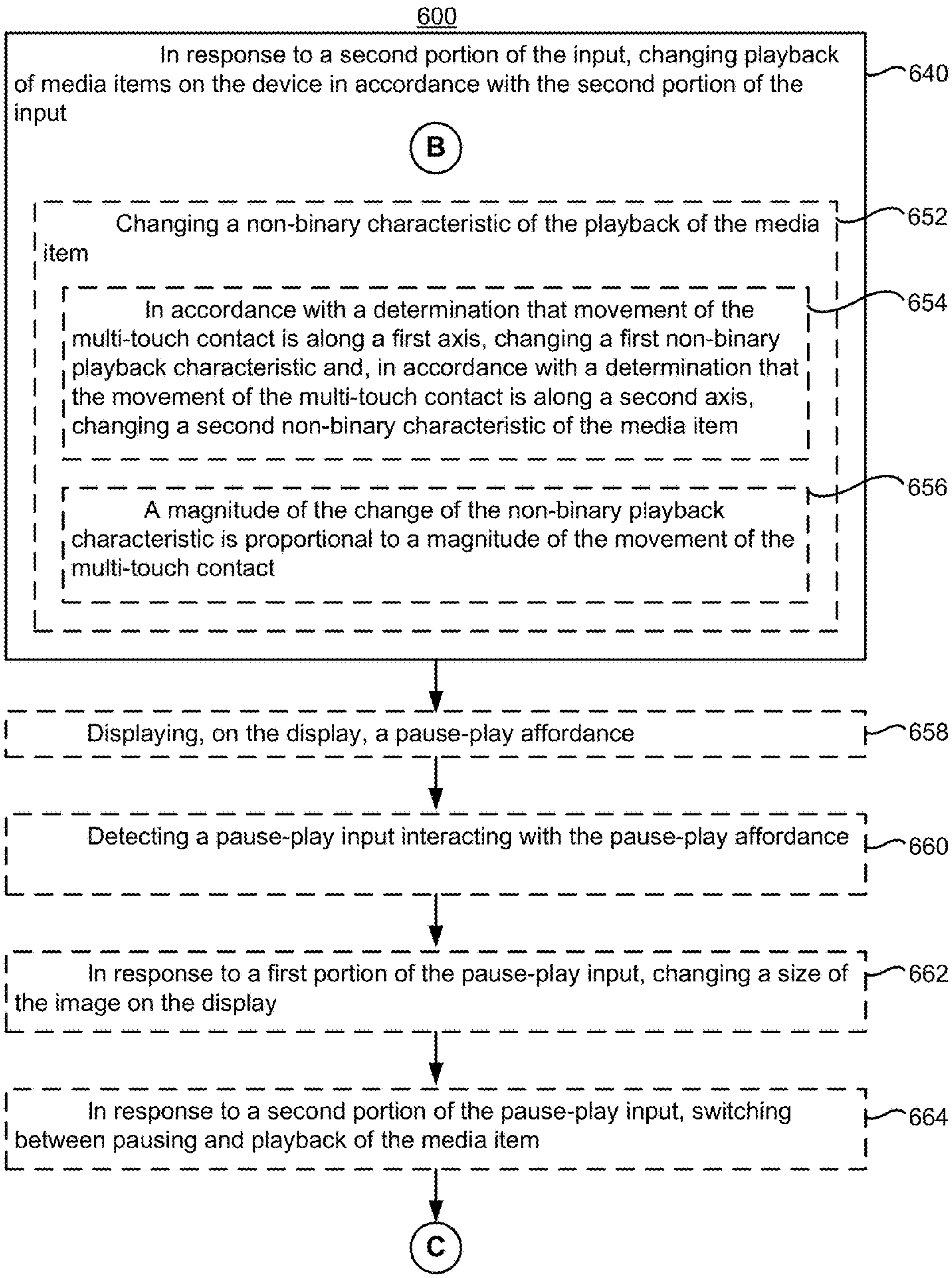
Figure 6D:
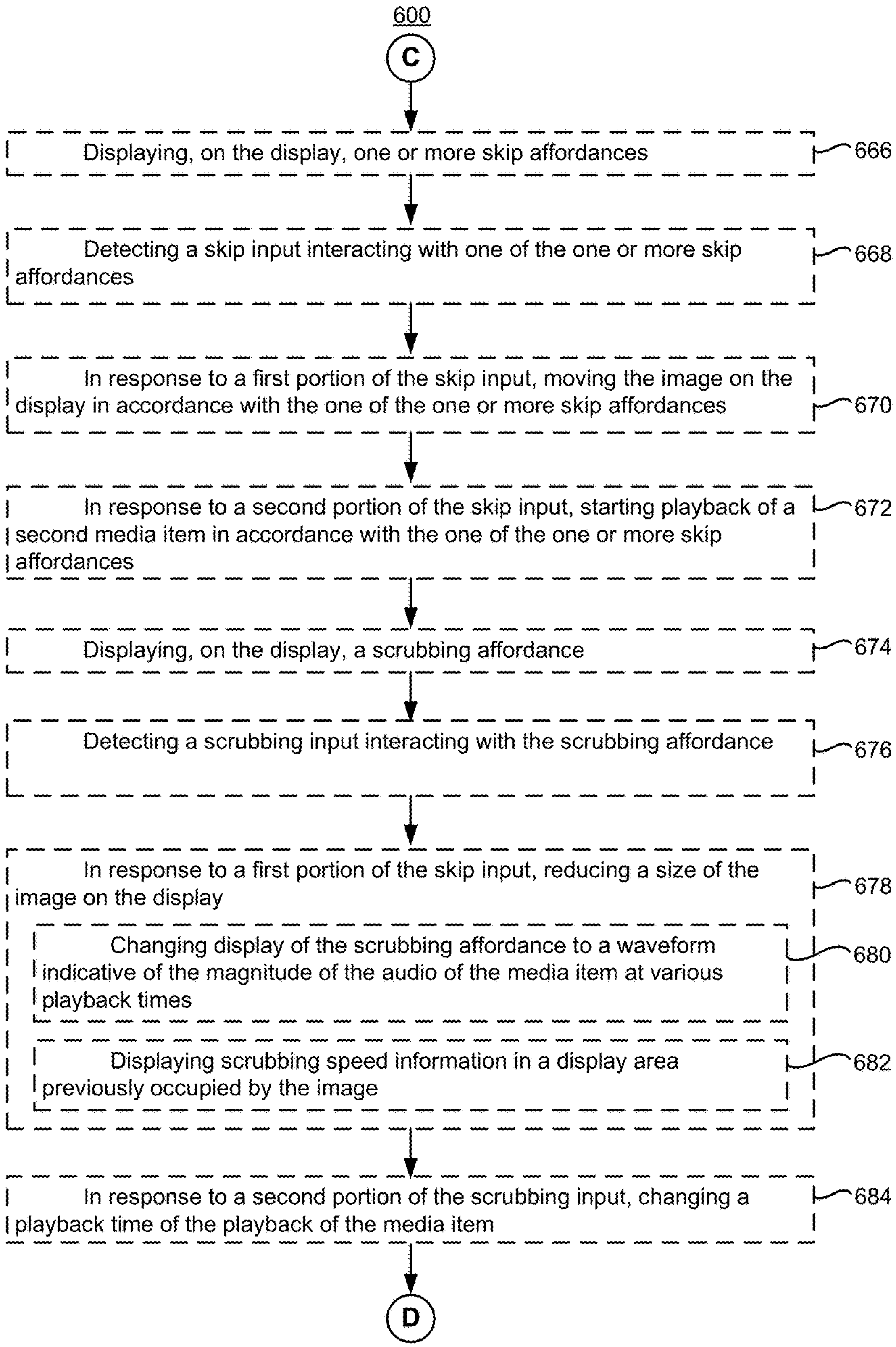
Figure 6E:
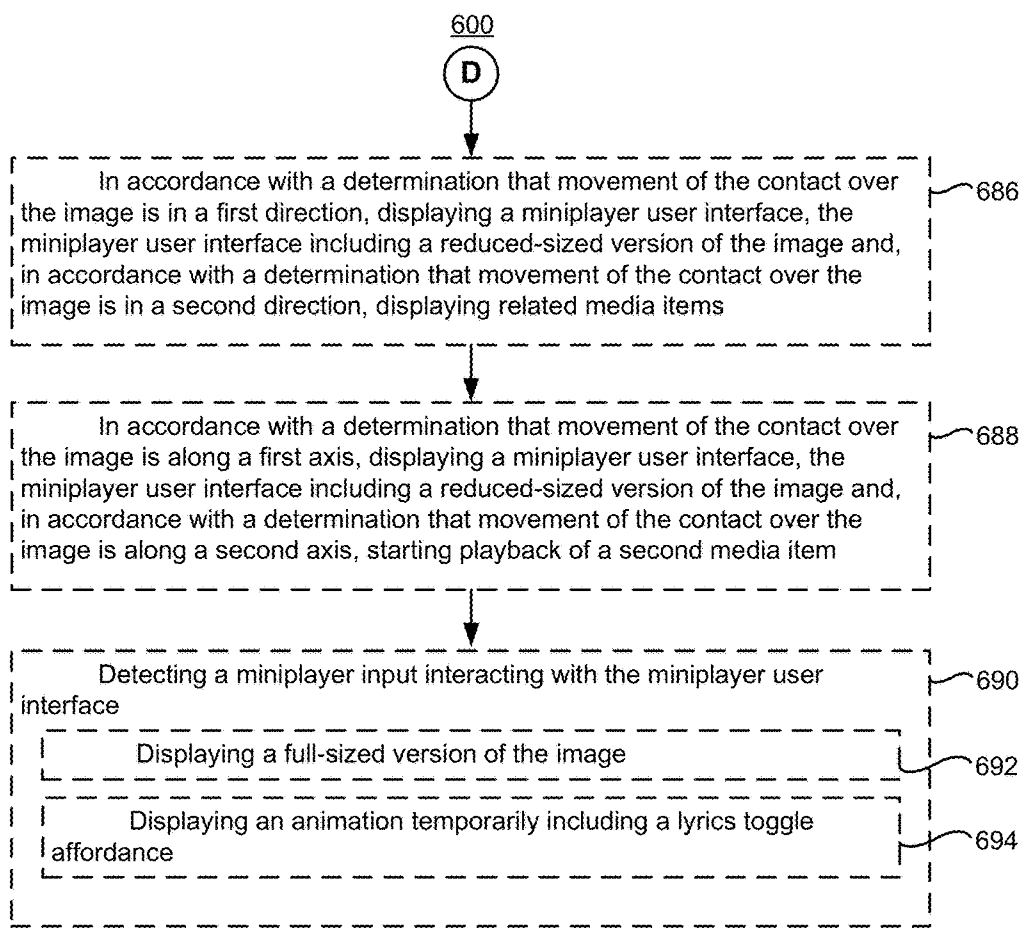
Figure 7A:
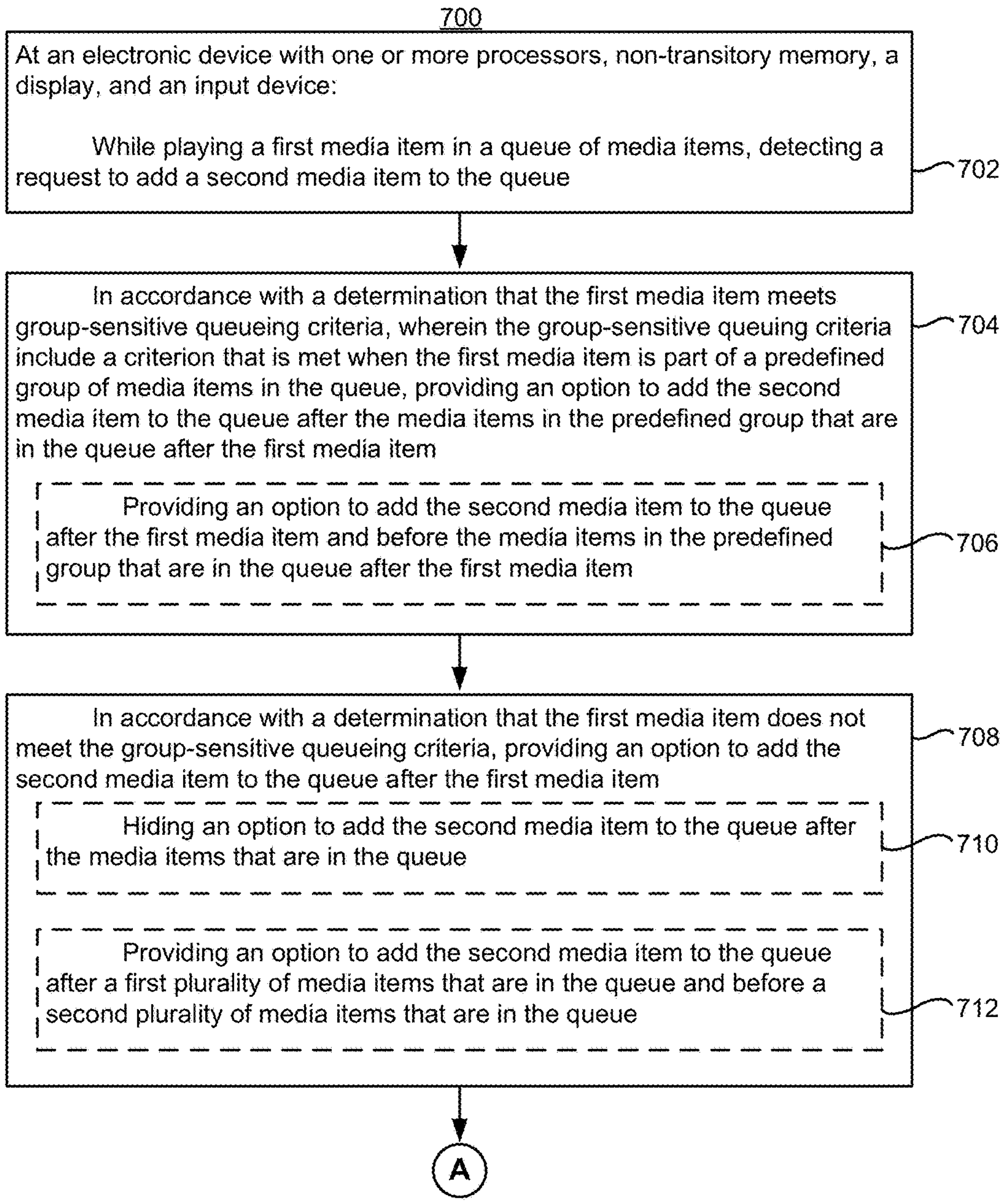
Figure 8A:
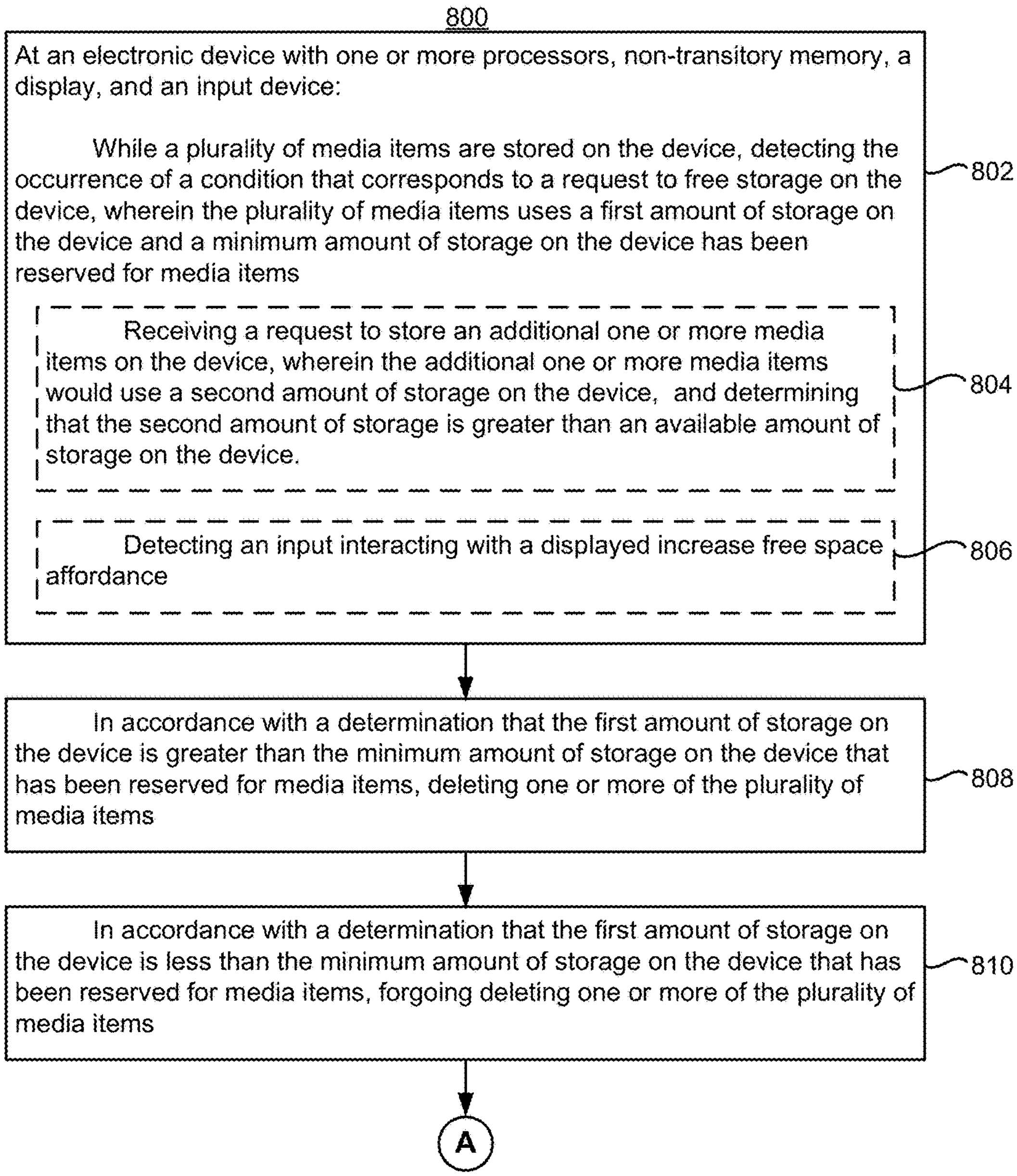
FIGS. 8A-8D are flow diagrams illustrating a method of managing storage of media items in accordance with some embodiments.
Figure 8B:
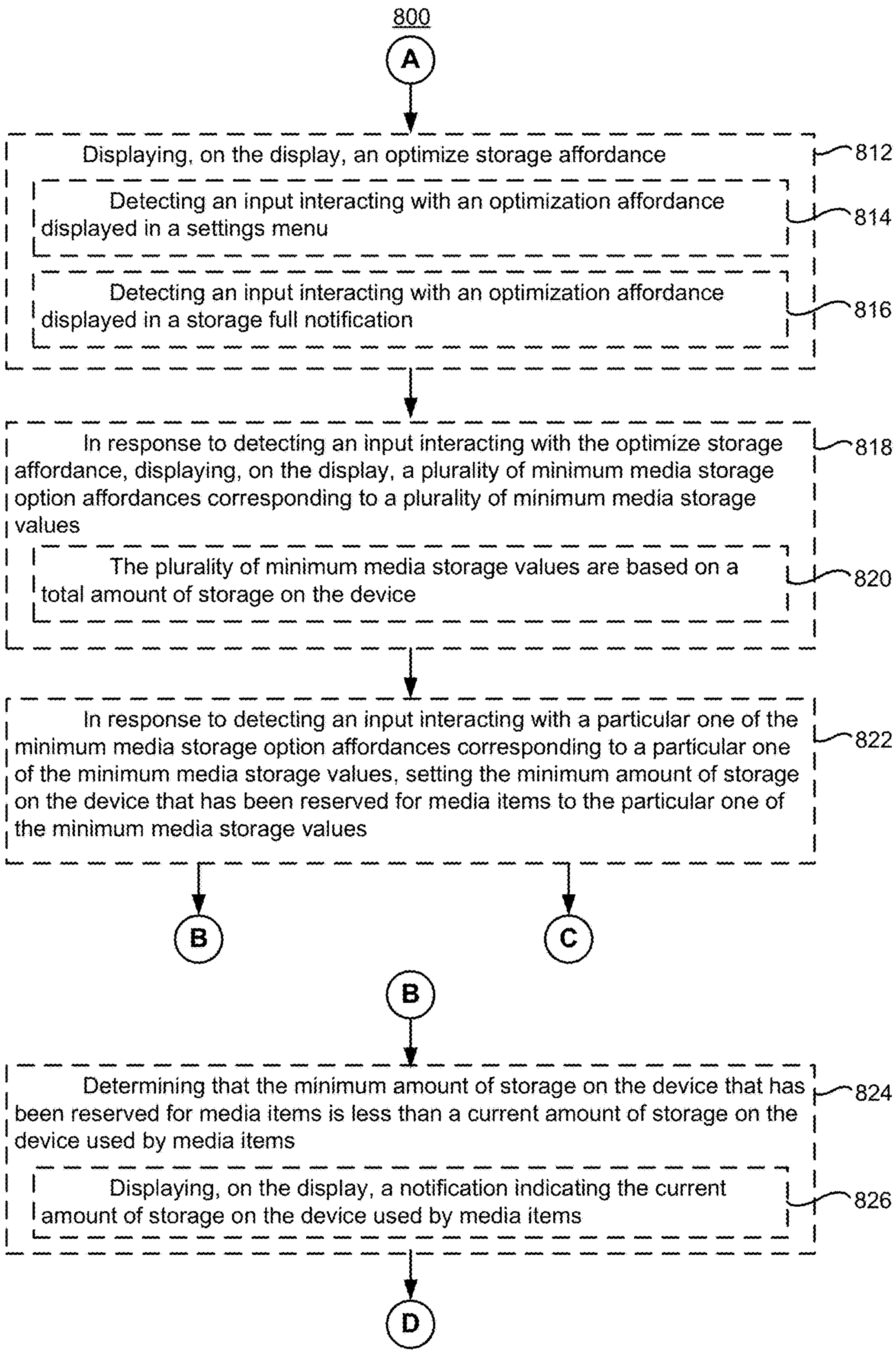
Figure 8C:
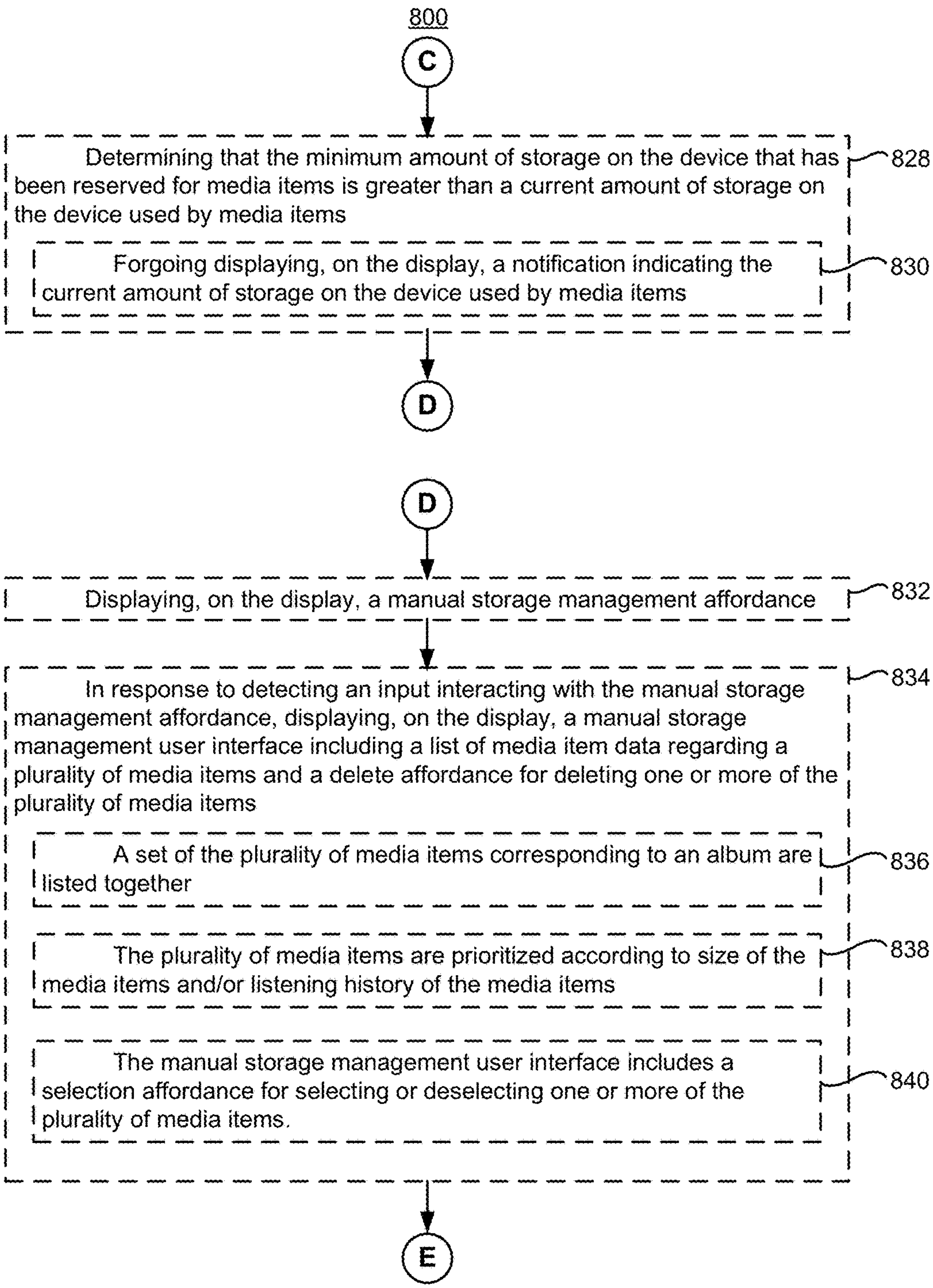
Figure 8D:
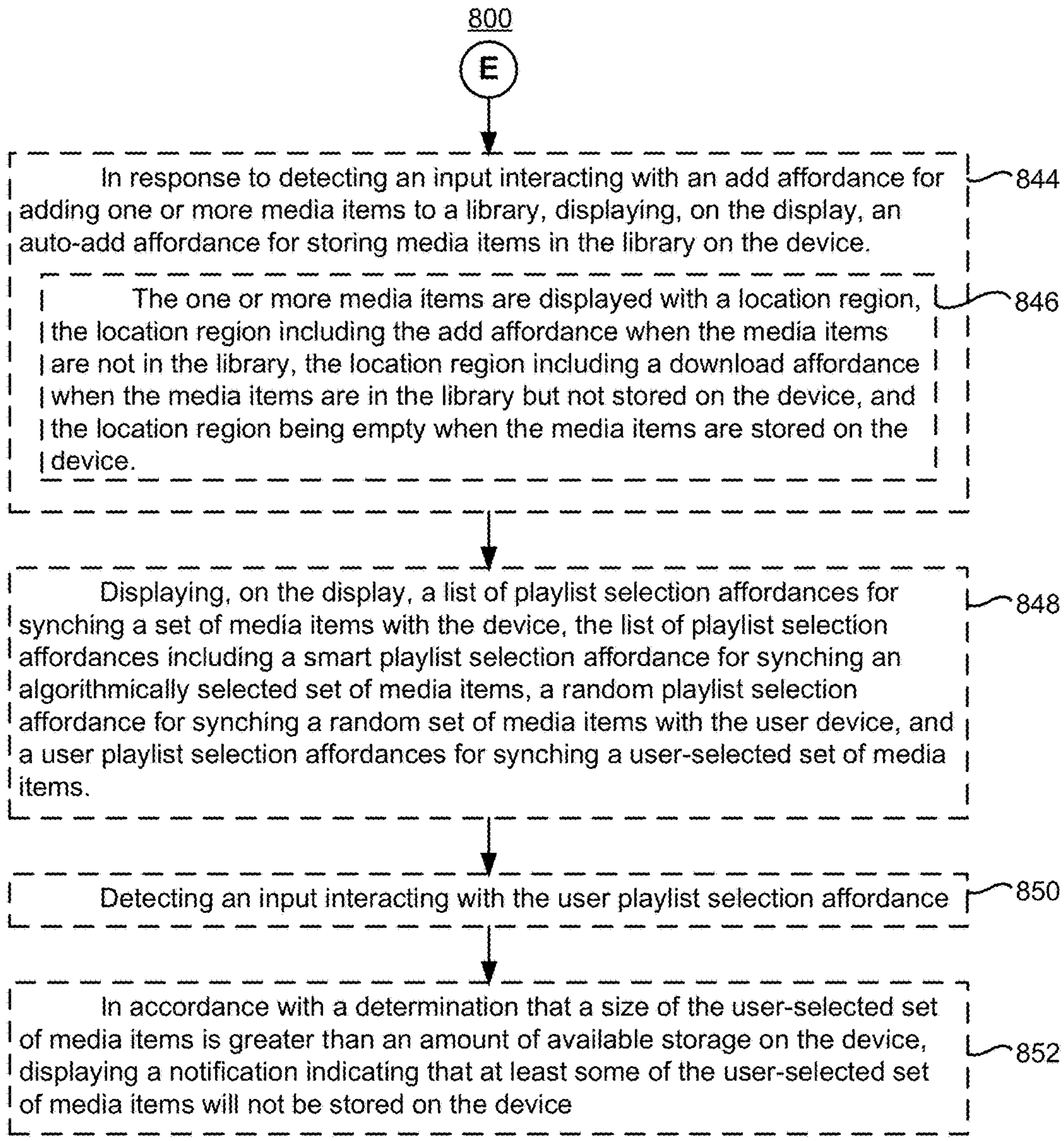
Figure 9A:
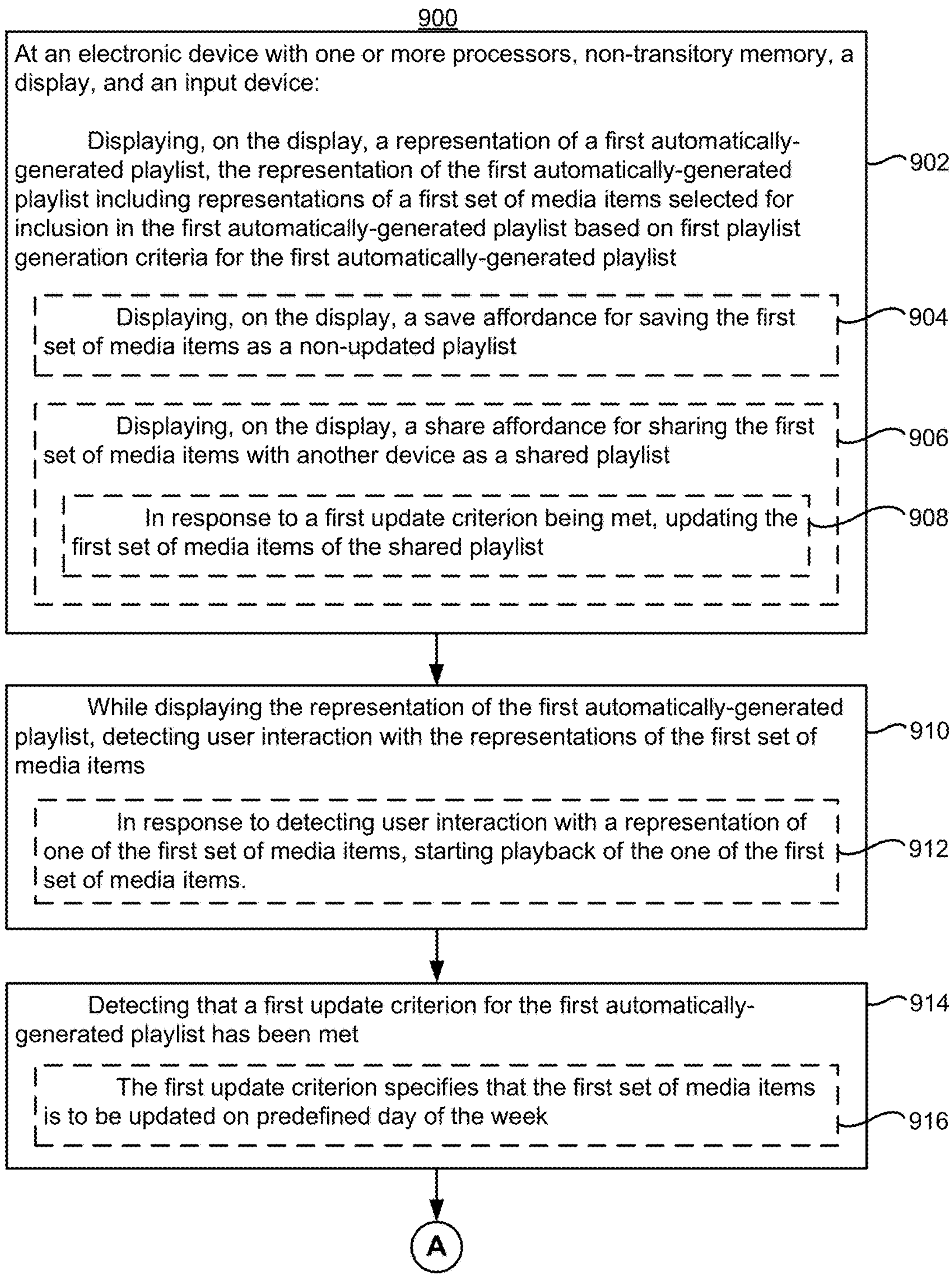
Figure 9B:
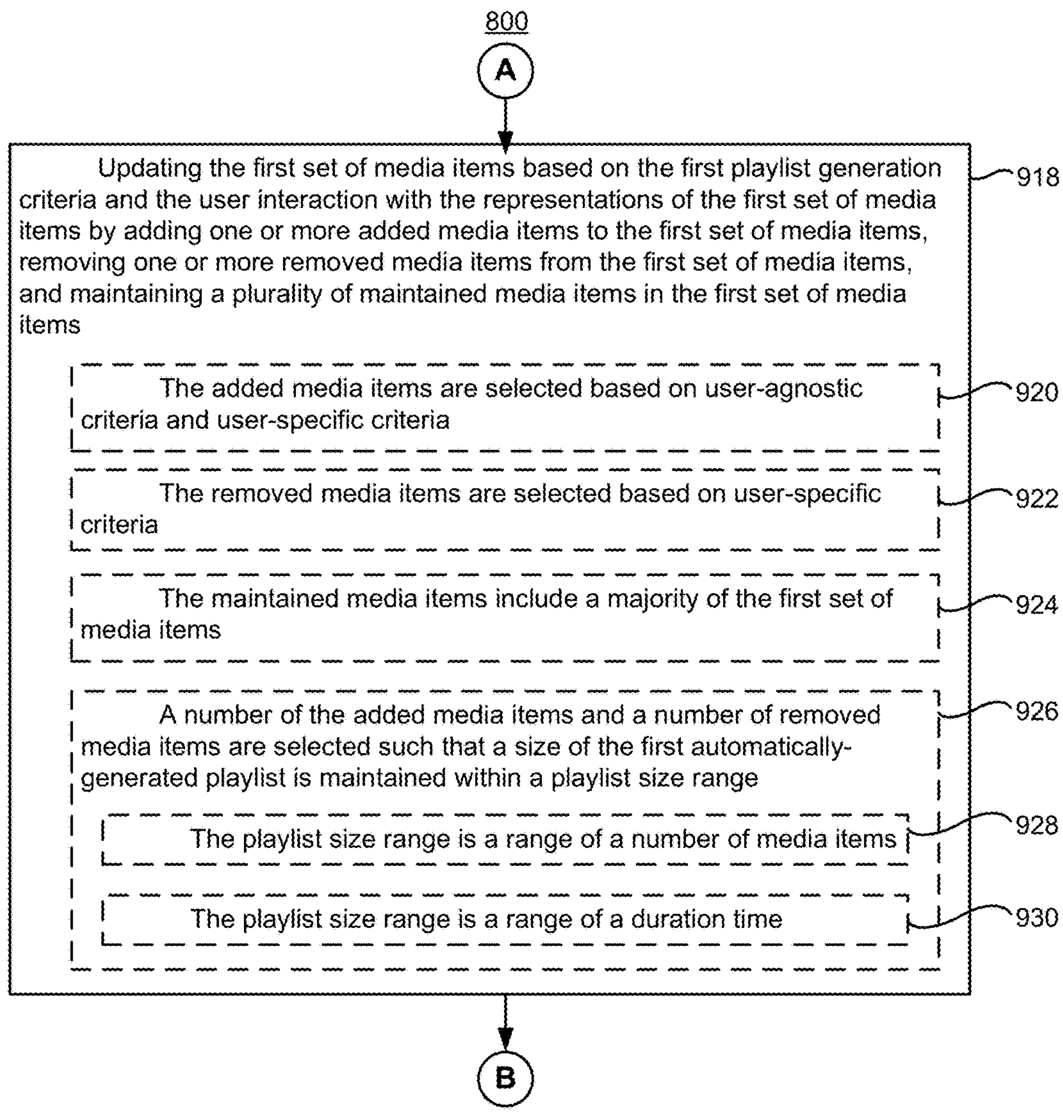
Figure 9C:
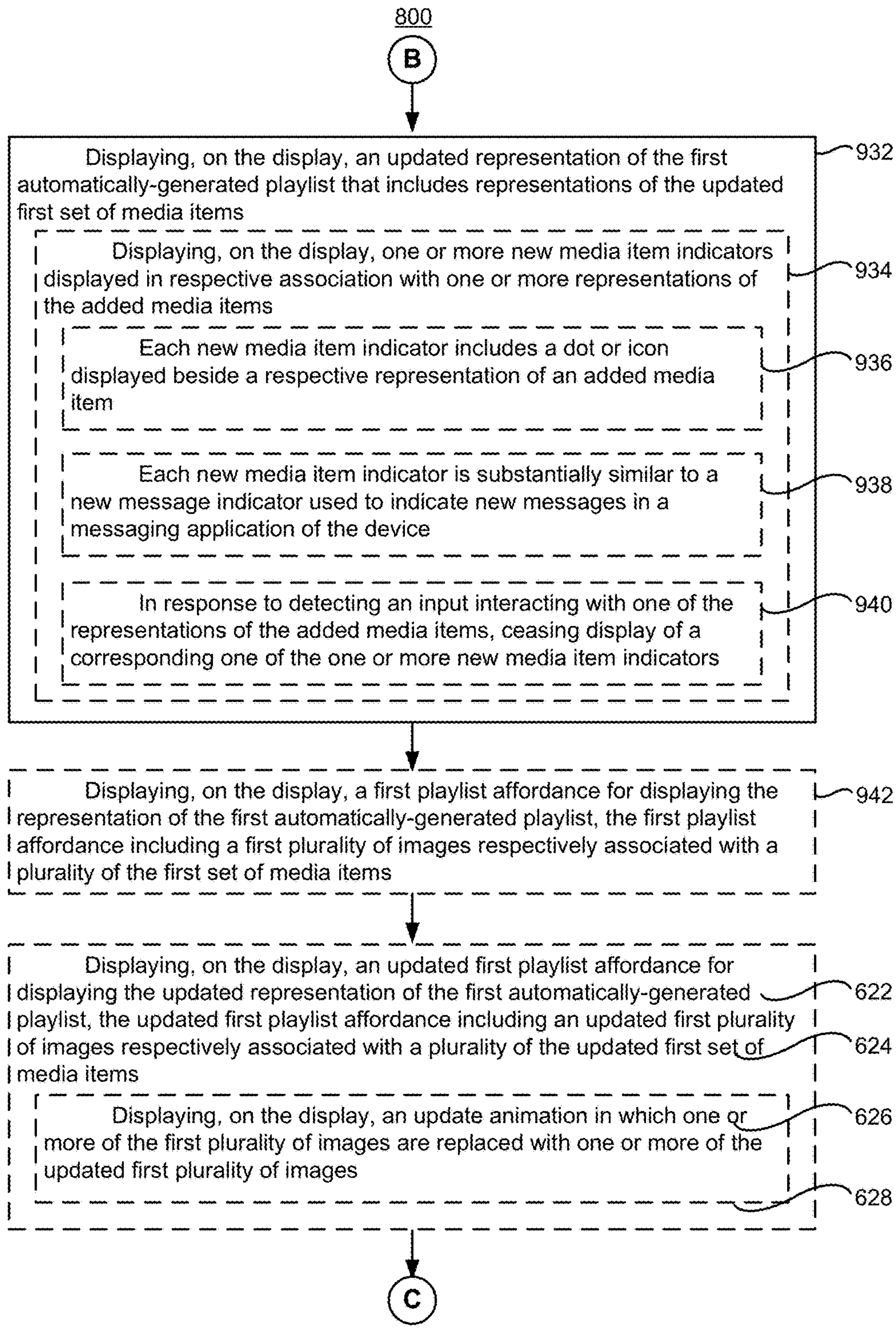

It should be understood that the particular order in which the operations in FIGS. 6A-6AE have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6E. For example, the inputs, affordances, and user interface responses described above with reference to method 600 optionally have one or more of the characteristics of the media items, playback controls, and user interfaces described herein with reference to other methods described herein (e.g., methods 700, 800, and 900). For brevity, these details are not repeated here.

FIGS. 7A-7B illustrate a flow diagram of a method 700 of queuing a media item in accordance with some embodiments. The method 700 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to queue a media item. The method reduces the cognitive burden on a user when queuing a media item, thereby creating a more efficient human-machine interface. For battery-operated electronic devices, enabling a user to queue a media item faster and more efficiently conserves power and increases the time between battery charges.

While playing a first media item in a queue of media items, the device detects (702) a request to add a second media item to the queue. For example, in FIG. 5AS, the device detects a touch 581A at the location of a queuing affordance 561A. As another example, in FIG. 5BC, the device detects a touch 581T at the location of the queuing affordance 561A.

In accordance with a determination that the first media item meets group-sensitive queuing criteria, wherein the group-sensitive queuing criteria include a criterion that is met when the first media item is part of a predefined group of media items in the queue, the device provides (704) an option to add the second media item to the queue after the media items in the predefined group that are in the queue after the first media item. Thus, a user can add a media item to a queue after an album or playlist has completed without returning to interact with the device once the album or playlist has finished (or is on the final item), reducing user interaction with the device, which conserves power and increasing the time between battery charges and reduces wear-and-tear of the device. For example, in FIG. 5AT, the device displays a play after affordance 562B. In FIG. 5AZ, the device detects a touch 581R at a location of the play after affordance 5622. In FIG. 5BA, the device displays a queue representation 543A indicating that the selected media item is added to the queue after the rest of the media items in the playlist.

In some embodiments, in accordance with a determination that the first media item meets the group-sensitive queuing criteria, the device provides (706) an option to add the second media item to the queue after the first media item and before the media items in the predefined group that are in the queue after the first media item. For example, in FIG. 5AT, the device displays a play next affordance 562A. In FIG. 5AW, the device detects a touch 581Q at a location of the play next affordance 562A. In FIG. 5AX, the device displays a queue representation 543A indicating that the selected media item is added to the queue after the first media item and before the rest of the media items in the playlist.

In accordance with a determination that the first media item does not meet the group-sensitive queuing criteria, the device provides (708) an option to add the second media item to the queue after the first media item (and before the other media items in the queue). For example, in FIG. 5AU, the device displays a play next affordance 562A.

In some embodiments, in accordance with the determination that the first media item does not meet the group-sensitive queuing criteria, the device hides (710) an option to add the second media item to the queue after the media items that are in the queue. For example, in FIG. 5AU, the device does not display a play after affordance 562B (as shown in, for example, FIG. 5AT).

In some embodiments, in accordance with the determination that the first media item does not meet the group-sensitive queuing criteria, the device provides (712) an option to add the second media item to the queue after a first plurality of media items that are in the queue and before a second plurality of media items that are in the queue. Thus, even when a playlist is large, a user can add a media item to a queue after a significant amount of time has passed without returning to interact with the device, reducing user interaction with the device, which conserves power and increasing the time between battery charges and reduces wear-and-tear of the device. For example, in FIG. 5AV, the device displays a play later affordance 562C which adds the selected media item to the queue after a set number of media items (e.g., 5 media items or, in some embodiments, 20 songs), and before other media items in the queue.

In some embodiments, the device displays (714) a list including a plurality of elements respectively associated with one or more of the media items in the queue. For example, in FIG. 5AX, the device displays a queue representation 543A with each element associated with one of the media items in the queue. As another example, in FIG. 5AY, the device displays the queue representation with one element associated with multiple media items in the queue (e.g., the rest of the playlist).

In some embodiments, each of the plurality of elements includes (716) an icon and identifying text respectively associated with the one or more of the media items in the queue. For example, in FIG. 5AX, the device displays a queue representation 543A with a plurality of elements including a mini-image and identifying text indicative of respective media items.

In some embodiments, the plurality of elements includes (718) a first element associated with all of the other media items in the predefined group that are in the queue after the first media item and a second element associated with the second media item. For example, in FIG. 5AY, the device displays a queue representation 543A with a first element associated with the rest of the playlist and a second element (above the first element) associated with the media item just added to the queue.

In some embodiments, the plurality of elements includes (720) a first set of elements associated with all of the other media items in the predefined group that are in the queue after the first media item and a second set of elements associated with the second media item, wherein the first set of elements and the second set of elements are visually separated on the display. For example, in FIG. 5AY, the device displays a queue representation 543A with a first element associated with the rest of the playlist (e.g., a set of one element associated with all of the other media items in the predefined group that are in the queue after the first media item) and a second element associated with the media item just added to the queue (e.g., a set of one element associated with the second media item). In FIG. 5AY, the device displays a banner 543B visually separating the first set of elements and the second set of elements.

In some embodiments, the device displays (722) the list in response to an input interacting with an image associated with the first media item. For example, in FIG. 5Y, the device detects a swipe 581J over the image 533 associated with the third media item. In response, in FIG. 5AB, the device displays a queue representation 543A.

In some embodiments, the device detects (724) an ordering input dragging one of the plurality of elements and changes an order of the media items in the queue in accordance with the ordering input. For example, in FIG. 5BK, the device detects a drag 581X and, in FIG. 5BL, displays a queue representation 543A in which the final media item of the queue has been moved to the top of the queue. As another example, in FIG. 5BM, the device detects a drag 581X and, in FIG. 5BN, displays a queue representation in which the rest of the playlist is moved to the middle of the queue.

In some embodiments, the device detects (726) a removing input swiping one of the plurality of elements and removes one or more of the media items in the queue in accordance with the removing input. For example, in FIG. 5130, the device detects a swipe 581Z and, in FIG. 5BQ, displays a queue representation 543A in which a media item associated with the swipe 581Z has been removed from the queue.

In some embodiments, the device disables (728) a non-linear playback function in response to the second media item being added to the queue. Thus, a user need not manually disable any active non-linear playback functions, reducing interaction with the device, thereby conserving power and increasing the time between battery charges and reducing wear-and-tear of the device. For example, in FIG. 5BB, the repeat affordance 551 indicates that the repeat setting is set to an off setting and the shuffle affordance 552 indicates that the shuffle setting is set to an off setting. In some embodiments, the device enables (730) the non-linear playback function in response to the playing the second media item. For example, in FIG. 5BR, the repeat affordance 551 indicates that the repeat setting is set to an on setting and the shuffle affordance 552 indicates that the shuffle setting is set to an on setting.

It should be understood that the particular order in which the operations in FIGS. 7A-7B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1000) are also applicable in an analogous manner to method 700 described above with respect to FIGS. 7A-7B. For example, the inputs, affordances, and user interface responses described above with reference to method 700 optionally have one or more of the characteristics of the media items, playback controls, and user interfaces described herein with reference to other methods described herein (e.g., methods 700, 900, and 1000). For brevity, these details are not repeated here.

FIGS. 8A-8D illustrate a flow diagram of a method 800 of managing storage of media items in accordance with some embodiments. The method 800 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to managing storage of media items. The method reduces the cognitive burden on a user when managing storage of media items, thereby creating a more efficient human-machine interface. For battery-operated electronic devices, enabling a user to manage storage of media items faster and more efficiently conserves power and increases the time between battery charges.

While a plurality of media items are stored on the device, the device detects (802) the occurrence of a condition that corresponds to a request to free storage on the device, wherein the plurality of media items uses a first amount of storage on the device and a minimum amount of storage on the device has been reserved for media items. Thus, a user can reduce the amount of storage of the device used by media items while retaining at least a threshold amount of media items on the device. With less data stored on the storage device, memory reads are faster and more storage is available for use as virtual processor cache, speeding up other operations. Further, by storing less data at the storage location, fewer or smaller (and less expensive) storage devices of the device (e.g., within the device, coupled to the device, or at a cloud storage facility) are needed by the user. In some embodiments, the device detects the occurrence of the condition when the device receives (804) a request to store an additional one or more media items on the device, wherein the additional one or more media items would user a second amount of storage on the device, and the device determines that the second amount of storage is greater than an available amount of storage on the device. For example, in FIG. 5BT, the device detects a touch 582C at a location of a download affordance 571B for downloading an album and determines that the amount of available storage is less than the size of the album, as shown by the insufficient storage window 564 in FIG. 5BW. In some embodiments, the device detects the occurrence of the condition when the device detects (806) an input interacting with a displayed increase free space affordance. For example, in FIG. 5BW, the device detects a touch 582J at a location of an optimize storage affordance 564A.

In accordance with a determination that the first amount of storage on the device is greater than the minimum amount of storage on the device that has been reserved for media items, the device deletes (808) one or more of the plurality of media items. For example, in FIG. 5CB, the device displays a media deletion warning 575C indicating that files may be deleted. Accordingly, a user is warned that media items may be deleted before they are removed from the device, reducing the likelihood that a user would need to add media items back the device with additional interaction with the device. Reducing interaction with the device conserves and increases the time between battery charges and reduces wear-and-tear of the device.

In accordance with a determination that the first amount of storage on the device is less than the minimum amount of storage on the device that has been reserved for media items, the device forgoes deleting (810) one or more of the plurality of media items.

In some embodiments, the device displays (812), on the display, an optimize storage affordance. For example, in FIG. 5BW, the device displays the optimize storage affordance 564A. As another example, in FIG. 5BY, the device displays an optimize storage feature toggle 576A. In some embodiments, the device detects (814) an input interacting with an optimization affordance displayed in a settings menu. For example, in FIG. 5BY, the device detects a touch 582F at a location of the optimize storage feature toggle 576A. In some embodiments, the device detects (816) an input interacting with an optimization affordance displayed in a storage full notification. For example, in FIG. 5BW, the device detects a touch 582J at a location of the optimize storage affordance 564A.

In some embodiments, in response to detecting an input interacting with the optimize storage affordance, the device displays (818), on the display, a plurality of minimum media storage option affordances corresponding to a plurality of minimum media storage values. For example, in FIG. 5BZ, the device displays a plurality of media storage reservation size affordances 576C. In some embodiments, the plurality of minimum media storage values are (820) based on a total amount of storage on the device. Accordingly, a user is provided with options that are based the storage device reducing interaction with the device, thereby conserving power and increasing the time between battery charges and reducing wear-and-tear of the device. For example, in FIG. 5BZ, the plurality of media storage reservation size affordances 576C are associated with no minimum, 1 GB, 2 GB, and 4 GB based on a total amount of storage on the device of 32 GB.

In some embodiments, in response to an input interacting with a particular one of the minimum media storage option affordances corresponding to a particular one of the minimum media storage values, the device sets (822) the minimum amount of storage on the device that has been reserved for media items to the particular one of the minimum media storage values. For example, in FIG. 5BZ, the device detects a touch 582G at a location of a media storage reservation size affordance 576C associated with 2 GB and sets the minimum amount of storage on the device that has been reserved for media items to 2 GB, as indicated in FIG. 5CA.

In some embodiments, the device determines (824) that the minimum amount of storage on the device that has been reserved for media items is less than a current amount of storage on the device used by media files and, in response, displays (826), on the display, a notification indicating the current amount of storage on the device used by media files. For example, in FIG. 5CB, the device displays a media deletion warning 575C indicating the current amount of storage on the device used by media files (e.g., 6.4 GB) and that the minimum amount of storage on the device that has been reserved for media items is less than that amount.

In some embodiments, the device determines (828) that the minimum amount of storage on the device that has been reserved for media items is greater than a current amount of storage on the device used by media files and, in response, forgoes displaying (830), on the display, a notification indicating the current amount of storage on the device used by media files.

In some embodiments, the device displays (832), on the display, a manual storage management affordance. For example, in FIG. 5CD, the device displays a manual storage management affordance 564B in an insufficient storage window 564.

In some embodiments, in response to an input interacting with the manual storage management affordance, the device displays (834), on the display, a manual storage management user interface including a list of media item data regarding a plurality of media items and a delete affordance for deleting one or more of the plurality of media items. Thus, a user can quickly delete media items, increasing the amount of free storage at the storage location. With less data stored on the storage device, memory reads are faster and more storage is available for use as virtual processor cache, speeding up other operations. Further, by storing less data at the storage location, fewer or smaller (and less expensive) storage devices of the device (e.g., within the device, coupled to the device, or at a cloud storage facility) are needed by the user. For example, in FIG. 5CD, the device detects a touch 582J at a location of the manual storage management affordance 564B. In FIG. 5CE, the device displays a manual storage management user interface 577 including a list of media items 577F and a delete selected affordance 577A.

In some embodiments, a set of the plurality of media items corresponding to an album are (836) listed together. For example, in FIG. 5CE, the list of media items 577F includes three sets of media items corresponding to three albums listed in three groupings.

In some embodiments, the plurality of media items are prioritized according to size of the media items and/or listening history. Thus, a user can quickly identify non-prioritized media items that user a large amount of storage and delete them, increasing the amount of free storage of the device. For example, in FIG. 5CE, the media items may be filtered to include only media items that are being proposed for deletion in the list of media items 577F or the list of media items 577F an ordered list of items that includes all media items, with the proposed media items for deletion sorted to the top.

In some embodiments, the manual storage management user interface includes a selection affordance for selecting or deselecting one or more of the plurality of media items. For example, in FIG. 5CE, the manual storage management user interface 577 includes a plurality of selection affordances 577E for selecting and deselecting individual media items. As another example, in FIG. 5CE, the manual storage management user interface 577 includes a deselect all affordance 577B for deselecting the selected media items. In some embodiments, the deselect all affordance 577B is replaced with a select all affordance when no media items are selected.

In some embodiments, in response to an input interacting with an add affordance for adding one or more media items to a library, the device displays (844), on the display, an auto-add affordance for storing media items in the library on the device. For example, in FIG. 5BR, the device detects a touch 582A at a location of an add affordance 571A. In response, in FIG. 5BS, the device displays an auto-add window 563 including an activate affordance 563A for activating the auto-add feature. In some embodiments, the one or more media items are (846) displayed with a location region, the location region including the add affordance when the media items are not in the library, the location region including a download affordance when the media items are in the library but not stored on the device, and the location region being empty when the media items are stored on the device. For example, in FIG. 5BR, the device displays a location region including the add affordance 571A. In FIG. 5BT, the device displays a download affordance 571B in the location region, and in FIG. 5BV, the track download indicators 547E are absent for downloaded tracks. In various implementations, when the album is completed downloading, the download indicator affordance 571C is replaced by a whitespace.

In some embodiments, the device displays (848), on the display, a list of playlist selection affordances for synching a set of media items with the device, the list of playlist selection affordances including a smart playlist selection affordance for synching an algorithmically selected set of media items, a random playlist selection affordance for synching a random set of media items with the user device, and a user playlist selection affordances for synching a user-selected set of media items. For example, in FIG. 5CF, the device displays a synched playlist user interface 578 including a smart playlist selection affordance 578B, a random playlist selection affordance 578C, and a user playlist selection affordance 578D in a group of such user playlist selection affordances. In some embodiments, the device detects (850) an input interacting with the user playlist selection affordance. For example, in FIG. 5CF, the device detects a touch 582K at a location of the user playlist selection affordance 578D. In some embodiments, in accordance with a determination that a size of the user-selected set of media items is greater than an amount of available storage on the device, the device displays (852) a notification indicating that at least some of the user-selected set of media items will not be stored on the device. For example, in FIG. 5CG, the device displays a large playlist window 565 indicating that only 350 out of 500 songs will be synched. As another example, in FIG. 5CI, the device displays a synched playlist selection affordance 579A that indicates that large playlist is selected for synching and that the large playlist is only partially synched.

It should be understood that the particular order in which the operations in FIGS. 8A-8D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8D. For example, the media items, playback controls, and user interfaces described above with reference to method 800 optionally have one or more of the characteristics of the inputs, affordances, and user interface responses described herein with reference to other methods described herein (e.g., methods 600, 700, and 900). For brevity, these details are not repeated here.

FIGS. 9A-9E illustrate a flow diagram of a method 900 of updating a playlist in accordance with some embodiments. The method 900 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to update a playlist. The method reduces the cognitive burden on a user when updating a playlist, thereby creating a more efficient human-machine interface. For battery-operated electronic devices, enabling a user to update a playlist faster and more efficiently conserves power and increases the time between battery charges.

The device displays (902), on the display, a representation of a first automatically-generated playlist, the representation of the first automatically-generated playlist including representations of a first set of media items selected for inclusion in the first automatically-generated playlist based on first playlist generation criteria for the first automatically-generated playlist. For example, in FIG. 5CK, the device displays a representation of the first automatically-generated playlist 593. The representation of the first automatically-generated playlist 593 includes representations of a first set of media items 596 selected for including based on first playlist generation criteria. In the example of FIG. 5CK, the first set of media items are selected based on an oldies theme, as indicated by the identifying information 594.

In some embodiments, the device displays (904) a save affordance for saving the first set of media items as a non-updated playlist. For example, in FIG. 5CK, displays a save affordance 595A. The device detects a touch 5280 at a location of the save affordance 595A and, in response, saves the first set of media items as a non-updated playlist, as indicated in FIG. 5CL by the inclusion of a saved affordance 591A in the plurality of playlist affordances 591.

In some embodiments, the device displays (906) a share affordance for sharing the first set of media items with another device as a shared playlist. For example, in FIG. 5CR, the device displays a share affordance 595B. In FIG. 5CS, the device includes a shared affordance 591B in the plurality of playlist affordances 591 indicating that another device has shared a playlist with the device. In some embodiments, in response to a first update criterion being met (as described further below), the device updates (908) the first set of media items of the shared playlist. In some embodiments, the device does not update the shared playlist and the playlist is a non-updated playlist.

While displaying the representation of the first automatically-generated playlist, the device detects (910) user interaction with the representations of the first set of media items. For example, in FIG. 5CQ, the device detects a touch 582Q at a location of a representation of one of the first set of media items 596. In some embodiments, in response to detecting user interaction with a representation of one of the first set of media items, the device starts playback (912) of the one of the first set of media items. For example, in FIG. 5CQ, the device detects a touch 582Q at a location of a representation of one of the first set of media items 596 and, in response, begins playback of the media item, as illustrated in FIG. 5CR, by the display of identifying text 515A and the pause-play affordance 521A in the pause state.

The device detects (914) that a first update criterion for the first automatically-generated playlist has been met. In some embodiments, the first update criterion specifies (916) that the first set of media items is to be updated on predefined day of the week. For example, in FIG. 5CK, the identifying information 594 indicates that the playlist was updated last Thursday. In FIG. 5CQ, the identifying information 595 indicates that the playlist was updated today (e.g., Thursday). In various implementations, the first update criterion is met for a plurality of users with similarly themed playlists. For example, all users may have a “new releases” playlist updated every Monday.

The device updates (918) the first set of media items based on the first playlist generation criteria and the user interaction with the representations of the first set of media items by adding one or more added media items to the first set of media items, removing one or more removed media items from the first set of media items, and maintaining a plurality of maintained media items in the first set of media items. Thus, a user is periodically automatically presented with a new set of media items for consumption, reducing interaction with the device as the user searches for new media items. Reducing interaction with the device conserves power and increases the time between battery charges and, also, reduces wear-and-tear of the device. For example, from FIG. 5CK to FIG. 5CQ, a number of media items have been added, removed, and maintained.

In some embodiments, the added media items are selected (920) based on user-agnostic criteria and user-specific criteria. For example, the added media items can be based on the theme (e.g., oldies), a user-agnostic criteria and user interaction with the playlist, a user-specific criteria. Thus, a user is periodically automatically presented with a new set of media items for consumption based on user preferences, reducing interaction with the device as the user searches for new media items based on their preferences. As mentioned above, reducing interaction with the device conserves power and increases the time between battery charges and, also, reduces wear-and-tear of the device.

In some embodiments, the removed media items are selected (922) based on user-specific criteria. For example, the removed media items can be based on user interaction with the playlist or an amount of a time the media item has been maintained on the user playlist.

In some embodiments, the maintained media items include (924) a majority of the first set of media items. For example, in FIG. 5CQ, of the nine displayed media items, six are maintained from the playlist in FIG. 5CK.

In some embodiments, a number of the added media items and a number of removed media items are selected (926) such that a size of the first automatically-generated playlist is maintained within a playlist size range. Maintaining the size of the playlist within a manageable size range increases the likelihood that a user will interact with the automatically-generated playlist, reducing interaction with the device as the user need not alternatively search for new media items. Reducing interaction with the device conserves power and increases the time between battery charges and, also, reduces wear-and-tear of the device. For example, in FIG. 5CQ, the identifying information 594 indicates that there are 80 songs on the playlist. In some embodiments, the playlist size range is (928) a range of a number of media items. For example, the range may be between 75 and 85 songs. In some embodiments, the playlist size range is (930) a range of duration time. For example, the range may be between 3.5 and 4.5 hours.

The device displays (932), on the display, an updated representation of the first automatically-generated playlist that includes representations of the updated first set of media items. For example, in FIG. 5CQ, the device displays representations of the updated set of media items 596. In some embodiments, the device displays (934), on the display, one or more new media item indicators displayed in respective association with one or more representations of the added media items. In some embodiments, each new media item indicator includes (936) a dot or icon displayed beside a respective representation of an added media item. Thus, a user can easily identify new media items for consumption, reducing interaction with the device as the user searches for new media items. Reducing interaction with the device conserves power and increases the time between battery charges and, also, reduces wear-and-tear of the device. For example, in FIG. 5CQ, the device displays new media item indicators 596A as a dot beside representations of added media items. In some embodiments, each new media item indicator is (938) substantially similar to a new message indicator used to indicate new messages in a messaging application of the device. In some embodiments, in response an input interacting with one of the representations of the added media items, the device ceases display (940) of a corresponding one of the one or more new media item indicators. For example, in response to detecting the touch 582Q at the representation of the fifth media item, the device ceases display, in FIG. 5CR, or the corresponding new media item indicator 596A.

In some embodiments, the device displays (942), on the display, a first playlist affordance for displaying the representation of the first automatically-generated playlist, the first playlist affordance including a first plurality of images respectively associated with a plurality of the first set of media items. For example, in FIG. 5CJ, the device displays the first automatically-generated playlist affordance 592A and, in response to detecting a touch 582N at the location of the first automatically-generated playlist affordance 592A, displays, as illustrated in FIG. 5CK, the representation of the first automatically-generated playlist 593. The first automatically-generated playlist affordance 592A (shown in FIG. 5CJ) includes a plurality of images respectively associated with a plurality of the first set of media items (shown in FIG. 5CK).

In some embodiments, the device displays (944), on the display, an updated first playlist affordance for displaying the updated representation of the first automatically-generated playlist, the updated first playlist affordance including an updated first plurality of images respectively associated with a plurality of the updated first set of media items. Thus, a user is notified that a new set of media items is available for consumption, reducing interaction with the device as the user searches for new media items. Reducing interaction with the device conserves power and increases the time between battery charges and, also, reduces wear-and-tear of the device. For example, in FIG. 5CP, the device displays the updated first automatically-generated playlist affordance 592A and, in response to detecting a touch 582P at the location of the updated first automatically-generated playlist affordance 592A, displays, as illustrated in FIG. 5CQ, the updated representation of the first automatically-generated playlist 593. The updated automatically-generated playlist affordance 592A (shown in FIG. 5CP) includes an updated plurality of images respectively associated with a plurality of the updated first set of media items (shown in FIG. 5CQ). In some embodiments, the device displays (946), on the display, an update animation in which one or more of the first plurality of images are replaced with one or more of the updated first plurality of images. For example, from FIGS. 5CL-5CP, an update animation is illustrated in which one or more of the first plurality of images are replaced with one or more of the updated first plurality of images.

In some embodiments, the device displays (948), on the display, a representation of a second automatically-generated playlist, the representation of the second automatically-generated playlist including representations of a second set of media items selected for inclusion in the second automatically-generated playlist based on second playlist generation criteria for the second automatically-generated playlist. For example, in FIG. 5CT, the device displays a second automatically-generated playlist affordance 592B for displaying a representation of a second automatically-generated playlist.

In some embodiments, the second playlist generation criteria is (950) different from the first playlist generation criteria. In some embodiments, the first playlist generation criterion is (952) a first theme selected from a theme set including new releases, older songs, or user favorites and the second playlist generation criterion is selected from the theme set. Thus, a user is notified that with a new set of media items of a theme are available for consumption, reducing interaction with the device as the user searches for new media items of the theme. Reducing interaction with the device conserves power and increases the time between battery charges and, also, reduces wear-and-tear of the device. For example, in FIG. 5CS, the device displays the first automatically-generated playlist affordance 592A with a designation of an oldies theme and, in FIG. 5CT, the device displays the second automatically-generated playlist affordance 592B with a designation of a new releases theme. In some embodiments, the device provides (954) an option to select the first playlist generation criteria and the second playlist generation criteria (e.g., a setting for a user to select the theme for one or more of the playlists).

In some embodiments, while displaying the representation of the second automatically-generated playlist, the device detects (956) user interaction with the representations of the second set of media items.

In some embodiments, the device detects (958) that a second update criterion for the second automatically-generated playlist has been met. In some embodiments, the second update criterion is (960) different from the first update criterion. In some embodiments, the first update criterion specifies (962) that the first automatically-generated playlist is to be updated on a first day of the week and the second update criterion specifies that the second playlist is to be updated on a second day of the week that is different from the first day of the week. Thus, a user is presented with a new set of media items for consumption meeting different themes on different days, increasing the likelihood that a user will interact with the automatically selected new set of media items, reducing interaction with the device as the user searches for new media items. Reducing interaction with the device conserves power and increases the time between battery charges and, also, reduces wear-and-tear of the device. For example, in FIG. 5CK, the identifying information 594 indicates that the playlist was updated last Thursday. In FIG. 5CQ, the identifying information 595 indicates that the playlist was updated today (e.g., Thursday). The second playlist can be updated on a different day of the week, e.g., Tuesday.

In some embodiments, the device updates (964) the second set of media items based on the second playlist generation criteria and the user interaction with the representations of the second set of media items. In some embodiments, a number of media items added to the second set of media items is (966) different from a number of the added media items added to the first set of media items. For example, whereas FIG. 5CQ illustrates that the updated first set of media items includes three added media items (out of nine illustrated), an updated second set of media items can include more than three (out of nine) added media items.

In some embodiments, the device displays (968), on the display, an updated representation of the second automatically-generated playlist, the updated representation of the second automatically-generated playlist including representations of the updated second set of media items.

In some embodiments, the first automatically-generated playlist is (970) one of seven automatically-generated playlists with seven different playlist generation criteria and seven different update criteria specifying that the respective automatically-generated playlist is to be updated on a respective day of the week. For example, in FIG. 5CS, the device displays a first automatically-generated playlist affordance 562A and partially displays a second automatically-generated playlist affordance 562B. In FIG. 5CT, the device displays the second automatically-generated playlist affordance 562B and partially displays a third automatically-generated playlist affordance 562C. In some embodiments, further scrolling reveals four additional automatically-generated playlist affordances.

It should be understood that the particular order in which the operations in FIGS. 9A-9E have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9E. For example, the media items, playback controls, and user interfaces described above with reference to method 900 optionally have one or more of the characteristics of the inputs, affordances, and user interface responses described herein with reference to other methods described herein (e.g., methods 60, 700, and 800). For brevity, these details are not repeated here.

Figure 10:
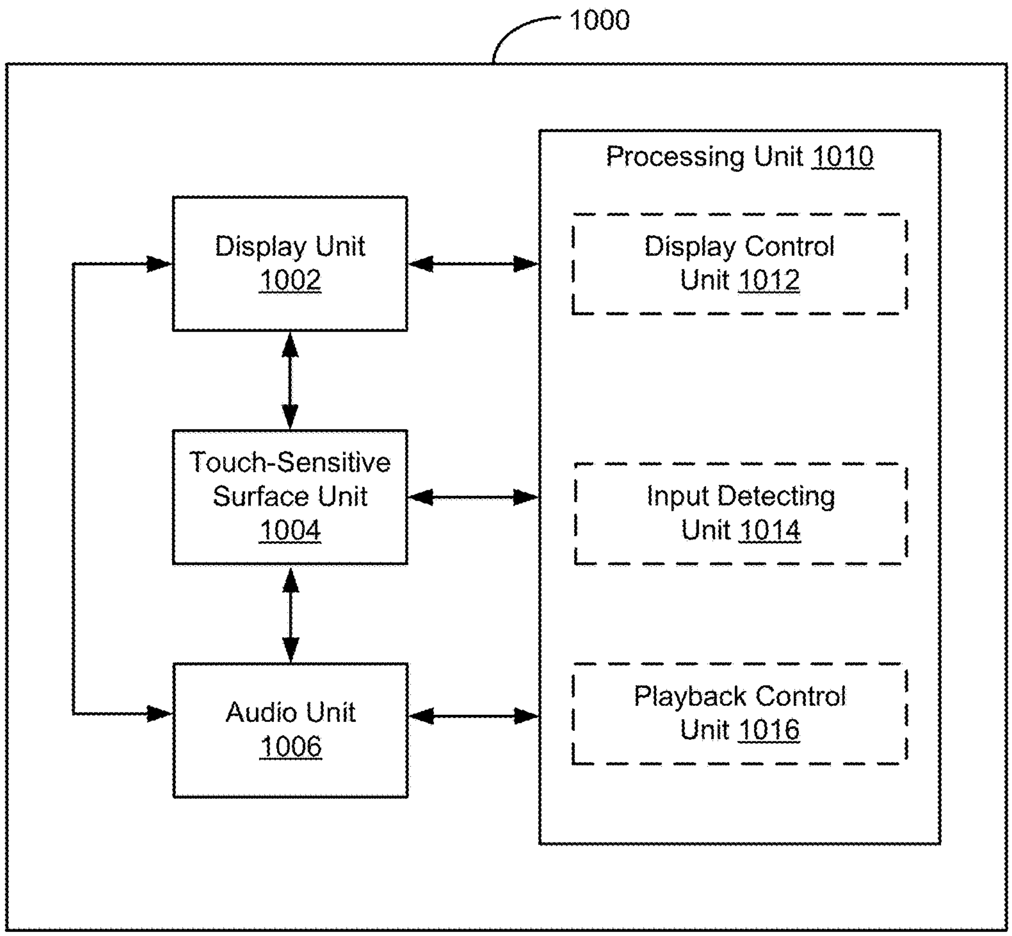
FIGS. 10-13 are functional block diagrams of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, a touch-sensitive surface unit 1004 configured to receive contacts, an audio unit 1006 configured to playback an audio portion of a media file, and a processing unit 1010 coupled with the display unit 1002, the touch-sensitive surface unit 1004, and the audio unit 1006. In some embodiments, the processing unit 1010 includes: a display control unit 912, an input detecting unit 914, and a playback control unit 916.

The processing unit 1010 is configured to display (e.g., with the display control unit 1012), on the display unit 1002, a playback status indicator regarding playback of a media item. In some embodiments, the processing unit 1010 is configured to playback (e.g., with the playback control unit 1016), using the audio unit 1006, the media item.

The processing unit 1010 is configured to display (e.g., with the display control unit 1012), on the display unit 1002, an image associated with the media item.

The processing unit 1010 is configured to detect (e.g., with the input detecting unit 1014) an input interacting with the image. In some embodiments, the processing unit 1010 is configured to detect (e.g., with the input detecting unit 1014) a contact at the location of the image. In some embodiments, the processing unit 1010 is configured to detect (e.g., with the input detecting unit 1014) a movement of a contact over the image. In some embodiments, the processing unit 1010 is configured to detect (e.g., with the input detecting unit 1014), movement of a multi-touch contact over the image.

The processing unit 1010 is configured to, in response to a first portion of the input, adjust (e.g., with the display control unit 1012) the appearance of the image on the display unit 1002 in accordance with a first portion of the input. In some embodiments, such as embodiments in which the processing unit 1010 detects movement of a contact over the image, the processing unit 1010 is configured to move (e.g., with the display control unit 1012) the image on the display unit 1002 in accordance with a direction of the movement of the contact. In some embodiments, the processing unit 1010 is configured to start to display (e.g., with the display control unit 1012) a second image associated with a second media item as the image is sliding off of the display unit 1002. In some embodiments, the processing unit 1010 is configured to display (e.g., with the display control unit 1012) related media items. In some embodiments, the processing device 1010 is configured to display (e.g., with the display control unit 1012) media items in a queue to be played after the media item. In some embodiments, the processing device 1010 is configured to display (e.g., with the display control unit 1012) suggested media items selected based on the media item. In some embodiments, the processing device 1010 is configured to display (e.g., with the display control unit 1012) a lyrics toggle affordance for toggling display of lyrics of the media item.

In some embodiments, such as embodiments in which the processing unit 1010 detects a contact at a location of the image, the processing device 1010 is configured to change (e.g., with the display control unit 1012) a size of the image on the display unit 1002. In some embodiments, the processing device 1010 is configured to toggle display (e.g., with the display control unit 1012) of a border around the image.

In some embodiments, such as embodiments in which the processing unit 1010 detects movement of a multi-touch contact over the image, the processing device 1010 is configured to change (e.g., with the display control unit 1012) a shape of the image on the display unit 1002. In some embodiments, the processing device 1010 is configured to skew (e.g., with the display control unit 1012) the image. In some embodiments, a magnitude of the change in the shape of the image is proportional to a magnitude of the movement of the multi-touch contact.

The processing device 1010 is configured to, in response to a second portion of the input, change playback (e.g., with the playback control unit 1016) of media items on the device in accordance with the second portion of the input. In some embodiments, such as embodiments in which the processing device 1010 detects movement of a contact over the image, the processing device 1010 is configured to start playback (e.g., with the playback control unit 1016) of a second media item. In some embodiments, the processing device 1010 is configured to, in accordance with a determination that movement of the contact is in a first direction, select (e.g., with the playback control unit 1016) a prior media item in a queue as the second media item and, in accordance with a determination that the movement of the contact is in a second direction, select (e.g., with the playback control unit 1016) a next media item in a queue as the second media item. In some embodiments, the processing device 1010 crossfades (e.g., with the playback control unit 1016) between the media item and the second media item.

In some embodiments, such as embodiments in which the processing device 1010 detects a contact at a location of the image, the processing device 1010 is configured to pause playback (e.g., with the playback control unit 1016) of the media item. In some embodiments, the processing device 1010 is configured to resume playback (e.g., with the playback control unit 1016) of the media item.

In some embodiments, such as embodiments in which the processing unit 1010 1010 detects movement of a multi-touch contact over the image, the processing device 1010 is configured to change (e.g., with the playback control unit 1016) a non-binary characteristic of the playback of the media item. In some embodiments, in accordance with a determination that movement of the multi-touch contact is along a first axis, the processing device 1010 is configured to change (e.g., with the playback control unit 1016) a first non-binary playback characteristic and, in accordance with a determination that the movement of the multi-touch contact is along a second axis, change (e.g., with the playback control unit 1016) a second non-binary characteristic of the media item. In some embodiments, a magnitude of the change of the non-binary playback characteristic is proportional to a magnitude of the movement of the multi-touch contact.

In some embodiments, the processing device 1010 is configured to display (e.g., with the display control unit 1012), on the display unit 1002, a pause-play affordance. In some embodiments, the processing device 1010 is configured to detect (e.g., with the input detecting unit 1014) a pause-play input interacting with the pause-play affordance. In some embodiments, the processing unit 1010 is configured to, in response to a first portion of the pause-play input, change (e.g., with the display control unit) a size of the image on the display unit 1002. In some embodiments, the processing unit 1010 is configured to, in response to a second portion of the pause-play input, switch (e.g., with the playback control unit 1016) between pausing and playback of the media item.

In some embodiments, the processing device 1010 is configured to display (e.g., with the display control unit 1012), on the display unit 1002, one or more skip affordances. In some embodiments, the processing device 1010 is configured to detect (e.g., with the input detecting unit 1014) a skip input interacting with one of the one or more skip affordances. In some embodiments, the processing unit 1010 is configured to, in response to a first portion of the skip input, move (e.g., with the display control unit 1012) the image on the display unit 1002 in accordance with the one of the one or more skip affordances. In some embodiments, the processing device 1010 is configured to, in response to a second portion of the skip input, start playback (e.g., with the playback control unit 1016) of a second media item in accordance with the one of the one or more skip affordances.

In some embodiments, the processing device 1010 is configured to display (e.g., with the display control unit 1012), on the display unit 1002, a scrubbing affordance. In some embodiments, the processing device 1010 is configured to detect (e.g., with the input detecting unit 1014) a scrubbing input interacting with the scrubbing affordance. In some embodiments, the processing device 1010 is configure to, in response to a first portion of the skip input, reduce (e.g., with the display control unit 1012) a size of the image on the display unit 1002. In some embodiments, the processing device 1010 is configured to change display (e.g., with the display control unit 1012) of the scrubbing affordance to a waveform indicative of the magnitude of the audio of the media item at various playback times. In some embodiments, the processing device 1010 is configured to display (e.g., with the display control unit 1012) scrubbing speed information in a display area previously occupied by the image. In some embodiments, the processing device 1010 is configured to, in response to a second portion of the scrubbing input, change (e.g., with the playback control unit 1016) a playback time of the playback of the media item.

In some embodiments, such as embodiments in which the processing device 1010 detects movement of a contact over the image, the processing device 1010 is configured to, in accordance with a determination that movement of the contact over the image is in a first direction, display (e.g., with the display control unit 1012) a miniplayer user interface, the miniplayer user interface including a reduced-sized version of the image and, in accordance with a determination that movement of the contact over the image is in a second direction, display (e.g., with the display control unit 10120) related media items.

In some embodiments, such as embodiments in which the processing device 1010 detects movement of a contact over the image, the processing device 1010 is configured to, in accordance with a determination that movement of the contact over the image is along a first axis, display (e.g., with the display control unit 1012) a miniplayer user interface, the miniplayer user interface including a reduced-sized version of the image and, in accordance with a determination that movement of the contact over the image is along a second axis, start playback (e.g., with the playback control unit 1016) of a second media item.

In some embodiments, the processing device 1010 is configured to detect (e.g., with the input detecting unit 1014) a miniplayer user input interacting with the miniplayer user interface. In some embodiments, the processing device 1010 is configured to display (e.g., with the display control unit 1012) a full-size version of the image. In some embodiments, the processing unit 1010 is configured to display (e.g., with the display control unit 1012) an animation temporarily including a lyrics toggle affordance.

The operations in the information processing methods described above are, optionally implemented by running one or more functional modules in information processing apparatus such as general purpose processors (e.g., as described above with respect to FIGS. 1A and 10) or application specific chips.

The operations described above with reference to FIGS. 6A-6E are, optionally, implemented by components depicted in FIGS. 1A-1B or FIG. 10. For example, displaying operation 602, displaying operation 604, detecting operation 606, adjusting operation 616, and changing operation 640 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11:
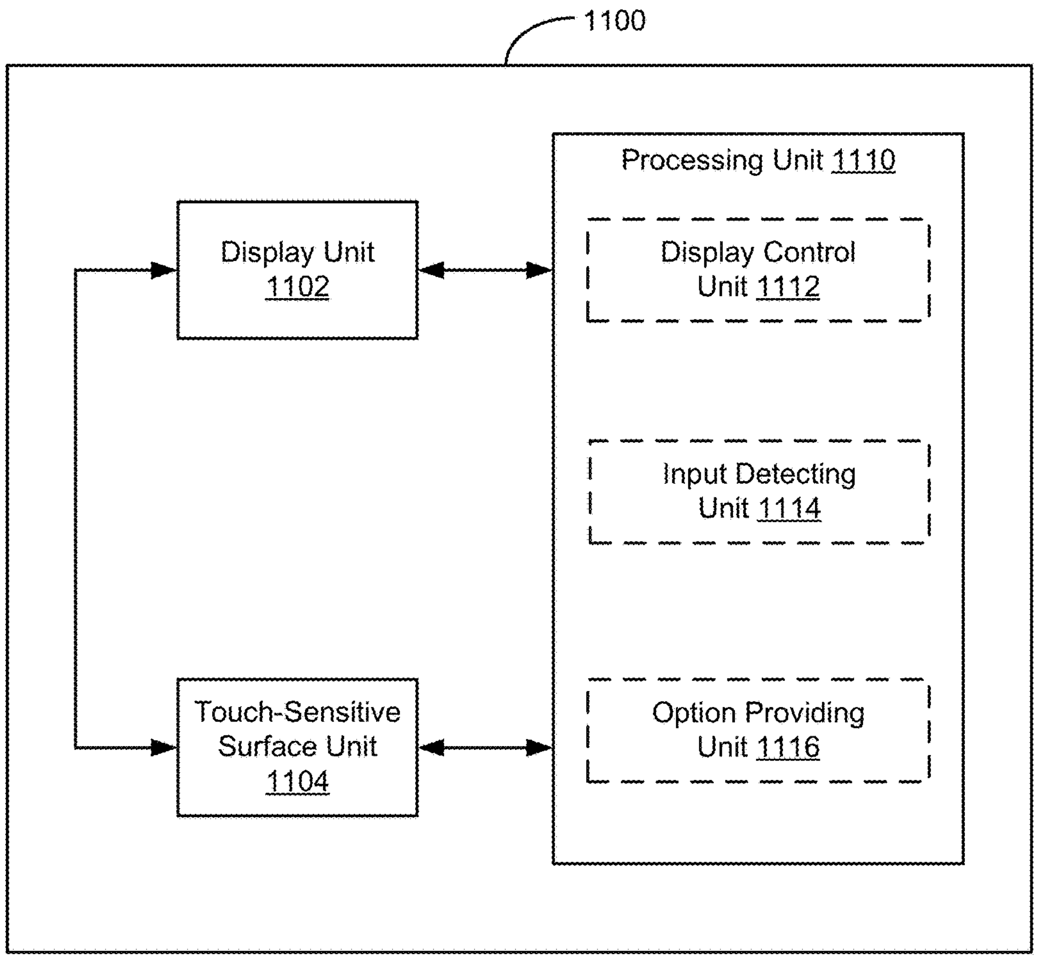

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, a touch-sensitive surface unit 1104 configured to receive contacts, and a processing unit 1010 coupled with the display unit 1002 and the touch-sensitive surface unit 1004. In some embodiments, the processing unit 1110 includes: a display control unit 1112, an input detecting unit 1114, and an option providing unit 1016 (which can be implemented as a user interface control unit or integrated as part of the display control unit 1112 and/or input detecting unit 1014).

The processing device 1110 is configured to, while playing a first media item in a queue of media items, detect (e.g., with the input detecting unit) a request to add a second media item to the queue.

The processing device 1110 is configured to, in accordance with a determination that the first media item meets group-sensitive queuing criteria, wherein the group-sensitive queuing criteria include a criterion that is met when the first media item is part of a predefined group of media items in the queue, provide an option (e.g., with the option providing unit 1116) to add the second media item to the queue after the media items in the predefined group that are in the queue after the first media item. In some embodiments, the processing device 1110 is configured to provide an option (e.g., with the option providing unit 1116) to add the second media item to the queue after the first media item and before the media items in the predefined group that are in the queue after the first media item.

The processing device 1110 is configured to, in accordance with a determination that the first media item does not meet the group-sensitive queuing criteria, provide an option (e.g., with the option providing unit 1116) to add the second media item to the queue after the first media item. In some embodiments, the processing unit 1110 is configured to hide, or not provide (e.g., with the option providing unit 1116), an option to add the second media item to the queue after the media items that are in the queue. In some embodiments, the processing device 1110 is configured to provide an option (e.g., with the option providing unit 1116) to add the second media item to the queue after a first plurality of media items that are in the queue and before a second plurality of media items that are in the queue.

In some embodiments, the processing device 1110 is configured to display (e.g., with the display control unit 1112) a list including a plurality of elements respectively associated with one or more of the media items in the queue. In some embodiments, each of the plurality of elements includes an icon and identifying text respectively associated with the one or more of the media items in the queue. In some embodiments, the plurality of elements includes a first element associated with all of the other media items in the predefined group that are in the queue after the first media item and a second element associated with the second media item. In some embodiments, the plurality of elements include a first set of elements associated with all of the other media items in the predefined group that are in the queue after the first media item and a second set of elements associated with the second media item, wherein the first set of elements and the second set of elements are visually separated on the display unit 1102. In some embodiments, the processing device 1110 is configured to display the list in response to detecting an input (e.g., with the input detecting unit 1114) interacting with an image associated with the first media item.

In some embodiments, the processing device 1110 is configured to detect an ordering input (e.g., with the input detecting unit) dragging one of the plurality of elements and change an order of the media items in the queue in accordance with the ordering input. In some embodiments, the processing device 1110 is configured to detect a removing input swiping one of the plurality of elements and remove one or more of the media items in queue in accordance with the removing input.

In some embodiments, the processing device 1110 is configured to disable a non-linear playback function in response to the second media item being added to the queue and to enable the non-linear playback function in response to playing the second media item.

The operations in the information processing methods described above are, optionally implemented by running one or more functional modules in information processing apparatus such as general purpose processors (e.g., as described above with respect to FIGS. 1A and 11) or application specific chips.

The operations described above with reference to FIGS. 7A-7E are, optionally, implemented by components depicted in FIGS. 1A-1B or FIG. 11. For example, detecting operation 702, providing operation 704, and providing operation 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
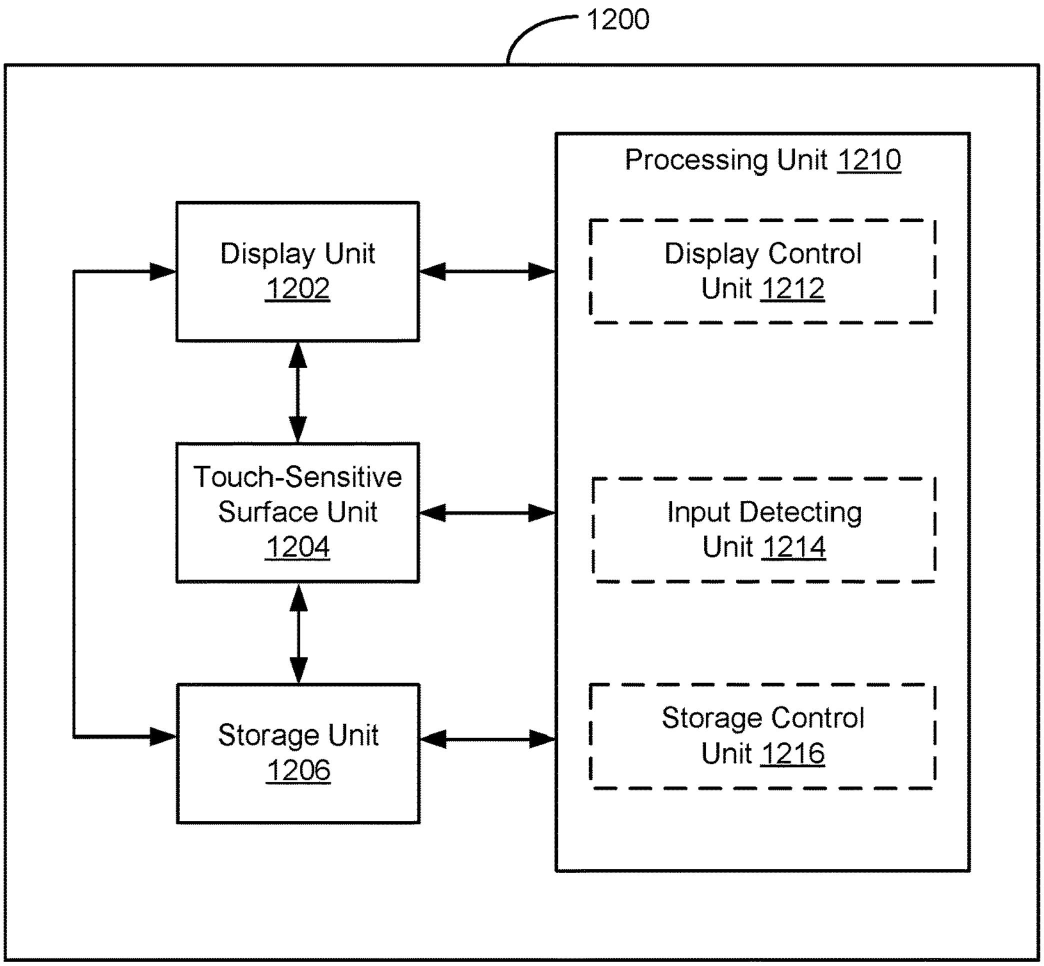

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, a touch-sensitive surface unit 1204 configured to receive contacts, a storage unit 1206 configured to store one or more media items, and a processing unit 1210 coupled with the display unit 1202, the touch-sensitive surface unit 1204, and the storage unit 1206. In some embodiments, the processing unit 1210 includes: a display control unit 1212, an input detecting unit 1214, and a storage control unit 1216.

The processing unit 1210 is configured to, while a plurality of media items are stored on the storage unit 1206, detect (e.g., with the storage control unit 1216) the occurrence of a condition that corresponds to a request to free storage on the storage unit 1206, wherein the plurality of media items uses a first amount of storage on the storage unit 1206 and a minimum amount of storage on the storage unit 1206 has been reserved for media items. In some embodiments, the processing device 1210 is configured to receive (e.g., with the input detecting unit 1214) a request to store an additional one or more media items on the device, wherein the additional one or more media items would use a second amount of storage on the device, and determine (e.g., with the storage control unit 1216) that the second amount of storage is greater than an available amount of storage on the storage unit 1206. In some embodiments, the processing device 1210 is configured to detect (e.g., with the input detecting unit 1214) a user interaction with a displayed increase free space affordance.

The processing device 1210 is configured to, in accordance with a determination that the first amount of storage on the storage unit 1206 is greater than the minimum amount of storage on the storage unit 1206 that has been reserved for media items, delete (e.g., with the storage control unit 1216) one or more of the plurality of media items.

The processing device 1210 is configured to, in accordance with a determination that the first amount of storage on the storage unit 1206 is less than the minimum amount of storage on the storage unit 1206 that has been reserved for media items, forgo deleting (e.g., with the storage control unit 1216) one or more of the plurality of media items.

In some embodiments, the processing device 1210 is configured to display (e.g., with the display control unit 1212), on the display unit 1202, an optimize storage affordance. In some embodiments, the processing device 1210 is configured to detect (e.g., with the input detecting unit 1214) an input interacting with an optimization affordance displayed in a settings menu. In some embodiments, the processing device 1210 is configured to detect (e.g., with the input detecting unit 1214) an input interacting with an optimization affordance displayed in a storage full notification.

In some embodiments, the processing device 1210 is configured to, in response to detecting an input interacting with the optimize storage affordance, display (e.g., with the display control unit 1212), on the display unit 1202, a plurality of minimum media storage option affordances corresponding to a plurality of minimum media storage values. In some embodiments, the plurality of minimum media storage values are based on a total amount of storage on the storage unit 1206.

In some embodiments, the processing device 1210 is configured to, in response to detecting an input interacting with a particular one of the minimum media storage option affordances corresponding to a particular one of the minimum media storage values, set (e.g., with the storage control unit 1216) the minimum amount of storage on the storage unit 1206) that has been reserved for media items to the particular one of the minimum media storage values.

In some embodiments, the processing device 1210 is configured to determine (e.g., with the storage control unit 1216) that the minimum amount of storage on the storage unit 1206 that has been reserved for media items is less than a current amount of storage on the storage unit 1206 used by media files. In some embodiments, the processing device 1210 is configured to display (e.g., with the display control unit 1212), on the display unit 1202, a notification indicating the current amount of storage on the storage unit 1206 used by media items.

In some embodiments, the processing device 1210 is configured to determine (e.g., with the storage control unit 1216) that the minimum amount of storage on the storage unit 1206 that has been reserved for media items is greater than a current amount of storage on the storage unit 1206 used by media files. In some embodiments, the processing device 1210 is configured to forgo displaying (e.g., with the display control unit 1212), on the display unit 1202, a notification indicating the current amount of storage on the storage unit 1206 used by media items.

In some embodiments, the processing device 1210 is configured to display (e.g., with the display control unit 1212), on the display unit 1202, a manual storage management affordance. In some embodiments, the processing device 1210 is configured to, in response to detecting an input interacting with the manual storage management affordance, display (e.g., with the display control unit 1212), on the display unit 1202, a manual storage management user interface including a list of media item data regarding a plurality of media items and a delete affordance for deleting one or more of the plurality of media items. In some embodiments, a set of the plurality of media items corresponding to an album are listed together. In some embodiments, the plurality of media items are prioritized according to size of the media items and/or listening history of the media items. In some embodiments, the manual storage management user interface includes a selection affordance for selecting or deselecting one or more of the plurality of media items.

In some embodiments, the processing device 1210 is configured to, in response to detecting an input interacting with an add affordance for adding one or more media items to a library, display (e.g., with the display control unit 1212), on the display unit 1202, an auto-add affordance for storing media items in the library on the storage unit 1206. In some embodiments, the one or more media items are displayed with a location region, the location region including the add affordance when the media items are not in the library, the location region including a download affordance when the media items are in the library but not stored on the storage unit 1206, and the location region being empty when the media items are stored on the storage unit 1206.

In some embodiments, the processing device 1210 is configure to display (e.g., with the display control unit 1212), on the display unit 1202, a list of playlist selection affordances for synching a set of media items with the device, the list of playlist selection affordances including a smart playlist selection affordance for synching an algorithmically selected set of media items, a random playlist selection affordance for synching a random set of media items with the user device, and a user playlist selection affordances for synching a user-selected set of media items. In some embodiments, the processing device 1210 is configured to detect (e.g., with the input detecting unit 1214) an input interacting with the user playlist selection affordance. In some embodiments, the processing device 1210 is configured to, in accordance with a determination that a size of the user-selected set of media items is greater than an amount of available storage on the storage unit 1206, display (e.g., with the display control unit 1212), on the display 1202, a notification indicating that at least some of the user-selected set of media items will not be stored on the storage unit 1206.

The operations in the information processing methods described above are, optionally implemented by running one or more functional modules in information processing apparatus such as general purpose processors (e.g., as described above with respect to FIGS. 1A and 12) or application specific chips.

The operations described above with reference to FIGS. 8A-8D are, optionally, implemented by components depicted in FIGS. 1A-1B or FIG. 11. For example, detecting operation 802, deleting operation 808, and forgoing operation 810 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
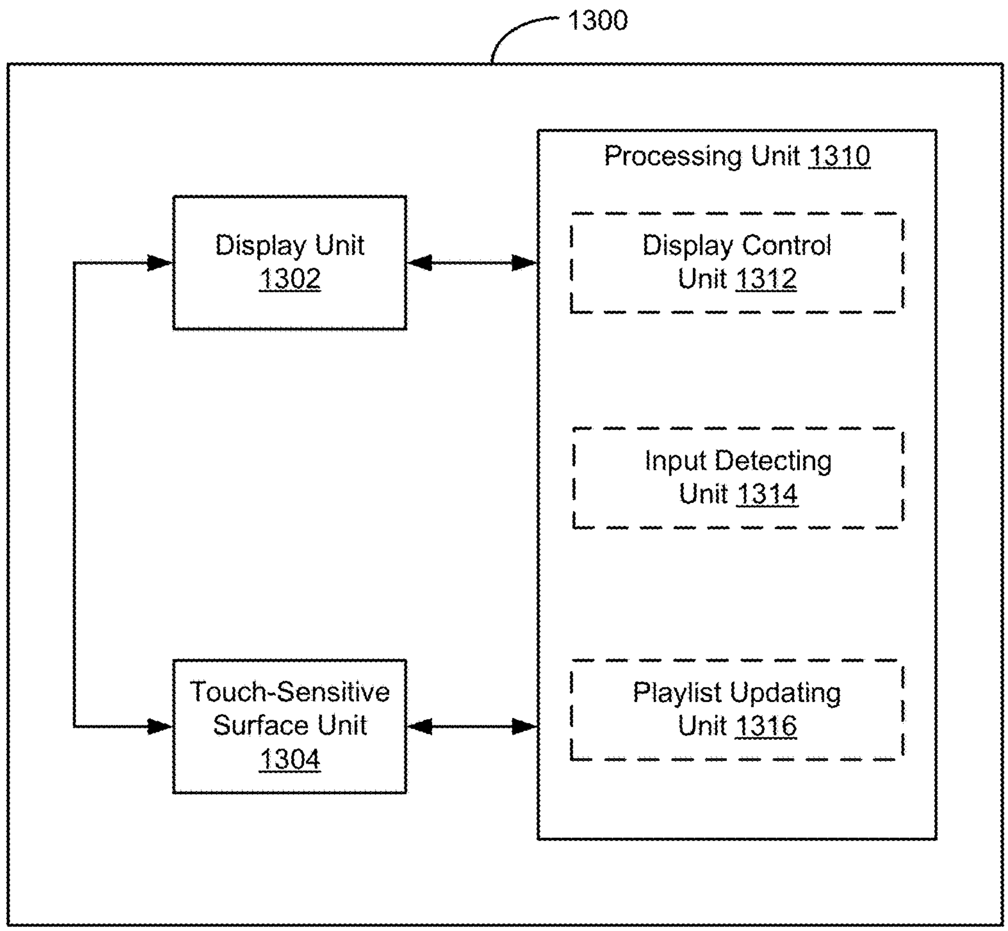

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts, and a processing unit 1310 coupled with the display unit 1302 and the touch-sensitive surface unit 1304. In some embodiments, the processing unit 1310 includes: a display control unit 1312, an input detecting unit 1314, and a playlist updating unit 1316.

The processing device 1310 is configured to display (e.g., with the display control unit 1312), on the display unit 1302, a representation of a first automatically-generated playlist, the representation of the first automatically-generated playlist including representations of a first set of media items selected for inclusion in the first automatically-generated playlist based on first playlist generation criteria for the first automatically-generated playlist. In some embodiments, the processing device 1310 is configured to display (e.g., with the display control unit 1312), on the display unit 1302, a save affordance for saving the first set of media items as a non-updated playlist. In some embodiments, the processing device 1310 is configured to display (e.g., with the display control unit 1312), on the display unit 1302, a share affordance for sharing the first set of media items with another device as a shared playlist. In some embodiments, the processing device 1310 is configured to, in response to a first update criterion being met, update (e.g., using the playlist updating unit 1316) the first set of media items of the shared playlist.

The processing device 1310 is configured to, while displaying the representation of the first automatically-generated playlist, detect (e.g., with the input detecting unit 1314) user interaction with the representations of the first set of media items. In some embodiments, the processing device 1310 is configured to, in response to detecting user interaction with a representation of one of the first set of media items, start playback of the one of the first set of media items.

The processing device 1310 is configured to detect (e.g., with the playlist updating unit 1316) that a first update criterion for the first automatically-generated playlist has been met. In some embodiments, the first update criterion specifies that the first set of media items is to be updated on predefined day of the week.

The processing device 1310 is configured to update (e.g., with the playlist updating unit 1316) the first set of media items based on the first playlist generation criteria and the user interaction with the representations of the first set of media items by adding one or more added media items to the first set of media items, removing one or more removed media items from the first set of media items, and maintaining a plurality of maintained media items in the first set of media items. In some embodiments, the added media items are selected (e.g., by the playlist updating unit 1316) based on user-agnostic criteria and user-specific criteria. In some embodiments, the removed media items are selected (e.g., by the playlist updating unit 1316) based on user-specific criteria. In some embodiments, the maintained media items include a majority of the first set of media items. In some embodiments, a number of the added media items and a number of removed media items are selected (e.g., by the playlist updating unit 1316) such that a size of the first automatically-generated playlist is maintained within a playlist size range. In some embodiments, the playlist size range is a range of a number of media items. In some embodiments, the playlist size range is a range of a duration time.

The processing device 1310 is configured to display (e.g., with the display control unit 1312), on the display unit 1302, an updated representation of the first automatically-generated playlist that includes representations of the updated first set of media items. In some embodiments, the processing device 1310 is configured to display (e.g., with the display control unit 1312), on the display unit 1302, one or more new media item indicators displayed in respective association with one or more representations of the added media items. In some embodiments, each new media item indicator includes a dot or icon displayed beside a respective representation of an added media item. In some embodiments, each new media item indicator is substantially similar to a new message indicator used to indicate new messages in a messaging application of the device. In some embodiments, the processing device 1310 is configured to, in response to detecting an input interacting with one of the representations of the added media items, cease display (e.g., with the display control unit 1312) of a corresponding one of the one or more new media item indicators.

In some embodiments, the processing device 1310 is configured to display (e.g., with the display control unit 1312), on the display unit 1302, a first playlist affordance for displaying the representation of the first automatically-generated playlist, the first playlist affordance including a first plurality of images respectively associated with a plurality of the first set of media items.

In some embodiments, the processing device 1310 is configured to display (e.g., with the display control unit 1312), on the display unit 1302, an updated first playlist affordance for displaying the updated representation of the first automatically-generated playlist, the updated first playlist affordance including an updated first plurality of images respectively associated with a plurality of the updated first set of media items. In some embodiments, the processing device 1310 is configured to display (e.g., with the display control unit 1312), on the display unit 1302, an update animation in which one or more of the first plurality of images are replaced with one or more of the updated first plurality of images.

In some embodiments, the processing device 1310 is configured to display (e.g., with the display control unit 1312), on the display unit 1302, a representation of a second automatically-generated playlist, the representation of the second automatically-generated playlist including representations of a second set of media items selected for inclusion in the second automatically-generated playlist based on second playlist generation criteria for the second automatically-generated playlist. In some embodiments, the second playlist generation criteria is different from the first playlist generation criteria. In some embodiments, the first playlist generation criterion is a first theme selected from a theme set including new releases, older songs, or user favorites and the second playlist generation criterion is selected from the theme set. In some embodiments, the processing device 1310 is configured to provide an option (e.g., with the display control unit 1312) to select the first playlist generation criteria and the second playlist generation criteria.

In some embodiments, the processing device 1310 is configured to, while displaying the representation of the second automatically-generated playlist, detect (e.g., with the input detecting unit 1314) user interaction with the representations of the second set of media items.

In some embodiments, the processing device 1310 is configured to detect (e.g., with the playlist updating unit 1316) that a second update criterion for the second automatically-generated playlist has been met. In some embodiments, the second update criterion is different from the first update criterion. In some embodiments, the first update criterion specifies that the first automatically-generated playlist is to be updated on a first day of the week and the second update criterion specifies that the second playlist is to be updated on a second day of the week that is different from the first day of the week.

In some embodiments, the processing device 1310 is configured to update e.g., with the playlist updating unit 1316) the second set of media items based on the second playlist generation criteria and the user interaction with the representations of the second set of media items. In some embodiments, a number of media items added to the second set of media items is different from a number of the added media items added to the first set of media items.

In some embodiments, the processing device 1310 is configured to display (e.g., with the display control unit 1312), on the display unit 1302, an updated representation of the second automatically-generated playlist, the updated representation of the second automatically-generated playlist including representations of the updated second set of media items.

In some embodiments, the first automatically-generated playlist is one of seven automatically-generated playlists with seven different playlist generation criteria and seven different update criteria specifying that the respective automatically-generated playlist is to be updated on a respective day of the week.

The operations in the information processing methods described above are, optionally implemented by running one or more functional modules in information processing apparatus such as general purpose processors (e.g., as described above with respect to FIGS. 1A and 13) or application specific chips.

The operations described above with reference to FIGS. 9A-9E are, optionally, implemented by components depicted in FIGS. 1A-1B or FIG. 13. For example, displaying operation 902, detecting operation 910, detecting operation 914, updating operation 918, and displaying operation 932 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a device with one or more processors, non-transitory memory, a display, and an input device:

displaying, on the display, a first image that corresponds to a first automatically-generated playlist, the first image that corresponds to the first automatically-generated playlist including a first group of images that correspond to a first set of media items selected for inclusion in the first automatically-generated playlist based on first playlist generation criteria for the first automatically-generated playlist;

detecting, via the input device, a user interaction; and in response to detecting the user interaction:

in accordance with a determination that the user interaction corresponds to a first input type, displaying, on the display, a second image that corresponds to a second automatically-generated playlist, the second image that corresponds to the second automatically-generated playlist including a second group of images that correspond to a second set of media items selected for inclusion in the second automatically-generated playlist based on second playlist generation criteria for the second automatically-generated playlist; and in accordance with a determination that the user interaction corresponds to a second input type:

ceasing display of the first image that corresponds to the first automatically-generated playlist; and displaying, on the display, a playlist interface for the first automatically-generated playlist that includes at least a subset of the first group of images displayed adjacent to descriptions that correspond to the first set of media items.

2. The method of claim 1, further comprising, in accordance with a determination that the user interaction corresponds to a third input type directed to a respective image among the first group of images that correspond to the first set of media items, starting playback of the one of the first set of media items.

3. The method of claim 1, further comprising:

while displaying the first image that corresponds to the first automatically-generated playlist, detecting a second user interaction with the first group of images that correspond to the first set of media items;

after detecting the second user interaction with the first group of images that correspond to the first set of media items, detecting that a first update criterion for the first automatically-generated playlist has been met;

in response to detecting that the first update criterion has been met, updating the first set of media items based on the first playlist generation criteria and the second user interaction with the first group of images that correspond to the first set of media items, wherein updating the first set of media items includes:

adding one or more added media items to the first set of media items;

removing one or more removed media items from the first set of media items; and maintaining a plurality of maintained media items in the first set of media items; and after updating the first set of media items, displaying, on the display, an updated first image that corresponds to the first automatically-generated playlist, the first updated image that corresponds to the first automatically-generated playlist including a third group of images that correspond to the updated first set of media items.

4. The method of claim 3, wherein the first update criterion specifies that the first set of media items is to be updated on a predefined day of the week.

5. The method of claim 3, wherein the added media items are selected based on user-agnostic criteria and user-specific criteria.

6. The method of claim 3, wherein the removed media items are selected based on user-specific criteria.

7. The method of claim 3, wherein the maintained items include a majority of the first set of media items.

8. The method of claim 3, wherein a number of the added media items and a number of the removed media items are selected such that a size of the first automatically-generated playlist is maintained within a playlist size range.

9. The method of claim 8, wherein the playlist size range is a range of a number of media items.

10. The method of claim 8, wherein the playlist size range is a range of a duration time.

11. The method of claim 3, wherein displaying the updated first image that corresponds to the first automatically-generated playlist includes displaying, on the display, one or more new media item indicators displayed in respective association with one or more images of the added media items.

12. The method of claim 11, wherein each new media item indicator includes a dot or icon displayed beside a respective image of an added media item.

13. The method of claim 11, wherein each new media item indicator is substantially similar to a new message indicator used to indicate new messages in a messaging application of the device.

14. The method of claim 11, further comprising, in response to detecting an input interacting with one of the images of the added media items, ceasing display of a corresponding one of the one or more new media item indicators.

15. The method of claim 3, further comprising:

before updating the first set of media items, displaying, on the display, a first playlist affordance for displaying the image that corresponds to the first automatically-generated playlist, the first playlist affordance including a first plurality of images respectively associated with a plurality of the first set of media items; and after updating the first set of media items, displaying, on the display, an updated first playlist affordance for displaying the updated first image that corresponds to the first automatically-generated playlist, the updated first playlist affordance including an updated first plurality of images respectively associated with a plurality of the third group of images that correspond to the updated first set of media items.

16. The method of claim 15, wherein displaying the updated first playlist affordance includes displaying, on the display, an update animation in which one or more of the first plurality of images are replaced with one or more of the third group of images.

17. The method of claim 1, wherein displaying the first image of the first automatically-generated playlist includes displaying a save affordance for saving the first set of media items as a non-updated playlist.

18. The method of claim 3, wherein displaying the first image that corresponds to the first automatically-generated playlist includes displaying a share affordance for sharing the first set of media items with another device as a shared playlist.

19. The method of claim 18, further comprising, in response to the first update criterion being met, updating the first set of media items of the shared playlist.

20. The method of claim 1, further comprising:

while displaying the second image that corresponds to the second automatically-generated playlist, detecting a second user interaction with the second group of images that correspond to the second set of media items;

after detecting the second user interaction with the second group of images that correspond to the second set of media items, detecting that a second update criterion for the second automatically-generated playlist has been met;

in response to detecting that the second update criterion has been met, updating the second set of media items based on the second playlist generation criteria and the user interaction with the representations of the second set of media items; and after updating the second set of media items, displaying, on the display, an updated image that corresponds to the second automatically-generated playlist, the updated image that corresponds to the second automatically-generated playlist including a fourth group of images that correspond to the updated second set of media items.

21. The method of claim 20, wherein the second update criterion is different from a first update criterion associated with the first automatically-generated playlist.

22. The method of claim 21, wherein the first update criterion specifies that the first automatically-generated playlist is to be updated on a first day of the week and the second update criterion specifies that the second automatically-generated playlist is to be updated on a second day of the week that is different from the first day of the week.

23. The method of claim 20, wherein the second playlist generation criteria is different from the first playlist generation criteria.

24. The method of claim 23, wherein the first playlist generation criteria is a first theme selected from a theme set including new releases, older songs, or user favorites and the second playlist generation criteria is selected from the theme set.

25. The method of claim 24, further comprising providing an option to select the first playlist generation criteria and the second playlist generation criteria.

26. The method of claim 20, wherein a number of media items added to the second set of media items is different from a number of the added media items.

27. The method of claim 1, wherein the first automatically-generated playlist is one of seven automatically-generated playlists with seven different playlist generation criteria and seven different update criteria specifying that the respective automatically-generated playlist is to updated on a respective day of the week.

28. A non-transitory computer readable storage medium storing one or more programs, the one or more programs comprising instructions, which, when executed by an electronic device with a display, and an input device, cause the electronic device to:

display, on the display, an image that corresponds to a first automatically-generated playlist, the image that corresponds to the first automatically-generated playlist including a first group of images that correspond to a first set of media items selected for inclusion in the first automatically-generated playlist based on first playlist generation criteria for the first automatically-generated playlist;

detect, via the input device, a user interaction; and in response to detecting the user interaction:

in accordance with a determination that the user interaction corresponds to a first input type, display, on the display, a second image that corresponds to a second automatically-generated playlist, the second image that corresponds to the second automatically-generated playlist including a second group of images that correspond to a second set of media items selected for inclusion in the second automatically-generated playlist based on second playlist generation criteria for the second automatically-generated playlist; and in accordance with a determination that the user interaction corresponds to a second input type:

cease display of the first image that corresponds to the first automatically-generated playlist; and display, on the display, a playlist interface for the first automatically-generated playlist that includes at least a subset of the first group of images displayed adjacent to descriptions that correspond to the first set of media items.

29. The non-transitory computer readable storage medium of claim 28, wherein the instructions further cause the electronic device to:

while displaying the first image that corresponds to the first automatically-generated playlist, detect a second user interaction with the first group of images that correspond to the first set of media items;

after detecting the second user interaction with the first group of images that correspond to the first set of media items, detect that a first update criterion for the first automatically-generated playlist has been met;

in response to detecting that the first update criterion has been met, update the first set of media items based on the first playlist generation criteria and the second user interaction with the first group of images that correspond to the first set of media items, wherein updating the first set of media items includes:

adding one or more added media items to the first set of media items;

removing one or more removed media items from the first set of media items; and maintaining a plurality of maintained media items in the first set of media items; and after updating the first set of media items, display, on the display, an updated first image that corresponds to the first automatically-generated playlist, the first updated image that corresponds to the first automatically-generated playlist including a third group of images that correspond to the updated first set of media items.

30. The non-transitory computer readable storage medium of claim 29, wherein displaying the updated first image that corresponds to the first automatically-generated playlist includes displaying, on the display, one or more new media item indicators displayed in respective association with one or more images of the added media items.

31. The non-transitory computer readable storage medium of claim 29, wherein the first update criterion specifies that the first set of media items is to be updated on a predefined day of the week.

32. The non-transitory computer readable storage medium of claim 28, wherein the instructions further cause the electronic device to:

in accordance with a determination that the user interaction corresponds to a third input type directed to a respective image among the first group of images that correspond to the first set of media items, start playback of the one of the first set of media items.

33. The non-transitory computer readable storage medium of claim 28, wherein the instructions further cause the electronic device to:

while displaying the second image that corresponds to the second automatically-generated playlist, detect a second user interaction with the second group of images that correspond to the second set of media items;

after detecting the second user interaction with the second group of images that correspond to the second set of media items, detect that a second update criterion for the second automatically-generated playlist has been met;

in response to detecting that the second update criterion has been met, update the second set of media items based on the second playlist generation criteria and the user interaction with the representations of the second set of media items; and after updating the second set of media items, display, on the display, an updated image that corresponds to the second automatically-generated playlist, the updated image that corresponds to the second automatically-generated playlist including a fourth group of images that correspond to the updated second set of media items.

34. The non-transitory computer readable storage medium of claim 33, wherein the second update criterion is different from a first update criterion associated with the first automatically-generated playlist.

35. An electronic device comprising:

a display;

an input device; and means for displaying, on the display, an image that corresponds to a first automatically-generated playlist, the image that corresponds to the first automatically-generated playlist including a first group of images that correspond to a first set of media items selected for inclusion in the first automatically-generated playlist based on first playlist generation criteria for the first automatically-generated playlist;

means for detecting, via the input device, a user interaction; and means, responsive to detecting the user interaction, for:

in accordance with a determination that the user interaction corresponds to a first input type, displaying, on the display, a second image that corresponds to a second automatically-generated playlist, the second image that corresponds to the second automatically-generated playlist including a second group of images that correspond to a second set of media items selected for inclusion in the second automatically-generated playlist based on second playlist generation criteria for the second automatically-generated playlist; and in accordance with a determination that the user interaction corresponds to a second input type:

ceasing display of the first image that corresponds to the first automatically-generated playlist; and displaying, on the display, a playlist interface for the first automatically-generated playlist that includes at least a subset of the first group of images displayed adjacent to descriptions that correspond to the first set of media items.

36. An electronic device comprising:

a display unit configured to display a user interface;

one or more input units configured to receive inputs; and a processing unit coupled with the display unit and the one or more input units; the processing unit configured to:

display, on the display unit, an image that corresponds to a first automatically-generated playlist, the image that corresponds to the first automatically-generated playlist including a first group of images that correspond to a first set of media items selected for inclusion in the first automatically-generated playlist based on first playlist generation criteria for the first automatically-generated playlist;

detect, via the one or more input units, a user interaction; and in response to detecting the user interaction:

in accordance with a determination that the user interaction corresponds to a first input type, display, on the display unit, a second image that corresponds to a second automatically-generated playlist, the second image that corresponds to the second automatically-generated playlist including a second group of images that correspond to a second set of media items selected for inclusion in the second automatically-generated playlist based on second playlist generation criteria for the second automatically-generated playlist; and in accordance with a determination that the user interaction corresponds to a second input type:

cease display of the first image that corresponds to the first automatically-generated playlist on the display unit; and display, on the display unit, a playlist interface for the first automatically-generated playlist that includes at least a subset of the first group of images displayed adjacent to descriptions that correspond to the first set of media items.

37. The electronic device of claim 36, wherein the processing unit is further configured to:

while displaying the first image that corresponds to the first automatically-generated playlist, detect a second user interaction with the first group of images that correspond to the first set of media items;

after detecting the second user interaction with the first group of images that correspond to the first set of media items, detect that a first update criterion for the first automatically-generated playlist has been met;

in response to detecting that the first update criterion has been met, update the first set of media items based on the first playlist generation criteria and the second user interaction with the first group of images that correspond to the first set of media items, wherein updating the first set of media items includes:

adding one or more added media items to the first set of media items;

removing one or more removed media items from the first set of media items; and maintaining a plurality of maintained media items in the first set of media items; and after updating the first set of media items, enable display of, on the display unit, an updated first image that corresponds to the first automatically-generated playlist, the first updated image that corresponds to the first automatically-generated playlist including a third group of images that correspond to the updated first set of media items.

38. The electronic device of claim 37, wherein displaying the updated first image that corresponds to the first automatically-generated playlist includes displaying, on the display, one or more new media item indicators displayed in respective association with one or more images of the added media items.

39. The electronic device of claim 37, wherein the first update criterion specifies that the first set of media items is to be updated on a predefined day of the week.

40. The electronic device of claim 36, wherein the instructions further cause the electronic device to:

in accordance with a determination that the user interaction corresponds to a third input type directed to a respective image among the first group of images that correspond to the first set of media items, start playback of the one of the first set of media items.

41. The electronic device of claim 39, wherein the processing unit is further configured to:

while displaying the second image that corresponds to the second automatically-generated playlist, detect a second user interaction with the second group of images that correspond to the second set of media items;

after detecting the second user interaction with the second group of images that correspond to the second set of media items, detect that a second update criterion for the second automatically-generated playlist has been met;

in response to detecting that the second update criterion has been met, update the second set of media items based on the second playlist generation criteria and the user interaction with the representations of the second set of media items; and after updating the second set of media items, display, on the display, an updated image that corresponds to the second automatically-generated playlist, the updated image that corresponds to the second automatically-generated playlist including a fourth group of images that correspond to the updated second set of media items.

42. The electronic device of claim 41, wherein the second update criterion is different from a first update criterion associated with the first automatically-generated playlist.

* * * * *